(12) United States Patent
Von Bargen

(10) Patent No.: US 11,149,719 B2
(45) Date of Patent: Oct. 19, 2021

(54) EDDRIVE PROPELLANTLESS PROPULSION SYSTEM

(71) Applicant: Edward Von Bargen, Shirley, NY (US)

(72) Inventor: Edward Von Bargen, Shirley, NY (US)

( * ) Notice: Subject to any disclaimer, the term of this patent is extended or adjusted under 35 U.S.C. 154(b) by 0 days.

(21) Appl. No.: 16/564,471

(22) Filed: Sep. 9, 2019

(65) Prior Publication Data

US 2020/0080546 A1    Mar. 12, 2020

Related U.S. Application Data

(60) Provisional application No. 62/729,143, filed on Sep. 10, 2018.

(51) Int. Cl.
*F03G 3/00* (2006.01)

(52) U.S. Cl.
CPC ..................... *F03G 3/00* (2013.01)

(58) Field of Classification Search
CPC .................... F03G 3/00; F03G 3/06
See application file for complete search history.

(56) References Cited

U.S. PATENT DOCUMENTS 3,530,617 A * 9/1970 Halvorson ........... A63H 18/007
446/484
3,653,269 A * 4/1972 Foster ................... F03G 7/10
74/84 S (Continued)

FOREIGN PATENT DOCUMENTS

GB      2426315 A    11/2006
JP   2016079918 A     5/2016

OTHER PUBLICATIONS

Millis, Marc G.; "Assessing Potential Propulsion Breakthroughs;" National Aeronautics and Space Administration, Glenn Research Center, Cleveland, Ohio; Prepared for the New Trends in Astrodynamics and Applications II—An International Conference sponsored by NASA Headquarters and Princeton University, Princeton, New Jersey, Jun. 3-5, 2005; dated Dec. 2005; NASA/TM-2005-213998; https://ntrs.nasa.gov/search.jsp?R=200600000222019-10-11T16:18:03+00:00Z.

(Continued)

*Primary Examiner* — David M Fenstermacher
(74) *Attorney, Agent, or Firm* — Hoffmann & Baron, LLP

(57) ABSTRACT

The invention is a method and system for electric-powered propellantless propulsion in space. In addition to its breakthrough methods to produce thrust, the invention is also incorporated into propellantless velocity control and propellantless direction control systems. Disclosed herein are multiple embodiments of a mechanical propulsion system that do not require a propellant and do not violate Newton's Laws of Motion. The invention produces a significant amount of thrust solely in the intended direction of the propulsion system, with the main elements needed for the invention's successful operation successfully tested using multiple prototypes. Due to the Law of Conservation of Momentum, propellantless propulsion by mechanical means is generally considered not possible by propulsion experts. But with the advent of an innovative new technology that was inspired by recent advancements in the fields of renewable energy and energy storage, a revolutionary new form of propellantless propulsion that can harvest kinetic energy and simultaneously produce a significant amount of thrust has indeed now become possible.

20 Claims, 41 Drawing Sheets

(56) References Cited

U.S. PATENT DOCUMENTS

| | | | | |
|---|---|---|---|---|
| 4,238,968 A | * | 12/1980 | Cook | F03G 3/00 |
| | | | | 74/84 R |
| 8,066,226 B2 | | 11/2011 | Fiala et al. | |
| 2003/0066382 A1 | * | 4/2003 | Love | F03G 7/10 |
| | | | | 74/574.2 |
| 2005/0109138 A1 | | 5/2005 | Tavarez | |
| 2005/0160845 A1 | * | 7/2005 | Keefe | F03G 7/10 |
| | | | | 74/84 S |
| 2005/0183524 A1 | * | 8/2005 | Governo | F03G 3/08 |
| | | | | 74/84 S |
| 2005/0247145 A1 | * | 11/2005 | LeGoff | F03G 7/00 |
| | | | | 74/84 S |
| 2006/0005644 A1 | * | 1/2006 | Weaver | F03G 3/06 |
| | | | | 74/84 S |
| 2006/0123937 A1 | * | 6/2006 | Tsepenyuk | F03G 7/10 |
| | | | | 74/84 S |
| 2006/0169073 A1 | * | 8/2006 | Charette | F03H 99/00 |
| | | | | 74/84 S |
| 2006/0213293 A1 | * | 9/2006 | Lasch | F03G 3/08 |
| | | | | 74/84 S |
| 2007/0295164 A1 | | 12/2007 | Tavarez | |
| 2011/0073715 A1 | | 3/2011 | Macaulife | |
| 2011/0219893 A1 | | 9/2011 | Fiala et al. | |

OTHER PUBLICATIONS

International Search Report and Written Opinion from corresponding PCT Application No. PCT/US2019/050216, dated Oct. 30, 2019.

\* cited by examiner

EDDRIVE PROPELLANTLESS PROPULSION SYSTEM

CROSS REFERENCE TO RELATED APPLICATION

This application claims the benefit of U.S. Provisional Application No. 62/729,143, filed on Sep. 10, 2018, which is incorporated herein by reference.

BACKGROUND

Since there are so few methods that have been found to do it successfully, and the enduring limitations of those few that have been found over many decades, inertial propulsion has never lived up to its perceived potential. Inertial propulsion is commonly defined as propelling a vehicle without the use of a propellant such as rocket fuel or ions, or by the application of an obvious "external force". In short, inertial propulsion is propellantless propulsion.

Commonly accepted types of Inertial or Propellantless Propulsion include: (1) Solar Sails—which make use of the miniscule amount of momentum elicited by photons emitted from the sun to exert pressure on a sail; (2) Electromagnetic Tethers—which use long cables and the Earth's magnetic field to elicit a small amount of limited motion; (3) Gravity Assist—which use the gravitational field of planets or moons that are along a spacecraft's path to slingshot around the planet or moon and accelerate or change direction; (4) Laser—which use photons from lasers instead of the sun to push space sails.

Confronted by the physical limits of rocketry and space sails, NASA established the "Breakthrough Propulsion Physics Project" in 1996 seeking to facilitate what were then considered to be what would be the ultimate breakthroughs in space transportation. They included new propulsion technologies that required no propellant mass, propulsion that attains the maximum transit speeds physically possible, breakthrough methods of energy production to power such devices, and the kind of technological breakthroughs that might make human voyages to other star systems possible. Because of the provocative nature of actively seeking such fantastic breakthroughs as warp drives and traveling through wormholes to reach other parts of the galaxy, this work received much media attention. As a result of the media exposure, the NASA Breakthrough Propulsion Physics Project became overwhelmed with submissions from expert and amateur enthusiasts alike who wished to contribute their ideas. By the time the project was unceremoniously ended in 2002, thousands of submissions had been received and were examined.

But it wasn't the number of submissions that led to the program being terminated. In addition to the lack of funding, the biggest problem was that after thousands of submissions, not a single person had submitted an idea that appeared to work. In fact, a great many of the submissions to the project involved concepts that were already known not to work. This led to subsequent research whose results were published by Marc G. Millis from the NASA Glenn Research Center in 2005 in a report titled: "Assessing Potential Propulsion Breakthroughs."

The findings of the report were separated into three main categories: "Non-Viable Approaches," "Unresolved Approaches" and "Candidates for Continued Research."

Non-Viable Approaches

Oscillation Thrusters and Gyroscopic Antigravity Devices: A large number of mechanical devices that claim to produce net external thrust, using just the motion of internal components, are often proposed. These devices fall into two categories, oscillation thrusters and gyroscopic devices. Their appearance of creating net thrust is attributable to misinterpretations of normal mechanical effects.

Oscillation thrusters move a system of internal masses through a cycle where the motion in one direction is quicker than in the return direction. When the masses are accelerated quickly, the device has enough reaction force to overcome the friction of the floor and the device slides. When the internal masses return slowly in the other direction, the reaction forces are not sufficient to overcome the friction to move the device. The net effect is that the device moves in one direction across a frictional surface. In a frictionless environment, the whole system would simply oscillate around its center of mass.

A gyroscope thruster consists of a system of gyroscopes connected to a central body. When the central body is torqued, the gyros move in a way that appears to defy gravity. Actually the motion is due to gyroscopic procession and the forces are torques around the axes of the gyros mounts. There is no net thrust created by the system.

Hooper Antigravity Coils: Experiments were conducted to test assertions from U.S. Pat. No. 3,610,971, by W. J. Hooper that self-cancelling electromagnetic coils can reduce the weight of objects placed underneath. No weight changes were observed within the detectability of the instrumentation. More careful examination led to the conclusion that Hooper may have thermal effects as his "Motional Field" effects.

Schlicher Thrusting Antenna: Tests of a specially terminated coax, which claimed to create more thrust than attributable to photon radiation pressure, revealed that no such thrust was present.

Podkletnov Gravity Shield: A controversial claim of "gravity shielding" using rotating superconductors and radio-frequency radiation was published based on work done at Finland's Tampere Institute. A privately funded replication of the Podkletmov configuration "found no evidence of a gravity-like force to the limits of the apparatus sensitivity," where the sensitivity was, "50 times better than that available to Podkletnov."

Coronal Blowers: There are many variants of the original patent where high-voltage capacitors create thrust, many of which claim that the thrust is a new physical affect akin to antigravity. These go by such terms as: "Biefeld-Brown effect," "lifters," "electrostatic antigravity," "electrogravitics," and "asymmetrical capacitors." To date, all rigorous experimental tests indicate that the observed thrust is attributable to coronal wind. Quoting from one such finding: " . . . their operation is fully explained by a very simple theory that uses only electrostatic forces and the transfer of momentum by multiple collisions [with air molecules]."

Quantum Tunneling as an FTL venue: A prerequisite to faster-than-light travel is to prove faster-than-light information transfer. The phenomenon of quantum tunneling, where signals appear to pass through barriers at superluminal speed, is often cited as such empirical evidence. Experimental and theoretical work indicates that the information transfer rate is only apparently superluminal, with no causality violations. Although the leading edge of the signal does appear to make it through the barrier faster, the entire signal is still light speed limited. This topic still serves, however, as a tool to explore this intriguing aspect of physics.

And more recently, the much publicized EmDrive—which attempted to use microwaves bouncing around inside a cone-shaped chamber to generate thrust—was also proven not to work, with the previously reported about 4 millinewtons of thrust being the result of a testing flaw.

Unresolved Approaches

Woodward's Transient Inertial Oscillations: Experiments and theories published by James Woodward claim that oscillatory changes to inertia can be induced by electromagnetic means. U.S. Pat. No. 6,098,924 claims how this can be used for propulsion and also claims Conservation of Momentum is satisfied by evoking interpretations of Mach's principle. However, independent verification experiments, using techniques less prone to spurious effects, were unable to reliably confirm or dismiss the claims. Woodward and others continue with experiments and publications to make the effect more pronounced and to more clearly separate the claimed effects from experimental artifacts. The oscillatory inertia approach is considered unresolved.

Abraham-Minkowski Electromagnetic Momentum: More than one approach attempts to use an unresolved question of electromagnetic momentum (Abraham-Minkowski controversy) to suggest a new space propulsion method. The equations that describe electromagnetic momentum in a vacuum are well established (photon radiation pressure), but there is still debate concerning momentum within dielectric media. In all of the proposed propulsion methods, the anticipated forces are relatively small (comparable to experimental noise) and critical issues remain unresolved. In particular, the conversion of an oscillatory force into a net force remains questionable and the issue of generating external forces from different internal momenta remains unproven.

Inertia and Gravity Interpreted as Quantum Vacuum Effects: Theories are entering peer-reviewed literature that assert that gravity and inertia are side effects of the quantum vacuum. The theories are controversial and face many unresolved issues. In essence this approach asserts that inertia is related to an electromagnetic drag force against the vacuum when matter is accelerated, and that gravity is the result of asymmetric distributions of vacuum energy caused by the presence of matter. The space propulsion implications of these theories have been raised, but experimental approaches to test these assertions have not yet entered literature.

Podkletnov Force Beam: On an Internet physics archive it is claimed that forces can be imparted to distant objects using high-voltage electrical discharges near superconductors. Between 0.0004 to 0.0023 Joules of mechanical energy are claimed to have been imparted to an 18.5 gram pendulum located 150 meters away and behind brick walls of a separate building. Like the prior gravity shielding claims, these experiments are difficult and costly to duplicate and remain unsubstantiated by reliable independent sources.

Candidates for Continued Research

Space Drives: "Space Drive" is a general term used to encompass the ambition of propulsion without propellant. The two largest issues facing this ambition are to find a way for a vehicle to induce external net forces on itself, and secondly, to satisfy Conservation of Momentum in the process. Several avenues for research remain, including: (1) investigate space from the perspective of new sources of reaction mass, (2) revisit Mach's Principle to consider coupling to surrounding mass via inertial frames, and (3) investigate the coupling between gravity, inertia, and controllable electromagnetic phenomena. These are very broad and open to areas where a variety of research sequels could emerge.

Reaction mass in space—A key aspect of Conservation of Momentum is the reaction mass. When an automobile accelerates, its wheels push against the road using the Earth as the reaction mass. Helicopters and aircraft use the air as their reaction mass. In space, where there are no roads or air, a rocket must bring along propellant to thrust against. To contemplate space travel that circumvents the propellantless limits of rockets, some other indigenous reaction mass must be found along with the means to induce net forces on the reaction mass.

Continued observations reveal a number of interesting phenomena of space. Although none are directly suitable as reactive media, they are at least indicative that space has substantive properties whose further study pertains to breakthrough spaceflight. Cosmological observations have revealed the Cosmic Microwave Background Radiation, Dark Matter, Dark Energy, and quantum physics has revealed Zero Point Energy. The Cosmic Background Radiation is low-energy microwave radiation whose composite motion is coincident with the mean reference frame of the Universe. Although too weak to be used as a reactive media, its existence and directional dependence is thought provoking in the context of space travel. Dark Matter is the term used to encompass observations that there is more gravitating matter at galactic scales than can be observed. Some estimates are that more than 90 percent of the matter in galaxies is not directly visible. One of the key supporting empirical observations is the anomalous rotation rates of galaxies, where the galaxies appear to hold together more strongly than can be accounted for by the visible matter. From the propulsion point of view, the suitability of Dark Matter as a reaction mass has not yet been rigorously studied. On even larger scales, anomalous red-shifts from the most distant matter of the Universe suggest that the Universe is expanding at an accelerating rate. The working hypothesis for this anomaly is dubbed Dark Energy and it is conjectured to be an antigravity-like effect. Again, the propulsion implications of such phenomena have not been explored. And lastly, the quantum vacuum phenomenon of Zero Point Energy suggests that even the most empty of space still contain some nonzero amount of energy.

Now while using Cosmic Microwave Background Radiation, Zero Point Energy, or so-called Dark Matter and/or Dark Energy in any capacity whatsoever for propellantless propulsion purposes sounds intriguing, it is not something that is currently possible. (Research continues to be done with this goal in mind, but there have been no significant breakthroughs publically acknowledged to date.) However, what is indeed possible now—more than 13 years after Mr. Millis wrote his detailed report, "Assessing Potential Propulsion Breakthroughs" for NASA, and especially since old notions are sometimes proven outdated with new scientific discoveries—is that a new type of propellantless propulsion system that produces a significant amount of thrust by purely mechanical means can indeed be done now using the EdDrive Propellantless Propulsion System.

SUMMARY OF THE INVENTION

The invention is a method and system for electric-powered propellantless propulsion for in-space spacecraft, space stations, new spacecraft docking infrastructure, gateways, satellites, telescopes, communication devices, cargo carriers, very low-gravity landers, robots, small and mid-sized astronaut transporters, and many others. In addition to its breakthrough methods to produce thrust, the invention will also be incorporated into electric-powered propellantless velocity control and electric-powered propellantless direction control systems. Disclosed herein are multiple potential embodiments of a mechanical propulsion system that do not require a propellant and do not violate Newton's Laws of Motion. The invention produces a significant amount of thrust solely in the intended direction of the propulsion system, with the main elements needed for the invention's successful operation successfully tested using multiple prototypes. Due to the Law of Conservation of Momentum, and thousands of failed attempts over many decades, propellantless propulsion by purely mechanical means is generally considered not possible by propulsion experts. But with the advent of an innovative new breakthrough technology that was inspired by recent advancements in the fields of renewable energy and energy storage, as well as recent improvements in the fields of Artificial Intelligence and Machine Learning, a revolutionary new form of propellantless propulsion that can harvest kinetic energy and simultaneously produce a significant amount of thrust at the same time has indeed now become possible.

It is therefore an object of the present invention to provide a method and system for propellantless propulsion that can be used with a wide variety of spacecraft and other space-based vehicles.

It is also an object of the present invention to provide a purely mechanical means to produce a significant amount of thrust and also satisfy Conservation of Momentum in the process.

It is also an object of the invention to embrace Newton's Third Law of Motion (for every action, there is an equal and opposite reaction) and take advantage of it and innovative new types of "action and reaction" combinations (or pairs) to quickly and efficiently generate the force that is needed to set an object with a considerable amount of mass in motion and subsequently use its kinetic energy to produce a significant amount of thrust during each full cycle of the invention.

It is also an object of the invention to complete the innovative new types of "action and reaction" combinations during the initial force generating phase of the invention without causing any movement whatsoever by the spacecraft when possible and appropriate.

It is also an object of the invention to complete the innovative new types of "action and reaction" combinations during the initial force generating phase of the invention without causing any net negative movement by the spacecraft in instances when movement is unavoidable or appropriate.

It is also an object of the invention to complete the innovative new types of "action and reaction" combinations during the initial force generating phase of the invention while maintaining the vast majority of the kinetic energy that was generated during the initial force generating phase and continue to maintain it as the invention seamlessly transitions over to the propulsion producing phase.

It is also an object of the invention to safely propel spacecraft on long-distance journeys at incredible speeds that are far beyond what is now possible with propellant-based technologies.

It is also an object of the invention to use revolutionary new clean energy harvesting and clean energy storage technologies to dramatically increase the energy efficiency of the invention, and do it while simultaneously producing a significant amount of thrust at the same time.

It is also an object of the invention for the invention to be used when needed for Propellantless Velocity Control and Propellantless Direction Control purposes.

At the heart of the EdDrive Propellantless Propulsion System, and what makes it possible to meet these and many other objectives, is a pretty straight-forward combination of basic concepts that are based on well-known and recognized laws of physics. Moreover, in addition to being based on well-known and recognized laws of physics, this combination of basic concepts are also essential for the successful operation of the EdDrive and its various units and systems, as well as their different embodiments. This combination of basic concepts generally works as follows:

In order to move or propel an object in space with a greater mass than itself, object 1 is first set in motion using mechanical means. Once in motion, object 1 (the projectile) then interacts with object 2 (the larger mass object) and they become stuck together by mechanical means. Once the projectile and the larger mass object become stuck together and can't be separated until the mechanical devices holding them together release them, the force (f=ma) of the projectile in motion either pushes or pulls the larger mass object in the direction it had been going (or the direction of its momentum). If the projectile and the larger mass object were both going in the same direction, the larger mass object will accelerate and increase in velocity. If the projectile and the larger mass object were going in opposite directions, the larger mass object will decelerate and decrease in velocity. Either way, the projectile and the larger mass object will both be traveling together at the same velocity once they become stuck together.

Even though manual-powered options that can be used as a last resort in extreme circumstances will be covered later, the invention is primarily powered by electric power. Electric power is the rate per unit time at which electric energy is transferred by an electric circuit. The International Standard Unit for electric power is the watt, one joule per second. Electric power is usually produced by electric generators, but can also be supplied by sources such as solar panels and batteries. Since the invention will be used in space for propulsion purposes—and solar panels are currently a widely used power source for spacecraft, satellites, the International Space Station, as well as many other human-made objects in space—solar power is clearly an option to power the invention and will be used as much as is realistically possible. Unlike on Earth, where access to solar power is obviously limited by the rotation of the Earth and also by such factors as time of year, sun angle and weather conditions, the sun is available to provide unobstructed sunlight to solar panels in space 24 hours a day, 7 days a week, 365 days a year. The main limiting factor for solar panels in space—other than, of course, not going behind planets or moons (or even asteroids), away from the sun—is how far away from the sun the solar panels are located. Basically, the farther away from the sun, the less power that can be produced.

The second, and ideally primary, potential source of electric power for the invention will be nuclear power. Nuclear power sources that can be used in space come in a wide variety of forms. They include Radioisotope Thermoelectric Generators (RTGs), the Kilopower Uranium-235 Fission Reactor, as well as many different and more powerful Nuclear Fission Reactors, including many that have been under development since the 1960s.

Radioisotope Thermoelectric Generators provide a source of power where a chain reaction does not take place. The power depends on the initial amount of the radioisotope used as fuel and the power is provided by converting the heat generated by radioactive decay of the radioisotope into electricity using thermocouples. Most RTGs use plutonium-238. With the use of RTGs, the power generated cannot be varied or shut down so supplementary batteries are often used for peak times. RTGs are normally used when spacecraft require less than 100 kW. Above that, fission systems are more cost effective than RTGs.

Kilopower is an experimental project aimed at producing a new design for nuclear reactors to generate electric power in space. The project started in October 2015, led by NASA and the U.S. Department of Energy's National Nuclear Security Administration. The Kilopower reactors are intended to come in four sizes that will be able to produce from one to 40 kilowatts of electric power per hour and operate continuously for 10 years—and potentially as many as 12 to 15 years. The Kilopower fission reactor uses uranium-235 to generate heat that is carried to the Stirling converters via titanium heat pipes. Since successfully completing the testing of the Kilopower reactor in March of 2018 using improved Stirling technology (which dates all the way back to 1816 with the Stirling Engine and its inventor Robert Stirling), the Kilopower team has been developing mission concepts and performing additional risk reduction activities to prepare for a possible future flight demonstration.

In order to meet greater energy needs, more powerful Fission Reactors, including those that can continuously produce in excess of two megawatts of electric power per hour (<2 MW), and do so for as long as seven to 10 years, have been successfully "paper tested" for several decades. The most likely reason why none of them are currently being used in any capacity (there are certainly enough approved and also expired patents that contain all the basic ingredients necessary to produce a usable fission reactor that could be used in space) is because of the size limitations—mostly related to how much fuel or propellant can be carried onboard—and other constraints that are characteristic of propellant-based propulsion technologies. The EdDrive Electric-Powered Propellantless Propulsion System will undoubtedly change that.

The third source of electric power for the invention will make use of stored energy. Since lithium-ion batteries don't work well in cold conditions and wear out relatively quickly with repeated use, the preferred energy storage technology for the invention will be supercapacitors over batteries. Capacitors, unlike batteries that store potential energy in chemical form, store potential energy in an electric field. Going an adaptation further, a supercapacitor is a high-capacity capacitor with capacitance (the ability of a system to store an electric charge) values much higher than other capacitors. They typically store 10 to 100 times more energy per unit volume or mass than electrolytic capacitors. And fortunately, like other capacitors, supercapacitors can also accept and deliver a charge much faster than batteries and tolerate many more charge and discharge cycles than rechargeable batteries.

The ability of supercapacitors to accept and deliver a charge much faster and have many more charge and discharge cycles will be put to good use by the invention. Nuclear reactors produce a lot of waste heat. When necessary, some of it can be used to heat the air-filled interior of a spacecraft as well as other sealed containment vessels where the individual "units" of the invention may be operating—more so the farther away from the sun it is. But a lot of the waste heat will also be able to be converted into usable energy and stored in the supercapacitors or other storage devices including flywheels. Surplus energy produced by solar panels and/or from a nuclear power source (or sources) will also be able to be stored and used as needed. There will also be multiple small-scale energy harvesting technologies used whenever possible that will be able to harvest waste energy generated from whatever internal systems are used and also put to good use as needed. Better batteries, especially those that will work in cold conditions and have many more charge and discharge cycles, are inevitable and will also be utilized as they become available. Then there is Breakthrough Method #2, which will make it possible to harvest and store and also reuse a significant amount of the energy that is used to power the invention and, quite remarkably, also be able to do it while simultaneously producing thrust. This breakthrough technology of the EdDrive alone will totally revolutionize space travel.

Bottom line: whether the EdDrive Electric-Powered Propellantless Propulsion System is used by a small satellite or a large space hub that can accommodate numerous spacecraft, there are more than enough technologies now known that can be made available through various means to provide it with a reliable primary and constant source of electric power. A person skilled in the art of nuclear and other power sources that have been, are, or can potentially be used in space in the future (including fusion) will know this.

The ability of supercapacitors to accept and deliver a charge much faster and have many more charge and discharge cycles will be important for another very important reason. The invention is a mostly mechanical device and it will have "gaps" in time between when the electricity that is being produced is actually being used by the invention's various components and when it is not. But more importantly, there will also be instances when the supercapacitor's ability to provide a supercharged burst of energy will be essential for the invention—or whatever larger system it is a part of—to operate properly. And thanks to the supercapacitors and recent improvements in artificial intelligence and machine learning, it will be possible to do. With the invention, not only will what happens every second be important, so will every millisecond.

In this regard, and also on the subject of time or time periods, there are two major time periods (Phase 1 and Phase 2) that occur during the normal operation of the invention during which innovative new concepts and technologies will be used that are uniquely characteristic of the invention and will become an undeniable reality of the EdDrive Propellantless Propulsion System. Furthermore, these innovative new concepts and technologies, which will be at the forefront of what takes place during Phase 1 and Phase 2, will be essential for the EdDrive to operate successfully regardless if only one "unit" of the invention is being used or multiple "units" of the invention are being used in a variety of different ways.

During the first time period of the invention (or Phase 1), the invention will take a certain amount of time—which will also vary depending on what rate of acceleration or deceleration is needed and possible at the time, the latter also including the amount of electric power available—to generate the force ($f=ma$) that will be required to set in motion the main source (or sources) of mass that will be used by the invention (previously known as object 1 or the projectile) so it can interact with the spacecraft or other space-based vehicle (previously known as object 2 or the larger mass object) and increase or decrease its velocity or rate of speed. This initial period of time (or Phase 1) in the multi-phase "cycle" of the invention—which will include when all the force will be generated that will subsequently be converted into kinetic energy and used by the invention during Phase 2 to propel by primarily accelerating or decelerating the spacecraft or other host object (henceforth called the host vehicle)—will be composed of a very efficient and compact series of different "action and reaction" procedures or maneuvers. In addition to their primary objective of generating force during Phase 1, this compact series of "action and reaction" procedures or maneuvers will also be intended (at least in the most efficient and effective potential embodiments) to do so without affecting the movement of the host vehicle in any way whatsoever during the process of the force being generated. Moreover, whether Breakthrough Method #1 (BM #1) or Breakthrough Method #2 (BM #2) is used or implemented during Phase 2 to make use of the force (primarily in the form of the kinetic energy of object 1 or the projectile) generated during Phase 1 to produce thrust and propel the host vehicle, it will be the intention of either BM #1 (without harvesting and storing energy) or BM #2 (with the harvesting and storing of energy) to ultimately only move the host vehicle in the direction that is intended, and only do it at its new and possible and desired velocity or rate of speed.

The EdDrive Propellantless Propulsion System is basically a tale of two of the most well established and accepted laws of physics. The invention starts this tale of two laws of physics at the beginning of its "cycle" in Phase 1 by actually embracing Newton's Third Law of Motion (for every action, there is an equal and opposite reaction) and using it to its distinct advantage. It does this by taking a different approach. Instead of trying to somehow beat Newton's Third Law of Motion (like so many have tried to do in the past), the EdDrive is an undeniable acknowledgement that if you want to use a mostly mechanical device to actually go somewhere in space, you better try something new.

With the EdDrive Propellantless Propulsion System, this new approach means starting by designing a compact series of unconventional "action and reaction" procedures or maneuvers to generate force (f=ma), with the different "action and reaction" combinations (or pairs) designed and fully intended to perfectly cancel each other out and produce absolutely no unwanted movement or, in the case of some of the less effective embodiments used during Phase 1, at least no net movement in an undesired direction by the host vehicle the propulsion system is intended to move. This new approach also means that this compact series of unconventional "action and reaction" combinations, which are needed to generate the force that will subsequently be used to actually produce motion, will be performed in a way that will make it possible for the invention to maintain the vast majority of the force that was initially generated in Phase 1, and continue to maintain it, as the invention seamlessly transitions from the generating force phase in Phase 1 to the motion (typically acceleration or deceleration) producing phase (or Phase 2) in the invention's incredibly efficient full cycle.

The second law of motion in the invention's tale of two laws of physics is the Law of Conservation of Momentum. As with the invention's prior embrace of Newton's Third Law of Motion—which was accomplished by the invention's use of a compact series of "action and reaction" procedures or maneuvers during Phase 1 that perfectly cancel each other out in each instance without causing any movement whatsoever by the host vehicle (primarily the first "action and reaction" procedure or maneuver) or at least no net negative movement by the host vehicle (primarily the second "action and reaction" procedure or maneuver, except in the case of the ninth embodiment of the invention, which causes no movement whatsoever by the host vehicle during Phase 1) and still generate the force that is subsequently used to produce a significant amount of thrust per cycle—the invention also embraces the Law of Conservation of Momentum in Phase 2. This is where the real "breakthrough technology" of the invention (or at least when it first became apparent that the harvested kinetic energy of a projectile could potentially be used for propulsion purposes in space) comes into play—and also another concept or aspect of the invention that (along with Breakthrough Method #1, which actually came afterward) is essential for it to be operated successfully.

The Law of Conservation of Momentum—In a closed system (one that does not exchange any matter with its surroundings and is not acted on by external forces) the total momentum is constant. In other words, an object in motion will stay in motion unless it is acted upon by another object or external force.

The breakthrough technology of the invention, inspired by recent advancements in the fields of renewable energy and energy storage, goes right at the problem of Conservation of Momentum. Through an innovative new process of momentum conversion, the momentum of the main source of mass of the invention (object 1 or the projectile) that is put into motion by the invention in Phase 1, and also still possessing the vast majority of the kinetic energy that was generated in Phase 1, is seamlessly transferred to and shared with the host vehicle (object 2 or the larger mass object). But that doesn't mean the invention's main source of mass that was previously set in motion doesn't also remain in motion. It means the mass set in motion (the large mass object or projectile) and the host vehicle both end up moving together in unison—a perfect example of an inelastic collision during which both objects become stuck together and move together at the same velocity afterward. And while several things need to happen incredibly quickly in order for this seamless transfer/combination of momentum to occur—including how the resulting velocity they both move together at afterward is reduced for the projectile due to the added and greater mass of the host vehicle–the momentum (p) or (p=my) of the combined masses (P1(initial))+(P2(initial))=(P1(final))+(P2(final)) nevertheless remains the same. As a result, Conservation of Momentum is fully realized.

Because of the profound impact this new breakthrough in propellantless propulsion will have on the future of human endeavors in space, the added knowledge or reality that this seamless transfer/combination and recalibration of momentum can also be done in multiple ways might seem a little anticlimactic. But it shouldn't be. In fact, as touched on earlier, it is probably an understatement to say at this juncture that the many potential embodiments of what will be called, "Breakthrough Method #2" or BM #2 (with the harvesting and storing of energy) for brevity and simplicity's sake as the many potential embodiments of both Breakthrough Method #1 and Breakthrough Method #2 are described in more detail throughout this document, also have quite a remarkable added benefit.

The first Breakthrough Method of the invention (BM #1) is a pretty straight-forward, bare-bones, transfer/combination and recalibration of momentum with no added bonus. The second Breakthrough Method of the invention (BM #2), on the other hand, definitely has the added bonus of also being able to harvest a significant amount of kinetic energy and then store it as electrical energy. BM #2 does its rather opportunistic harvesting of kinetic energy and then storing of electrical energy by making a rather simple improvement beyond what must already be done in BM #1, and it does it without losing any of the momentum that is ultimately shared by the large mass object (object 1 or the projectile) and the host vehicle (object 2 or the larger mass object) in the process of carrying out and completing Breakthrough Method #2, which includes its primary function of also producing a significant amount of thrust.

Perhaps the easiest way to explain how either Breakthrough Method #1 (embodiments without harvesting and storing energy) or Breakthrough Method #2 (embodiments with the harvesting and storing of energy) is done is to start with a simple analogy. Imagine a steel sled sitting at the top of a snow covered hill that just needs a good push to go over the side. Now imagine yourself getting a running start and jumping forward onto the sled. Normally your forward momentum (p=my) as you land and remain standing on the deck of the sled will carry both of you the short distance needed to go over the edge and down the other side.

Now imagine yourself (object 1 or the projectile) doing something similar in space with the object you are jumping on (object 2 or the large mass object) floating freely before you. Then also imagine at the same time that (just as with how the "action and reaction" combinations in Phase 1 will cancel each other out thanks to Newton's Third Law of Motion) the reaction mass you needed to push off of in order to leap forward has already been taken out of the equation (not unlike how the projectile will be set freely in motion while the equal and opposite "action and reactions" combinations that set the projectile in motion cancel each other out and produce no unintended motion by the host vehicle). Since there is no friction and very little gravity to contend with once you land and stand firmly on the object floating before you, your momentum will undoubtedly propel the object forward and take you along for the ride.

Similarly, with the real thing, the host vehicle and the previously freely moving main source of mass used by the invention to produce thrust (the large mass projectile or LMP)—which could actually be located within the main body of the host vehicle or, more likely, within a long, hollow, pipe-shaped, sealed containment vessel (which could look very much like the main body of a typical booster rocket connected to the main body of a rocket from the outside) and that is securely connected to the main body of the host vehicle by virtue of one of the different methods of connecting and housing the different "units" of the invention—will also not only accelerate together for a very brief amount of time while the transfer/combination of momentum is taking place, but they will both continue on together at their new, increased, recalibrated velocity until the invention can produce another round (or cycle) of thrust.

There will, however, be some notable differences between how the two breakthrough methods produce that round (or cycle) of thrust. For starters, Breakthrough Method #1 is certainly done faster. With no energy to be harvested and stored for future use, quite a few milliseconds of time will be saved as the large mass projectile (or LMP) of the invention, which was set in motion in Phase 1 and continued in motion at the very beginning of Phase 2, actually "pushes or pulls" (depending on which embodiment of the invention and also which embodiment of BM #1 is being used) the host vehicle along with it as the transfer/combination of momentum between the two of them is consummated. Moreover, while both breakthrough methods use the LMP (or LMPs) to either push or pull the host vehicle at the beginning of Phase 2 in order to accelerate or decelerate it—which is perfectly consistent with what would be expected to happen due to the Law of Conservation of Momentum—that is where the similarities end.

Because Phase 1 ends just after the LMP is set freely in motion along with the creation of an all new reaction (reaction #3 in most potential embodiments), which unlike the "action and reaction" combinations (or pairs) that proceeded it that perfectly canceled each other out without causing any movement whatsoever by the host vehicle (primarily the first "action and reaction" combination) or at least no net negative movement by the host vehicle (primarily the second "action and reaction" combination)—and also what occurs in most of the potential embodiments of the invention that will be described herein with the exception of the ninth—the new reaction (or reaction #3), which is actually an ancillary result or product of the actions of the previous "action and reaction" combinations, can indeed be used by itself by the invention to produce a significant amount of thrust. However, because an object in motion in space (object 1 or the projectile) will remain in motion unless it is acted upon by an external force (such as those provided by BM #1 and BM #2), in order to keep reaction #3 from ultimately leading to and causing a reaction #4, the different breakthrough methods of the invention will need to quickly convert reaction #3 into thrust. But several things need to happen first.

Most of the potential embodiments of the invention that are included in this patent application—which means the first, second, third, fourth, sixth, seventh, eighth and tenth embodiments of the invention, and all of which ordinarily make use of a large mass object and rely heavily on a "partially inelastic collision" to propel the projectile onward after the "action and reaction" combinations are cancelled out during Phase 1—all have something in common. What they all have in common, in addition to their use of a mechanical device or devices that include an elastic member or members—such as a rubber strap (or something similar made of a similar material) or a rubber impactor (or something similar made of a similar material) or the use of a spring or springs (which can come in a wide variety of shapes, sizes and strengths)—is the overt use of the Restoring Force of the elastic member (or members) and the inherent way in which each elastic member behaves or functions before, during, and after it is stretched or compressed and, more importantly, how the Restoring Force of each elastic member that is used in a mechanical device in one of the many different potential embodiments of the invention, can be used in new and innovative ways to achieve the unique aims or objectives of the invention during Phase 1.

The first embodiment of the invention to be described briefly—which will also include the first set of "action and reaction" procedures or maneuvers that can potentially be used by the invention to generate force in Phase 1—came into being after several failed attempts with an experimental prototype to do something much easier. When the initial design didn't work after repeated attempts (even though it sure seemed like it should have), the incredibly counterintuitive reason why it didn't became apparent and a whole new way of tackling the question of how to successfully do propellantless propulsion in space was born. Afterwards, including making a few necessary additions, it became the first functioning embodiment of Phase 1 that could be used to set an object in motion (object 1 or the projectile) and also have the kinetic energy of the projectile it set in motion subsequently be able to be harvested and simultaneously be able to be used to produce a significant amount of thrust at the same time. To put this incredibly counterintuitive discovery or revelation simply, whether the elastic member or members being used as the main driver in the larger mechanical device being used to propel object 1 is an elastic strap or a spring, if it is not allowed to return to its normal, natural length or equilibrium position, the elastic member's property of Restoring Force will constantly push or pull with an equal and opposite amount of force on the objects at either end. As a result, if done properly, and whether different types or any reasonable number of elastic straps or spring-using mechanical devices are used as the main driver to generate the force needed to propel the large mass object during Phase 1, it can undoubtedly be done in a way that will result with the large mass object being made available through a partially inelastic collision to be used to produce a significant amount of thrust during Phase 2 using either Breakthrough Method #1 or Breakthrough Method #2.

First Embodiment of the Invention

After being pulled backwards at the onset of Phase 1 by a powerful smart winch (or winches or winch-like devices) with the assistance of a low-mass, stronger-than-steel, wound metal alloy cable or a synthetic rope until it is locked and held in place, a large mass object made of steel (object 1 or the projectile) is then released and propelled forward toward a double-walled, steel reinforced bulkhead (Bulkhead #1) by a thick elastic strap made of vulcanized natural rubber or synthetic rubber—(sort of like how a rock is pulled back and then propelled forward at high speed using a sling shot). The thick elastic strap is not only used as the main or primary driver to generate the kinetic energy generated by the propellantless propulsion system in the first embodiment of the invention, but is also used to help hold everything together. The thick elastic strap itself needs to be held in place behind the large steel block by the wide groove specifically cut out for it and by another large piece of metal—preferably made of steel—that overlaps the thick elastic strap on the back side and is bolted into the large steel block on top and on bottom without hitting the thick elastic strap. By doing so, the large steel block and the thick elastic strap will be assured of remaining together so they can be used over and over again by the invention to produce a repeated, albeit not a constant, supply of thrust.

In order to keep reaction #3—which in the first embodiment of the invention is the rebounding mass of the large mass projectile after it impacts with a thick rubber impactor mounted on the surface of the first wall of Bulkhead #1 and begins to bounce off of it after a "partially inelastic collision" without causing a net amount of negative movement by the host vehicle during Phase 1—from leading to unwanted and unnecessary movement by the host vehicle in a reaction #4, the two ends of the thick elastic strap may need to be moved rapidly away from where they have been locked and held throughout Phase 1 in their normal location near Bulkhead #1 on either side wall of the sealed containment vessel. By rapidly moving the two ends of the thick elastic strap away from Bulkhead #1, any remaining tension that the thick elastic strap is still exerting on the back side of the large steel block (due to the Restoring Force of the thick elastic strap—which is also still being held in place behind the large steel block and isn't going anywhere as the large steel block makes contact with the thick rubber impactor) can be relieved or new potential tension can be avoided before it can have an adverse effect on the rebounding mass. But since nothing can easily be done where the thick elastic strap is being held in place behind the large steel block, the two loop-shaped ends at either end of the thick elastic strap, if necessary, will need to be rapidly moved away from near Bulkhead #1 by moving the low-mass metal brackets that have been holding them there throughout Phase 1.

The most preferred embodiment to accomplish this rapid movement of the two looped ends away from near Bulkhead #1 and other related tasks, includes using two, electric and electric motor-powered, chain or belt-driven, linear actuators—with one on either side—located and running horizontally along the side walls of the usually tube-shaped, sealed containment vessel, adjacent and perpendicular to Bulkhead #1. By using the most advanced artificial intelligence technologies available, along with a wide variety of high-quality smart sensors, the two chain or belt-driven side-wall linear actuators will not only be tasked with rapidly moving the two low-mass metal brackets that have been holding—normally right up until just before the impact occurs—the thick elastic strap taut on either side away from near Bulkhead #1, but will also be required to move them just far enough away so that the thick elastic strap is slack enough so as to not affect the large steel block, as well as the remainder of the rebounding mass it is a part of, before the rebounding mass can be used to quickly produce thrust using either Breakthrough Method #1 (without harvesting and storing energy) or Breakthrough Method #2 (with the harvesting and storing of energy). Additionally, since the distance the two low-mass metal brackets must be moved away from Bulkhead #1 will vary—including, in some instances, not needing to be moved at all—and ultimately depend, for the most part, on whether BM #1 or BM #2 is used to quickly transfer/combine and recalibrate the momentum of the large mass projectile (or LMP) with the host vehicle in order to normally accelerate or decelerate the host vehicle by a little more than two miles-per-hour per full cycle (or round) of thrust, regardless of what breakthrough method of the invention is used, or even what embodiment of BM #1 or BM #2 is used, the two side-wall linear actuators will also preferably have multiple smart motors that can perform these and multiple other tasks.

With the aid of a supercharged burst of energy from the supercapacitors, the two side-wall linear actuators—which, like the supercapacitors, can come in a wide variety of different embodiments—will also need to rapidly move the two attached low-mass metal brackets the required distance away from Bulkhead #1 the exact instant the rebounding large steel block is about to become clear of the thick rubber impactor. This is necessary to do because in order for the impact to take place and not adversely affect the rapid movement of the large steel block and the remainder of the rebounding mass of the LMP away from the thick rubber impactor so it can be used to produce the most amount of thrust possible during Phase 2, it is best that the "partially inelastic collision"—which is defined as one in which some of the kinetic energy is converted into other types of energy, such as heat and sound or lost through deformation, while almost all of the kinetic energy still remains after the collision and momentum is conserved—is allowed to occur without being affected by the thick elastic strap. And with the partially inelastic collision able to be completed without any interference from the thick elastic strap, the partially inelastic collision will make it possible for the host vehicle (object 2 or the larger mass object) and the large mass object (object 1 or the projectile) to effectively bounce off each other possessing equal amounts of momentum, like what happens when two quarters are slid across the surface of a table at the same velocity and collide head-on.

In fact, the Restoring Force of the thick elastic strap that is constantly pulling in either direction with equal force from its center until it reaches its natural length, is what makes the partially inelastic collision possible in the first place. Because the Restoring Force of the thick elastic strap is constantly pulling in either direction with an equal amount of Elastic Force the entire time from when the LMP is released by whatever means are locking and holding it in place up until just before the impact, the same exact amount of momentum (p=my) is possessed by the host vehicle (which also happens to be being pulled and moving in the desired direction of the thrust that is ultimately produced during Phase 2) as that possessed by the large mass projectile (or LMP) when they collide. As a result, not only is the initial positive movement of the host vehicle canceled out by the negative movement of the host vehicle after the partially inelastic collision due to Newton's Third Law of Motion, but the resulting rebounding mass of the LMP is then available to be used to ultimately produce a significant amount of net positive movement (or thrust) during Phase 2 using either BM #1 or BM #2.

A fully remote controlled, including its own self-contained 12 volt battery power source, prototype was constructed in the summer of 2018 to specifically test this unique application of Restoration Force and a partially inelastic collision using components similar to those that would be used by an in-space spacecraft using the first embodiment of the EdDrive Propellantless Propulsion System. To date, including always providing a very low friction environment for the test host vehicle, over 100 tests have been successfully conducted with strikingly similar results. In other words, the prototype does the same exact thing every time it is tested with absolutely no net negative movement by the host vehicle from the moment when the test vertical linear actuator is remotely activated in order to instantly release the test LMP without any possibility of external interference, up until the moment the test LMP is clearly moving in the opposite direction after the partially inelastic collision.

Restoring Force will also be put to good use by the thick rubber impactor to accomplish its primary responsibility of dramatically reducing the potential negative effects of the host vehicle and the large mass projectile repeatedly colliding with each other. A car's bumper works by using this principle to prevent damage. In the case of the thick rubber impactor, and because the host vehicle and the LMP will be colliding with each other with an equal and opposite amount of force (f=ma), as well as possessing an equal amount of momentum (p=my), at impact, the vast majority of the kinetic energy possessed by the host vehicle and the LMP before the impact will be transferred to elastic energy in the thick rubber impactor. And because the thick rubber impactor will be constructed in such a way that it can easily absorb the impact of both objects with a minimal amount of damage being done to either, the Restoring Force of the thick rubber impactor (or an impactor made of other elastic materials) will propel each object in the opposite direction with an equal amount of Elastic Force, which actually means the Restoring Force of the thick rubber impactor, and not the impact, is what causes the two objects to bounce (or springboard) off each other so well.

Now at the very beginning of Phase 2, and with it now possible for the rebounding mass of the LMP to rapidly rebound and start to move freely away from the thick rubber impactor and Bulkhead #1 unencumbered by the tension that had previously been exerted on the back side of the large steel block by the thick elastic strap, and also unencumbered from any new potential influence by it until BM #1 or BM #2 is completed, the supercapacitors are once again called into action. But before the supercapacitors are put to work by the AI-enhanced control system and even more high-quality smart sensors to perform either Breakthrough Method #1 or Breakthrough Method #2, we first need to back track a little bit.

There is a long, mostly square-shaped, metal shaft—preferably made of steel—connected to and protruding out the front side of the large steel block. In addition to contributing to the total mass of the rebounding mass (object 1 or the projectile), the long, square-shaped, steel shaft is also used by the invention to guide and help keep all the mass associated with the large steel block in line and in its proper place during Phase 1. Similarly, the square-shaped steel shaft is also tasked during Phase 1 with passing back-and-forth through the square-shaped cutout for it in the thick rubber impactor and also the double-walled, steel reinforced bulkhead behind it while the two "action and reaction" procedures or maneuvers are being undertaken to generate the force needed to propel all the mass associated with the large mass projectile into Bulkhead #1 at a rapid and accelerating pace. Finally, and also during Phase 1, the square-shaped steel shaft is also ultimately used to lock and hold in place the large steel block and the long, square-shaped, steel shaft protruding out of the front side of it before they are set in motion.

There are grooves for gears cut into the long, square-shaped, steel shaft that run nearly the full length of the shaft along either side and on top. There is also a relatively small angular piece of steel protruding from the bottom of the long, square-shaped, steel shaft near the end of it that is used to lock the shaft in place until it is released by a spring-loaded piston (sort of like pulling the trigger on a crossbow).

Another embodiment of a linear actuator will be used to pull down on the spring-loaded piston in order to release the angular piece of steel and the square-shaped steel shaft it is holding in place on the far side of Bulkhead #1. This vertically aligned linear actuator (which will be very similar to the one used in the test prototype to remotely release the test LMP) will be the preferred method used by the AI—enhanced control system to release the angular piece of steel so the large mass object (object 1 or the projectile) can be set in motion.

The three grooves for gears on either side and on top of the square-shaped steel shaft will be used by three corresponding gears—or sets of gears, depending on the size of the "unit"—to assist in holding the square-shaped steel shaft in place once the angular piece of steel is locked in place by the spring-loaded piston and the vertical linear actuator securely mounted below the spring-loaded piston on the far side of the second wall of Bulkhead #1.

The three gears, which will stay in constant contact with the gear grooves that run nearly the full length of the square-shaped steel shaft, will also be able to turn freely in either direction (or be put into freely-turning-mode by the AI-enhanced control system) to guide the square-shaped steel shaft as it traverses back and then forth through the double steel walls of Bulkhead #1 and the rubber impactor during Phase 1.

A small amount of the kinetic energy (energy a body possesses by virtue of being in motion) of the square-shaped steel shaft and the remainder of the rapidly accelerating mass (primarily provided by the large steel block) that comprises the large mass projectile (or LMP) is lost on the way back in through Bulkhead #1 after the LMP is released due to friction between the square-shaped steel shaft and the three contact gears. More, of course, as previously described, is then lost due to the actual impact or partially inelastic collision with the thick rubber impactor and the equal and opposite amount of force provided by Bulkhead #1 behind it (not to mention a little bit also being lost due to air resistance along the way). But in the end, once all these minor energy losses are tabulated, and also after including what is unfortunately lost in cancelling out the initial positive movement of the host vehicle, most of the potential energy that was expended in setting the LMP in motion is still present in the form of the kinetic energy possessed by the LMP after the partially inelastic collision. Moreover, because of the very efficient use of electric power by the smart winch (or winches or new winch-like devices) in the beginning of Phase 1, and also because the vertical linear actuator being used to pull down the spring-loaded piston is very efficient and will use very little electric power, a significant amount of the total amount of energy used thus far by the invention up until the impact is also still present in the form of the kinetic energy possessed by the LMP immediately after the square-shaped steel shaft starts moving back through, and the large steel block starts moving rapidly away from, Bulkhead #1.

Now once again back at the very beginning of Phase 2, and for the very first millisecond or two when either breakthrough method (BM #1 or BM #2) is actively being implemented, the AI-enhanced control system continues to keep the three gears in constant contact with the square-shaped steel shaft in freely-turning-mode so they can continue to turn freely, except now the three contact gears are turning in the opposite direction of how they had just turned freely previously. This millisecond or two of time after the front side of the large steel block breaks contact with the thick rubber impactor is more than enough time for the momentum (p=my) and kinetic energy (K.E.=½ mv2) of the rebounding mass of the invention (object 1 or the projectile) to be fully established and be able to be quantified.

It is then at this point, with the two looped ends of the thick elastic strap already moved out of the way if necessary by the two side-wall actuators (and moved out of the way without causing any movement by the host vehicle, which will be discussed in more detail later) and also with the total mass of the rebounding mass of the LMP ready to be used to transfer/combine its momentum with the host vehicle, that the two breakthrough methods go their separate ways.

Breakthrough Method #1 serves its intended purpose by simply having the AI-enhanced control system no longer allow any of the three gears (at least in this embodiment) in constant contact with the square-shaped steel shaft to continue to turn by instantly putting all three contact gears into lock-mode. If the three contact gears can't turn, the square-shaped steel shaft can no longer move the majority of the invention's mass used for propulsion purposes away from the bulkhead. And because the three contact gears are themselves firmly embedded in the double-walled, steel reinforced bulkhead (Bulkhead #1) due to the secure attachments of their control mechanisms that also house their energy generating capabilities, the linear momentum of the rebounding mass (object 1 or the projectile) has nowhere to go but to be transferred/combined and recalibrated together with the linear momentum of the host vehicle (object 2 or the larger mass object) during their inelastic collision.

Breakthrough Method #2 has much higher aspirations than just transferring/combining and recalibrating the linear momentum of the rebounding mass with the linear momentum of the host vehicle. As touched on previously, a large amount of the energy that has been used by the invention up until the point where the two breakthrough methods part ways, (mostly the electric power used by the electric winch, or winches or winch-like devices, to pull back the large steel block by the attached metal connector until the angular piece of steel locks the square-shaped steel shaft in place), still exists in the form of the kinetic energy possessed by all the mass of the rebounding mass of the LMP put freely in motion just a millisecond after the front side of the large steel block clears the rubber impactor.

So why let it go to waste? Depending on how it is done, and also because there should be a little slack in the thick elastic strap at this point to work with (which will be described in more detail later), the first embodiment of the invention may already need to use some electric power to rapidly move the two looped ends of the thick elastic strap a short distance away from Bulkhead #1 in order to eliminate any possible influence of the thick elastic strap on the back side of the rebounding mass before it can complete BM #1. By using just a little more electric power, the two opposing low-mass metal brackets that are holding the two looped ends of the thick elastic strap, can be moved a little bit farther away from Bulkhead #1 by the two side-wall actuators in order to make a little more room for the kinetic energy of the rebounding mass to be harvested to the fullest extent possible. And just as importantly, it can also be done in such a way that the full momentum of the rebounding mass (object 1 or the projectile) that exists immediately after the impact of the large steel block with the thick rubber impactor with the assistance of a partially inelastic collision between the host vehicle and the LMP, can be seamlessly transferred and combined with the momentum of the host vehicle (object 2 or the larger mass object).

Needless to say, being able to recover a fairly significant amount of the energy used to power the invention will be a very good thing. When Breakthrough Method #1 is the embodiment chosen to produce thrust, the control mechanisms for the three contact gears are simultaneously instructed by the AI-enhanced control system to instantly bring the square-shaped steel shaft to an abrupt halt just one or two milliseconds after the large steel block rebounds and clears the rubber impactor. When Breakthrough Method #2 is chosen, in addition to having the three gears in constant contact with the steel shaft continue to keep turning in freely-turning-mode immediately after the impact (as is done in BM #1), the AI-enhanced control system will instead have the three contact gears instantly—along with the round-shaped, stronger-than-steel, metal alloy shaft connected to each of the three contact gears that will, in turn, also make it possible to connect them to and activate the electric generators housed in the control mechanisms for each of the three contact gears as well—put into energy-generation-mode by their control mechanisms in the same one or two milliseconds immediately after the large steel block rebounds and clears the thick rubber impactor.

Since speed will be of the essence, the amount of Rotational Force—or torque—produced by the additional gears in the gear chain (or gearbox) leading to the three electric generators will be calibrated so the kinetic energy of the rebounding mass can be harvested as quickly and efficiently as possible during the short period of time the kinetic energy of the LMP is rapidly changed to mechanical energy before finally being transferred and stored as electrical energy in the supercapacitors located nearby. It will take several dozen more milliseconds, as well as a little more distance traveled away from Bulkhead #1 by the front side of the large steel block, to accomplish all this, but the high torque of the additional gears used in the gear chain (or gearbox) to drive the inside of the large rotor of the three, specially designed—including being somewhat over-sized—electric generators will undoubtedly stop the turning of the three gears in constant contact with the square-shaped steel shaft, and the movement of the square-shaft steel shaft along with them. And thanks—this time to Conservation of Energy and Conservation of Momentum—the kinetic energy of the rebounding mass of the LMP will be harvested as the linear momentum of the rebounding mass of the LMP, which is undoubtedly conserved and also undoubtedly separate from angular momentum because the two Conservation of Momentum Laws—linear and angular—clearly state that neither can be converted to the other, is seamlessly transferred/combined and recalibrated with the linear momentum of the host vehicle.

Another option to harvest the energy a little quicker will be to use three, mechanically driven, flywheels instead of the three, over-sized, electric generators housed in the control mechanisms for each of the three contact gears that BM #2 had just used in the previous embodiment to take advantage of the Law of Conservation of Energy (energy cannot be created or destroyed, only changed from one form to another) to harvest and rapidly change the kinetic energy of the rebounding LMP into mechanical energy and then into stored electrical energy. Since flywheel technology does the storing of energy in kinetic form, converting the energy from the rapidly turning gears directly into the stored kinetic energy of the rapidly spinning mass within each of the three flywheels using mechanical means can be done very quickly and efficiently. Also, because each flywheel has its own electric generator built into it to convert the kinetic energy of the spinning mass within it into electric power as it is needed, more time will be available to convert the kinetic energy of the spinning mass into electric power. This will be extremely useful because the electric power from the flywheels will most likely be used to directly help power the smart winch (or winches or other similar devices) during Phase 1 and also eliminate the additional steps that would be required to store the harvested energy in supercapacitors. And just as when BM #1 is used, BM #2 in both embodiments (either using generators or flywheels—or some combination of both) will allow the linear momentum of the rebounding LMP (object 1 or the projectile) to be seamlessly transferred/combined and recalibrated with the linear momentum of the host vehicle (object 2 or the larger mass object) and not violate the Law of Conservation of Momentum.

Relevant facts related to Momentum and Kinetic Energy: (1) The fact that momentum is not lost in collisions is called Conservation of Momentum. In partially inelastic collisions (such as a superball hitting and rebounding from the ground) momentum is conserved but some of the kinetic energy is transferred to other forms (normally thermal or sound energy). (2) An inelastic collision, in contrast to a partially elastic collision, is a collision between objects such that after the collision both stick to each other and hence move together with the same velocity. Also, although inelastic collisions result in both objects sticking together, like partially inelastic collisions, they do not conserve kinetic energy but they do obey conservation of momentum. (3) What happens to momentum in an inelastic collision? An inelastic collision is one in which part of the kinetic energy is changed to some other form of energy in the collision. Momentum is conserved in inelastic collisions, but one cannot track the kinetic energy through the collision since some of it is converted to other forms of energy. (4) How can momentum be changed? If a force acts in the same direction as the object's motion, then the force speeds the object up. Either way, a force will change the velocity of an object. And if the velocity of the object is changed, then the momentum of the object is changed. (5) Is momentum a form of energy? Momentum is momentum and energy is energy. Momentum is not a form of energy: it is simply a quantity which proves to be useful in the analysis involving forces and impulses. If an object is moving, then it has kinetic energy. And if an object has kinetic energy, then it definitely has mechanical energy.

Now that we have briefly examined the breakthrough technology of the invention, and also have multiple breakthrough technologies or systems to choose from to produce thrust (there are also many more potential embodiments of BM #1 and BM #2 that will be described later), the next question is, "How does the invention produce sustained thrust?"

After conducting many tests with different prototypes in order to determine the amount of thrust that can be expected to be produced by the invention, and also after examining the thrust produced using similar ratios for the mass provided by the test rebounding mass (object 1 or the projectile) and the test host vehicle (object 2 or the larger mass object) under similar circumstances, the same results were repeatedly observed and measured time and time again for each full cycle or round of thrust. This was especially true when using the 1 kilogram test version of the invention—which included the mass contributed by the test rebounding mass, as well as the mass of the test host vehicle and its remaining contents—in the 1 kilogram mass total. If similar ratios or percentages for mass as in the 1 kilogram test prototype are used (the mass of the test rebounding mass was approximately 50% of the total mass of the test host vehicle and the remainder of its contents excluding the mass of the test rebounding mass), one "unit" of the invention can be expected to accelerate or decelerate a host vehicle and all its contents (including the large mass object once it becomes one with the host vehicle after they become stuck together) approximately 36 inches in the first second. In addition, it will be done with the final velocity of the combined masses already achieved within the first second (which will be an increase or decrease of approximately 2.045 miles-per-hour) and be expected to remain constant (in space) until the host vehicle is acted upon again by another round (or cycle) of thrust.

The majority of the cycle time for one "unit" of the invention—or from when the first amount of electric power is drawn in Phase 1 until the host vehicle is quickly accelerated or decelerated to its new velocity in Phase 2—will take, under normal conditions, about 10 seconds. The remainder of the cycle time for one "unit" of the invention (beyond Phase 1 and Phase 2) will be filled by an additional two seconds that will be called the, "Recovery Time Period." This remaining two seconds in the Recovery Time Period—which will be more than enough time for the invention to get ready to go again right after the thrust production phase is completed in Phase 2—will come to a quick conclusion with the full or total cycle time for one "unit" of the invention being a non-stop, action-packed, 12 seconds for an average-size host vehicle.

Now 12 seconds might sound like a long time for a full cycle to be completed with one "unit" of the invention—especially since the entirety of Phase 2 will normally take less than one second to complete. But since the invention is so efficient, using just one "unit" of the invention—and using the same ratios or percentages for mass, as well as other metrics and circumstances as existed during the repeated testing of the 1 kilogram test prototype—a small spacecraft on a one-way journey out into the solar system after leaving Earth's orbit could pass by Mars in just 20 days. Just as remarkable, the same small spacecraft would be traveling with a top potential velocity of more than 290,000 miles-per-hour at the end of day 20, and the velocity would still be increasing by an additional 14,720 mph by the end of each subsequent day. At the end of day 60, the same small spacecraft would be traveling at an astonishing velocity of more than 880,000 mph. And all these incredible velocities will be able to be attained using just one "unit" of the invention with 12 seconds allocated for each completed full cycle or round of thrust.

Using the formula: 1 newton=the amount of force needed to propel 1 kilogram of mass (or around 2.2 lbs.) 1 meter per second per second, the average amount of thrust produced by one "unit" of the invention—using the results repeatedly achieved here on Earth with the 1 kilogram test prototype in a very low-friction environment—works out to approximately 76 millinewtons of thrust per second.

1 newton=1000 millinewtons
1 meter=39.37 inches
36 inches of distance traveled in one second divided by 12 seconds of cycle time=3 inches traveled per second by the host object or 0.0762 meters per second.
39.37 inches divided by 3 inches or 1 m/s divided by 0.0762 m/s=13.12 times 1000 divided by 13.12=76.2 millinewtons of thrust on average per second.

But the 76.2 millinewtons of thrust produced on average per second by the first embodiment of the invention isn't really an accurate metric to use with the invention. Current propellant-based propulsion systems use the amount of thrust that can be produced per second because they can produce a steady flow (or amount) of thrust while they are in operation. Since the 1 kilogram prototype, like the first embodiment of the invention, both use an elastic strap as the primary driver during Phase 1 and, under normal circumstances, are expected to operate in twelve second cycles, a more accurate measurement for a single "unit" of the invention using the first embodiment of the invention would be to calculate the total amount of thrust produced per 12 second cycle—or round of thrust. When this more accurate metric for the amount of thrust produced per round (or instance) of thrust is calculated, the more accurate amount of thrust produced by the first embodiment of the invention is 914.4 millinewtons of thrust per instance.

Knowing that this instance of thrust occurs in less than one second using either BM #1 or BM #2, and with the mass of the test host vehicle being 1 kilogram, the mass of the test LMP being 0.333 kilograms, and the mass of the test host vehicle without the mass of the LMP included being 0.667 kilograms, we can also calculate the initial (i) momentum and final (f) momentum for the test LMP (P1) and the test host vehicle (P2) before and after their inelastic collision using the formula for Conservation of Momentum.

$$P(i)=P(f) \text{ or } P1(i)+P2(i)=P1(f)+P2(f)$$

Since we know that momentum is mass*velocity (p=mv), and that the mass of P1 is 0.333 kg, the mass of P2 is 0.667 kg, the initial velocity of P2 is 0, the combined mass of P1 and P2 is 1.0 kg, and the increase in velocity for the 1 kilogram prototype after the inelastic collision during which P1(f) and P2(f) become stuck together and become P1(f)+P2(f) is 0.9144 m/s, we can then calculate:

$$P1(i)(0.333 \text{ kg}*v)+P2(i)(0.667 \text{ kg}*0)=P1(f)+P2(f) \text{ or}$$
$$(1 \text{ kg}*0.9144 \text{ m/s}) \text{ or } 0.9144 \text{ kg m/s}$$

P1(i) (0.333 kg*v)+0=0.9144 kg m/s
P1(i) v=2.743 m/s
P1(i) 0.333 kg*2.743 m/s=0.9144 kg m/s

Therefore, with the initial momentum of the test LMP (0.9144 Ns) seamlessly transferred/combined and recalibrated with the momentum of the test host vehicle as a result of their inelastic collision, we can conclude that momentum was conserved.

For satellites or telescopes or other small to medium-sized hosts of any of the embodiments of the invention included herein, having an average acceleration rate in excess of 3 inches per second per second (or 0.0763 meters per second per second) and not needing any propellant will be, in almost all instances, a significant improvement on current technologies. It might start out slow, but it will no doubt get to where it wants to go and still be able to go where it wants, any time it wants, and as many times as it wants. And that's even before considering the fact that the acceleration rates in space have the potential to be considerably higher than what were achieved here on Earth during testing with the 1 kilogram prototype. This is primarily because there will be no friction and less gravity for the invention to contend with in space—not to mention that the first embodiment of the invention is one of the least powerful of those that are included in this document.

Obviously with the rates of speed achievable in long-distance space travel, utilizing only one "unit" of the invention will also be fine with medium-sized and some large spacecraft. The real question for all of them (small, medium and large spacecraft or host vehicles) then becomes, "How will they slow down and change direction?"

Fortunately, the host vehicle will have many different options at its disposal to control its speed or velocity. To begin with, an easy way for each and every "unit" of the invention to operate at a slower pace will be to simply increase the number of seconds needed to complete each full cycle, or just reduce the amount of force generated in Phase 1. But regardless of how it is done, all the different Propellantless Velocity Control Methods and Systems (which will be described in more detail later) will have the potential to be built into every "unit" of the invention. As a result, even very slow velocities and/or velocity changes, needed mostly for docking and direction changes, will not be difficult to achieve.

The same will also hold true for how, with the assistance of a separate, specially designed "unit" of the invention called the Direction Control Unit, the host vehicle will be able to steer itself in space. In almost all instances, at least one "unit" of the Direction Control Unit will be needed to be deployed by every host vehicle in order to have the ability to control its direction and propel itself by propellantless means. This includes whether just one "unit" of the invention or multiple "units" of the invention are deployed.

By using the Propellantless Direction Control Unit (or DCU) the host vehicle will also have the ability to accelerate or decelerate in any direction. And fortunately, once again thanks to recent improvements in artificial intelligence and machine learning, using the specially designed Direction Control Unit embodiment of the invention to go in any direction that is desired will be relatively easy to do. This includes being able to perform a 180 degree turn with a very large mass spacecraft (or basically spin it completely around) so it can start to decelerate once it reaches the halfway point of its journey even while traveling at hundreds of thousands of miles-per-hour. It might take a little time to accomplish the 180 degree change in the direction the spacecraft is pointing (or its attitude), but the spacecraft will undoubtedly be able to accelerate or decelerate and travel at the desired velocity possible, in the desired direction, and do it at any time, using the invention's different Velocity Control Methods and Systems working in concert with the Direction Control Unit, even if the DCU is also used in combination with one or more "Regular Units" of the invention—or even other DCUs.

The Propellantless Direction Control Unit of the invention will be very similar to a Regular Unit of the invention in many ways. Two of the biggest differences have to do with where the DCU will be located and how it will need to be able to move and be positioned in any direction so it can accelerate or decelerate the host vehicle in any direction. Since a Regular Unit of the invention will only be able to accelerate or decelerate the host vehicle in the same direction it is pointing in together with the host vehicle, a Regular Unit of the invention can essentially be located anywhere in the host vehicle. In fact, if a cat walk or connection tube was installed, astronauts could pass back-and-forth through a Regular Unit of the invention without interfering with it at all. Still, in most instances, a Regular Unit (or multiple Regular Units) of the invention will most likely be housed in its own, long, pipe-shaped, sealed containment vessel that is securely attached to the side of the host vehicle, similar to how a booster rocket is attached to the side of the main body of a rocket.

Being located anywhere is not something that will always work well with the Direction Control Unit. Because the sealed containment vessel used with the DCU will be moved by mechanical means and be able to be positioned by the AI-enhanced control system in any direction to produce thrust, the easiest or preferred way to change the direction of the host vehicle will be to locate the DCU as far away from the main body of the host vehicle as possible. This would ordinarily mean locating the DCU at either end of the host vehicle—what, in most instances, would be considered the front (forward) or the back (aft). By doing so, even the previously described 180 degree change in the orientation of the host vehicle by a very large spacecraft can be accomplished rather easily by repositioning the direction of thrust 90 degrees from the direction the spacecraft is currently moving in order to induce a spin. Of course, an equal amount of thrust from 90 degrees in the opposite direction will then be needed at some point to end the spin so the very large spacecraft can begin to decelerate for the second half of its journey. Also, regardless of what embodiment of the invention is being used within the sealed containment vessel component of the DCU (and there will be several to choose from), it won't be difficult to perform the 180 degree change in the orientation of the host vehicle even if it takes doing a little bit of back-and-forth thrusting with the DCU and the various velocity control systems to finally get it right.

Ordinarily the sealed containment vessel of the Direction Control Unit will be housed in a pipe-shaped, hollow, low-mass, metal tube with both ends sealed and the length considerably longer than the width. Near the middle of the pipe-shaped sealed tube will be two solidly built walls or partitions with a relatively small space between them that will function as the steel reinforced bulkhead. The DCU will also be designed so the sealed containment vessel can rotate 360 degrees on its central axis, while, at the same time, also be able to rotate 360 degrees using the DCU's rotatable circular base. For a variety of reasons, the pipe-shaped metal tube and all its contents—which will essentially be the same as what will be found in a Regular Unit of the invention—will preferably be horizontal, or running lengthwise, in the same direction as the spacecraft or other host vehicle. This is important because the sealed containment vessel of the DCU will also be able to be locked in place with the assistance of additional supports when the DCU is just being used for normal propulsion purposes, meaning going either forward or in reverse. But, either way, the sealed containment vessel of the DCU will be able to be pointed in any direction with little difficulty.

Although the Direction Control Unit will be described in more detail later, for now, in an effort to quickly describe how the DCU will work: a carousel or merry-go-round, with its rotating circular platform, will suffice for the DCU's rotatable circular base and a gymnast swinging around on a high bar will suffice for the pipe-shaped, sealed, metal tube (or sealed containment vessel) that will rotate on its central axis. If the gymnast was somehow able to keep on swinging continuously around the high bar, and the strong vertical supports that were firmly holding the high bar in place were also bolted into the rotating circular platform, eventually, as they both continued to rotate, the gymnast's head would point in every direction.

Fortunately, the Direction Control Unit won't have to wait until the pipe-shaped, sealed, low-mass, metal tube is pointing in the right direction. Without any difficulty whatsoever, the AI-enhanced control system will be able to pinpoint and set both the rotatable circular base and the pipe-shaped sealed outer shell of the DCU at precisely the desired angles needed to accelerate or decelerate the spacecraft or other host vehicle in any direction. As a result, the DCU will be able to be used to alter the host vehicles trajectory or orientation, or perform any other task the DCU is capable of doing. And, best of all, it will be able to do it without the use of any propellant.

With the basics of the Electric-Powered Propellantless Direction Control Unit covered, the two major issues that still remain and need to be addressed (before additional embodiments of the invention will be briefly described) are safety and the capabilities of the different Units of the invention. While certainly possible, using only a single Propellantless Direction Control Unit for propulsion purposes with a multibillion U.S. dollar spacecraft to visit Mars or the asteroid belt or one of the more than 180 moons of the four gas giants farther out in the solar system, doing so might not be the wisest choice. This is especially true if humans are passengers on the voyage or mission. As mentioned earlier, there will be some manual-powered options made available with all the Units of the invention that can be used to perform some simple tasks if necessary, but this will be a last option. Host vehicles in near-Earth orbit or otherwise near Earth will be able to be serviced using new Propellantless Service Vehicles made possible by the invention if the problem is worth fixing. This will not be the case millions of miles—or even over a billion miles—out in space. Another spacecraft using the invention might be able to be dispatched in an emergency, but it really makes no sense to use just the one DCU and need to rely so heavily on it.

One reason is because the overall size that the Direction Control Unit can be built will be limited by some basic structural constraints. Because the DCU will be able to propel a spacecraft in any direction, using the DCU all the time by itself to produce thrust will result in way too much wear and tear on its joints once the spacecraft reaches a certain mass to make much sense of only using a single DCU. This continues to be true even with the potential for the DCU to automatically use additional supports when not being used to change direction or perform other specialized tasks.

The same goes for making the DCU much larger in width than the overall width of the spacecraft. Since the overall shape and width of the spacecraft will likely be very similar to the rocket that brings up the separate segments the spacecraft is made of, you are probably looking at a spacecraft that is 30 to 50 feet wide. So in order to maintain the same ratios or percentages of mass for the host vehicle and the large mass projectile of the invention as there was in the 1 kilogram test prototype—where the mass of the large mass projectile was 50% of the mass of everything else and still on the conservative side of what is possible to do when you consider that more dense materials than steel will be able to be used to construct the large mass projectile (or LMP) in all the various embodiments of the invention—a large mass spacecraft using a Direction Control Unit (or even more than one DCU) along with a Regular Unit of the invention will likely be the proper choice. This is especially true due to there also being more old-tech or traditional embodiments of direction control devices—such as gimbals, reaction or momentum wheels, and other attitude actuators, as well as many different propellant using devices—that can and will be an option to be used for backup purposes.

When it comes to potential large mass spacecraft such as cargo carriers, which will likely be automated—meaning there will be limited or no need for life support or habitat space—and be used for a variety of purposes including asteroid mining, using more than one Regular Unit of the invention in addition to the Direction Control Unit will also be a possibility. In this instance, there will certainly be different levels of thrust that can be expected to be attained depending on the amount of mass being transported at any time. In fact, some cargo carriers—or other host vehicles—could potentially be designed with propellantless propulsion systems that will produce significantly more thrust per cycle when not carrying any cargo than the amount of thrust that can be produced when using the same percentages for mass as were used in the 1 kilogram test prototype. Also, since they will only be transporting cargo—or potentially used to intercept rogue asteroid or comets—being able to produce less thrust (or acceleration or deceleration) on average per second when fully loaded with whatever they are transporting is even something that could potentially be made much less of a factor by adding several more Regular Units of the invention (much more on this later).

Second Embodiment of the Invention

The second embodiment of the invention is very similar to the first embodiment of the invention in many respects. The two main differences primarily have to do with changes that were made in order to make the second embodiment of the invention able to operate normally under much colder conditions or circumstances than the first (and original) embodiment of the invention, and also to make it possible for the invention to produce more thrust each full cycle by using springs instead of a thick elastic strap made of vulcanized natural rubber or synthetic rubber (or similar materials) as the primary elastic member and driver of the mechanical device that is used by the invention to generate force during Phase 1.

Inside the sealed containment vessel of the second embodiment of the invention everything looks very much the same as in the first embodiment of the invention in the section or side of the invention where most of the activity takes place. This includes the continued and repeated use of a large steel block, a large metal connector, one or more smart winches (or similar devices), one or more low-mass metal alloy cables or synthetic ropes, two side wall chain or belt-driven linear actuators, an impactor, the visible part of a square-shaped steel shaft, as well as a double-walled, steel reinforced bulkhead (Bulkhead #1) still located near the center of the overall unit. But instead of having a thick elastic strap made of vulcanized natural rubber or synthetic rubber—including those that may have some graphene mixed in for added strength and durability and/or the two looped ends also being a little thicker and made in a single continuous loop—a synthetic material that is much more tolerant of extreme temperatures and temperatures differences is used for a new cold temperature strap. Dacron, Kevlar, or a combination of composite fibers Vectran and Dyneema, which are now regularly used in commercial bow string construction, as well as metals used in some compound bows, are just some of the potential embodiments of materials that could be used to make the new cold temperature strap.

However, since these potential materials will not be anywhere near as elastic—meaning their ability to stretch is limited (usually less than 5% of natural rubber)—additional means to generate force during Phase 1 will be needed. This is accomplished by adding two separate units of an innovative new mechanical device to the system. Each new mechanical device will consist of a longitudinally movable piston rod and two (or more) compression coil springs (or other types of springs, including wave springs) that will be housed in a long, tubular, low-mass container or housing. This pair of self-contained units within their long, tubular housings will be located on the far side of Bulkhead #1—joining the spring-loaded piston, the vertical linear actuator below it, as well as the long tail section of the square-shaped steel shaft containing the angular piece of steel—with each of the tubular housing located and positioned horizontally along either side wall of the usually pipe-shaped, sealed containment vessel the invention is operating in.

The smart connector end of the piston rod extending out from the end of the tubular piston rod housing abutting Bulkhead #1 along either side wall will pass through the two steel walls of Bulkhead #1 and connect to the metal side piece on the side of the low-mass bracket attached to the mounting block (or carriage) of the chain or belt-driven side-wall linear actuator. The low-mass metal bracket will also now be holding a looped end of a cold temperature strap with the bolt and rotatable metal sleeve in the center of the bracket that is securely attached to and covering the entire face of the mounting block. The smart connector end of the piston rod will connect to the side of the mounting block/bracket using linkage that can be electronically locked or released by the AI-enhanced control system when needed. However, since the piston rod will need to be pulled into the area occupied by the chain or belt-driven side-wall linear actuator in order to generate the force needed to complete Phase 1, the two (or more) electric motor driven sprockets or pulleys within each of the side-wall linear actuators will need to be able to turn freely in either direction. This will be accomplished by having their smart motors capable of being put into turning-freely-mode, which will continue up until the instant the large mass object (object 1 or the projectile) makes contact with the impactor during Phase 1.

Also, by having the smart connector end of the piston rod capable of being extended out automatically from inside the piston rod by basically placing another piston rod within the piston rod, doing so will eliminate the need to disconnect the smart connector end from the mounting block/bracket upon the impact of the large steel block with the thick rubber impactor and would be another potential option (or embodiment).

Despite the fact that the invention will usually be operating in the microgravity environment of space, a spring (like a rubber strap) can still work just as it would on Earth. Similarly, as a spring does not use gravity but the application of force, it can certainly be used to perform useful functions in space. A spring (like a rubber strap) also possess the property of Restoring Force. As a result, the Spring Force (like the Elastic Force of a rubber strap) that is exerted by a compressed or stretched spring upon any object it is attached to, is also always acted upon by a Restoring Force that attempts to restore the spring and the attached object to its rest or equilibrium position.

However, for our intents and purposes, and also because it is an object of the invention to embrace Newton's Third Law of Motion (for every action, there is an equal and opposite reaction) and take advantage of it through innovative new types of "action and reaction" combinations (or pairs) to quickly and efficiently generate the force that is needed to subsequently produce a significant amount of thrust during each full cycle of the invention—and also do so without causing any movement whatsoever by the host vehicle during the first "action and reaction" combination and no net negative movement by the host vehicle during the second "action and reaction combination during Phase 1—instead of using one thick elastic strap as the elastic member and primary driver as is done in the first embodiment of the invention, two compression coil springs will be used together within each of the long, tubular housings containing a longitudinally movable piston rod. By using the two compression coil springs as the elastic member and primary driver in the second embodiment of the invention, they will be able to combine with and help the cold temperature strap at least be able to complete the second "action and reaction" combination during Phase 1 without causing a net amount of negative movement by the host vehicle as was done with the first embodiment of the invention.

This will be made possible by having the two compression coil springs within each piston rod housing be of equal length and strength. It will also be done by having the two equal length and strength compression coil springs—which will have a low-friction, round-shaped, bumper or buffer located between them that will also be used to securely connect them to each other—work together in concert to rapidly launch or propel the LMP forward at a high rate of speed during the second "action and reaction" procedure or maneuver of Phase 1.

But first, and also as part of another innovative new "action and reaction" procedure or maneuver, the second equal length and strength compression spring will need to be fully compressed and the first equal length and strength compression spring will need to be fully stretched by the middle bumper or buffer connected to the end of the piston rod within the piston rod housing—and without causing any movement by the host vehicle as ideally sought—after the piston rod is pulled back by the cold temperature strap and the winch (or winches or similar devices) during the first "action and reaction" procedure or maneuver in Phase 1. By having the fully compressed second equal length and strength compression spring pushing with equal and opposite force against the second wall of Bulkhead #1 while, at the same time, the first equal length and strength compression spring is pulling the front, inside of the piston rod housing with the same equal and opposite amount of force the instant the angular piece is released by the piston and vertical actuator, the large mass object (object 1 or the projectile) will be able to be propelled at a very high rate of speed toward the impactor and also simultaneously push and pull the host vehicle (object 2 or the larger mass object) rapidly toward the front side of the large steel block while possessing an equal amount of force and momentum as the LMP.

The reason why the host vehicle and the LMP will collide and compress the (potentially and preferably spring-using) impactor from either side with the same amount of force ($f=ma$)—whether the second embodiment of the invention is being used in a Direction Control Unit or a Regular Unit of the invention—is due to how the same, but also the same but exact opposite, is done at the same time with the first equal length and strength compression spring as is done with the second equal length and strength compression spring. For instance: instead of how the second equal length and strength compression spring is compressed and its length is reduced as the LMP is pulled back by the smart winch (or winches or similar devices) and pushed up against Bulkhead #1 during the first "action and reaction" combination during Phase 1, the first equal length and strength compression spring—which is directly connected to the second equal length and strength compression spring by the round-shaped, low-mass, middle bumper or buffer between them and also to the far end of the piston rod housing by another bumper or buffer that is connected to the third bulkhead of the sealed containment vessel (or Bulkhead #3)—is simultaneously being stretched and its length is increasing. Conversely, as the second equal length and strength compression spring rapidly decompresses and grows in length after the LMP is released during the second "action and reaction" combination during Phase 1 because of Restoring Force, the first equal length and strength compression spring is simultaneously contracting and reducing in length by the same exact amount, at the same exact rate of speed, as what is occurring with the second equal length and strength compression spring as it is rapidly expanding.

With both Spring Force and Restoring Force, it doesn't matter whether the spring is compressed or stretched within the limits needed for it to maintain its structural integrity. As long as the spring is trying to return to its normal length or rest position, Restoring Force toward the spring's center will be maintained and an equal and opposite amount of Spring Force will be exerted at either end of the spring, whether the force being exerted is pushing or pulling the object it is connected to. This is also the case once an expanding or a contracting spring exceeds its equilibrium position, only immediately in the opposite direction and also with the opposite Restoring Force.

The most important factors to ensure that the expanding and contracting equal length and strength compression springs can both be used together to achieve the objectives of the invention during Phase 1 in the end will be to: (1) make sure that both compression springs are of equal length and strength; (2) make sure that both compression springs are connected to the piston rod housing at either end and to each other in the middle; and, as a result, (3) that both compression springs are each the same length when in the rest position. If so, the first equal length and strength compression spring and the second equal length and strength compression spring—because they are each trying to return to their natural length or rest position while they are either stretched or compressed—can be used together to generate the force needed to propel the LMP during Phase 1 without causing any unintended movement by the host vehicle. And better yet—because the second equal length and strength compression spring will be decompressing and becoming longer in length due to Restoring Force after the LMP is released while, at the same time, the first equal length and strength compression spring is simultaneously contracting and reducing in length due to Restoring Force pulling the objects at either end with equal force toward its center—together, they will each be simultaneously providing an equal amount of Spring Force that will be able to be used by the invention to accelerate the host vehicle and the LMP to the fullest extent possible the entire time that the two equal length and strength compression springs are exerting Spring Force upon them.

In addition to being able to use the two equal length and strength compression springs within the two piston rod housings to generate a significant amount of force during Phase 1—and do it with the initial positive movement by the host vehicle almost immediately cancelled out by the negative movement caused later during the second "action and reaction" combination during Phase 1—a major benefit of being able to use the two equal length and strength compression springs to provide the conditions that will make it possible for the partially elastic collision to occur and ultimately result in the rebounding mass of the LMP being made available to produce thrust using either BM #1 or BM #2, will be the fact that this can all be done and still accelerate the large mass object (object 1 or the projectile) at, or very close, to its maximum possible acceleration rate and velocity before impact. This is because an object being pushed or pulled by a fully compressed or extended compression spring won't reach its top velocity or rate of speed as the spring expands or contracts due to Restoring Force until the compression spring reaches its equilibrium position—which is the exact midpoint of where the spring will be when it is at its natural length. So (even though there are other combinations of springs that could be used and will be described in still coming embodiments of the invention), if the two equal length and strength compression springs are configured to reach their natural length or equilibrium position just before the host vehicle and the LMP collide in a partially inelastic collision—and do so while possessing an equal amount of force and momentum—the objects being propelled by the two equal length and strength compression springs will either be at, or come very close to reaching, their highest potential (or optimum) acceleration rate and velocity.

And while there will be a little bit of continued motion by the two equal length and strength compression springs within the piston rod housing because of the equal and opposite amount of Spring Force being exerted at either inside end of the piston rod housing as the two springs attempt to return to their rest position at the end of Phase 1, the continued movement (or oscillations), as just described, will be minimal. Moreover, because it doesn't matter (within reason) whether the two equal length compression springs are expanding or contracting—or what the spring constant is for the springs, which determines how stiff and strong a spring is—as they attempt to return to their rest position, their decreasing oscillations in either direction will quickly balance each other out and result in no net negative movement by the host vehicle. The fact that this will also be occurring while the initial positive movement of the host vehicle caused during the second "action and reaction" combination in Phase 1 is also coming into balance with the negative movement of the host vehicle caused during the partially inelastic collision in accordance with Newton's Third Law of Motion, the brief oscillations of the equal length and strength compression springs within the two piston rod housings after they reach their equilibrium position and are simultaneously disconnected by their smart linkage from the mounting blocks/brackets, will almost be irrelevant.

And then there is the fact that the cold temperature strap will continue to exert tension on the piston rod and the back side of the large steel block up until just before the point of impact (just as what happens with the thick elastic strap in the first embodiment of the invention), and whose quick cancelling out of any potential adverse effects of the ending of this tension will also coincide with the two equal length and strength compression springs constantly pushing and pulling the host vehicle in the desired direction and causing positive movement the entire time they are decompressing and contracting by pushing against the second wall of Bulkhead #1 and pulling on Bulkhead #3. Fortunately, all these changes will occur very rapidly and result in no net negative movement of the host vehicle as a result of the second "action and reaction" combination during Phase 1. Even better, all these rapid changes will also occur before or have negligible adverse effect on the amount and strength of the kinetic energy and momentum of the rebounding mass of the LMP, which will then be free to be used to perform Breakthrough Method #1 or Breakthrough Method #2 to produce thrust.

One aspect of using a spring or springs that is different from using an elastic strap and will need to be taken into account when the two equal length and strength compression springs are being designed and then manufactured, has to do with making sure all the springs that are used (or may be used in the second or other embodiments of the invention) are never pushed beyond their elastic and compression limits. The elastic limit is defined as the maximum stretch limit of a spring without having a permanent set. However, a spring also has a certain limit of flexibility considering its dimensions in regard to how far it can travel or can be compressed once it reaches its fully compressed state or solid length. If the pitch between the coils of a compression spring is larger in proportion to its free or natural length, and have loosely wound coils, then the spring can be safely compressed to its solid length. The elastic limit and compression limit of a spring also depends on the type of material used.

Another advantage of using a mechanical device using a spring or springs instead of a large elastic strap made of vulcanized natural rubber or synthetic rubber (or other similar devices or materials) during Phase 1, will be the ability of a spring to help generate more force than a rubber strap in the same amount of available space. Naturally, the amount of space that is available or desired will determine the spring's load-displacement, which will include the spring's stiffness rate, load-range, and displacement range.

Similarly, using springs in some capacity in the construction of the impactor might not only work better in colder temperatures than using winter tire rubber or even new rubber or synthetic rubber products being developed for extreme temperatures, but using springs could also help provide more force to propel the rebounding mass as a result of there being much less energy lost due to deformation. Wave springs and nonlinear springs (as well as other types of springs) are certainly potential options (or embodiments) that could be used to achieve improved results.

Another factor that will determine the amount of force that can be generated during Phase 1, regardless of the amount of available or desired space, will be the size of the large mass object (object 1 or the projectile) being used by the Direction Control Unit or the Regular Unit of the invention. A large, solid block of steel (density 8.05 grams per cubic centimeter for steel) is one potential option to be used as the main body of the large mass projectile (or LMP). A more preferred potential option (or embodiment) for the main body of the LMP in the second embodiment of the invention (or any other included in this document) will be a steel outer shell (8.05 grams per cubic centimeter) with a tungsten inner core (density 19.3 grams per cubic centimeter), with the tungsten inner core comprising the majority of the total mass. By using a tungsten inner core with a steel outer shell, the overall volume (or size) of the steel outer shell block could be easily cut in half while the overall mass of the LMP remains close to or the same as previously. A little less air resistance from an LMP that has a main body that is half the size certainly wouldn't hurt either. But since the overall mass of the LMP is intended to be approximately 50% (or half) of the mass of the host vehicle and everything else excluding the LMP (or LMPs), the ability to double the mass of the main body of the LMP by using a tungsten inner core with a steel outer shell could be extremely beneficial and also be the most likely choice.

Other potential options (or embodiments) for the large mass object (object 1 or the projectile) include: (1) A steel (density 8.05 g/cm3) outer shell with a platinum (density 21.45 g/cm3) core. (2) A steel (density 8.05 g/cm3) outer shell with a gold (density 19.32 g/cm3) core. (3) A steel density 8.05 g/cm3) outer shell with a palladium (density 12.16 g/cm3) core. (4) A steel (density 8.05 g/cm3) outer shell with a lead (density 11.34 g/cm3) core. There are also more than 40 other metals and alloys with a higher density than steel, as well as many others with a lower density than steel. Using any of them or any of the others already mentioned in some capacity to embody the LMP, including constructing the entire LMP out of some of them, would also be another option.

Regardless of what the LMP is made of, another factor that should also be considered because it will play a role in how well the invention performs, will be how the equal length and strength compression springs within the tubular piston rod housing—which will be providing the vast majority of the force that will be used to propel the LMP—won't have to contend with the force of gravity pulling down on them or the LMP any more than anything else within the host vehicle at any point along its journey. Especially when it comes to long-distance journeys, when the difference between the thrust achieved with gravity pulling down on the LMP while in orbit around Earth and what it will be in deep space using the most efficient embodiment of the invention (which is still to come), the improvements in thrust for each completed full cycle of the invention are definitely worth mentioning.

Due to the reduction in the amount of gravity that is felt the further away from a planet or moon a spacecraft travels in space, in order to accurately measure the mass of an object in space another type a scale is used—which is called an inertial balance. An inertial balance is made of a spring on which an object is attached whose mass is sought to be determined. Once attached, the object is free to vibrate, and for a given stiffness of the spring the frequency of the vibrations enables the user of the device to calculate the mass. In fact, onboard the International Space Station, the astronauts have their own custom-made version of an inertial balance that they use to keep track of their mass while there. Bottom line: if you change the amount of gravity affecting a large mass object, you will need to retune your springs in order to get the same effect. Or, to the advantage of the EdDrive Propellantless Propulsion system when it is used for long-distance space travel, if the same propulsion springs are used in orbit around Earth and in deep space, with less gravity to contend with, in deep space the propulsion springs will be able to propel the LMP a little faster and also be able to increase or decrease the spacecraft's velocity by a greater amount each round of thrust.

Relevant facts related to springs: (1) Springs are great for storing or absorbing energy. When a pushing or pulling force is used to stretch or compress a spring, work is being done and energy is being used, with most of the energy that was used to compress or stretch the spring stored as potential energy in the spring. (2) A force must be applied to a spring to stretch or compress it. By Newton's Third Law of Motion, a spring must apply an equal force to whatever is applying the force to the spring. (3) Newton's Third Law of Motion tells us the forces come in "action and reaction" pairs and so we can think of Hooke's Law as telling us how much force it takes to compress a spring or as telling us how much force a spring exerts when compressed. Newton's Third Law of Motion says they are equal and opposite. (4) Spring Force is the force exerted by a compressed or stretched spring upon any object that is attached to it. An object that compresses or stretches a spring is always acted upon by a force (Restoring Force) that tries to restore the object to its rest or equilibrium position. (5) When you stretch or compress a spring you work against the Restoring Force of the spring. This work is stored as elastic potential energy (Spring Force) in the spring. (6) The potential energy of a spring increases with the displacement from the equilibrium position of the spring. (7) Any given spring has what is called a "spring constant" (k). This constant linearly relates the spring's Restoring Force to the distance it is distended.

As with all the other previously described potential embodiments of components, parts, methods and/or systems used by the EdDrive Propellantless Propulsion System, any of the embodiments of components, parts, methods and/or systems that are described in the second embodiment of the invention, if possible, may be used in other embodiments of the invention.

Third Embodiment of the Invention

The third embodiment of the invention is similar to the first two embodiments of the invention in that it also uses a large mass object (object 1 or the projectile) as a rebounding mass after a partially inelastic collision to produce thrust during Phase 2. The third embodiment of the invention likewise also uses a rubber or spring-using impactor that is attached to the face of the first wall of Bulkhead #1 to minimize the potential negative effects of the repeated impacts between the host vehicle and the LMP. But how it gets to the point of impact is done a little differently.

For starters, the third embodiment of the invention will not be using a thick elastic strap or a cold temperature strap, and there will also be no need for the two side-wall linear actuators. However, the third embodiment of the invention will be borrowing from the second embodiment of the invention in its use of two, equal length and strength, compression coil springs to provide the equal and opposite amount of force needed to propel the host vehicle in the desired direction while, at the same time, also propelling the newly designed large mass projectile in the opposite direction in order for the partially inelastic collision to occur.

The third embodiment of the invention will also be using a new, self-contained, totally spring-powered unit or new embodiment of a mechanical device that can be used to generate force. This totally spring-powered new mechanical device that will be used by the third embodiment of the invention to propel the LMP during Phase 1, will primarily consist of two, large-diameter, equal length and strength, compression coil springs and three, square-shaped, bumper or buffers housed in a new, rectangular-shaped, low-mass container or housing. Totally spring-powered, in this instance, also means that in addition to there being no thick elastic strap or cold temperature strap, there will also be no piston rod being used in any way. However, the third embodiment of the invention will, at first, still be using the square-shaped steel shaft, the three contact gears, as well as their three control mechanisms in order to perform BM #1 (without harvesting and storing energy). And if BM #2 (with the harvesting and storing of energy) is used instead, either the oversized generators or the flywheels (or both), which will still be associated or combined with the control mechanisms and be embedded in the double-walled, steel reinforced bulkhead of Bulkhead #1, will also still be able to be used to harvest the kinetic energy of the rebounding mass of the LMP and produce thrust.

The third embodiment of the invention will also be making Bulkhead #2—from which it will be securely attached to the face of and prominently protruding out from—the location of the new, self-contained, totally spring-powered unit and sole origin of all the force and kinetic energy generated by the invention in the third embodiment of the EdDrive Electric-Powered Propellantless Propulsion System. The central location of the new, self-contained, totally spring-powered unit on the face of Bulkhead #2 will also mean it will need to be flanked on either side by a winch or new winch-like device.

Because it will be using Bulkhead #2 as the sole origin of all the force and kinetic energy generated by the invention before the partially inelastic collision between the host vehicle and the front side of the main body of the LMP (object 1 or the large mass projectile), the third embodiment of the invention is also able to get a little more creative by potentially using more new or somewhat new mechanical devices in order to perform the first two "action and reaction" procedures or maneuvers during Phase 1 and then successfully complete either Breakthrough Method #1 or Breakthrough Method #2.

The third embodiment of the invention is also the first of two embodiments of the invention (the sixth being the other) that are very similar in their structural composition and how they will each be able to complete the second "action and reaction" combination during Phase 1 using much fewer components than were used previously and also be able to increase the efficiency and thrust producing potential of the invention by combining two (or more) much larger diameter (or large-diameter) compression coil springs together within a single, low-mass, container or housing unit.

A spring piston gun uses a large diameter piston powered by a spring to force a smaller diameter barrel containing a projectile to be accelerated. The third embodiment of the invention will be using guide cables—preferably four and preferably made of a low-mass, stronger than steel, wound metal alloy—that will extend in one continuous piece from Bulkhead #2 to Bulkhead #1. Since the guide cables will guide the large main body of the LMP—preferably consisting of a steel outer shell and a tungsten majority inner core—as it is rapidly being accelerated and then launched by the new, self-contained, totally spring-powered unit used as the primary driver and/or mechanical device to generate force during Phase 1, there will be no need for a smaller diameter barrel to guide the LMP. Instead, the new, self-contained, totally spring-powered unit—which will consist of a relatively long, rectangular-shaped, low-mass, propulsion spring's housing, two (although more of each could be added), large-diameter, equal length and strength, compression coil springs, and three, square-shaped, bumpers or buffers (one each at either end and one in between the two equal length and strength compression springs)—will be all that is needed to propel the LMP away from Bulkhead #2 at an extremely high rate of speed while, at the same time, also propelling the host vehicle in the desired direction with an equal and opposite amount of Spring Force so they can collide in a partially inelastic collision.

In addition to the four new simple guide loops that will preferably be built-in along the corner edges on the two sides of the steel outer shell of the large metal block (or main body of the LMP) for the guide cables to pass through, there will also be at least two connector loops built into the back side (one on either side) of the metal connector for the metal cables or synthetic ropes that will be used by the winches (or other similar devices) to pull back the LMP so it can interact and ultimately be launched by the equal length and strength compression springs within the propulsion spring's housing. Still another possibility (or potential embodiment) to add additional mass to the LMP and also provide more options in regard to more potential loops and their potential placement, will be to bolt a large metal plate (or plates) with the loops (guide or connector) already built into them onto the main body of the block. And even if the block is tube or more bullet-shaped, either will be able to be done.

There will also be a new, relatively long, round-shaped metal shaft protruding out the back side of the main body of the LMP. The rear shaft of the LMP will be long and round-shaped so that it will fit nicely through the round-shaped opening cut into the first square-shaped bumper or buffer located inside, at the front end (the end farther away from Bulkhead #2), of the long, rectangular-shaped, propulsion spring's housing. From there, as the rear shaft of the LMP passes through the first bumper or buffer and continues to be pulled back into the propulsion spring's unit by the two winches on either side of the propulsion spring's housing, the round-shaped end of the rear shaft will also be passing through the center of the first (or outer), large-diameter, equal length and strength compression spring until it eventually comes into contact with the solid, middle, square-shaped, bumper or buffer located between and connecting the first equal length and strength compression spring and the second equal length and strength compression spring.

But the two winches won't stop pulling back the LMP once the end of the round-shaped rear shaft comes into contact with the solid, middle bumper or buffer. Instead, the two winches will continue to pull back the LMP, compressing the second equal length and strength compression spring and also stretching the first equal length and strength compression spring in the process. Only when the second equal length and strength compression spring is fully compressed and the first equal length and strength compression spring is fully expanded—and without doing any damage to either—do the winches finally stop pulling the LMP back.

As already mentioned, the third embodiment of the invention will be using the square-shaped steel shaft (although there will certainly be other shapes or embodiments of the steel shaft described later) and related components when using either Breakthrough Method #1 or Breakthrough Method #2 to produce thrust during Phase 2. The reason for this is quite simple. Because the third embodiment of the invention will have the two, large-diameter, equal length and strength compression coil springs working together in concert to rapidly launch or propel the LMP forward, the second "action and reaction" procedure or maneuver, performed in large part by the fully compressed second equal length and strength compression spring pushing with an equal and opposite amount of force against Bulkhead #2 while, at the same time, the first equal length and strength compression spring is pulling the front, inside of the propulsion spring's housing with the same equal and opposite amount of force the instant the angular piece is released by the piston and vertical actuator, the second "action and reaction" combination can be used in the same way that the second "action and reaction" combinations were used in the two previous embodiments of the invention to complete Phase 1. This means that—in keeping with the well-established principles of Newton's Third Law of Motion—the initial positive movement of the host vehicle, which had been caused by it simultaneously being pushed and pulled in the desired direction by the two equal length and strength compression springs within the propulsion spring's housing as they also administered an equal and opposite amount of Spring Force to the end of the rear shaft of the LMP to propel it in the opposite direction, can, as previously, also be used in combination with the negative movement caused by the LMP during the partially inelastic collision to ultimately result in no net negative movement by the host vehicle. And, just as importantly, as well as providing them each with an equal and opposite amount of force and momentum, the partially inelastic collision between the host vehicle and the LMP will also result in the rebounding mass of the LMP fully capable of being used to produce thrust using BM #1 or BM #2.

Whether it is done in a Direction Control Unit or a Regular Unit of the invention, the main reason this can be done as previously with basically no difference in the outcome of the partially inelastic collision (except for possibly the differences brought about by potentially having greater levels of kinetic energy and momentum to work with), is due to how the same, but also the same but exact opposite, is done at the same time with the first equal length and strength compression spring as is done with the second equal length and strength compression spring. Just as before, instead of how the second equal length and strength compression spring is compressed and its length is reduced as the LMP is pulled back by the smart winches (or similar devices) and pushed up against Bulkhead #2 during the first "action and reaction" combination during Phase 1, the first equal length and strength compression spring—which is also directly connected to the second equal length and strength compression spring by the middle bumper or buffer between them—is simultaneously being stretched and its length is increasing. Or, as the second equal length and strength compression spring rapidly decompresses and grows in length after the LMP is released during the second "action and reaction" combination during Phase 1 because of Restoring Force, the first equal length and strength compression spring is also still simultaneously contracting and reducing in length by the same exact amount, at the same exact rate of speed, as what is occurring with the second equal length and strength compression spring as it is rapidly expanding in the third embodiment of the invention.

With both Spring Force and Restoring Force, it doesn't matter whether the spring is compressed or stretched within the limits needed for it to maintain its structural integrity. As long as the spring is trying to return to its normal length or rest position, Restoring Force toward the spring's center will be maintained and an equal and opposite amount of Spring Force will be exerted at either end of the spring, whether the force being exerted is pushing or pulling the object it is connected to. This is also the case once an expanding or a contracting spring exceeds its equilibrium position, only immediately in the opposite direction and also with the opposite Restoring Force.

And also as before, the most important factors to ensure that the expanding and contracting equal length and strength compression springs can both be used together to achieve the objectives of the invention during Phase 1 in the end will be to: (1) make sure that both compression springs are of equal length and strength; (2) make sure that both compression springs are connected to the propulsion spring's housing at either end and to each other in the middle; and, as a result, (3) that both compression springs are each the same length when in the rest position. If so, the first equal length and strength compression spring and the second equal length and strength compression spring—because they are each trying to return to their natural length or rest position while they are either stretched or compressed—can be used together to generate the force needed to propel the LMP during Phase 1 without causing any net negative movement by the host vehicle as sought. And better yet—because as the second equal length and strength compression spring is decompressing and becoming longer in length due to Restoring Force after the LMP is released and, at the same time, the first equal length and strength compression spring is simultaneously contracting and reducing in length due to Restoring Force pulling with equal force toward its center—together, they will each be simultaneously providing an equal amount of Spring Force that will be able to be used by the invention to the fullest extent possible to accelerate the large mass object (object 1 or the projectile) the entire time that the round-shaped rear shaft of the LMP is still in contact with the middle bumper of buffer between the first equal length and strength compression spring and the second equal length and strength compression spring. In fact, due to both springs actually being able to reach their equilibrium position—which is also when the LPM will reach its top potential acceleration rate and velocity—and there being a little more time between when the elastic members reach their equilibrium position and propel the LMP forward before the partially inelastic collision occurs compared to previously, not to mention all the extra canceling of movement that needs to happen in the first two embodiments of the invention and everything entailed in using the two side wall actuators, the AI-enhanced control system will have less to do and a little less electric power will need to be expended.

Still, everything will still happen incredibly quickly. Whether Breakthrough Method #1 (without harvesting and storing energy) or Breakthrough Method #2 (with the harvesting and storing of energy) is implemented by the AI-enhanced control system, most of the round-shaped rear shaft of the LMP will still be inside the propulsion spring's housing when it breaks contact with the middle bumper or buffer. That means the LMP will be at its top acceleration rate and velocity without the LMP even exiting the propulsion spring's housing and the front side of the large metal block will only need enough distance between it and the impactor, once the end of the round-shaped rear shaft breaks contact with the middle bumper or buffer, to complete BM #2. Moreover, if BM #2 is commenced within one or two milliseconds of the metal block breaking contact with the impactor, and everything else is done properly, the total distance needed between Bulkhead #1 and Bulkhead #2 will be able to be reduced considerably compared to the first two embodiments of the invention. Needless to say, doing so will also dramatically reduce the distance needed to pull the LMP back in order to get ready for another round of thrust by the invention during the Recovery Time Period. Likewise, the amount of energy used to power the winches will be reduced considerably. This is especially true considering how the LMP will be pulled back using very little energy because it will be done encountering very little resistance up until the point when the end of the rear shaft comes into contact with the solid middle bumper or buffer between the two compression springs—which, whether BM #1 or BM #2 is done just before, will be the same from that point on.

The short distance away from its point of origin, along with the means of generating force in the third embodiment of the invention, will also provide more options for the invention. This is especially true when it comes to backup or emergency purposes. One of the potential options (or new potential embodiment), will be to replace the smart winches or similar devices with large, electric and electric motor-powered, smart cable reels. It will be relatively easy to do. They could even be located behind or within Bulkhead #2, from where they could provide a decent alternative, or even compliment, to the winches for any number of reasons (more on them later).

Many other potential options (or new embodiments) will also be able to be utilized for locking and holding the LMP in place—or to assist in doing so. They would primarily be used once the second equal length and strength compression spring is pulled back and fully compressed and, at the same time, the first equal length and strength compression spring is fully extended during Phase 1. For instance, by placing a steel plate within the second (or middle) bumper or buffer between the first and second equal length and strength compression springs within the propulsion spring's housing, any number of steel arms and/or attachments will be able to be attached to the steel plate that would extend out from it and pass into Bulkhead #2 when the second equal length and strength compression spring is being compressed by the LMP. By making the proper sized openings in the third (or last) bumper or buffer and the first wall of Bulkhead #2, the various steel arms and/or attachments that could possibly be used will be able to pass into (or even through) Bulkhead #2, where they could easily be secured by electronically controlled means. Moreover, they will also be able to be used to ensure that there is an equal and opposite amount of Spring Force applied to Bulkhead #1 and Bulkhead #2 when the attachment and the other possible means of locking and holding both ends of the LMP are released.

One such option (or potential embodiment) will be to use a simple steel arm or bar with a latch or hook or even an angular piece of steel at its end. The latter will be very similar to what was done previously with the square-shaped steel shaft—except this time it will be attached to a steel arm or bar that is extending out from a steel plate that was placed within the middle bumper or buffer between the two equal length and strength compression springs.

Another option will be to add just a standard steel shaft to the steel plate within the bumper or buffer and use a system using magnets for lock mode. Permanent Magnets can be used by physically bringing the permanent magnet in contact and out of contact with the steel object being used for lock mode. Electromagnets can be turned on and off by simply providing or removing electric power. A Magswitch is a device that allows a magnetic field to be turned on and off like an electromagnet, but has no need for ongoing power to sustain a strong magnetic field. A Magswitch is also super strong, exhibiting up to 5 times the power of other magnet systems.

Then, of course, adding a second square-shaped steel shaft and the respective or desired number of contact gears and control mechanisms instead of using an arm and latch or hook, or a standard shaft and magnets, is yet another possibility that could be done.

Still another possibility will be simple "Stoppers" that can be deployed electronically by the second square-shaped steel shaft (or any other shaped metal shaft) on the far side of Bulkhead #2 (by any means) in order to stop the shaft from being able to pass through. Likewise, if used with the square-shaped (or any other shaped) steel shaft used to produce thrust in each of the three embodiments of the invention described so far, "Stoppers" can be deployed as an emergency option (or for any other reason) to spring open or pop out, or be deployed by some other means, to stop the progress of the steel shaft through Bulkhead #1 (which, as with any of the other bulkheads, can be reinforced by any means using any material) in order to assist in producing thrust.

As already touched on, the third embodiment of the invention will also have three, square-shaped, low-friction, bumpers of buffers within the propulsion spring's housing. The first (or front) and third (or last) will each be located at either inside end of the propulsion spring's housing, with each attached to the far end of each equal length and strength compression spring and also their respective inside end of the propulsion spring's housing. The second (or middle) bumper or buffer will occupy the location between the two, large-diameter, compression coil springs of equal length and strength and be securely attached to each.

In addition, should a square-shaped steel shaft be attached to the round-shaped rear shaft when the third embodiment of the invention is used (or any of those still to come), a square-shaped opening will be made in the middle and also the last bumper or buffer for it to pass through. The first bumper or buffer will, of course, have a larger round-shaped opening for the round-shaped rear shaft of the LMP to pass through. The same will also hold true for any of the other potential embodiments of a square-shaped steel shaft that may be used to pass through the bumpers or buffers and be used to lock or hold the LPM in place or be used to perform some other task.

As with all the other previously described potential embodiments of components, parts, methods and/or systems used by the EdDrive Propellantless Propulsion System, any of the embodiments of components, parts, methods and/or systems that are described in the third embodiment of the invention, if possible, may also be used in other embodiments of the invention.

Fourth Embodiment of the Invention

The fourth embodiment of the invention looks basically the same as the third embodiment of the invention, except only a single, large-diameter, compression coil spring is used in the construction of the propulsion spring unit within the propulsion spring's housing instead of two, large-diameter, equal length and strength, compression coil springs. Because it only uses a single, large-diameter, compression coil spring, the fourth embodiment of the invention isn't as efficient or as powerful as the third embodiment of the invention is when using a propulsion spring's housing of the same size. However, other than that, the first "action and reaction" combination used during Phase 1 by the fourth embodiment of the invention still causes no movement whatsoever by the host vehicle as ideally sought, the second "action and reaction" combination used during Phase 1 is the same in how the initial positive movement by the host vehicle is canceled out by a partially inelastic collision, and the rebounding mass of the LMP is subsequently also used to produce thrust during Phase 2 using either BM #1 or BM #2.

On the bright side, the fourth embodiment of the invention, even though it will just be using a single, large-diameter, compression coil spring to launch or propel the large mass object (object 1 or the projectile) forward out from the propulsion spring's housing in the direction of Bulkhead #1, it will still be able to be used to produce a significant amount of thrust. That is because after the fully compressed single compression spring is released and simultaneously starts to decompress due to Restoring Force and propel the LMP at an accelerating velocity away from Bulkhead #2, it is still pushing with an equal and opposite amount of force against Bulkhead #2 on one side and the end of the round-shaped rear shaft of the LMP on the other. And while it is certainly not the optimal or most efficient way to provide the LMP with kinetic energy, at least the force supplied by the compressed single compression spring as it decompresses will be equal and opposite against Bulkhead #2 and also against the end of the round-shaped rear shaft of the LMP until the rear shaft breaks contact with the low-friction, square-shaped, second bumper or buffer attached to the moving end of the single compression spring. That then leaves the impact of the LMP with the impactor and the partially inelastic collision between the host vehicle and the LMP to cancel out the positive movement caused while setting the LMP in motion, which will happen just milliseconds before BM #1 (without harvesting and storing energy) or BM #2 (with the harvesting and storing of energy) is implemented by the AI-enhanced control system and the kinetic energy of the rebounding LMP is then used to produce a significant amount of thrust.

Because the natural length of the single, large-diameter, compression coil spring will be shorter than the overall distance inside the propulsion spring housing, in addition to the LMP reaching its top possible acceleration and velocity just as the end of the round-shaped rear shaft is breaking contact with the second bumper or buffer, the moving end of the single compression spring will simultaneously also be reaching its equilibrium position and top possible acceleration and velocity. This also means that the metal plate embedded within the second bumper or buffer and the attached arm or bar or shaft if they are used to help lock and hold the LMP in place at the completion of the first "action and reaction" procedure or maneuver during Phase 1, will also be reaching their top acceleration and velocity when the second bumper or buffer breaks contact with the end of the rear shaft still within the propulsion spring's housing. But since the metal plate and arm or bar or shaft will all contain mass (as well as the spring itself), their kinetic energy will then produce a small amount of thrust in the undesired direction as the single compression spring becomes fully extended after stretching beyond its natural length. The small amount of thrust in the undesired direction will, of course, be quickly counteracted and negated as the single compression spring continues to oscillate back-and-forth within the propulsion spring's housing until it finally reaches its natural length and rest position. However, since the metal plate embedded within the second bumper or buffer and the attached arm or bar or shaft, if they are indeed used, will also have the potential to be used as the last thing locking and/or holding the single compression spring in place before it is released. By using them to release the LMP, they will produce a significant recoil and positive movement by the host vehicle in the same direction of the momentum of the rebounding LMP, which will also be significantly greater than any negative movement caused directly by the spring during Phase 1.

Due to the reduced amount of thrust for the same available amount of space within the propulsion spring's housing, the fourth embodiment of the invention might not be the preferred embodiment when compared to the third embodiment of the invention (and certainly not when compared to the sixth and ninth embodiments of the invention still to come), but it will work. For this reason alone, it must be included in the still growing list of potential embodiments of the invention.

As with all the other previously described potential embodiments of components, parts, methods and/or systems used by the EdDrive Propellantless Propulsion System, any of the embodiments of components, parts, methods and/or systems that are described in the fourth embodiment of the invention, if possible, may be used in other embodiments of the invention.

Fifth Embodiment of the Invention

Because they will also work and should therefore also be included, the fifth embodiment of the invention will be comprised of several different potential embodiments of the invention that also don't complete both "action and reaction" combinations used during Phase 1 in a way or ways that perfectly or immediately cancel each other out and, therefore, also cause some back-and-forth movement by the host vehicle during Phase 1. They do, however, also cause positive movement by the host vehicle initially and can also make use of an impact and a partially inelastic collision between the host vehicle and whatever large mass object (object 1 or the projectile) that they may be using to ultimately produce thrust using BM #1 or BM #2.

Using a system based on the hyperloop is once such potential embodiment of the invention that could be used. A hyperloop is a sealed, reduced-pressure tube through which a pressurized capsule (or large mass object in our case) may travel free of friction on air bearings or by magnetic levitation and be driven by linear induction motors. If it is done inside a sealed tube with near vacuum conditions and also using a magnetic field to completely surround the large mass object (object 1 or the projectile) as it travels through the tube, according to Newton's Third Law of Motion, the force used to propel the LMP will be the same as the force of the impact of the LMP with the impactor and Bulkhead #1 behind it. Unfortunately, they will each cause an equal amount of movement by the host vehicle in opposite directions during Phase 1 (or somewhat equal—the initial recoil will be somewhat greater than the opposite movement—due to friction, heat energy, noise energy and deformation losses before and after impact), but they will ultimately come very close to canceling each other out. Otherwise, the collision will still be a partially inelastic collision and the rebounding mass of the LMP will be free to be used to produce thrust by any of the embodiments of either BM #1 or BM #2 during Phase 2 that have been previously described or are otherwise possible.

One way to potentially lessen any potential damage to the LMP and/or the rubber or spring-using impactor during impact, and also potentially enhance the velocity and kinetic energy of the rebounding mass, will be to add a rubber or synthetic rubber or spring-using bumper (or some other similar material or device) to the front side of the LMP that will go around where the square-shaped (or any other shaped) steel shaft is attached.

Perhaps not as effective, but a rubber or synthetic rubber layer or coating could also be placed around the entire LMP. These, of course, would be in addition to any potential embodiment of rubber or spring-using impactor that could be used by the invention, including those made of or using: (1) vulcanized natural rubber; (2) synthetic rubber; (3) butyl rubber; (4) neoprene; (5) Latex; (6) Polyurethane; (7) adding graphene to any of the above for superior strength and durability; (8) new rubber products or other synthetic products for extreme temperatures being developed; (9) high performance fibers—Kevlar, Spectra, Dyneema, Zylon and many others; (10) spider's silk with or without carbon nanotubes (11) coil springs (12) wave springs; (13) nonlinear springs; (14) or any other type of spring or anything using a spring or springs of any type.

Another potential embodiment of the invention that could be used is one that uses compressed air to propel the large mass object (object 1 or the projectile) toward the impactor in a sealed tube or by using guide cables during Phase 1. Since, ideally, air will be used as a medium to heat the interior of the sealed containment vessel the Direction Control Unit or Regular Unit of the invention will be operating in, air will be readily available and could be reused to propel the LMP. With temperatures as low as minus 270 degrees Celsius or minus 450 degrees Fahrenheit normal in space, maintaining a temperature within the sealed containment vessel that the invention can safely operate in for extended periods of time will be an imperative. Having another potential embodiment of the invention that could use compressed air to propel the LMP—even if only for backup or emergency purposes—certainly couldn't hurt either.

Another potential embodiment of the invention that could be used is one that uses electromagnetic force to launch or propel a large mass object (object 1 or the projectile) by means of a sliding armature or some type of track during Phase 1. Potential embodiments of devices that currently use electromagnetic force to launch or propel objects or projectiles at high velocities include: electric cannons, electromagnetic railguns, electromagnetic railgun launchers, electromagnetic coil guns, and other electromagnetic force generating devices. And while an extensive amount of engineering would be needed to be done in order to make any of these potential electromagnetic devices a viable option to be used by the invention to generate the force that would be used to propel the LMP into the impactor and Bulkhead #1 behind it during Phase 1, it is certainly possible and, therefore, they must be included.

Another potential embodiment of the invention that could be used to propel an object (object 1 or the projectile) toward the impactor is any number of potential embodiments that are based on already mentioned and well-known technologies that are used to help describe other embodiments of the invention. They include: sling shots, bows, crossbows, spring piston guns, and others.

Another potential embodiment of the invention that could be used during Phase 1 to help propel an object (object 1 or the projectile) is related to the various other embodiments of devices that could be used that are either a winch, similar to a winch, or can perform the responsibilities of a winch. They include: (1) electric winch; (2) hydraulic winch; (3) pneumatic or air-powered winch; (4) manual winch; (5) smart winch; (6) any total number of winches or types of winches being used at one time or as backups; (7) any total number of winch-like devices; (8) cable reel; (9) electric-powered overhead or alternative pulley system; (10) electric-powered overhead garage door opener and closer type device; (11) belt-drive and/or ball screw driven side-wall linear actuators that could extend the full length of the side wall on either side; (12) hydraulic and other types of actuators; (13) manual-powered hand-cranks or pull chains or other manual-powered devices for any of the above; (14) robotic arm or arms; (15) linear electric motor; (16) conveyor belt or roller; (17) the generators of the control mechanisms run in reverse and used as motors to turn the contact gears and move the shaft back through the bulkhead until it is locked and/or held in place; (18) any other device that can perform the tasks or responsibilities normally associated with a winch.

Another potential embodiment of the invention that could be used to produce net positive thrust (although under most circumstances most likely not that much), would be to use a device with an electric-powered propeller that would be directly attached to the back side of the LMP. Since there will be air (or other combinations of gases) within the sealed containment vessel under ordinary conditions in order to provide a medium to provide warmth, the electric-powered propeller could certainly propel an object (object 1 or the projectile) along a rail or track, or be guided by guide cables or by other means during Phase 1. As a result, it must also be included.

Additionally, the same will also go for any other means of propelling a large mass object (object 1 or the projectile) using innovative new "action and reaction" procedures or maneuvers toward or away from a steel reinforced bulkhead, or other strong structure of any kind, during Phase 1, and then use the mass of the LMP, or the rebounding mass of the LMP, during Phase 2—using any potential or possible embodiment of either BM #1 (without harvesting and story energy) or BM #2 (with the harvesting and storing of energy)—to produce net positive thrust and either push or pull the host vehicle in the direction of the LMP's (or LMPs') momentum.

As with all the other previously described potential embodiments of components, parts, methods and/or systems used by the EdDrive Propellantless Propulsion system, any of the embodiments of components, parts, methods and/or systems that are described in the fifth embodiment of the invention, if possible, may also be used in other embodiments of the invention.

Sixth Embodiment of the Invention

The sixth embodiment of the invention is very similar to the third embodiment of the invention in that it also uses two, large-diameter, equal length and strength springs within a propulsion spring's housing as the main driver to achieve the objectives of the invention during Phase 1. These objectives are, of course, first, to not cause any movement whatsoever by the host vehicle during the innovative new first "action and reaction" procedure or maneuver (or embodiment), second, to also cause no net negative movement of the host vehicle by making use of a partially inelastic collision between the host vehicle and the LMP during the second "action and reaction" procedure or maneuver (or embodiment), and third, to also make it possible for the rapidly rebounding LMP to possess the most amount of kinetic energy possible to produce thrust during Phase 2 using BM #1 or BM #2. That then leaves the main difference between the third and sixth embodiments of the invention being that the sixth embodiment of the invention also requires the use of a new and different type of spring to further improve the overall performance and thrust producing capabilities of the EdDrive Propellantless Propulsion System beyond what is able to be achieved with the third embodiment of the invention.

Compression springs are a type of open coiled, helical spring that are designed to oppose the compression set along the wind axis. Compression springs are usually either fitted inside a hole or placed on a rod. When a load is applied on a compression coil spring, it tries to push back the load in order to attain its natural length or rest position. Compression springs offer excellent resistance against linear compressing forces, which makes them very energy efficient devices.

Every spring is a flexible mechanical element and should undergo a large amount of elastic deflection. This deflection may be either elongation or reduction in length of the spring. Both compression and extension springs are basically helical springs (coil springs), although they are made to serve two different purposes. In the case of a helical compression spring, the external force tends to compress the spring. Thus the length of such a spring reduces when subjected to external loading. On the other hand, an extension spring undergoes incremental elongation in length when subjected to external loading. One of the crucial purposes of every spring is to store mechanical energy when it is elastically deformed (elongated or compressed) by external loading and then release that energy by regaining its original shape upon removal of the external load. Under the action of external load, a compression spring will shorten in length, storing energy within it. Such a loaded spring will continuously push the connecting members with an equal and opposite amount of force in order to try to expand its own length and revert back to its original position by releasing stored energy. Conversely, an extension spring will store energy when it is elongated by the action of external load. As a result, it will continuously pull the connecting members with an equal and opposite amount of force in order to return to its natural length or rest position by releasing the stored energy.

The actual length of any helical spring in unloaded condition is called its free or natural length. The length of any helical spring when it is fully compressed is called its solid length, and this indicates the minimum possible length of any helical (extension or compression) spring. In order to facilitate compression in axial length under the action of external load, a sufficient gap must be provided between adjacent coils of a compression spring. If so, such a spring can be compressed until adjacent coils touch each other (or until solid length is achieved). On the contrary, extension springs are not meant for compression and thus the gap between adjacent coils are not necessary when it is at its natural length or in the rest position. Naturally, this gap will increase when such coils are subjected to tensile loading. Thus extension springs can be wound tightly to minimize longitudinal space requirements without sacrificing spring stiffness.

The third embodiment of the invention uses two, large-diameter, compression coil springs of equal length and strength (or possessing the same spring constant, which measures how stiff and strong the spring is). In the third embodiment of the invention, the first equal length and strength compression spring and the second equal length and strength compression spring are, when in use, also either always compressing or expanding until they reach their rest position. As a result, the first and second equal length and strength compression springs—because they are always trying to return to their natural length and rest position—can be used together to help generate the force needed to propel the LMP during Phase 1 at a high rate of speed without causing any unintended movement by the host vehicle. Using two equal length and strength compression springs together will also split the responsibilities and lessen the physical and structural requirements of each compression spring. Still, the elastic limit of two equal length and strength compression springs is somewhat limited. This is especially true when it comes to stretching the more powerful and thicker bar diameter hot wound compression springs (some with bar diameters of at least two inches and overall diameters of over 18 inches) that may be needed to propel large spacecraft and other host vehicles. And while combining two or more compression springs together instead of using just one spring for each to do the stretching on one side and the compressing on the other is also always a possibility, if two, large-diameter, equal length and strength, helical coil springs are going to be used together to provide a high amount of potential Spring Force—which means at some point one spring will need to be fully compressed while the other is fully elongated—replacing the first equal length and strength compression spring within the propulsion spring's housing with a large-diameter, equal length and strength, helical expansion spring is certainly another and potentially superior option.

The sixth embodiment of the invention does exactly that. By doing so—because an equal length and strength expansion spring is much more suited for the stretching responsibilities of the two springs (one compression and the other expansion) which will simultaneously be used together to generate force during Phase 1 within a Direction Control Unit or Regular Unit of the invention that is using the sixth embodiment of the invention—the amount of force that can be generated and subsequently used to produce thrust during Phase 2 will be able to be increased. Likewise, the amount of acceleration or deceleration that can be achieved each full cycle or round of thrust by increasing the amount of force that can be used to propel the large mass object (object 1 or the projectile) at a greater velocity will also be able to be increased.

Additionally, the accumulated wear and tear on the expansion spring—which will be performing its responsibilities as intended—in most instances, will be less over time than if a compression spring of equal strength is used instead. Also, if the expansion spring used instead of a compression spring for stretching or elongating purposes is to any degree more efficient from an overall energy usage perspective, the sixth embodiment of the invention will be more energy efficient as well. Lastly, since extension springs are not meant for compression and thus the gap between adjacent coils are not necessary, the available length within the long, rectangular-shaped, propulsion spring's housing that can be used to generate force during Phase 1—and ultimately propel the LMP at the greatest potential velocity possible so its kinetic energy can be used by either BM #1 (without harvesting and storing energy) or BM #2 (without the harvesting and storing of energy) during Phase 2 to create thrust—will also be increased if an equal length and strength extension spring (or even a torsion or other tension spring) is used instead of the first equal length and strength compression spring and the propulsion spring's housing is the same length.

Thanks once again to Newton's Third Law of Motion (for every action, there is an equal and opposite reaction), the sixth embodiment of the invention will be able to perform the two "action and reaction" procedures or maneuvers during Phase 1 in a way that will make it possible for the first "action and reaction" pair to perfectly cancel each other out without causing any movement whatsoever by the host vehicle as ideally sought and the second "action a reaction" pair to cause no net negative movement by the host vehicle as was done in the third embodiment of the invention. By being able to permanently attach the front inside end of the equal length and strength extension spring to the front inside of the propulsion spring's housing by the first (or front) bumper or buffer (or the open end farthest away from Bulkhead #2), and by also being able to attach the back end of the accompanying equal length and strength compression spring and its attached third (or last) bumper or buffer directly to the face of the first wall of Bulkhead #2, when the LMP is released by the AI-enhanced control system, there with be an equal and opposite amount of Spring Force exerted in either direction on the host vehicle and the LMP by the Restoring Force of the rapidly contracting equal length and strength extension spring and the simultaneously rapidly decompressing equal length and strength compression spring.

Once the LMP is released by whatever means are used to lock and hold it in place by the AI-enhanced control system, the middle bumper or buffer between the rapidly contracting equal length and strength extension spring and the rapidly decompressing equal length and strength compression spring that the round-shaped rear shaft of the LMP is simultaneously being pulled and pushed (or propelled) by will continue to rapidly accelerate until the equal length and strength extension spring fully contracts and returns to its natural length and equilibrium position and the accompanying equal length and strength compression spring fully decompresses and returns to its natural length and equilibrium position. At this point, the LMP—with the end of its rear shaft still within the propulsion spring's housing by a distance equal to the natural length (or solid length) of the extension spring—will be traveling at its top possible velocity or rate of speed and it will possess the same amount of kinetic energy and momentum as the positively moving in the opposite direction host vehicle.

According to industry literature, if it is done without causing any permanent damage to the extension spring or the compression spring (or any other type of spring for that matter), there is only a relatively small amount of difference between the amount of energy that is used to either stretch an extension spring or compress a compression spring until either is fully extended or compressed and the difference in the amount of potential energy that is contained within the extension spring when it is fully extended and a compression spring when it is fully compressed. Furthermore, there will also only be a relatively small amount of difference between the amount of potential energy contained within a fully extended extension spring and a fully compressed compression spring and the difference in the amount of kinetic energy possessed by the LMP once the rear shaft breaks contact with the middle bumper or buffer between the two springs just after they reach their equilibrium position. In fact, due to the relative simplicity and reduction in the number of moving parts in the sixth embodiment of the invention—not to mention the high level of efficiency of the springs and how they are being used, as well as how many of the remaining parts or components that are electric powered are made as efficient as possible—the greatest percentage of the total amount of energy thus far used by the invention during Phase 1 will be able to be harvested and stored using Breakthrough Method #2 than was previously able to be harvested and stored in any of the other embodiments of the invention.

Breakdown of approximate energy use by the sixth embodiment of the invention:
(1) AI-enhanced control system: 30 watts per hour for AI-chip now used in many robots (or the same amount of electricity used by a 60-watt light bulb), or 50 watts per hour for AI-chip or board now used in some self-driving cars, or 100 watts for AI-chip or board with two AI-chips combined together on one board for redundancy and security purposes. 100 watts divided by 300 cycles per hour=0.3 watts per cycle.
(2) Electric smart winch: Current Brushless DC (BLDC) electric motors that can be used with the new, custom-made winch-like devices that will be an option to be used by the invention can typically achieve efficiencies in excess of 90%. AC Induction motors that can also be used by the invention instead of the BLDC motors can typically achieve efficiencies in the neighborhood of 90%. And that's using commonly and readily available technologies that can certainly be improved. Also, current winch technologies weren't exactly designed with energy efficiency as a top priority. Line speeds in excess of 100 feet per minute and pulling capacities of up to 130,000 lbs. were more of a priority. Fortunately, the custom made winch-like devices that can be used with the invention will do more to address heat and noise energy losses, as well as other factors related to design and structural concerns (more on that later). As a result, these new, winch-like devices can be expected to achieve efficiencies of 75% or better.
(3) Actuators and control mechanisms used to release the various mechanical devices locking and holding the LMP in place: (>10 watts per cycle)
(4) Generating the kinetic energy of the LMP: As previously described, other than the major loss of energy used to cancel out the initial positive movement of the host vehicle with the partially inelastic collision, there will be a slight difference between the amount of energy used to compress and stretch the springs within the propulsion spring's housing and the amount of kinetic energy possessed by the LMP when contact is broken with the middle bumper or buffer. Total losses: (<50%)
(5) Loses incurred during impact: A spring-using impactor will be more efficient than one using rubber or a similar material. Total losses: (>5%)
(5) Losses incurred by gears and generators: (typically 80% to 85% efficiency—although incremental improvements are certainly possible).
(6) Losses incurred by flywheels: (typically flywheels with magnetic bearings and high vacuum can maintain 97% mechanical efficiency and 85% round trip efficiency—although incremental improvements are certainly possible).
(7) Supercapacitors: (generating efficiencies up to 97.94%). Total efficiency of the sixth embodiment of the invention: approximately 20% to 25% and potentially greater.

This ability of the invention to harvest and store and, in effect, easily reuse a significant amount of the electric power that is used in the normal operation of the invention will certainly be put to good use. And while new space stations, gateways, and even large docking hubs, as well as large cargo carriers and other large spacecraft, would likely choose to use (if no other options were available) the third or sixth embodiments of the invention in part due to their potential to incorporate two or more, large-diameter, hot wound, springs together in one unit that will be able to equally share and fulfil all the force generating responsibilities of the unit, the third or sixth embodiments of the invention, using just two springs, will also be more than adequate to be used with small and mid-sized spacecraft or other similar sized host vehicles. And then, of course, if two or more extension springs or compression springs were combined together instead of using just one to perform the stretching and compressing duties, each combination of springs would be able to equally share and fulfil the force generating responsibilities of the multi-expansion and compression spring units within the (most likely) longer propulsion spring's housing.

Being able to harvest and store and also reuse a significant amount of the energy ultimately used to produce thrust will also decrease the size of the primary energy source (or sources) needed to power the individual units of invention and also the remainder of the host vehicle. Due to their length and amount of open areas, there will certainly be plenty of room within the sealed containment vessels the different potential embodiments of the invention will be operating in to accommodate whatever energy sources and storage devices may be used. However, using fewer and smaller energy sources will also cost less. A small satellite powered by one or more solar panels and a bunch of supercapacitors (and/or even batteries) using the sixth (or even the third) embodiment of the invention would certainly be a low-cost option. It might take a little longer between rounds of thrust at times due to energy constraints, but it will no doubt be able to eventually get to wherever it wants to go.

As with all the other previously described potential embodiments of components, parts, methods and/or systems used by the EdDrive Propellantless Propulsion System, any of the embodiments of components, parts, methods and/or systems that are described in the sixth embodiment of the invention, if possible, may be used in other embodiments of the invention.

Seventh Embodiment of the Invention

The seventh embodiment of the invention goes one step farther beyond what was done in the sixth embodiment of the invention. The seventh embodiment of the invention does this by replacing the two, large-diameter, equal length and strength extension and compression springs within the long, rectangular-shaped, propulsion spring's housing with just a single, large-diameter, extension spring. But, unfortunately, the seventh embodiment of the invention is very similar to the fourth embodiment of the invention and suffers from many of the same difficulties.

In the fourth embodiment of the invention, only a single, large-diameter, compression spring is used to propel the large mass object (object 1 or the projectile) and simultaneously cause positive movement by the host vehicle when the LMP is released during Phase 1. The main problem with using only the single compression spring in the fourth embodiment of the invention is the reduced amount of force that can be generated to carry out the objectives of the invention during Phase 1, which also results in less thrust being produced during Phase 2 using BM #1 or BM #2.

The same problems also exist in the seventh embodiment of the invention. Moreover, because, while the single compression spring in the fourth embodiment of the invention is pushed back and fully compressed by the LMP in order to generate the equal and opposite amount of Spring Force pushing against Bulkhead #2 and the LMP as the LMP is rapidly accelerated away from Bulkhead #2, the single extension spring used in the seventh embodiment of the invention—even though it will essentially be attached to both the front and back of the long, rectangular-shaped, propulsion spring's housing when the LMP is released—instead of pushing against Bulkhead #2, the single extension spring will be simultaneously pulling the host vehicle in the same direction as Bulkhead #2 (or at least in respect to Bulkhead #1) with an equal and opposite amount of Spring Force as it is rapidly accelerating the LMP in the opposite direction and also providing the host vehicle and the LMP with an equal amount of force and momentum. So, in essence, the same exact thing will occur when using the single compression spring as when using the single extension spring.

As with all the other previously described potential embodiments of components, parts, methods and/or systems used by the EdDrive Propellantless Propulsion System, any of the embodiments of the components, parts, methods and/or systems that are described in the seventh embodiment of the invention, if possible, may be used in other embodiments of the invention.

Eighth Embodiment of the Invention

The eighth embodiment of the invention is primarily concerned with the use of very large springs (although it can also pertain to the use of very large elastic straps or similar devices) to generate the force during Phase 1 that is needed—using any of the previously described embodiments of the invention or others that may be possible—to propel the large mass object (object 1 or the projectile) and subsequently use its kinetic energy to produce thrust during Phase 2 by successfully completing either BM #1 (without harvesting and storing energy) or BM #2 (with the harvesting and storing of energy). In some instances, the use of multiple smaller springs instead of using one or more very large springs may be necessary or be a much more practical option—especially when it comes to propelling very large mass host vehicles. In order to deal with this eventuality, the eighth embodiment of the invention provides yet another option.

Since the LMP (especially really large ones) will be able to be constructed with multiple, round-shaped, rear shafts connected to and protruding out from the main body of the LMP, there is also no reason why multiple, long, rectangular-shaped, propulsion spring's housings and their various units—including those that may be housing compression, or compression and extension, or just extension springs—can't be used at the same time. By using multiple propulsion spring's housings and their various units, the springs within them will be able to be made much smaller than those that would be needed to achieve the same ratios as the 1 kilogram test prototype, yet, when combined, will still be able to generate the same amount of force needed to propel the LMP during Phase 1. And due to how using multiple smart winches (or similar devices) at the same time in order to complete the first "action and reaction" procedure or maneuver during Phase 1 is certainly possible (although using more than two or three may not be the most energy efficient potential option or embodiment), in this instance, it also makes a lot of sense if there is no other alternative.

Fortunately, when it comes to very large spacecraft and other very large mass host vehicles, there are other alternatives. Very powerful hydraulic winches are a common product that are commercially available and their components could be cannibalized or otherwise used in other new types of winch-like devices that may be constructed for the invention. Also, even more powerful hydraulic actuators with extendable and retractable piston rods could be used. Their reach will almost certainly be shorter than devices using cables, but they could be combined with devices using cables (which should have little difficulty pulling the LMP back regardless of how big or how much mass it contains until it makes contact with a bumper or buffer) and connects to the LMP once the round-shaped rear shaft, or shafts, makes contact with the solid surface of the bumper or buffer it will be pushing against. From there, the much more powerful hydraulic actuators can take over the responsibilities of pulling the LMP back until it is locked and held in place by whatever means of doing so are used. Thus, if powerful hydraulic actuators are indeed used in this or similar ways, there really is no spring (or even elastic strap) made today that they couldn't compress or stretch.

Very large mass spacecraft and other very large mass host vehicles will also be using powerful fission reactors. That includes fission reactors that will be able to continuously produce in excess of two megawatts (<2 MW) of electric power per hour, and do so for several years. So meeting the power needs of multiple units, including those housing any number of different combinations of springs, won't be a problem. This is especially true when you consider how the total amount of energy needed to compress or stretch a spring is just a little more—or very close to—the amount of potential energy contained (or stored) within a compressed or stretched spring afterward. Then there is all the harvested energy that will be harvested and reused if an embodiment of BM #2 is used to produce thrust. Also, due to how each Direction Control Unit or Regular Unit of the invention will almost certainly have plenty of space to accommodate all its energy needs within the sealed containment vessel or other location where the embodiment (or embodiments) of the invention are operating in, each DCU or Regular Unit of the invention will be able to be made energy self-sufficient if so desired.

Very large mass spacecraft and other very large mass host vehicles will also, in most instances, be very large in size as well. So providing the surface area on a steel reinforced bulkhead, or on another large and strongly constructed surface that will assuredly be needed to accommodate multiple propulsion spring's housing units and any number of different combinations of propulsion springs, also shouldn't be a problem. Bottom line: if it is capable of being built or assembled in space any time in the not too distant future, the many different potential embodiments of the EdDrive Propellantless Propulsion System that can be constructed will very likely be able to be configured in such a way that it (or they) will be able to be used to provide propellantless propulsion for it.

As with all the other previously described potential embodiments of components, parts, methods and/or systems used by the EdDrive Propellantless Propulsion System, any of the embodiments of components, parts, methods and/or systems that are described in the eighth embodiment of the invention, if possible, may be used in the other embodiments of the invention.

Ninth Embodiment of the Invention

The biggest difference between the ninth embodiment of the invention and the $1^{st}$, $2^{nd}$, $3^{rd}$, $4^{th}$, $6^{th}$, $7^{th}$ and 8th embodiments of the invention, is that the thrust produced during Phase 2 is definitely produced without using a rebounding mass. That means there is no impact of a large mass object (object 1 or the projectile) with a rubber or spring-using impactor and the bulkhead behind it before the round of thrust is completed by the ninth embodiment of the invention using new or somewhat similar embodiments of either Breakthrough Method #1 (without harvesting and storing energy) or Breakthrough Method #2 (with the harvesting and storing of energy).

The second biggest difference between the ninth embodiment of the invention and the previous ones, is that the large mass object (object 1 or the projectile) has been eliminated and replaced with two, separate, large mass objects (objects 1a and 1b or the projectiles) which are approximately half the mass of the large mass projectile (or LMP) used in the previous embodiments of the invention. Therefore, if the same ratios for mass are used as in the 1 kilogram test prototype (50% for the mass of the test large mass object compared to the mass of everything else including the mass of the test host vehicle), the mass of the two separate large mass objects (or smaller LMPs) used in the ninth embodiment of the invention will each be 25% of the mass of everything else other than the large mass projectiles used in the Direction Control Units or Regular Units of the invention—although the ratios could certainly also be higher or lower.

The third biggest difference between the ninth embodiment of the invention and the previous ones, is that, because there is no longer an impact of a large mass object with an impactor or bulkhead of any type, there is also no longer a second "action and reaction" procedure or maneuver that needs a partially inelastic collision to make the two smaller LMPs used in the ninth embodiment of the invention available for their kinetic energy to be harvested. It also means that there is no initial positive movement by the host vehicle caused while setting the two smaller LMPs in motion and that all the "action and reaction" combinations used with the ninth embodiment of the invention can be completed without causing any movement whatsoever by the host vehicle as ideally sought.

The fourth biggest difference between the ninth embodiment of the invention and the previous ones, is how a new pair of longer and larger, electric and electric motor-powered, chain or belt driven, side-wall linear actuators are being used and the two mounting blocks/brackets are now also being used to hold and move the two smaller LMPs along both side walls of the sealed containment vessel. In fact, all the major components of the invention have been moved out of the center of the sealed containment vessel and now occupy both side walls, essentially creating two new versions (or embodiments) of Phase 1 (force generation) and Phase 2 (thrust production).

The fifth biggest difference between the ninth embodiment of the invention and the previous ones, is that no elastic members and their property of Restoring Force are being used at all during the second "action and reaction" procedure or maneuver during Phase 1 to generate force. Instead, large electric motors, taking full advantage of the Law of Conservation of Angular Momentum and Newton's Third Law of Motion, are used in the longer and larger side-wall actuators as the main drivers to set the two smaller LMPs in motion without causing any movement whatsoever by the host vehicle as ideally sought. And by being able to complete the second "action and reaction" combination without causing any movement whatsoever by the host vehicle, the kinetic energy and linear momentum of the two smaller LMPs—which are rapidly set in motion by the torque (or Rotational Force) provided by the drive trains of the two longer and larger side-wall linear actuators while the equal and opposite torque from the large electric motors on the host vehicle is being perfectly canceled out by running one set of motors clockwise and the other set of motors counterclockwise—can subsequently be used to produce a much greater amount of thrust than is able to be produced in the previous embodiments of the invention for the amount of energy expended, using the new or somewhat new versions (or embodiments) of BM #1 or BM #2.

The sixth biggest difference between the ninth embodiment of the invention and the previous ones, is that the smart winch or winches have been eliminated. As a result, there is a new pair of new winch-like devices that will have the ability to use their electric smart motor, during what was previously the Recovery Time Period, to return, usually in a coordinated effort with the two larger side-wall actuators, the two smaller LMPs back to the starting point at the completion of Phase 2 as part of what will now be the first "action and reaction procedure or maneuver during Phase 1. This pair of smart devices will also have the ability to run the electric smart motor in reverse and generate electric power during Phase 2. But Instead of being located on the face of Bulkhead #2, as the winch or winches had, the new pair of smart winch-like devices and their built-in electric power generating capabilities using generators or flywheels, will now become a separate pair of smart devices that will be embedded in Bulkhead #1 and also be located at either end, close to the side wall of the sealed containment vessel. From either location, each new winch-like device will then ultimately connect to and become part of a new, longer, and more substantive, mechanical device that will occupy the two locations previously occupied by the two side-wall linear actuators in the first two embodiments of the invention, and from where they will repeatedly be used to help the invention generate force in Phase 1 and also produce thrust in Phase 2. A second pair of these new winch-like devices, with their own built-in capabilities, will also be used from their location embedded within Bulkhead #2 to assist the first pair of winch-like devices in completing the first "action and reaction" combination during Phase 1 without causing any movement whatsoever by the host vehicle as ideally sought.

The seventh biggest difference between the ninth embodiment of the invention and the previous ones, is in how the amount of energy that is used by the invention in the completion of a Full Cycle (or round) of thrust that can be harvested and stored using Breakthrough Method #2 will be dramatically increased. In fact, the overall amount of energy that is used to power the invention that could be harvested and stored in supercapacitors or flywheels (or both) could easily be close to tripled when compared to what had been able to be achieved in the previous embodiments of the invention.

In the first two embodiments of the invention, the two, opposing, chain or belt-driven, side-wall linear actuators are used to instantly move their low-friction mounting blocks (or carriages) and the securely attached brackets holding the two looped ends of the strap (thick elastic strap or cold temperature strap) away from Bulkhead #1 in order to ensure tension from the thick elastic strap or the cold temperature strap on the back side of the large steel block isn't allowed to interfere with the rebounding LMP so the rebounding LMP can move freely and its kinetic energy can be converted into thrust during Phase 2. One of the actual benefits of needing to use the two opposing side-wall actuators in the first two embodiments of the invention, is in how a very small amount of kinetic energy is able to be harvested by the regenerative braking system built into the smart motors and the remainder of the two side-wall actuators in order to help more traditional or conventional braking systems stop the progress of the mounting blocks/brackets the intended distance away from Bulkhead #1.

Another benefit of using the two side-wall linear actuators in the first two embodiments of the invention (and definitely worth taking a closer look at this far into the patent application), is in how, during the process of the regenerative braking system harvesting a very small amount of kinetic energy, the production of a very small amount of additional thrust in the same direction of the thrust made possible by the kinetic energy of the main source of mass of the invention also occurs during Phase 2. The conservation of linear momentum in this instance is very simple: the slowing of the chain or belt holding the mounting block/bracket by a motor running in reverse (and now serving as an electric generator) causes the momentum of the mounting block/bracket and its contents to pull the chain or belt in the direction of its momentum. The belt or chain then pulls on the pulley or sprocket, which is attached to the motor, which is securely attached to the side wall of the host vehicle, which then pulls the host vehicle in the direction of the mounting block/bracket's linear momentum and ultimately transfers the linear momentum of the mounting block/bracket to the host vehicle. And since we know from the two Laws of Conservation of Momentum—linear and angular—that they are absolutely separate and that neither can be converted to the other, the linear momentum of the mounting block/bracket, as it is being slowed down by the regenerative braking system, has to be—because it is undoubtedly conserved—transferred/combined and recalibrated with the linear momentum of the host vehicle.

In fact, although on a much smaller scale, what is done by the regenerative braking system when it is harvesting kinetic energy and simultaneously producing a very small amount of thrust is very similar to what normally happens when the invention is using Breakthrough Method #2. And perhaps even more noteworthy, when what is done by all the different embodiments of Breakthrough Method #2 that can be successfully deployed by the invention, as well as what is done by the regenerative braking system used by the two side-wall linear actuators, when they are compared to how a regenerative braking system works in an electric vehicle (EV), or in an electric train or trolley car on Earth, the similarities are striking.

This continues to be true even with the obvious differences between the invention and commonly used transportation braking systems on Earth. The most obvious difference has to do with gravity and how it is necessary for the wheels of vehicles on Earth to interact as they do with whatever surface (or reaction mass) they are riding on. The invention, on the other hand, because of the effects of microgravity in space—which, instead of causing floating as is typically thought, in reality causes the host vehicle and everything within it to essentially "fall" together at the same rate—means that gravity is totally useless as a means to have the LMP and the host vehicle interact with each other to produce thrust.

But, perhaps, the most important difference between the invention and Earth-based braking systems is one that isn't so obvious. On Earth, the mass of the Earth (object 2 or the larger mass object) is so massive when compared to the mass of an EV or a train or trolley car (object 1 or the projectile), that the effect of the transfer of the vehicle's linear momentum to the Earth as it is braking using a regenerative braking system (or any other for that matter) is so miniscule that it can't be observed or measured using available technology. This definitely isn't the case with the results that will be obtained by the invention in space, where the acceleration or deceleration of the larger mass object (object 2 or the larger mass object) caused by the invention will actually be great enough to be observed with the naked eye. Therefore, a person skilled in the art of regenerative braking systems should have little difficulty determining that the science behind why a regenerative braking system works and performs as it does on Earth is practically identical to the science behind why the EdDrive Propellantless Propulsion System—of course, with the assistance of the mechanical means that will keep the large mass object (object 1 or the projectile) and the host vehicle (object 2 or the larger mass object) stuck together during the various versions (or embodiments) of an inelastic collision—will work and perform as well as it undoubtedly will in space.

In the preferred embodiment of the two chain or belt-driven side-wall linear actuators used by the invention in the first two embodiments of the invention, electric-powered traction or induction motors are used to rapidly spin the sprockets or pulleys that are used to instantly move the two low-friction mounting blocks the two low-mass metal brackets are attached to away from Bulkhead #1. In order to ensure that the equal and opposite amount of torque (or Rotational Force) that the smart motors are imparting on the host vehicle and also using to rapidly rotate their rotors, as well as the other spinning parts that may be driven by the spinning rotors, doesn't ultimately result in spinning motion by the host vehicle (and also the creation of angular momentum), the two pairs of motors—which are directly opposite each other on either side wall of the sealed containment vessel—will be constructed and set up so as to perfectly cancel out the equal and opposite amount of Rotational Force imparted by the motors on the host vehicle. This can easily be done by having one pair of motors turn clockwise while the other pair turn counterclockwise.

For instance, if the mounting block/bracket is attached to the lower section of the chain or belt that can be rotated in either direction by the two main sprockets or pulleys within the side-wall actuator, and the mounting block/bracket is being moved by the side-wall linear actuator toward Bulkhead #2, the rotor of the smart motor turning the sprocket or pulley closer to Bulkhead #1 (or the first sprocket or pulley) will turn counterclockwise and also turn the belt counterclockwise. The same will also hold true for the motor and rotor of the second sprocket or pulley, whether one sprocket or pulley or both are used at the same time. But regardless of how many sprockets or pulleys are used, as the rotor within the motors that are used start to rotate counterclockwise, an equal and opposite amount of Rotational Force—or torque—will be applied to the host vehicle, which, if it isn't counteracted, will eventually cause the host vehicle to spin clockwise. An actual example of this being done on purpose in space can be found in the use of reaction or momentum wheels that are now used in practically all satellites in operation today for the purpose of pointing in the proper direction (more on them later).

But, fortunately, the clockwise spin of the host vehicle can be counteracted and stopped before it even starts. This, as we know from the use of the two side-wall actuators in the first two embodiments of the invention, can easily be done by having the motors in the opposing side-wall actuator rotate their rotors clockwise, which will also spin their sprockets or pulleys clockwise, which will also turn the chain or belt clockwise and move the mounting block/bracket toward Bulkhead #2. By doing so, the motor's torque (Rotation Force) exerted on the outer wall of the host vehicle in the opposite direction of the torque exerted by the opposing side-wall actuator will perfectly cancel each other out. Helicopters do something very similar by adding a tail rotor or by adding another rotor called a coax rotor. Coaxial rotors are a pair of helicopter rotors mounted one above the other on concentric shafts, with the same axis of rotation, but turning in opposite directions (or contra-rotating). Without a tail rotor or using coaxial rotors, a helicopter would just spin around in the opposite direction of the main rotor blades. To prevent this from happening, the main purpose of a tail rotor or an added coax rotor is to pull against the torque of the main rotor and hold the helicopter straight (more on this later).

Obviously being able to have the motors of one of the invention's side-wall actuators rotate their rotors clockwise while the other is having its motors rotate their rotors counterclockwise in order to keep the host vehicle from spinning will be very important. However, just as important, is the fact that while this incredibly fortuitous canceling out of any potential spinning by the host vehicle is happening—and thanks once again to Conservation of Momentum and Conservation of Energy—we also know from the first two embodiments of the invention that the small amount of additional thrust in the same direction as the direction of the momentum of the LMP, which was caused by using the regenerative braking system to help stop the progress of mounting block/bracket where needed and also harvest a very small amount of kinetic energy in the process, will still occur.

These two concepts, first, the smart motors being constructed and set up so as to perform their tasks and simultaneously also perfectly cancel out any potential movement by the host vehicle that may be caused by any of them, and second, the kinetic energy of the moving masses—primarily provided by the mounting blocks, the low-mass metal brackets, and the looped ends of the thick elastic strap or the cold temperature strap—being capable of being harvested by the regenerative braking system while a very small amount of thrust is simultaneously being produced, are the two concepts that provided the basis behind what happens in the ninth embodiment of the invention.

The preferred method to achieve the ambitious objectives of the ninth embodiment of the invention will make extensive use of large, electric and electric motor-powered, smart cable generators. One pair of these new winch-like devices will be firmly embedded between the two walls of Bulkhead #1, where they will be placed close to the side wall on either side of the sealed containment vessel, and a second pair will be firmly embedded between the two walls of Bulkhead #2, where they will also be placed close to the side wall on either side of the sealed containment vessel.

Since the ninth embodiment of the invention seeks to cause no movement whatsoever by the host vehicle during Phase 1, as with the previous embodiments of the invention using winches and elastic members (straps or springs or both) to complete the first "action and reaction" procedure or maneuver without doing so, the ninth embodiment of the invention also makes use of Restoring Force and Tension Force during the first "action and reaction" combination. The Tension Force of the low-mass, stronger-than-steel, wound, metal alloy cables of the smart cable generators can, of course, be used in the same way the cables of the winches had previously, but Restoring Force is done in a new way (or embodiment) in order to complete the first "action and reaction" combination during Phase 1 without causing any movement whatsoever by the host vehicle.

This will be accomplished by first having the pair of smart cable generators embedded in Bulkhead #1 on either side of the sealed containment vessel, start Phase 1 by reeling in the cable reel cables that pass through the first wall of Bulkhead #1 and are attached to the bracket that is on the nearest side of the mounting block/bracket that is also the holder of one of the smaller LMPs. Each smaller LMP is securely attached to the face of the mounting block/bracket that is also securely attached to either the upper or lower section of the chain or belt that extends in one piece and rotates around the two sprockets or pulleys at either end of what is now a much longer and larger side-wall linear actuator than was used previously in the first two embodiments of the invention. Because the smart motors of the two larger side-wall actuators will be able to put their rotors into freely-turning-mode if they aren't needed—perhaps for backup purposes—to return or help return the two smaller LMPs back to the starting point near Bulkhead #1, the mounting blocks/brackets will be able to be pulled back by the cable generators fairly easily, and they will also consume less electric power. Still, because the two smaller LMPs will contain a considerable amount of mass, some force will be needed to pull them back near Bulkhead #1.

If the two smaller LMPs end the previous Cycle near Bulkhead #2, when the cable generators start to pull the two smaller LMPs back toward Bulkhead #1, they will be pulling the host vehicle in the desired direction with an equal and opposite amount of force. If it wasn't for the fact that quickly reeling in the smaller LMPs will cause them to gain kinetic energy and momentum in the undesired direction, the positive movement of the host vehicle caused by pulling the smaller LMPs toward Bulkhead #1 by the cable generators embedded in Bulkhead #1 would be acceptable. But that isn't the case. That then leaves the question of what to do about the possibility of momentum being gained by the smaller LMPs as they are being returned to the starting point?

One option to balance the positive movement of the host vehicle with the negative movement caused by moving the smaller LMPs, would be to reel in the smaller LMPs very slowly and let the small amount of friction within the drive trains of the larger side-wall actuators cancel out the force of pulling the LMPs, which would also make it possible to stop the smaller LMPs when they reach the starting point without causing any significant movement by the host vehicle. But this will take a long time and certainly not be the preferred method (or embodiment) to complete the first "action and reaction" combination during Phase 1.

The second option to balance the positive movement of the host vehicle with the potential negative movement caused by moving the smaller LMPs back to the starting point, would be to let the energy generating components of the smart cable generators embedded in Bulkhead #2, which have the ability to perform either Breakthrough Method #1 or Breakthrough Method #2, perform BM #1 or BM #2 with the two returning smaller LMPs and stop them back at the starting point. This would work, but it would also cause the negative movement needed to cancel out the previous positive movement of the host vehicle.

The third, and preferred option (or embodiment), will also be to use the second pair of smart cable generators 38 embedded in Bulkhead #2 to provide the remainder of the equal and opposite amount of force needed to return the two smaller LMPs 36 back to the starting point, but in this case it will be done without causing any movement whatsoever by the host vehicle. This will be accomplished by adding the capabilities of a spring-loaded or spring-driven cable reel to the capabilities of the two smart cable generators embedded in Bulkhead #2. By doing so, the force provided by the motor-driven cable generators embedded in Bulkhead #1 will be counter-balanced by the mass (or load) of the smaller LMPs and the force needed to wind the spring within the smart cable generators with the added capabilities of a spring-driven cable reel. In the end, the force from the cable generators embedded in Bulkhead #1 will perfectly cancel out the equal and opposite force from the cable generators embedded in Bulkhead #2, and the smaller LMPs (caught in a purely one-sided tug-of-war between the cable generators embedded in opposing steel reinforced bulkheads because the spiral springs used in the smart cable generators embedded in Bulkhead #2 will have more than enough length and strength to provide a constant equal and opposite force as their cable generator cables are being pulled out) will be able to be returned to their starting point without causing any movement whatsoever by the host vehicle as ideally sought.

After the two smaller LMPs—which will preferably have a steel outer shell and a tungsten inner core to reduce their size and/or increase their mass—are reeled in as close to Bulkhead #1 as possible, the cable generator cables of the smart cable generators are then locked in place (internally or otherwise) by the AI-enhanced control system, thus completing the first "action and reaction" combination of Phase 1. It is then at this point, with the AI-enhanced control system simultaneously preparing to activate the smart motors that will be used by the two longer and larger side-wall actuators, that the two, large, electric-powered, smart cable generators embedded in Bulkhead #1 are being converted into new embodiments of thrust producing devices that will be expected to perform similarly to the devices used in the previous embodiments of the invention to carry out Breakthrough Method #1 or Breakthrough Method #2 during Phase 2.

However, before BM #1 or BM #2 can be commenced, the two larger side-wall actuators must first begin the second "action and reaction" procedure or maneuver of Phase 1 and rapidly set the two smaller LMPs in motion so their kinetic energy can be harvested and simultaneously turned into thrust once the two smaller LMPs have reached their top acceleration rate and velocity possible. Fortunately, the ninth embodiment of the invention has the ability to borrow from the first two embodiments of the invention. And by using the torque of the smart motors to simultaneously power the drive trains of the two, longer and larger, opposing, side-wall linear actuators and, at the same time, also counter-balance the equal and opposite amount of force the torque of the motors of the two larger side-wall actuators are imparting on the host vehicle, the two smaller LMPs are rapidly set in motion without causing any movement whatsoever by the host vehicle as ideally sought. With the hard part solved, that then leaves what happens after the two smaller LMPs are rapidly set in motion by the Rotational Force (or torque) of the drive trains of the two larger side-wall actuators and when their newfound linear momentum and translational kinetic energy will be put to good use by the invention?

To begin with, in order for the two LMPs to be able to reach their top potential acceleration rate and velocity, they must first have enough available space to do so. In the first two embodiments of the invention, the use of a regenerative braking system, along with more conventional braking systems that accompany them, to stop the progress of the mounting blocks/brackets precisely where needed also results in a very small amount of kinetic energy being harvested and a very small amount of positive thrust in the desired direction being produced. But that is done in a short amount of time using a relatively small amount of mass. Because of this, it can also be done in a relatively short amount of distance. The ninth embodiment of the invention will be using the two side-wall actuators to rapidly move much more mass and, consequently, will need much more time and a much longer distance in which to stop in. The question then becomes, how much?

Today's electric and hybrid vehicles have the ability to engage the regenerative braking system the instant a driver's foot lifts up on the accelerator pedal. So the motors of the different embodiments of side-wall actuators that could be used in the ninth embodiment of the invention could undoubtedly be used as generators as part of a regenerative braking system that could be used to help convert some of the kinetic energy of the smaller LMPs into stored electric energy when they reach the top potential velocity that is possible within the limits of the system. Moreover, if a regenerative braking system is included in the mix of potential options, the more conventional mechanical brakes that ordinarily accompany a regenerative braking system would also be able to be used to stop the two smaller LMPs in a reasonable amount of distance relatively quickly. On the plus side, using the more conventional braking systems to stop the forward progress of the LMPs would make it possible for the translational kinetic energy of the two smaller LMPs to be converted into thrust, but most of the kinetic energy wouldn't be harvested, it would most likely be wasted in the brakes as heat—not to mention result in a lot of wear and tear on the braking system. Adding a lock-mode function to the smart motors could also be an option, and would most likely be made available, but it, as well as the other potential options that could be performed by the various components of the side-wall actuators, are really more suited to be performed by the pair of large, electric-powered, smart cable reels instead.

Because the two smaller LMPs will be securely attached to the flat face of the mounting blocks (or carriages) of the two side-wall actuators, they will extend in toward the center of the sealed containment vessel housing either a Direction Control Unit or a Regular Unit of the invention. That means the bracket will need to be turned sideways and be located on the nearest side of the combined mounting block/bracket, facing Bulkhead #1, so the cable from the cable generator can be connected to it. It also means that if the smaller LMPs are large enough to require additional cable generators, the additional cable generators could be connected directly to the nearest side of the smaller LMP. Either way, this will leave just the amount of space equal to the diameter of the sprocket or pulley, with a little extra space added on each side, between Bulkhead #1 and the smaller LMP when the smaller LMP is pulled back and held in place until the smart motors are engaged. In addition, since the cable generators will be embedded in Bulkhead #1, from where they will not only be able to fill the responsibilities of a winch but also the responsibilities of a long, square-shaped, steel shaft and its three accompanying contact gears and control mechanisms in order to perform BM #1 or BM #2, a lot of space will be saved by just using the cable generators. That saved space could easily be used to push back Bulkhead #1 and increase the size and length of the two side-wall actuators.

Being able to make the two side-wall actuators much longer—even if it requires adding additional sprockets or pulleys—will be extremely beneficial. One of the major ways it will be beneficial is in how it will make it possible for the two smaller LMPs to reach much higher velocities before BM #1 or BM #2 is implemented. The velocity that the LMPs can reach is very important because the amount of kinetic energy that they possess is increased significantly by going faster. For example, because the kinetic energy (½ mv2) of a large mass object (object 1 or the projectile) as its speed changes is proportional to the square of the factor by which the speed changes, if the velocity of the smaller LMP is doubled, its kinetic energy changes to four times the initial kinetic energy. Likewise, if the velocity is tripled, its kinetic energy will be nine times greater. Obviously the faster the smaller LMP can go before BM #1 or BM #2 has to be implemented the better.

One way to help increase the velocity of the LMPs will be to increase the initial torque that is used to turn the sprockets or pulleys when they are first engaged. This can be done by using a clutch and flywheel to effectively disengage the motor from the sprocket or pulley in order to get the rpms (rotations-per-minute) of the flywheel up to a safe speed—instead of starting from a standstill—before the sprocket or pulley is engaged by the drive train of the side-wall actuator. Another possibility will be to use an automatic transmission-like device to do something similar. Either way, the LMP will be moving faster sooner and will be able to reach greater velocities in a shorter distance.

With the two smaller LMPs pulled back and locked and/or held in place near bulkhead #1 by whatever means are locking and/or holding them in place (more on this later), and the drive trains of the two side-wall actuators ready to spin the sprockets or pulleys with a safe but still sizable amount of torque, once the sprockets or pulleys that are being used are engaged at the behest of the AI-enhanced control system, there will be an equal and opposite amount of torque (Rotation Force) produced by the motors to spin their rotors and also attempt to spin the host vehicle in the opposite direction the entire time the rotors are rotating. As a result, and as previously described, with the motors of one side-wall actuator rotating their rotors clockwise and the motors of the opposing side-wall actuator rotating their rotors counterclockwise, an equal amount of torque will be pulling the host vehicle in either direction and they will perfectly cancel each other out without causing any movement whatsoever by the host vehicle. And, of course, this will all be happening while the two smaller LMPs are rapidly being set in motion (not unlike how the drive train of a car is used to set the main body of the car in motion).

Naturally, if BM #1 (without harvesting and storing energy) is chosen by the AI-enhanced control system to be used at the beginning of Phase 2, once the (potentially even spring-loaded cables) are released by the cable generators embedded in Bulkhead #1 and put into freely-turning-mode just before all the sprockets or pulleys are simultaneously being engaged, the two cable generator cables can then be abruptly locked and stopped in place at any distance the smaller LMPs have reached along their path as long as they are stopped before they reach the second sprocket or pulley located next to Bulkhead #2. One reason why the two smaller LMPs 36 won't usually be stopped until they come very close to the second sprocket or pulley, is because it will give more time for the two smaller LMPs to rapidly accelerate to the top potential velocity or rate of speed they can achieve in the amount of space they have to operate in BM #1 will stop the two smaller LMPs abruptly, the smaller LMPs will be able to travel farther and faster before the sprockets or pulleys are disengaged and the cable generators embedded in Bulkhead #1 are activated.

Waiting until the two smaller LMPs—which will be rapidly accelerating toward Bulkhead #2 up until the instant the sprockets or pulleys are disengaged by the AI-enhanced control system—to reach their top velocity before abruptly locking and stopping the cable reel cables, is important because the greatest amount of thrust will be able to be produced when the greatest amount of kinetic energy is available. And because using BM #1 will allow the two smaller LMPs to reach a higher velocity, thus possess more kinetic energy, the additional velocity will make it possible for considerably more thrust to be produced than if BM #2 was used instead.

On the other hand, if BM #2 (with the harvesting and storing of energy) is chosen at the beginning of Phase 2, once the two smaller LMPs (objects 1a and 1b or the large mass projectiles) have reached their top acceleration rate and velocity in the space available to harvest their kinetic energy to greatest extent possible while, at the same time, simultaneously produce a significant amount of thrust, the AI-enhanced control system can switch the smart cable generators embedded in Bulkhead #1 from freely-turning-mode over to energy-generation-mode at the same time it is disengaging the sprockets or pulleys. Once in energy-generation-mode, the smart cable generators embedded in Bulkhead #1 can then be used to harvest the kinetic energy of the two smaller LMPs using their built-in or connected generators or flywheels (or both) and simultaneously take advantage of both Conservation of Energy and Conservation of Momentum (just as was done previously with the other embodiments of BM #2) and also turn it into thrust. And because approximately half of all the energy that is used to power the invention won't be lost in setting the two smaller LMPs in motion—as is lost in the previous embodiments of the invention that use an elastic member or members because of their property of Restoring Force and the need for an impact and a partially inelastic collision in order to perform either BM #1 or BM #2—approximately three times more (or somewhere between 65% and 70%) of all the energy used to operate the invention can be harvested and reused. Needless to say, that is quite an improvement over even the best results that can be achieved using the sixth embodiment of the invention.

In addition to the increased amount of kinetic energy that can be harvested and/or also converted into thrust by using the ninth embodiment of the invention over its predecessors, the ninth embodiment of the invention also has other major advantages. These advantage primarily have to do with where the smaller LMPs 36 and the smart cable generators—in whatever numbers are possible and/or may be desired—will be positioned or located. It also has to do with how, because the two larger side-wall actuators can do the same exact things in either direction, the ninth embodiment of the invention can easily be used to produce thrust in either direction by giving the cable generators embedded in Bulkhead #1 the capabilities of a spring-loaded cable reel and the cable generators in Bulkhead #1 the capabilities needed to harvest kinetic energy and generate electric power. Then there is the fact that the ninth embodiment of the invention can even be combined with another pair of smaller LMPs and their larger side-wall actuators that will be simultaneously operating along another axis, or, in some instances, even be combined with other embodiments of the invention (more on all of them later).

In a similar note: In the ninth embodiment of the invention just described—and also because the sealed containment vessels used by the various embodiments of the invention will be plenty long and wide—there will also be more than enough room next to a single, large, electric-powered, smart cable generator for any number of versions (or embodiments) of a square-shaped steel shaft and its accompanying contact gears and control mechanisms to be used along with or instead of a smart cable generator if so desired. That includes to lock and hold the smaller LMPs in place during Phase 1 or to produce thrust using BM #1 or BM #2 during Phase 2. The same goes for any other aspects of the previous embodiments of the invention that may be used in the ninth embodiment of the invention.

As with all the other previously described potential embodiments of components, parts, methods and/or systems used by the EdDrive Propellantless Propulsion System, any of the embodiments of components, parts, methods and/or systems that are described in the ninth embodiment of the invention, if possible, may be used in the other embodiments of the invention.

Tenth Embodiment of the Invention

The tenth embodiment of the invention is similar to the ninth embodiment of the invention in many ways. This includes its use of two, separate, large mass objects (objects 1a and 1b or the projectiles), that are likewise approximately half the mass of the single large mass projectile (or LMP) used in previous embodiments of the invention. But unlike the ninth embodiment of the invention, which completes the "action and reaction" procedures and maneuvers used during Phase 1 without causing any movement whatsoever by the host vehicle, the tenth embodiment of the invention returns to using a rubber or spring-using impactor and a steel reinforced bulkhead (Bulkhead #2 in this instance) behind it to complete Phase 1. The need for an impactor also means a partially inelastic collision and a rebounding mass are needed before a round of thrust can be completed by the tenth embodiment of the invention using the new or somewhat similar embodiments of either Breakthrough Method #1 (without harvesting and storing energy) or Breakthrough Method #2 (with the harvesting and storing of energy) that are used in the ninth embodiment of the invention.

Another difference between the tenth embodiment of the invention and the ninth, is in how the two longer and larger chain or belt-driven side-wall linear actuators have been replaced by an all new combination of mechanical devices that will also be located and run along the side wall of the sealed containment vessel. This new combination (or embodiment) of mechanical devices will make use of multiple elastic members (elastic straps and springs) in order to complete Phase 1 and also meet the objective of causing no net negative movement of the host vehicle in the process of making the rebounding masses of the two smaller LMPs available to be used to complete Phase 2.

Another difference between the tenth and ninth embodiments of the invention, is that there is now a thick elastic strap (the additional elastic strap) connected to the second side bracket that is attached to the mounting block/bracket on the far side of each of the smaller LMPs that extends all the way back to Bulkhead #2. The additional elastic strap is in addition (and borrowing from the first embodiment of the invention) to a thick elastic strap that is attached to the side of the two smaller LMPs and is also held in place at its center on the face of Bulkhead #2 by a single stationary metal bracket in a location similar to where a single smart winch would have previously been located in the first two embodiments of the invention. This single stationary metal bracket is very similar to the low-mass metal brackets that had previously been used in conjunction with the two side-wall linear actuators to hold the two looped ends of a thick elastic strap or a cold temperature strap—and which are still used to hold the looped ends of whatever elastic strap or straps (and potentially even springs) that are being utilized in the new set up.

Another difference between the ninth and tenth embodiments of the invention, is in how a second pair of large, electric-powered, smart cable generators will be added to assist in the generation of force in the first "action and reaction" combination during Phase 1. The first pair of smart cable reels used to generate force in Phase 1 will still be firmly embedded within the steel reinforced double-walls of Bulkhead #1. The second pair, however, will be located on the far side of Bulkhead #1, where they will be attached to the third bulkhead of the sealed containment vessel (or Bulkhead #3). From either location, each new cable generator will then ultimately connect to and become part of a new, larger, and more substantive, mechanical device that will primarily run along either side wall of the of the sealed containment vessel and extend all the way from Bulkhead #3 to the second wall of Bulkhead #2. As for how the kinetic energy of the two smaller LMPs will be harvested and/or converted into thrust after the impact with an impactor now located on the face of the first wall of Bulkhead #2, a third pair of large, electric-powered, smart cable generators will be embedded in Bulkhead #2 and be used to perform BM #1 or BM #2 and complete phase 2.

The addition of an additional elastic strap, which, in the preferred version (or embodiment) of the tenth embodiment of the invention, will connect to the side bracket on the far side of the sliding mounting block/bracket and extend and connect to Bulkhead #2 using another low-mass stationary bracket, will have two primary purposes. The first, will be to help the thick elastic strap, which is attached at either end to the side of the two smaller LMPs and also held in place at its center on the face of Bulkhead #2 by a single stationary metal bracket, pull and slide the released mounting blocks/brackets holding the two smaller LMPs back toward Bulkhead #2 much faster and with much more Elastic Force than just using the thick elastic strap alone. The second, will be to better balance out the equal and opposite amount of Elastic Force and Spring Force pulling and pushing the host vehicle and the two smaller LMPs toward each other at an accelerating pace during the second "action and reaction" procedure or maneuver during Phase 1.

Fortunately, the innovative new technologies and methods of the invention that are successfully implemented and exhibited in the different "action and reaction" combinations used during Phase 1 in many of the previous embodiments of the invention, are also able to be used to generate force without causing any unintended movement by the host vehicle in the tenth embodiment of the invention. The influence of these innovative new techniques and methods of the invention, in addition to how they are put to good use with the addition of the additional elastic straps, can also be seen clearly in many of the new mechanical devices (or embodiments) that are used by the tenth embodiment of the invention to help generate more force during Phase 1 and also contribute to the significant amount of thrust that is produced by the smart cable generators during Phase 2.

As in the ninth embodiment of the invention, the preferred method to perform the tenth embodiment of the invention will make extensive use of large, electric and electric motor-powered, smart cable generators. The first pair of these new winch-like devices will be firmly embedded between the two walls of Bulkhead #1 and also be placed as close as possible to the side wall on either side of the sealed containment vessel. The second pair of large, electric-powered, smart cable generators will be located in the area on the far side of Bulkhead #1, where they will each be combined with a new mechanical device that is very similar to the self-contained unit used in the second embodiment of the invention—which included the longitudinally movable piston rod, the two equal length and strength compression coil springs, and their low-mass tubular housing. But because the second pair of smart cable generators will also need to perform the responsibilities of a winch, they will be placed at the far end, away from Bulkhead #1, behind the new, low-mass, tubular containers housing a new, longer, piston rod and a pair of equal length and strength compression springs (a combination of an equal length and strength extension spring and an equal length and strength compression spring could also be used), and be attached to the third steel reinforced bulkhead (or Bulkhead #3) in the considerably longer sealed containment vessel the tenth embodiment of the invention is operating in.

Furthermore, the new, low-mass, tubular containers housing the new, longer piston rod and two equal length and strength compression springs, will be flipped around 180 degrees so the back end of the longer piston rod can be pulled back instead of being pulled toward the side of the invention where the two smaller LMPs (object 1a and 1b or the projectiles) are located. As a result, the longer piston rod will indeed need to be longer because it will also need to extend out the other end of the new longer piston rod housing so the longer piston rod—and its smart end and linkage—can be automatically connected to the bracket securely attached on the side of the mounting block (or the mounting block/bracket) holding the smaller LMP it will be responsible for helping to propel and also automatically disconnect from it when needed as well.

If a thick elastic strap made of vulcanized natural rubber or synthetic rubber is the primary elastic member (a cold temperature strap and springs could also be used) to help generate force in Phase 1, the first pair of cable generators embedded in Bulkhead #1 will start Phase 1 by reeling in the cable reel cables that pass through the first wall of Bulkhead #1 and are attached to the nearest side of the two smaller LMPs. Each smaller LMP is attached to the face of the mounting block/bracket that, with the help of a ball system to reduce friction, will easily slide along a track that is firmly attached to the two opposing side walls of the sealed containment vessel. After the two smaller LMPs—which will preferably have a steel outer shell and a tungsten inner core to reduce their size and/or increase their mass—are pulled back as close to Bulkhead #1 as possible with their cable generator cables reeled in and locked in place (internally or otherwise), the first pair of cable generators can then be prepared to be put into freely-turning-mode by the AI-enhanced control system while, at the same time, the third pair of large, electric-powered, smart cable generators embedded in Bulkhead #2 are being prepared to use their spring-loaded cable generators to rapidly reel in their cable generator cables without interfering with the progress of the two smaller LMPs once the LMPs are released, and then be converted into thrust producing devices that will perform similarly to the devices used in the ninth embodiment of the invention to perform Breakthrough Method #1 or Breakthrough Method #2 during Phase 2.

However, before all this (and much more) can be done by the AI-enhanced control system, something first needs to be done to counteract all the initial positive movement of the host vehicle that will be caused by multiple means when the two smaller LMPs are released.

The first major source of positive movement by the host vehicle will be caused by the two elastic straps (meaning one half of the thick elastic strap and also the additional elastic strap) on either side of the sealed containment vessel pulling with an equal and opposite amount of Elastic Force on Bulkhead #2 and simultaneously with the same amount of Elastic Force on the mounting block/bracket (by the additional elastic strap) and also the smaller LMP (by one end of the thick elastic strap) once the two smaller LMPs are released by whatever means are locking and/or holding them in place.

The second major source of positive movement by the host vehicle will be caused by the two equal length and strength compression springs within the two longer piston rod housings pushing with an equal and opposite amount of Spring Force on Bulkhead #3 and simultaneously pushing with the same amount of Spring Force on the mounting blocks/brackets holding the two smaller LMPs once the two smaller LMPs are released by whatever means are locking and/or holding them in place.

During a Regular Cycle of the tenth embodiment of the invention, the smart end of the two, longer, longitudinally movable piston rods passing through the two walls of Bulkhead #1 will be directly connected by their smart linkage to the mounting blocks/brackets the entire time they are still pushing and rapidly sliding the two mounting blocks/brackets holding the two smaller LMPs along the track on either side wall. Only when the two sets of equal length and strength compression springs reach their natural length and equilibrium position is the smart linkage disconnected by the AI-enhanced control system.

Because the two smaller LMPs will be securely attached to the mounting blocks/brackets and extend a bit farther in toward the center of the sealed containment vessel being used with either a Direction Control Unit or a Regular Unit of the invention, the two smaller LMPs will be able to be connected directly to the two, large, electric-powered, smart cable generators embedded in Bulkhead #1. By having the pair of smart cable generators that are attached to Bulkhead #3 pull back and compress the first equal length and strength compression spring within the two longer piston rod housings while, at the same time, they are also extending the second equal length and strength compression springs, the two cable generators embedded in Bulkhead #1 will also be able to be used to simultaneously pull back the two smaller LMPs toward Bulkhead #1. That means, the smart end of the two longer piston rods will be able to be connected to the mounting blocks/brackets by their smart linkage at the same time the two smaller LMPs are being locked and held in place near Bulkhead #1 by whatever means are used.

With the two smaller LMPs pulled back and locked and held in place near bulkhead #1, and the equal length and strength compression springs within the two longer piston rod housings also locked and held in place by whatever means are locking and holding the two smaller LMPs locked and held in place (more on this later), once the two LMPs are released by the AI-enhanced control system, there will be an equal and opposite amount of Elastic Force from the fully extended elastic straps pulling on Bulkhead #2 in the desired direction as the amount of Spring Force—provided by the two fully compressed first equal length and strength compression springs and the two fully extended second equal length and strength compression springs within the two longer piston rod housings—pushing and pulling the host vehicle in the same desired direction the entire time the elastic straps are rapidly contracting and the equal length and strength compression springs are rapidly returning to their natural length. As a result, when the Elastic Force provided by the additional elastic straps and the two halves of the thick elastic strap are combined with the Spring Force from the equal length and strength compression springs, the full force, or the total force of the additional elastic straps, the thick elastic strap, and the four compression springs, will become quite substantial. Together, as the elastic straps and the four compression springs are propelling the two smaller LMPs at an accelerating pace toward Bulkhead 2—and continuing to increase their kinetic energy the whole time— the exact instant that all the elastic members (straps and springs alike) reach their natural length and equilibrium position is when the smart linkage of the two longer piston rods will be disconnected. And with the two smaller LMPs at their top acceleration rate and velocity, the second "action and reaction" combination in Phase 1 will be able to be completed.

This will, of course, happen after the impact of the two smaller LMPs with a separate pair of rubber or spring-using impactors attached to the face of Bulkhead #2, which, as in the previous embodiments of the invention requiring an impact, will result in a partially inelastic collision between the host vehicle and the two smaller LMPs. Afterward, the kinetic energy of the two rebounding smaller LMPs will then be available to be used by the third pair of large cable generators embedded between the walls of Bulkhead #2 to perform either Breakthrough Method #1 or Breakthrough Method #2.

If BM #1 (without harvesting and storing energy) is chosen by the AI-enhanced control system to be used, after the spring-loaded cable generator cables of the two cable generators embedded in Bulkhead #2 are put into freely-turning-mode as the two smaller LMPs make contact with the two separate impactors, the cable generator cables of the cable generators embedded in Bulkhead #2 can then be abruptly locked and stopped by the AI-enhanced control system in the same one or two milliseconds (as was done previously with other embodiments of BM #1) after the two smaller LMPs break contact with the two impactors.

On the other hand, if BM #2 (with the harvesting and storing of energy) is chosen, once the two smaller LMPs (objects 1a and 1b or the large mass projectiles) have impacted with the impactors and completed the partially inelastic collision, the AI-enhanced control system can switch the large, spring-loaded, electric-powered, smart cable generators from freely-turning-mode over to energy-generation-mode at the beginning of Phase 2. Once in energy-generation-mode, the smart cable generators can then be used to harvest the kinetic energy of the two smaller LMPs and simultaneously take advantage of both Conservation of Energy and Conservation of Momentum (as was done previously with the other embodiments of BM #2) and also turn it into thrust.

By substituting a combination of springs and a cold temperature strap in place of the thick elastic strap during Phase 1, a more powerful and capable of operating in colder temperatures version of the tenth embodiment of the invention will also be able to be constructed. The biggest differences between the two versions (or embodiments), other than those previously described, will have to do with how much more additional space may need to be added in order to accommodate the additional springs and spring's housings and possibly where the large, potentially spring-loaded, electric-powered, smart cable generators—in whatever numbers are possible and/or may be desired—will be positioned or located.

In a similar note: In either version of the tenth embodiment of the invention just described—and also because the longer piston rods pass through Bulkhead #1 in the first version with more than enough room for the first pair of smart cable generators to be placed right beside them within Bulkhead #1—there will also be more than enough room for any number of versions (or embodiments) of the square-shaped steel shaft and their accompanying contact gears and control mechanisms to be used instead of the smart cable generators if so desired to lock and hold the smaller LMPs in place during Phase 1 or to produce thrust using BM #1 or BM #2 during Phase 2.

As with all the other previously described potential embodiments of components, parts, methods and/or systems used by the EdDrive Propellantless Propulsion System, any of the embodiments of components, parts, methods and/or systems that are described in the tenth embodiment of the invention, if possible, may also be used in other embodiments of the invention.

Eleventh Embodiment of the Invention

The eleventh embodiment of the invention has to do with using Artificial Intelligence and multiple AI-enhanced or AI-enabled control systems to simultaneously produce thrust using multiple and/or also different types of Units of the invention together in unison to propel long-distance spacecraft at truly incredible velocities—and also be able to attain these incredible velocities much faster.

One obvious thing that hasn't been covered yet, has to do with why can't any number of Units of the invention—primarily Regular Units or Specialty Units such as the Direction Control Unit—be used during the other eleven seconds, including prior to and after the less than one second it usually takes to complete BM #1 or BM #2 in a full or Regular Cycle of the invention (or whatever time period is possible depending on the size of the host vehicle and the number of Units deployed), in order to provide a constant—or closer to constant—flow of thrust? Certainly using multiple Units of the Direction Control Unit, or using one or more Regular Units of the invention in conjunction with a DCU with large mass spacecraft, or even using different Units together, have been covered or mentioned. But that's it. The reason why, along with saving the best for last, has to do with the fact that when a DCU or a Regular Unit of the invention isn't actively engaged in producing thrust during Phase 2, the large amount of mass that is possessed by its large mass object (object 1 or the projectile), and can but isn't being used to produce thrust, will just be more mass that has to be accelerated or decelerated in order to change the direction and/or velocity of the host vehicle. Basically, if an LMP or multiple LMPs (just like any other large mass object or objects) aren't in the process of being used to produce thrust, they are just more "dead weight" (or mass) that has to be moved.

But, fortunately, there is a way to overcome this problem. Once again, it entails the use of an AI-enhanced or AI-enabled control system, a wide variety and number of high-quality smart sensors, and enough charged supercapacitors and/or other electricity sources to simultaneously do a whole lot of things at the same exact time. In fact, as long as there is enough electric power available to first complete Phase 1, (which will mainly consist of powering all the winches or cable reels or other winch-like devices in all but the ninth embodiment of the invention) and then simultaneously perform Breakthrough Method #1 (without harvesting and storing energy) or Breakthrough Method #2 (with the harvesting and storing of energy) once the LMP or smaller LMPs are just a millisecond or two into Phase 2 with all the Units of the invention that are capable of being deployed by a spacecraft or other large mass host vehicle, all the Direction Control Units and Regular Units can be used at the same exact time as if they were one Unit of the invention that contained all of their masses.

Yes, that means a spacecraft or other host vehicle can be made to travel much faster than the more than 2.045 miles-per-hour increase or decrease in velocity that can be achieved during a twelve second Regular Cycle of the invention using a single DCU or Regular Unit if the ratios for mass are the same as exist in the 1 kilogram test prototype. For instance: if a spacecraft was designed to look similar to a rocket with four Regular Units of the invention encircling the back portion of the spacecraft like traditional rocket boosters, and if there was a single Direction Control Unit sticking out the back (or aft) of the main rocket body by itself with the same thrust potential as the four Regular Units, the spacecraft—if all five Units used BM #1 or BM #2 at the same exact time—could be expected to travel five times faster than if it was just using a single Direction Control Unit. Put another way, if a spacecraft could increase or decrease its velocity by more than 2.045 mph every twelve seconds by using a single DCU with the same ratios for mass as in the 1 kilogram test prototype (or the mass of the LMP being 50% of the mass of the entire spacecraft without including the mass of the LMP), the same spacecraft using the four Regular Units and the single DCU (which, as previously described, is needed for direction control purposes), could be expected to accelerate or decelerate by more than 10 mph every twelve seconds, or more than 50 mph every minute.

And it won't even be hard to do. All it would take is for a more capable (or even advanced) Artificial Intelligence-Enhanced or Enabled Control System to connect the AI-chip or board—which, in most instances, will be serving as the primary computing device used by the AI-enhanced control system—for each of the five individual Units of the EdDrive Electric-Powered Propellantless Propulsion System being deployed by the spacecraft in this example, and coordinate the operation of each Unit so that they would all release the angular piece and/or whatever else was being locked and held in place so they would simultaneously complete Phase 1 at the same time. If this, or something similar is done (including how newer and better computer technologies are inevitable and will be used as they become available), all five Units of the invention could perform either Breakthrough Method #1 or Breakthrough Method #2 within a millisecond or two of completing Phase 1 and produce thrust with all of them at the same exact time. And even if each individual Unit was set up or behaved a little differently, the Artificial Intelligence System (including those currently being developed that will be able to perform many more and/or also different tasks at the same time using a single AI), will eventually become familiar with all the idiosyncrasies of all the different Units deployed and get them to produce the most amount of thrust possible per cycle.

Naturally, if size or electric power limitations make it necessary to increase the amount of time in seconds needed to complete each full or Regular Cycle of the invention (for instance, increasing it from 12 to 15 seconds), the velocities that would still be able to be attained by using multiple Units (DCU or Regular Units) of the invention together in unison would still be incredible—and certainly way beyond anything now capable with propellant-using propulsion systems. As a result, even if the masses of all the LMPs (object 1 or the projectile) being used were reduced significantly (including by even more than half) because of the limitations of the devices and/or their parts or components, the potential increases in acceleration or deceleration by using multiple Units would still make extremely high-speed space travel by spacecraft of even huge masses (potentially hundreds of tons) possible.

As with all the other previously described potential embodiments of components, parts, methods and/or systems used by the EdDrive Propellantless Propulsion System, any of the embodiments of components, parts, methods and/or systems that are described in the eleventh embodiment of the invention, if possible, may also be used in other embodiments of the invention.

A propellantless propulsion system includes a first mass and a second mass with a greater mass than the first mass wherein the first mass is propelled in a first direction and the second mass is simultaneously propelled in the opposite direction of the first mass to make a partially inelastic collision of equal and opposite force between the first and second mass such that after the partially inelastic collision the first and second mass engage in an inelastic collision that results in the first and second mass moving together in a direction opposite to the first direction of the first mass to propel both the first and the second mass. The second mass is preferably a containment vessel having sidewalls coupled to forward, middle, and aft bulkheads. The first mass is propelled in the first direction within the containment vessel using a mechanical device. The mechanical device may be in the form of an elastic strap coupled between the first and second mass. An electric motor winch-like device is mounted to the containment vessel and adapted to pull the first mass towards the forward bulkhead without causing any movement by the containment vessel and to stretch the elastic strap such that upon releasing the electric motor, the elastic strap propels the first mass away from the forward bulkhead. The equal and opposite force of the elastic strap propels the second mass in the opposite direction of the first mass. Preferably, the second mass further includes an elastic impactor mounted on a forward surface of a middle bulkhead positioned between the forward and aft bulkheads to receive the impact of the partially inelastic collision with the first mass such that the first mass moves away from the middle bulkhead after the partially inelastic collision with the elastic impactor. The electric motor is preferably mounted to the forward bulkhead. The two ends of the elastic strap are held in place on opposite sides of the second mass with each end of the elastic strap mounted to the sidewall via a linear actuator having a carriage for connecting to an end of the elastic strap. The carriage is adapted to move linearly within the linear actuator along the sidewall to selectively alleviate the return of tension from the elastic strap after the partially inelastic collision, thereby creating thrust. The linear actuator may further include a regenerative braking system to harvest kinetic energy, thereby generating power as it stops the carriage after the partially inelastic collision.

In an alternative embodiment, the mechanical device may be in the form of at least one spring provided within a spring housing. The spring housing may be mounted to the forward bulkhead of the containment vessel such that the at least one spring is adapted to propel the first mass away from the forward bulkhead. An electric motor winch-like device is provided to move the first mass towards the forward bulkhead to be under spring tension. The propellantless propulsion system preferably further includes means for harvesting kinetic energy and generating power coupled to the first mass. The means for harvesting kinetic energy and generating power may include at least one of a guide shaft mounted to the first mass and having contact gears; a corresponding generator provided within the containment vessel and includes a mating contact gear in contact with the guide shaft for engaging the generator with the guide shaft; a guide shaft mounted to the first mass and having contact gears and a corresponding flywheel having a mating contact gear in contact with the guide shaft for engaging the flywheel with the guide shaft; and a guide shaft mounted to the first mass and having contact gears and a corresponding generator and flywheel combination having a mating contact gear in contact with the guide shaft for engaging the generator and flywheel combination with the guide shaft.

In a further embodiment, the propellantless propulsion system includes a containment vessel having a forward and aft bulkhead and sidewalls extending from the forward bulkhead to the aft bulkhead to form a closed vessel. A first mass and a second mass of equal mass are spaced apart and opposite from one another and have a combined mass less than the mass of the object the propulsion system is intended to propel. The first and second mass are preferably coupled via a carriage to a first and second linear actuator, respectively, such that the first and second mass are adapted to move simultaneously in a linear direction along the sidewalls. The system further includes at least one electric motor coupled to each linear actuator adapted to drive the carriage of the linear actuator and move the first and second mass coupled thereto. The system further includes a first and second cable generator connected to the aft and forward bulkheads, respectively, and a cable connecting the first cable generator to an aft surface of the first mass and a cable connecting the second cable generator to a forward surface of the first mass. A third and fourth cable generator are preferably connected to the aft and forward bulkheads, respectively, a cable connecting the third cable generator to an aft surface of the second mass and a cable connecting the fourth cable generator to an forward surface of the second mass. The at least one electric motor is coupled to each linear actuator to propel the first and second mass in motion towards the forward bulkhead and, before reaching the forward bulkhead, the first and third cable generators abruptly stop the movement of the first and second mass thereby imparting linear momentum to the containment vessel in the same direction as the movement of the first and second mass. Preferably, the first, second, third and fourth cable generators are adapted to move the first and second mass back to an initial start position without causing any movement to the containment vessel. The first and second mass may be propelled towards the aft bulkhead to move the containment vessel in the opposite direction by rotating the motors of the first and second actuators in reverse. In a preferred embodiment, the first linear actuator includes a motor rotating clockwise and the second linear actuator includes a motor rotating counterclockwise to cancel any rotational forces acting on the containment vessel. Furthermore, the first and second linear actuators may be mounted to opposing sidewalls of the containment vessel and the first and third cable generators may be mounted to the forward bulkhead and the second and fourth cable generators may be mounted to the aft bulkhead. The propellantless propulsion system also preferably includes a regenerative braking system provided in the first and third cable generators, thereby creating thrust and simultaneously generating power as they simultaneously stop the carriages coupled to the first and second mass before they reach the forward bulkhead. Preferably, the first, second, third and fourth cable generators are spring-loaded. The propellantless propulsion system may further include a third and fourth mass spaced apart and opposite each other on the top and bottom wall of the containment vessel and third and fourth linear actuators adapted to move the third and fourth mass, respectively, linearly along the top and bottom wall of the containment vessel in the direction of the forward bulkhead. The system may also include a fifth mass movable within the containment vessel, wherein the fifth mass is propelled in a direction away from the forward bulkhead to make a partially inelastic collision with the containment vessel such that after the partially inelastic collision the fifth mass and containment vessel engage in an inelastic collision that results in the fifth mass and containment vessel moving together in a direction toward the forward bulkhead to propel both the fifth mass and the containment vessel.

The propellantless propulsion system preferably further includes a directional control unit. The directional control unit comprises a housing having a length substantially larger than the width. The housing includes a shaft coupled to a support beam provided on either side of the housing and is connected to a 360 degree rotatable base. The rotatable base is adapted to be mounted to a host vehicle, such that the directional control unit housing can rotate 360 degrees around the shaft relative to the support beam. The directional control unit housing includes therein any embodiment of the propellantless propulsion system set forth in the specification. The propellantless propulsion system may include a plurality of containment vessels coupled together and synchronized to increase and/or decrease velocity of the system.

In further embodiment, the propellantless propulsion system includes a first mass and second mass, a third mass and fourth mass, a first actuator and a second actuator. The system further includes a fifth mass comprising a containment vessel for housing the first, second, third and fourth mass and the first and second actuator. The containment vessel and the first and second actuator preferably includes means for propelling the first and third mass toward the forward bulkhead to make an inelastic collision with the second and fourth mass, respectively, such that after the inelastic collision the first and second mass move together toward the forward bulkhead, the third and fourth mass simultaneously move together toward the forward bulkhead, and both pairs of combined masses engage the fifth mass and move together with the fifth mass in the direction of the forward bulkhead. The propelling means preferably comprises the first and third mass being spun and then launched at high speed by a motor within a first and second actuator. The first and second mass are returned by mechanical means to an initial start position, and the third and fourth mass are returned by mechanical means to an initial start position without causing any movement to the containment vessel.

BRIEF DESCRIPTION OF DRAWINGS

FIG. 31 also shows an overhead view of the ninth embodiment of the invention with the ability to produce thrust in either direction by adding the capabilities of a spring-loaded cable generator to the two pairs of cable generators in Bulkhead #1 and electric-power generating capabilities to the two pairs of cable generators in Bulkhead #2.

DETAILED DESCRIPTION OF THE INVENTION

Figure 1:
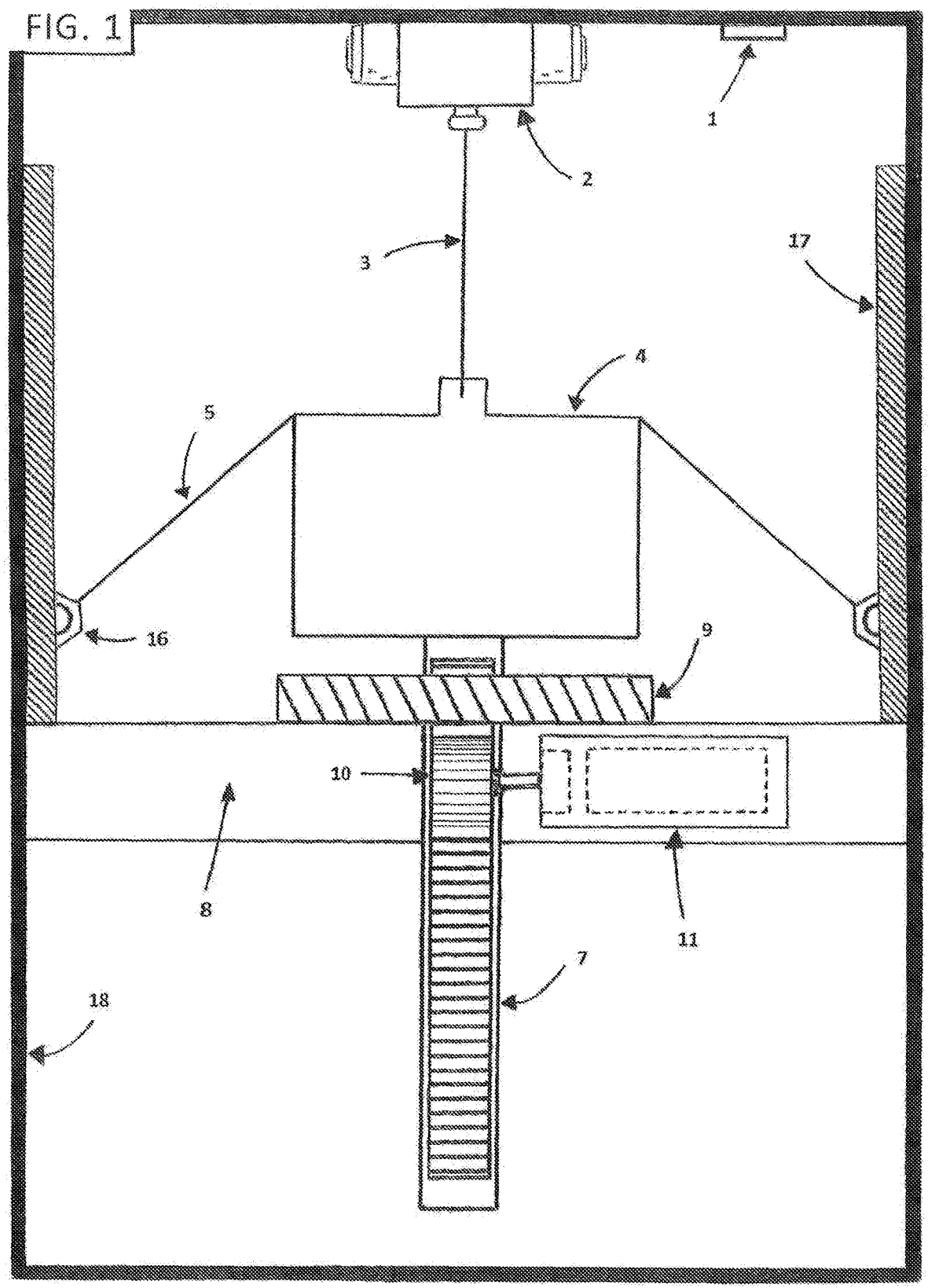
FIG. 1 is an overhead view of the first embodiment of the invention at the end of the previous cycle using Breakthrough Method #1 and one electric-powered smart winch.

None of the parts in the drawings are to scale or are in proportion to those that may be found in an operational unit of the invention. In some instances, certain features may be exaggerated in order to better illustrate and explain the present invention. All the parts shown are only intended to clearly convey the concepts and basic principles involved. Also, for clarity and simplicity's sake, some connections and structural components, as well as mechanical and electrical components and controls, are not shown. Furthermore, in the case of commonly known or generally understood parts that may be used in the successful operation of the invention, simple geometric shapes may be used at times to help depict them. The drawings are numbered consecutively beginning with 1 (example FIG. 1), as are the corresponding parts within the different views (examples: 1, 2, 3, 4, 5 . . . ).

As described previously, Phase 1 will relate in general to the time period that Force is generated by the invention. Phase 2 will relate in general to the time period that Thrust (or acceleration or deceleration) is produced by the invention. A Cycle is the time period that includes Phase 1 and Phase 2, and also the Recovery Time Period that typically follows Phase 1 and Phase 2 and continues up until the invention is ready to start back at the beginning of Phase 1 and do it all over again.

Host vehicle will be used to describe the object (object 2 or the larger mass object) the invention is being used to propel unless a more descriptive term is deemed more appropriate. A Unit of the invention includes all the different parts that may be used in order for the invention to complete a Full Cycle or Regular Cycle, or to perform an additional specialty task or tasks such as those the Propellantless Electric-Powered Direction Control Unit (or DCU) will perform. The use of the term Unit can also be used to describe any fully functional embodiment of the invention that can be used to successfully generate force during Phase 1 and/or to produce thrust during Phase 2.

The two different methods or primary embodiments of the "breakthrough technology" of the invention that make it possible for the invention to actually be used for propellantless propulsion purposes will be described as Breakthrough Method #1 (BM #1) and Breakthrough Method #2 (BM #2), whether they are used in a Regular Unit or in a Specialty Unit of the invention. BM #1 (without harvesting and storing energy) and BM #2 (with the harvesting and storing of energy) will also continue to be used to indicate that an embodiment being described is a new or further embodiment of either embodiment.

The use of the terms method or system are interchangeable where applicable. The use of the term Mass will occasionally be used when describing the combined sources of mass that are set in motion during Phase 1 or otherwise used by the invention to produce thrust during Phase 2. The use of (object 1 or the projectile) and (object 2 or the larger mass object) will continue to be used to indicate that an embodiment being described is covered and abides by the basic concepts that are at the heart of the EdDrive Propellantless Propulsion System, as well as indicate that the embodiment may be essential for the successful use of the invention and its various units and systems, as well as their different embodiments.

An embodiment of an invention is a particular instance of the invention, an example of one of the various ways in which the invention may be realized or implemented. Embodiments are also used in the specifications and claims to maximize the scope of protection claimed in the patent.

First Embodiment of the Invention

Since a Regular Unit of the first embodiment of the invention will normally operate in roughly twelve second Regular Cycles if there is an adequate supply of electric power and size constraints don't necessitate a longer time period, revisiting and starting where the first embodiment of the invention left off at the completion of the previous full Cycle needs to be examined first (see FIG. 1).

As the overhead view in FIG. 1 shows, the invention's main source of mass—shown in the first embodiment of the invention as a large solid block of steel 4 (object 1 or the projectile)—completed the previous full Cycle just a short distance away from the first wall of the double-walled, steel reinforced bulkhead 8 (or Bulkhead #1) near the center of the sealed containment vessel the first embodiment of the invention is operating in.

Because the invention will have the ability to use either one of the two primary breakthrough methods at its disposal to effectively produce the same amount of thrust, the actual distance between the large steel block 4 and the steel reinforced bulkhead 8 at the completion of a Cycle will depend primarily on what the energy needs of the invention and the host vehicle (object 2 or the larger mass object) are at the time. If there is an adequate supply of electric power available for the invention to meet its needs and all the energy storage devises are near or fully charged, the invention can use Breakthrough Method #1 (without harvesting and storing energy) and complete a Cycle with the large steel block 4 traveling a very short distance away from Bulkhead #1 as depicted in FIG. 1.

Figure 2:
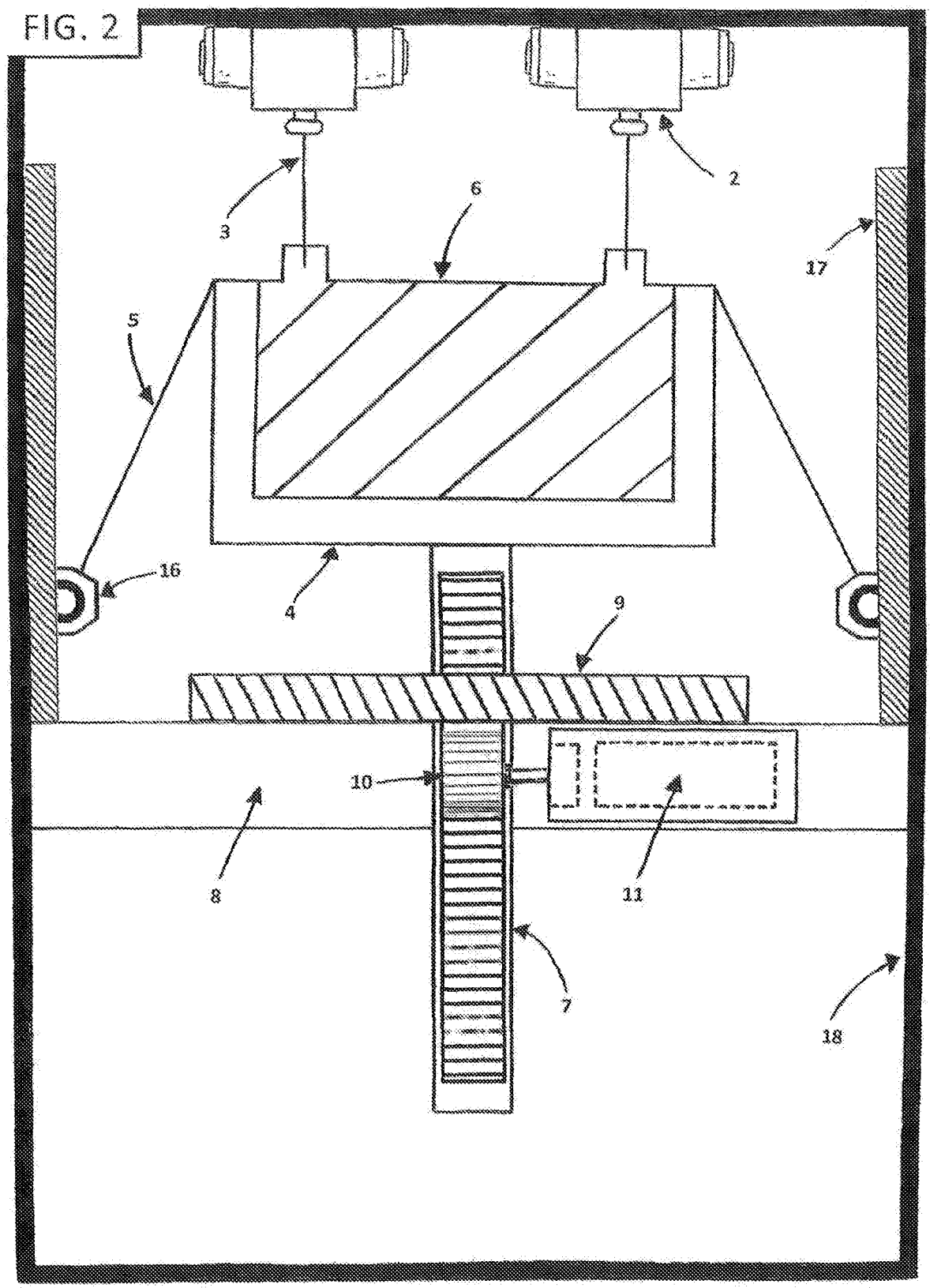
FIG. 2 is an overhead view of the first embodiment of the invention at the end of the previous cycle using Breakthrough Method #2, with two electric-powered smart winches and a large metal connector also added.

On the other hand, if more electric power is needed to accelerate or decelerate the host vehicle faster—or can be put to good use in other ways—Breakthrough Method #2 (with the harvesting and storing of energy) would be the better choice and the final distance between the large steel block 4 and the first wall of the double-walled, steel reinforced bulkhead 8 will be greater afterward (see FIG. 2). But enough on the final differences between BM #1 and BM #2 for now. (The differences between the two breakthrough technologies of the invention will be described in much greater detail later when it is more appropriate to do so.)

What does warrant a closer look now at the very beginning of Phase 1 and a new Cycle, is how the first embodiment of the invention can not only use one electric-powered smart winch 2 (see FIG. 1), but can also use two electric-powered smart winches 2 (see FIG. 2). The use of two smart winches 2 will usually occur in instances when the Mass of the large mass projectile (or LMP—which will largely be comprised of the mass from the large steel block 4), exceeds the recommended advisable limits of using only one winch 2, and thus requires the use of two (or more) winches 2 instead.

In either embodiment of winch 2 use (which will henceforth be described as winch 2 whether one or more smart winches—or winch-like devices—are used), any number of suitable embodiments of the preferred device (or winch 2—which are plainly depicted and further described below), now exist for public or industry consumption and can also be used as the basis for a modified or custom-made version of the final "winch-like device" that will or could be used by the invention to fill the responsibilities of the electric-powered smart winch 2.

Toward that end, regardless of how many winch-like devices are used, the winch 2 will need to possess some basic capabilities. Most notable among them: the device must be smart, must be bi-directional (forward and reverse), must be able to change speeds, must have soft-start or better capabilities, must have a high amount of torque, must be able to have a constant amount of torque through speed changes, must have multiple gears, must have multiple braking systems, must have temperature determining means, must know how much cable is out at all times, must be able to be accessed and controlled remotely, must be rated and have at least two times the expected line pulling capabilities needed, must have a low-energy mode, must have a movable guide that will make sure the cable is reeled in and lays properly in just a single layer on the drum (or primary drum if longer cable lengths are needed), must be able to be operated manually, and must be powered by high-quality, very efficient, brushless DC or AC induction or synchronous electric motors that have at least one automatic backup motor for each motor used.

Brushless DC (BLDC) motors are considered more energy efficient than AC induction motors and considerably more energy efficient than brushed DC motors (in some instances by as much as 20%). This means for the same amount of input power, a BLDC motor will convert more electrical energy into mechanical energy than either of the other two. A BLDC motor, for the same mechanical output, will also usually be smaller than a brushed DC motor, and always be smaller than an AC induction motor. The BLDC motor is smaller because its body has less heat to dissipate. From that standpoint, BLDC motors will produce less waste heat and be more energy efficient.

Brushed motors are not only larger than their brushless counterparts, they also have a shorter service life. The brushes in the brushed motor are usually made of carbon or graphite compounds which wear during use. These brushes will require maintenance and replacement over time. As the brushes wear they not only create dust, which will pose a greater problem in a microgravity environment, but also create noise caused by rubbing against the commutator. Brushless motors have longer service lives and are cleaner and quieter because they do not have parts that rub or wear during use.

AC induction motors use a series of coils powered by AC input voltage. Consequently, and also because the power provided by the supercapacitors and electric generators and/or flywheels, as well as solar panels and just about anything else being used to generate or store energy, will be a DC power source, AC motors (which only run on AC) are less efficient than BLDC motors. And while inverters are pretty good when it comes to energy efficiency (usually around 97% efficient), and all rotary electric motors require a controller to apply AC to the motor in some manner in order for them to work, the BLDC motor is also more efficient due to the secondary magnetic field being generated from the permanent magnets rather than by copper windings.

One advantage AC induction and brushed DC motors do have over BLDC motors, has to do with cost. The high power permanent magnets used with BLDC motors are very expensive. However, since these motors will be used in space to power devices needed for propulsion purposes, a little extra cost for high-quality magnets will certainly be worth the additional cost.

Systems using BLDC motors also provide constant torque over a wide range of speeds, while AC motors often lose torque as speed increases. These speed ranges include using speed control capabilities that range from as low as 3 rpm to as high as 4,000 rpm. In high power applications, AC induction motors may also require oil cooling or other types of cooling. Also, both BLDC motors and AC induction motors can be used as part of Regenerative Braking Systems.

In some cases, the best features of different motors are being combined. A good example of this can be seen in current hybrid and fully electric vehicles (EVs). Today more than 100 different electric motors can be found in modern vehicles. The most common types of electric motors available on the market are: multi-phase AC induction motors, permanent magnet (PM) synchronous motors, switched reluctance (SR) motors, and brushless direct current (BLDC) motors. Of these, the most efficient electric motors are those equipped with rare-earth permanent magnets, such as samarium-cobalt and neodymium-iron-boron magnets. Of the two, samarium-cobalt magnets can withstand higher temperatures (up to 500 degrees Celsius), but neodymium-iron-boron magnets offer the maximum amount of efficiency. Because of this, and also to show how many of the best features of different motors are now being combined, Toyota uses synchronous, AC, permanent magnet, brushless motors in its most energy efficient vehicles.

Another potential way to increase the efficiency of an electric motor will be to use a variable frequency drive (VFD) or a variable speed drive (VSD). The most obvious reason to incorporate a VFD or VSD into a system powered by an electric motor is speed control. This is usually done for process, operation, and economic benefits. One economic benefit comes from the reduction of maintenance costs. A larger benefit comes from the fact that the electric power the motor consumes is directly proportional to the cube of the velocity of the mechanical device being rotated by the motor. This means if the system can be run at 80% of full speed, it theoretically uses 51% of full load power.

VFDs (which are usually used will AC motors) and VSDs (which are usually used with DC motors) also reduce energy consumption by optimizing motor starting characteristics. VFDs and VSDs bring motors up to full speed quickly and do so drawing only 100% to 150% of full load amps (FLAs). This ability to start at normal FLA is very important if the power supply cannot withstand the normally six times FLA across-the-line starting draw, or even the 350% FLA soft-start device current.

Another potential way to increase the efficiency of an electric motor will be to make the motor's rotor out of a low-mass, stronger than steel, metal alloy. By doing so, the efficiency of the electric motor can be raised quite a bit just by doing this one simple thing.

Low-energy mode can also be used to conserve energy when the motor is not in operation.

Increasing the efficiency of the entire winch 2 (or winch-like device) can be accomplished by multiple means as well. By only having one layer of cable on the drum, the strength of the winch 2 will remain constant. For embodiments of the invention where greater cable lengths are needed, a second, larger drum can be added to reel in and store the cable that cannot be accommodated on the first drum and also eliminate the crushing pressure caused by overlapping the cable on a single drum. Obviously, using embodiments of the invention where shorter cable lengths are required would be preferable.

Another way to increase the efficiency of the entire winch 2 will be to make sure it is more than strong enough to pull what it needs to pull. By giving the winch a pulling capacity that is at least twice what is required, strain will be reduced on the winch 2 and the motor will draw less power.

Another way to increase the efficiency of the entire winch 2 will be to use artificial intelligence and/or machine learning capabilities. Systems using AI and/or ML in order to optimize energy efficiency are known to be able to increase the total efficiency of a system by as much as 15%.

For very large and very reliable winches made today, different types of gearboxes are often combined to provide the ideal transmission solution. One such solution that has been used successfully many times is the combination of a large diameter slew ring with an integral gear ring that is driven by multiple planetary gearboxes. In this manner very high torque values can be reached, but also the forces are more evenly distributed, and depending on gearbox/drive dimensioning, a very high grade of redundancy is available. The combination of large diameter bearings with an externally placed drive component also makes the inside of the drum available and accessible to be used for large slip ring or swivel coupling installations, which makes this an ideal choice for cable reels.

Phase 1 is commenced when the electric-powered, artificial intelligence-enhanced, control system 1 turns on or activates from low-energy mode the electric-powered smart winch 2. Because of recent advancements in artificial intelligence and all new AI-chips and boards, one, low-cost (easily costing less than $10,000 U.S. dollars), very energy efficient (usually less than 100 watts per hour or less), AI-chip or board with built-in redundancy and state-of-the-art cybersecurity capabilities (or any comparable AI-chip or board on the market now—and certainly the vastly better ones still to come in the future), will be more than sufficient to control every computer operated component or individual part of any Unit of the invention. To convey how easy it will be to operate an individual Unit of the invention: a typical hand-held smart device with a touch screen and the ability to relay voice commands will be capable of providing any or all pertinent information or instructions to the AI-chip or board controlling an individual Unit of the invention or any other Units or embodiments of the invention that may be part of the EdDrive Electric-Powered Propellantless Propulsion System.

New laser-based communication systems will soon make it possible to connect to Earth-based data centers much faster than currently used technologies. And the laser-based communication systems still to come will certainly be much faster than the Deep Space Network (DSN) communication system currently being used with spacecraft such as those NASA is still communicating with (including Voyager 1 and Voyager 2) even though they have left the solar system. Moreover, all new propellantless propelled spacecraft will be able to deploy many more communication buoys for the laser-based communication system so it can eventually be utilized throughout the solar system. But for our intents and purposes, the Regular Unit of the first embodiment of the invention currently being described will be able to be autonomous or controlled by operators on Earth using current radio wave communication technology. That means the invention will be able to be controlled by the same radio wave technology that astronauts now use to talk to each other on space walks or that the small, free-flying, drone robots (including those using artificial intelligence technologies) now being regularly tested on the International Space Station use to be fully autonomous or controlled by operators on Earth. And, of course, the invention will also be able to use improved radio wave communication technologies, or any other new or improved communication technology, as they become available.

The same will also hold true for existing and future navigation technology or technologies that may be used by the EdDrive Propellantless Propulsion System and its host vehicle.

Figure 3:
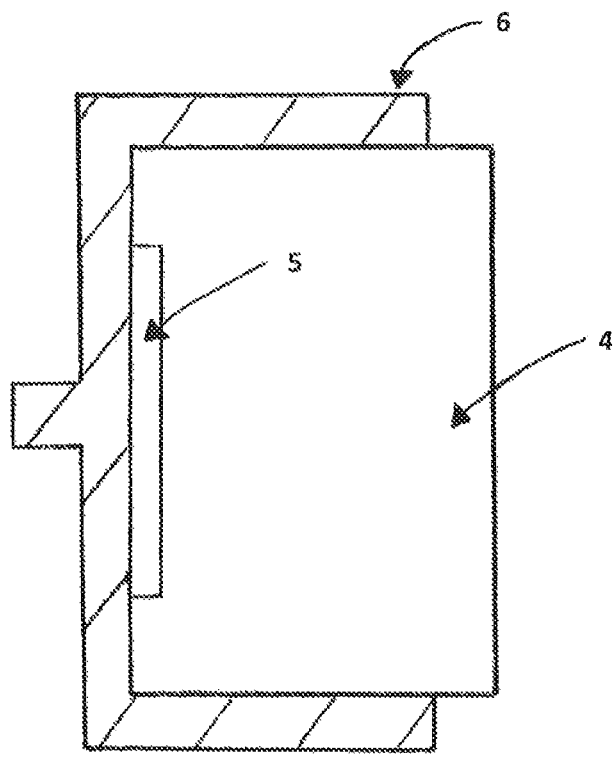
FIG. 3 shows a side view of the groove in the large steel block for the thick elastic strap and a large metal connector to hold the thick elastic strap in place.

Once activated by the control system 1, the winch 2 begins the Regular Unit of the invention's Cycle by using the low-mass, stronger than steel, wound metal alloy cable 3 and the lockable hook or other clevis at the end of it, to begin rapidly pulling the large steel block 4 back toward the winch 2, which is securely attached to the face of Bulkhead #2. In most instances, the invention will also be using a large metal connector 6 (see FIG. 2) to pull the large steel block 4 back the remaining distance sought toward the winch 2 and Bulkhead #2 behind it. In addition to providing another source of mass for the invention, the metal connector 6—preferably made of steel—will also be used to hold the thick elastic strap 5 in place behind the block 4 in the groove cut out specifically for the thick elastic strap 5 in the back side of the block 4 as shown in FIG. 3.

The connector 6 is bolted into the block 4 using several bolts on top and on the bottom that intentionally avoid going anywhere near—and certainly without hitting—the strap 5 because it would adversely affect the thick elastic strap's 5 structural integrity if it was punctured in any way. By not being directly connected to the block 4, the strap 5 is also free to be stretched and move freely in its groove.

As the block 4, the strap 5, and the connector 6 are all being pulled back together in unison by the winch 2 using the low-mass, wound metal alloy cable 3 (which is the preferred embodiment even though synthetic rope, chain, or other similar devices having high tensile strength could also be used), the square-shaped steel shaft 7, which is connected to and protruding out the front side of the main body of the block 4, likewise is pulled back in the direction of the winch 2 through the square-shaped cutout for it in the steel reinforced bulkhead 8 and the thick rubber impactor 9 attached to the outward facing surface of the first wall of Bulkhead #1.

Figure 4:
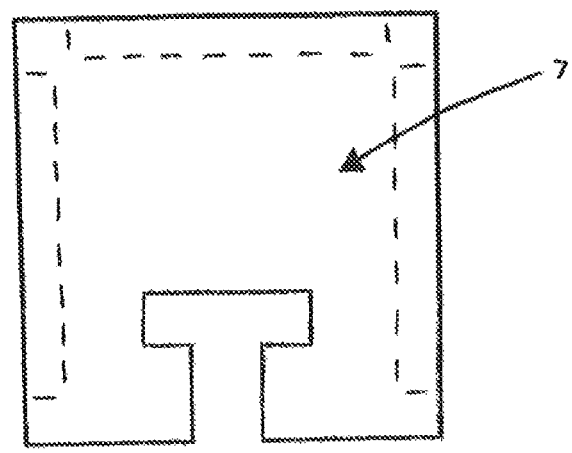
FIG. 4 shows an end view of the square-shaped steel shaft with an outline of where the wide grooves for gears are cut into it on the two sides and on top. The end view also shows the T-shaped groove for the angular piece of steel to slide back-and-forth in on the bottom of the square-shaped steel shaft so it can be used in the velocity control system.

The continued and evidently guided and controlled rapid movement of the shaft 7 through the bulkhead 8 and impactor 9 is made possible in large part due to how the shaft 7 is designed and constructed. As shown in FIG. 4, the square-shaped steel shaft 7 has three wide grooves for gears cut into it. On each of the two sides is where a guide or contact gear 10 will be located. On top of the shaft 7 is where the third guide or contact gear 10 will be located. (The T-shaped groove cut into the bottom of the shaft 7 will be described in detail later when the Electric-Powered Propellantless Velocity Control Systems are detailed.)

The three wide grooves for the guide or contact gears 10 (henceforth called contact gear 10 or contact gears 10) on either side (side contact gear) and on top (top contact gear) of the shaft 7 are made specifically for the three contact gears 10 to easily and freely traverse back-and-forth in. The way the grooves are designed will also assist in holding the three contact gears 10, as well as the shaft 7, all relatively stable and secure in the proper place. Being able to hold the shaft 7 in the proper place and have it traverse back-and-forth in a straight line will be extremely important due to the abiding microgravity conditions in space and why all three contact gears 10 will remain in constant contact with the shaft 7.

Just as important as holding the mostly free-floating block 4 and the other main sources of Mass of the LMP in the proper place during the entirety of the invention's full Cycle, will be the ability to permit the shaft 7 to traverse back-and-forth as freely as possible through the bulkhead 8 while continuing to remain in constant contact with the three contact gears 10. Fortunately, in addition to the control mechanism 11 for each of the three contact gears 10 having the necessary ability to permit their corresponding contact gear 10 to turn freely in either direction by being put into freely-turning-mode at the behest of the control system 1 whenever desired, the control mechanism 11 will also be firmly embedded within the bulkhead 8 and, as a result, provide structural support for its current and future responsibilities.

Figure 5:
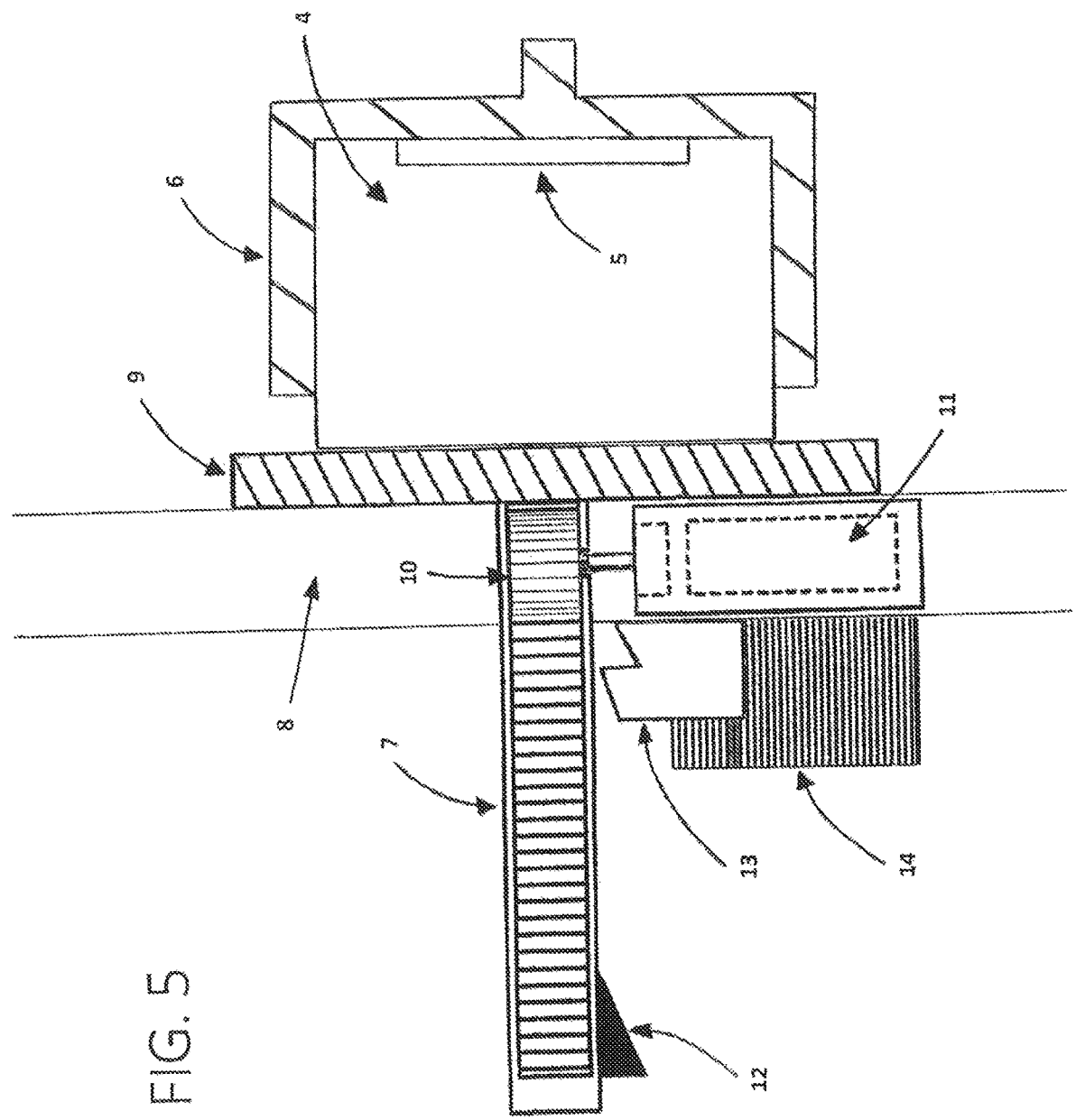
FIG. 5 shows a side view of the contact gear on either side of the square-shaped steel shaft with its control mechanism underneath it that is firmly embedded within the double-walled steel reinforced bulkhead (Bulkhead #1).

FIG. 5 shows a side view of one of the two side contact gears 10 and its control mechanism 11 firmly embedded between the two walls of the steel reinforced bulkhead 8 (or Bulkhead #1). An overhead view of a single top contact gear 10 and its control mechanism firmly embedded in Bulkhead #1 can be seen in FIG. 1 and FIG. 2.

The strap 5 keeps on stretching and the tension on it continues to increase as the winch 2 continues to rapidly pull the connector 6 back towards it and Bulkhead #2. Similarly, at the other end of the LMP, the shaft 7 continues to be rapidly pulled backwards through Bulkhead #1 and the impactor 9. This continues at a rapid pace until the angular piece of steel 12—which is pointing downward and located underneath, near the end of the shaft 7—finally reaches the spring-loaded piston 13 (see FIG. 6) that is connected to the top of the vertical linear actuator 14, with both the spring-loaded piston 13 and the vertical linear actuator 14, each attached by different means (not shown) to the second wall on the far side of Bulkhead #1.

Figure 7:
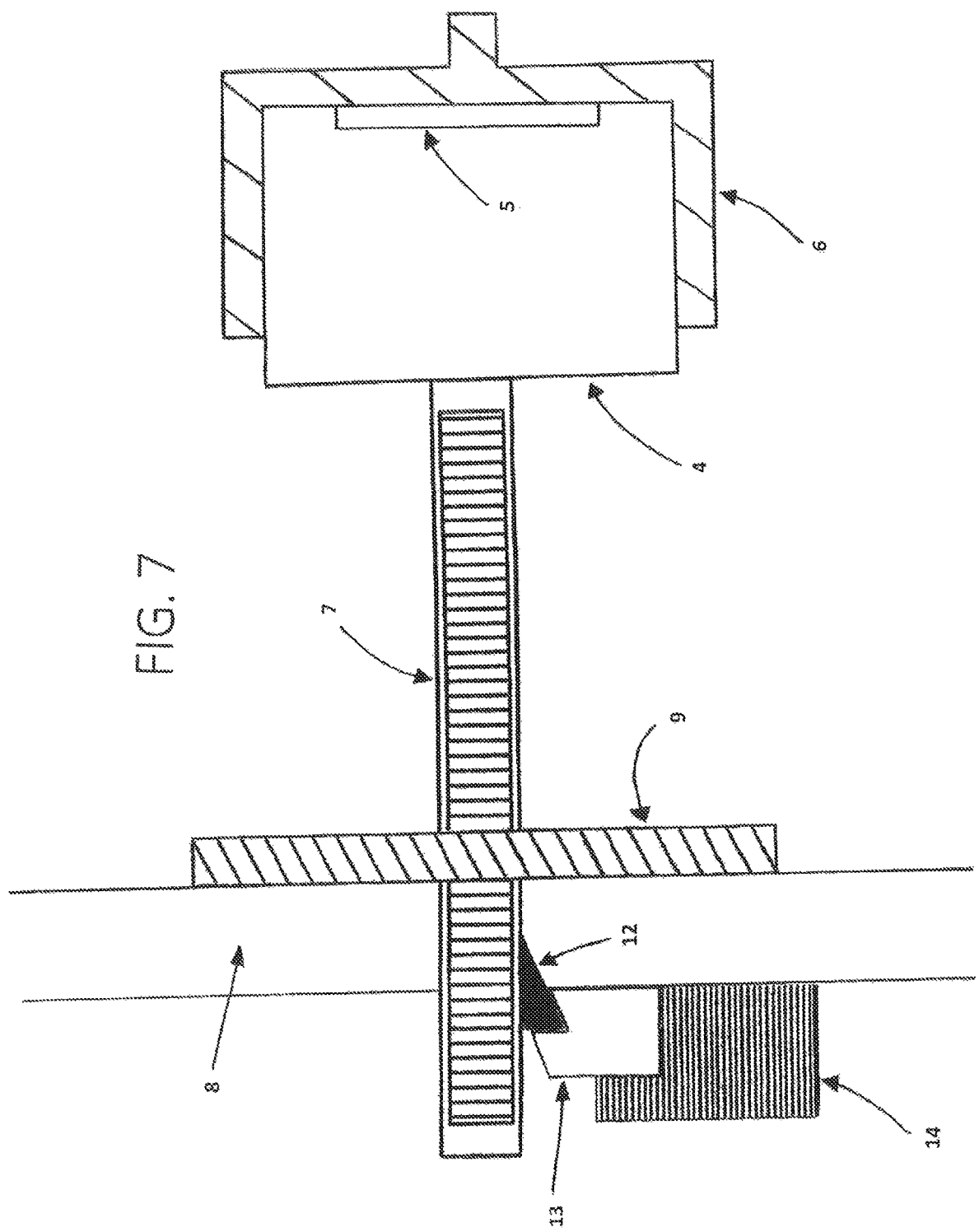
FIG. 7 shows immediately after the spring-loaded piston has locked the angular piece of steel in place along with the square-shaped steel shaft and everything else connected to it.

The angular piece of steel 12, now moving along with the shaft 7 at a significantly reduced and still slowing speed, pushes down on the spring-loaded piston 13 as it slides along the similarly angled top of the piston shaft 13 until the end of the angular piece 12 is reached and the top of the piston 13 locks and holds the shaft 7 in place (see FIG. 7).

Figure 8:
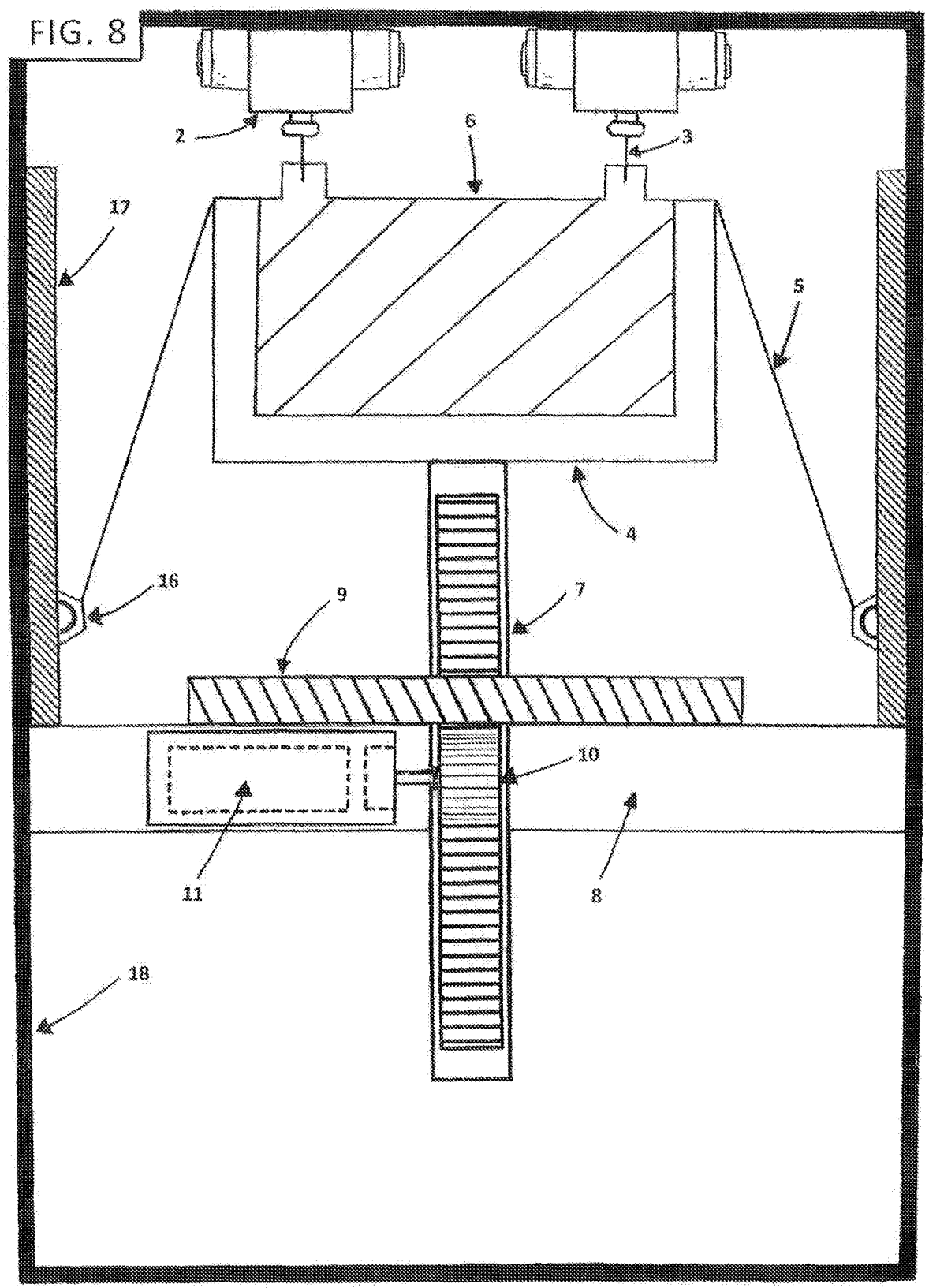
FIG. 8 is an overhead view of the first embodiment of the invention at the end of the first "action and reaction" combination when the angular piece is locked in place by the spring-loaded piston and the two winches have been put into low-energy mode.

At this point, with the angular piece 12 and the shaft 7 safely locked and held in place by the top of the piston 13, the electric-powered smart winch 2 immediately shuts down and stops pulling the connector 6 back toward it (see FIG. 8). But the winch 2 isn't put into low-energy mode yet by the control system 1 and its wide variety of smart sensors to conserve energy. Instead, the winch 2 is immediately thrown into reverse and keeps on running in reverse until the cable 3 has enough slack in it so as not to interfere with what will subsequently happen during the remainder of Phase 1 and also during Phase 2.

In the same exact instant that the winch 2 was being shut down and being prepared to be thrown into reverse, the control system 1 was simultaneously instructing the three control mechanisms 11 and their corresponding supercapacitors to instantly put all three contact gears 10 into lock-mode. Whether to just assist in holding in place the shaft 7—which just milliseconds earlier had been locked in place by angular piece 12 and the piston 13—or to provide many more options for the Electric-Powered Propellantless Velocity Control System (which will also be described in more detail later), or to just take some pressure off the piston 13 and the vertical actuator 14 so it will be a little easier for them to do what they will be instructed to do next, having lock-mode available from the three contact gears 10 to do much more than what they will be required of them in both BM #1 (without harvesting and storing energy) and BM #2 (with the harvesting and storing of energy) is something that will certainly be utilized by the invention whenever needed or when it is deemed appropriate to do so.

So now, with plenty of slack in the low-mass cable 3 and the winch 2 put into low-energy mode—as well as the shaft 7 and all the Mass immediately connected to it locked and held securely in place by multiple means—the invention also happens to have just completed the first "action and reaction" procedure or maneuver of Phase 1 (or the preferred embodiment of it in the first embodiment of the invention)—which now also merits a closer look into how and why the "action and reaction" combination that was used perfectly cancels each other out without causing any movement whatsoever by the host vehicle as ideally sought?

According to Newton's Third Law of Motion: For every action, there is an equal and opposite reaction; Likewise, forces always act in pairs and also always act in opposite direction; And finally, Action Force is force acting in one direction . . . Reaction Force is force acting in the opposite direction.

In the first "action and reaction" combination in the first embodiment of the invention, the Action Force is provided by the winch 2—which is securely attached to Bulkhead #2—and the equal and opposite Reaction Force is provided by both ends of the strap 5, which are pulling the host vehicle in the opposite direction with the same amount of Pulling Force the entire time the winch 2 is being used to pull the connector 6 and everything directly connected to the block 4 backwards. Consequently, the equal and opposite Action and Reaction Forces used in the first "action and reaction" combination during Phase 1 perfectly cancel each other out, and do so without causing any movement whatsoever in either direction by the host vehicle as ideally sought.

The latter point is important for three extremely crucial and also practical reasons. First, if there is no movement caused whatsoever, the host vehicle will continue to travel at its current velocity without being affected in any way. Second, the fact that the host vehicle is not affected in any way also means that, with the shaft 7 and all the Mass directly connected to it locked and held in place by multiple means, it is also possible for the winch 2 to be eliminated from the ongoing force generation process in Phase 1 without any repercussions whatsoever and, along with it, the remaining Tension Force that is directed along the length of cable 3, which pulls equally on the objects at either end of the cable 3 with equal force from its center, can be eliminated as well. Third, with the Action Force provided by the winch 2 and cable 3 eliminated without repercussions, the remaining Reaction Force provided by the fully extended strap 5 that is being held in place by the large mass object (object 1 or the projectile) by multiple means, now becomes its very own isolated or individual force generating embodiment. This new equal and opposite "action an reaction" combination (the second preferred embodiment for force generation in Phase 1 in the first embodiment of the invention) will then be able to be used to propel the LMP forward toward Bulkhead #1 at an accelerating velocity until just before the block 4 smashes into the impactor 9 and, all the more surprisingly, do it without producing any net negative movement by the host vehicle.

Taking a closer look at what occurs during the second "action and reaction" combination (or embodiment) for force generation in Phase 1: the force needed to pull or propel the Mass provided by the LMP (primarily consisting of the block 4, the connector 6, and the shaft 7) toward the impactor 9 and the bulkhead 8 behind it at an accelerating velocity, equals the force—also provided by the still rapidly contracting strap 5, which is pulling from its center in either direction with an equal amount of Pulling Force—pulling the heavier host vehicle toward the lighter Mass of the LMP. With the Pulling Force provided by the strap 5 unquestionably being equal in either direction as long as the strap 5 doesn't reach its natural length or equilibrium position, the two equal and opposite Action and Reaction Forces perfectly cancel each other out. But, unfortunately (although the initial movement of the host vehicle is positive movement in the desired direction) the net cancellation of the initial positive movement by the host vehicle only occurs after the heavier host vehicle has first been pulled a short distance in the direction of the rapidly approaching block 4 before the impact pushes it back in the opposite direction and they effectively cancel each other out.

And while it might seem a little counterintuitive that after the control system 1 instructs everything locking and holding the shaft 7 firmly in place to instantly release it so the block 4, as well as all the other Mass of the LMP subsequently set loose, can be propelled by the strap 5 at a rapid and still increasing velocity and then smash into the impactor 9 and the bulkhead 8 behind it (see FIG. 9), that after all this, the impact actually results in no net negative movement by the host vehicle before BM #1 or BM #2 can be put into effect. But that's exactly what happens. And it's exactly what all the science behind Newton's Third Law of Motion and the Restoring Force of an elastic member explicitly dictates should happen. And it's also exactly what over 100 tests conducted with the previously described prototype that was built in the summer of 2018 with components very similar to the invention—and also done specifically to test this scenario—showed time and time again.

Then, of course, if all it took to propel the host vehicle in the same direction of the initial impact was to use the deliberately compact and efficient setup so far described, then all the invention would need to do to produce the thrust needed to propel the host vehicle would be to use either BM #1 or BM #2 as the block 4 was closing in on the impactor 9 instead of waiting until afterward during the rebound. But, unfortunately, this isn't the case. And there is no doubt that it would have been much easier and efficient to produce thrust the first time the test shaft passed through the test version of Bulkhead #1—not to mention eliminate the subsequent need for the two side-wall linear actuators 17—but, once again, this isn't the case.

However, there is some good news. And the good news is that, although the Restoring Force of the strap 5 can't be used to produce thrust during the impact, the Restoring Force of the strap 5 can be used to produce a partially inelastic collision between the host vehicle and the LMP. In fact, the Restoring Force of the strap 5 that is constantly pulling in either direction with equal force from its center until it reaches its natural length, is what makes the partially inelastic collision—which is defined as a collision in which some of the kinetic energy is converted into other types of energy, such as heat and sound or lost through deformation, while almost all of the kinetic energy still remains after the collision and momentum is conserved—possible in the first place. And because the Restoring Force of the strap 5 is constantly pulling in either direction with an equal amount of Elastic Force the entire time after the LMP is released by whatever means are locking and holding it in place up until just before the impact, the same exact amount of momentum (p=my) is possessed by the host vehicle (which also happens to be being pulled and moving in the desired direction of the thrust that is ultimately produced during Phase 2) as that possessed by the large mass projectile (or LMP) when they collide. And because the host vehicle and the LMP will possess the same exact amount of force and momentum when they collide, the resulting partially inelastic collision will make it possible for the host vehicle and the LMP to effectively bounce off each other, like what happens when two quarters are slid across the surface of a table at the same velocity and collide head-on. As a result, not only is the initial positive movement of the host vehicle canceled out by the negative movement of the host vehicle by the time the partially inelastic collision is completed due to Newton's Third Law of Motion, but the resulting rebounding mass of the LMP is then available to be used to ultimately produce a significant amount of net positive movement (or thrust) during Phase 2 using either BM #1 or BM #2.

Restoring Force will also be put to good use by the thick rubber impactor 9 to accomplish its primary responsibility of dramatically reducing the potential negative effects of the host vehicle and the large mass projectile repeatedly colliding with each other. A car's bumper works by using this principle to prevent damage. In the case of the impactor 9, and because the host vehicle, which has a greater mass and thus a slower velocity, and the LMP, which has less mass and thus a faster velocity, will be colliding with each other with an equal and opposite amount of force (f=ma). But more importantly, because the host vehicle and LMP will likewise possess an equal amount of momentum (p=my) when the impact occurs, the vast majority of the kinetic energy possessed by the host vehicle and the LMP before the impact will be transferred to elastic energy in the impactor 9. And because the impactor 9 will be constructed in such a way that it can easily absorb the impact of both objects with a minimal amount of damage being done to either, the Restoring Force of the impactor 9 (or an impactor made of other elastic materials) will propel each object in the opposite direction with an equal amount of Elastic Force, which actually means the Restoring Force of the impactor 9, and not the impact, is what causes the two objects to bounce (or spring-board) off each other so well.

And just one more thing that is very pertinent to the current subject matter, not to mention also of great importance in establishing this document as a means to document the evolution and wide variety of potential embodiments the invention can ultimately be constructed should it become necessary to do so, and also despite the fact that even more efficient and powerful embodiments of the invention are included herein—and possibly even within this, the first embodiment of the invention (more on that a little later): the same prototype that was used to show time and time again that the impact of the test LMP with the test bulkhead produced absolutely no net negative movement by the host vehicle, the same prototype was ultimately also used to show time and time again that after the test LMP rebounded off the test bulkhead after the partially inelastic collision, the rebounding test LMP easily pulled the host vehicle along with it and produced a significant amount of thrust. So, to quickly recap, the same exact prototype that showed time and time again that the test LMP that initially smashed into the prototype's version of the bulkhead produced absolutely no net negative movement by the test host vehicle (not even a micrometer in the direction of the impact—although there was a little net positive movement in the opposite, desired, direction that is mostly attributable to the small amount of friction that is caused during the quick, forth-and-then-back, movement of the test host vehicle that took place in the brief amount of time before and then during the impact, and won't be a factor in space—the same exact prototype also showed time and time again that the same test LMP, when it was on the rebound after the partially inelastic collision, did in fact produce a significant amount of thrust.

Now referring back to just prior to where the invention was previously in its Cycle when the shaft 7 was locked and held in place by the spring-loaded piston 13 and the three contact gears 10—and also right after the winch 2 was put into reverse and summarily put plenty of slack in the cable 3—the control system 1 now proceeds to shut down the winch 2 and put it into low-energy-mode.

Figure 6:
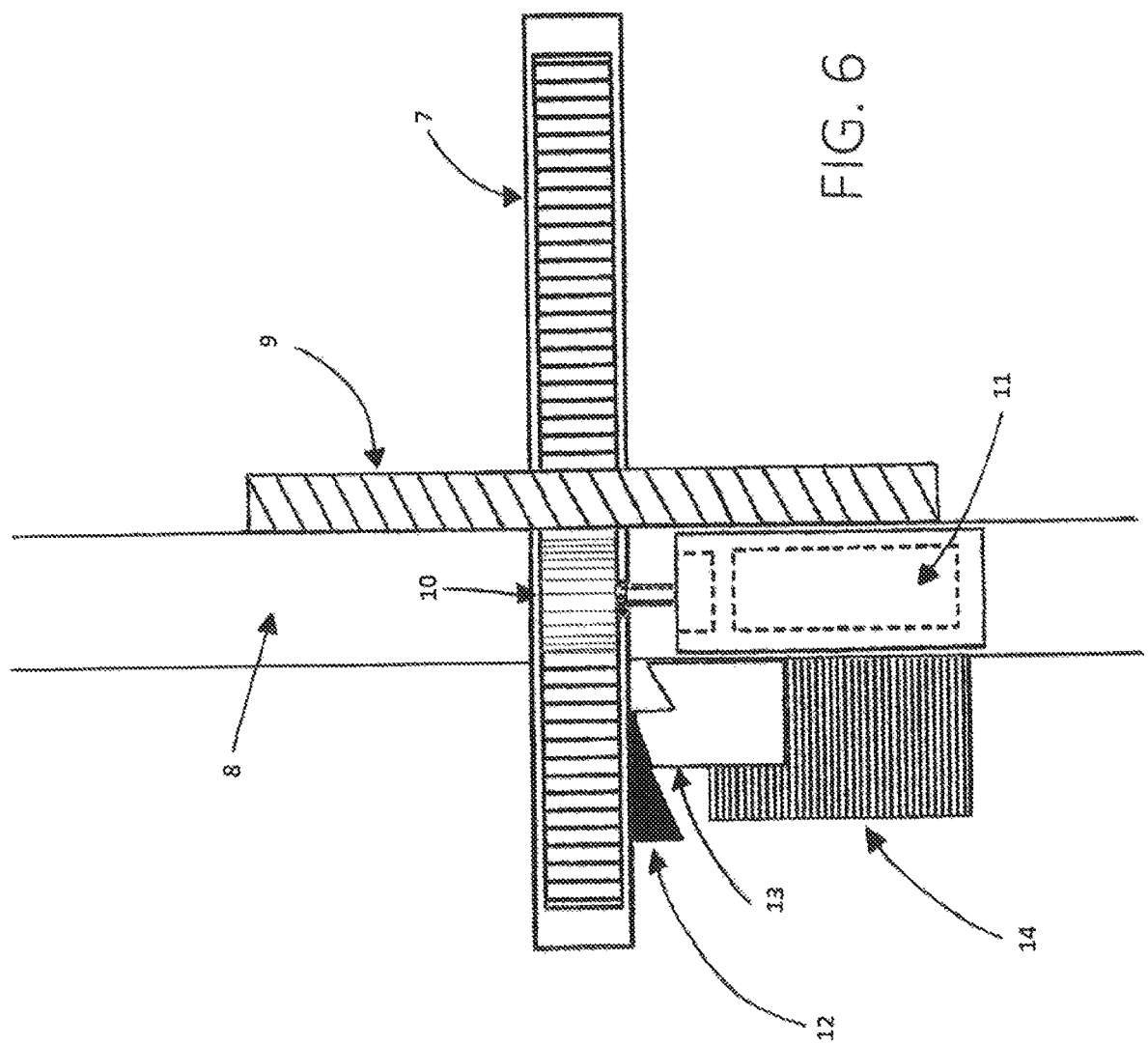
FIG. 6 shows when the angular piece of steel meets the spring-loaded piston that is located under the square-shaped steel shaft and above the vertical linear actuator on the far side of Bulkhead #1.

As shown in FIG. 5, FIG. 6 and FIG. 7, the vertical linear actuator 14 is located on the far side of bulkhead 8, where it is positioned underneath the shaft 7 and connected by commonly used linkage located on top of it to the spring-loaded piston 13. The piston 13, unlike the vertical actuator 14, has a glide and support track (not shown) to slide up and down in attached to the second wall of bulkhead 8, just above the top of the stationary outer casing of the vertical linear actuator 14.

Linear actuators are a common mechanical device that are often used in other mechanical devices and come in a wide variety of different potential embodiments that could be used by the invention. Nevertheless, regardless of what embodiment of linear actuator 14 is used by the invention, it will have only one purpose. That purpose will be to instantly pull down on the piston 13 and disengage it from the angular piece 12 when instructed to do so by the control system 1.

Either on its own using its autonomous capabilities, or continuing to carry out its previous instructions from Earth-based operators—and also doing it all at close to the speed of light—the control system 1 simultaneously sends out instructions to the vertical actuator 14, the three control mechanisms 11 embedded in Bulkhead #1, and the supercapacitors located nearby and powering all of them. Almost instantly, the three contact gears 10 that were being used to assist in holding the shaft 7 in place, are changed from lock-mode to freely-turning-mode by their corresponding control mechanism 11. At almost the same exact instant, the vertical actuator 14 pulls down on the piston 13, releasing the angular piece 12, that sets the shaft 7 free, so that the rest of the Mass comprising the LMP is likewise free to rapidly accelerate toward the impactor 9 and Bulkhead #1 behind it. Just a very short time later—or usually just fractions of a second depending on the size of the Unit being used—and while still accelerating, the front side of the block 4 smashes into the impactor 9 (as already shown in FIG. 9).

Figure 10:
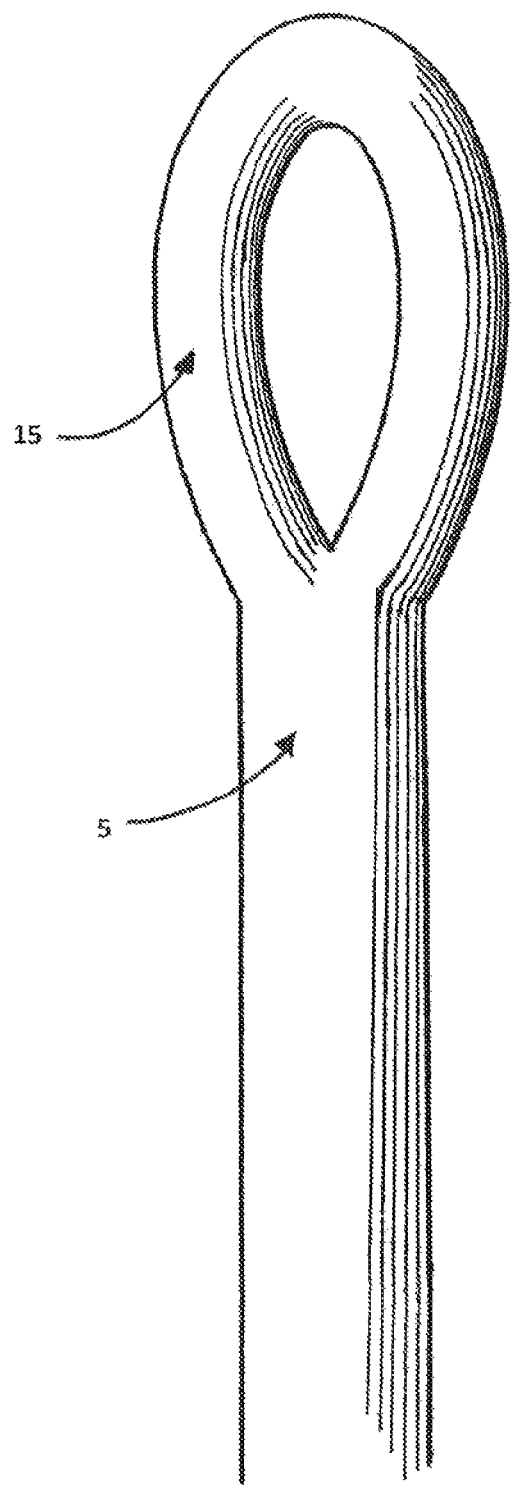
FIG. 10 shows a looped end of the thick elastic strap.

The two ends of the thick elastic strap 5 are made so as to form a looped end 15. The preferred embodiment of the two looped ends 15 of the strap 5 will be made in one, solid, extra thick, with no cut end, continuous looped piece (see FIG. 10).

Figure 12:
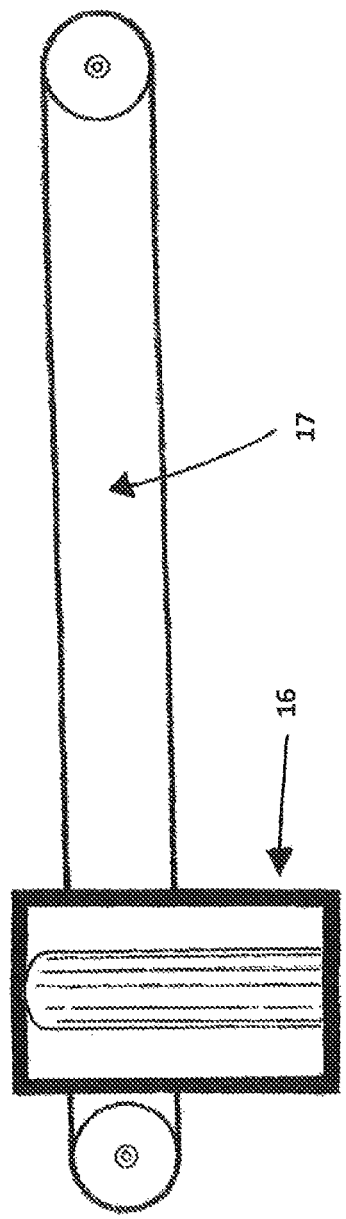
FIG. 12 shows the low-mass metal bracket attached to the mounting block of a simple belt-driven side-wall linear actuator when it is in lock mode next to Bulkhead #1 with the mounting block/bracket attached to the lower section of the belt.
Figure 11:
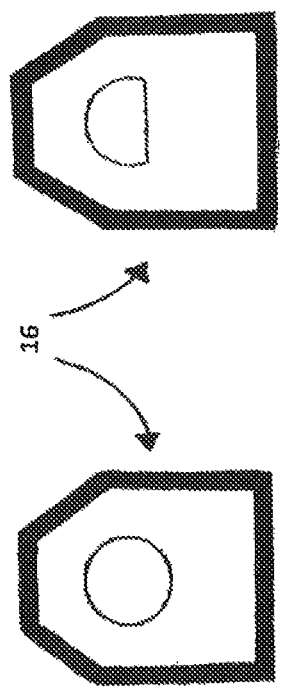
FIG. 11 shows the top and bottom pieces of the low-mass metal bracket.

The two looped ends 15 of the strap 5 are each held in place by a low-mass metal bracket 16 (see FIG. 11). The low-mass metal bracket 16 is securely attached to the mounting block of a chain or belt-driven, side-wall linear actuator 17 (see FIG. 12 for a simple version of a belt-driven linear actuator using two pulleys and a belt), and is essentially one part (the mounting block/bracket 16). As with the vertical linear actuator 14, there are many different potential embodiments of the side-wall linear actuator 17 that can be employed by the invention. The two, chain or belt-driven, side-wall linear actuators used in the first embodiment of the invention are located on either side, adjacent and perpendicular to Bulkhead #1, and run horizontally along the side wall 18 on each side of the sealed containment vessel the Regular Unit of the invention is operating in.

All during Phase 1, including up until and the moment the block 4 first makes contact with the impactor 9, the two low-mass metal mounting blocks/brackets 16 are in the locked position within the two opposing side-wall actuators 17. As shown in FIG. 1, FIG. 2 and in FIG. 12, this places the two opposing mounting blocks/brackets 16 near Bulkhead #1 on either side of the sealed containment vessel.

The two opposing mounting blocks/brackets 16 use a bolt and a free-spinning metal sleeve around the bolt to hold the two looped ends 15 of the strap 5. The bottom and main body of the bolt are round. The top portion of the bolt, however, is in the shape of a half-circle and it fits snuggly into the top half of the bracket 16.

Referring back to the time during the Cycle when the block 4 is rapidly accelerating toward the impactor 9, multiple, high-quality, smart sensors, located throughout the invention, constantly keep the control system 1 updated about the impending collision. As a result, the control system 1, similarly readies the two side-wall actuators 17 to carry out their intended responsibilities (or tasks) at precisely the right moment.

Because the preferred embodiment of the two side-wall actuators 17 employed by the invention in the first embodiment of the invention will use electric-powered traction or induction motors to rapidly rotate the pair of sprockets or pulleys that may be used to instantly move the chain or belt-driven mounting block (or carriage) that each of the brackets 16 are attached to away from Bulkhead #1, in order to ensure that the torque (Rotational Force) of the smart motors doesn't turn into angular (or spinning) motion by the host vehicle, the pair of smart motors in each side-wall actuator 17—which are directly opposite each other on either side wall 18—will be constructed so as to perfectly cancel each other out. This will, of course, be accomplished by simply having one pair of smart motors (or even more than two if more than two sprockets or pulleys are used or more torque is needed) turn clockwise while the opposing pair of smart motors, located in the opposing side-wall actuator 17, turn counterclockwise. This will also hold true if the pair of smart motors in each side-wall actuator 17 are both being used at the same time to drive the chain or belt, or only one is being used to drive the chain or belt while the other is in turning-freely-mode.

As previously described, and similar to how a helicopter can function properly by using a tail rotor or an additional coax rotor, the regenerative braking system of the side-wall actuators 17 can also be used during their proper operation to harvest a very small amount of energy and simultaneously produce a very small amount of thrust. This is also true of the more conventional braking systems that will accompany the regenerative braking system and can be used to help stop the progress of the Masses (object 1 or the projectile) attached to and/or connected to the two mounting blocks/brackets 16, and will likewise be able to be used to produce a very small amount of thrust in the direction of the momentum of the Masses provided by the two mounting blocks/bracket's 16 and the two looped ends 15 of the strap 5.

Figure 9:
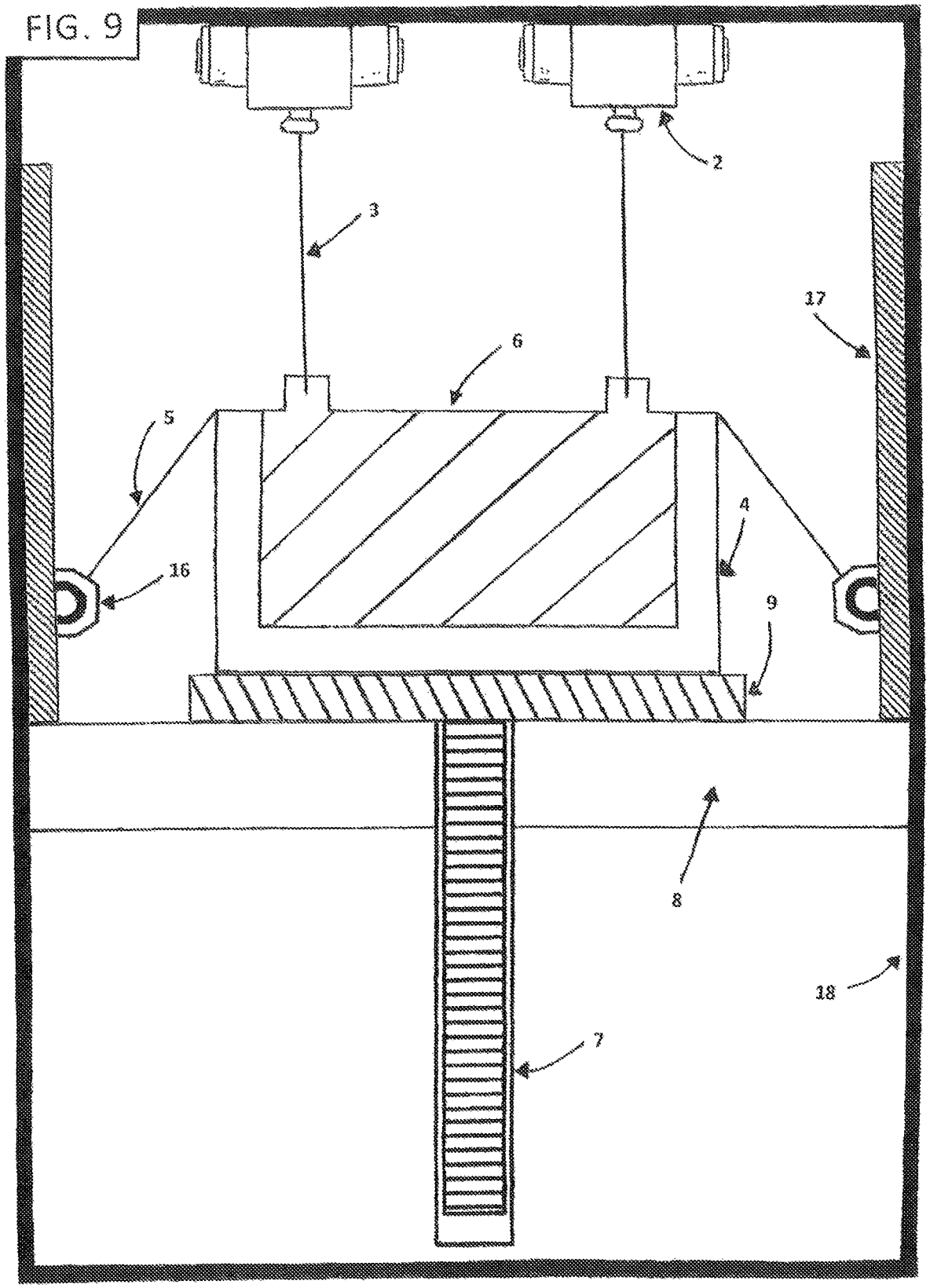
FIG. 9 shows the large steel block at the exact moment it slams into the rubber impactor.

Just a millisecond after the initial impact already shown in FIG. 9, and with the block 4 still in contact and still pushing forward into the thick rubber impactor 9, the high-quality smart sensors have already informed the control system 1 and the control system 1 now instructs the two side-wall actuators 17 to move—at extremely high speed—the two opposing mounting blocks/brackets 16 away from Bulkhead #1. Instantly, the rapid movement of the two opposing mounting blocks/brackets 16 holding the two looped ends 15 of the strap 5, is used to eliminate the possibility of a quick return of tension (or Restoring Force) that, up until the moment the strap 5 reached its equilibrium position just milliseconds earlier, had still been exerted by the strap 5 on the back side of the block 4 and then—less than a millisecond or two afterwards—made initial contact with the impactor 9. And by constructing the invention so that the strap 5 doesn't reach its equilibrium position until just before the impact, the maximum amount of kinetic energy and momentum will be possessed by the LMP when it makes contact with the impactor 9.

But just relieving a quick return of the tension (or Restoring Force) from the strap 5 isn't enough. A small amount of movement of the mounting blocks/brackets 16 away from Bulkhead #1, or even no movement (especially as the straps age and become a bit longer), might be sufficient to complete BM #1. But that certainly isn't the case with BM #2. That is why by the time the regenerative braking system and other means of braking employed by the side-wall actuators 17 have stopped the forward progress of the mounting blocks/brackets 16, and with them the two looped ends 15 of the strap, the control system 1 will have ensured that there is enough slack in the strap 5 for the block 4 and the connector 6 to rebound off the impactor 9 and have enough room for either BM #1 or BM #2 to be implemented and completed, with the rapid transfer/combination of their momentum, as well as that of the shaft 6 and the other sources of Mass of the LMP, with the host vehicle done as quickly and efficiently as possible.

Newton's Third Law of motion states: To achieve a net force and an acceleration, an object must interact with an object external to itself.

Without a doubt, with the block 4, the connector 6, and the shaft 7 unencumbered by the tension previously exerted by the strap 5, "an object external to itself" is precisely what the LMP becomes in its subsequent interactions with the host vehicle. In essence, even though the LMP is within the interior walls of the main body of the host vehicle or another connected or attached sealed containment vessel, the LMP becomes a free-flying projectile (even if only for a short distance) or an object external to the host vehicle that can then be used to provide an external force and accelerate or decelerate the host vehicle.

Except for the three contact gears 10 that had already been put into freely-turning-mode by the control system 1 and the three control mechanisms 11, there is nothing else (except for maybe air molecules within the sealed containment vessel) to affect the rebounding LMP as it breaks contact with the impactor 9. For all intents and purposes, immediately after breaking contact with the impactor 9, the rebounding LMP is a free-flying, high-velocity, high-density, significant quantity mass and force object (object 1 or the projectile) that is free to act upon the separate force and/or object embodied by the host vehicle (object 2 or the larger mass object).

Newton's First Law of Motion: An object in motion stays in motion with the same speed and the same direction unless it is acted upon by an external force.

Law of Momentum Conservation: For a collision occurring between object 1 and object 2 in an isolated system, the total momentum of the two objects before the collision is equal to the total momentum of the two objects after the collision.

An example of an inelastic collision . . . is a collision between two objects such that after the collision both stick to each other and hence move with the same velocity.

Therefore, regardless of all the thousands of failed attempts at propellantless propulsion that have been attempted over the preceding decades using mechanical devices, there is absolutely no reason why the rebounding LMP (object 1 or the projectile), made possible by the invention during Phase 1, can't "collide" with the host vehicle (object 2 or the larger mass object) through the use of either Breakthrough Method #1 (without harvesting and storing energy) or Breakthrough Method #2 (with the harvesting and storing of energy) and combine their two momentums through an inelastic collision during which both objects "stick to each other and hence move with the same velocity" in the same direction.

Just a millisecond after the rebounding block of steel 4 clears the impactor 9, the kinetic energy and momentum of the rebounding LMP are both fully established and can be clearly identified and quantified. It is then at this point, now at the very beginning of Phase 2, and with the rebounding LMP totally capable of being used by the invention to produce thrust, that the invention's two primary breakthrough systems to produce thrust take over.

Because Breakthrough Method #1 is a pretty straightforward, bare-bones, transfer/combination and recalibration of momentum, there is no reason to waste more time or more electric power than necessary to ensure that the tension previously exerted by the strap 5 on the back side of the block 4 doesn't have a chance to return and interfere with the proper execution of BM #1. As a result, within a millisecond or two of the rebounding block 4 clearing the impactor 9, the supercapacitors are once again called upon by the high-quality smart sensors and the control system 1 to provide another quick burst of energy.

This time the intended receiver of the quick burst of energy is the control mechanism 11 for each of the three contact gears 10. Up until this point, the three contact gears 10 had just finished guiding the shaft 5 on its still accelerating path in through the impactor 9 and Bulkhead #1 and are now continuing to turn freely in freely-turning-mode, except now, they are turning freely in the opposite direction as the rebounding block 4 begins to clear the impactor 9. From their location firmly embedded within Bulkhead #1, and just as the high-point on the teeth of each of the three contact gears 10 simultaneously hit the center of the gear grooves on either side and on top of the square-shaped steel shaft 7, the three fully charged supercapacitors and their respective control mechanisms 11 instantly put all three contact gears 10 into lock-mode, thereby instantly locking all three contact gears 10 in place, and Instantly stop the shaft 7 and the rest of the rebounding Mass from progressing any further.

With nowhere else to go, and with the three contact gears 10 firmly locked in place by their respective control mechanisms 11—which are themselves firmly held in place between the double walls of Bulkhead #1, which is itself a major structural component of the sealed containment vessel the Unit of the invention is operating in—the rebounding Mass (not unlike when the slack on a tow rope is expended too quickly when towing another vehicle) yanks or thrusts the host vehicle in the direction of its momentum. Just fractions of a second later, the rebounding Mass (object 1 or the projectile) and the host vehicle (object 2 or the larger mass object) are both traveling together at their same, new, recalibrated velocity—and also complete Phase 2 in the process.

If, in this instance, a single Direction Control Unit (or DCU) is being used to increase the velocity of the host vehicle and the direction of their momentums are aligned, after the transfer/combination and recalibration of momentum is completed, the host vehicle—using the same ratios for mass as the 1 kilogram prototype, or the mass of the rebounding mass (or LMP) being 50% of the mass of the host vehicle excluding the mass of the LMP—will be traveling at an increased velocity of a little more than two miles-per-hour. Conversely, if the same DCU was being used for deceleration purposes at the time, the host vehicle will be traveling at a decreased velocity of a little more than two miles-per-hour.

Now while these sizable increases or decreases in velocity—especially since they are accumulative—are the ultimate purpose of the invention, we also know that Breakthrough Method #2 has higher aspirations than just transferring/combining and recalibrating the momentums of the LMP and the host vehicle in order to seamlessly increase or decrease the velocity of the host vehicle. Up until the point just a millisecond after the block 4 clears the impactor 9, a significant amount of the electrical energy that has been used by the invention up until this point still exists in the form of the kinetic energy (energy a body possesses by virtue of being in motion) possessed by the LMP. So why not harvest it and also produce thrust at the same time?

In addition to being able to put the three contact gears 10 into lock-mode or freely-turning-in-either-direction-mode whenever instructed to do so, the control mechanisms 11 can also put the three contact gears 10 into energy-generation-mode and use their built-in generators or flywheels to do the electric power generating. Since the first embodiment of the invention already has to use a certain amount of electric power to operate the mechanical devices used to complete BM #1, and may also need to move the two looped ends 15 of the strap 5 away from Bulkhead #1 in order to eliminate the potential return of tension that the strap 5 could reapply on the LMP as it rebounds away from Bulkhead #1, by using just a little more electric power to have the two side-wall actuators 17 instantly move the two mounting blocks/brackets 16 holding the two looped ends 15 of the strap 5 just a little bit farther away from Bulkhead #1, there will be more than enough room for the kinetic energy of the rebounding LMP to be harvested to the greatest extent possible. And more important, it can be done in such a way that the momentum possessed by the rebounding LMP can be seamlessly transferred/combined and recalibrated with the momentum of the host vehicle.

Considering how valuable every watt that is generated in space is . . . or can be saved through increased efficiency . . . or can be harvested and stored for future use, especially the farther away from the sun the host vehicle is if solar panels are an option to generate electric power . . . being able to recover a significant amount of the energy used to power the invention and then reuse it will be invaluable. Breakthrough Method #2 accomplishes this incredibly valuable harvesting of the kinetic energy possessed by the rebounding LMP by, instead of the control mechanisms 11 abruptly locking the three contact gears 10 a millisecond or two after the block 4 clears the impactor 9, the control system 1 instead instructs the three control mechanisms 11 to put their three respective contact gears 10 into energy-generation-mode.

Figure 13:
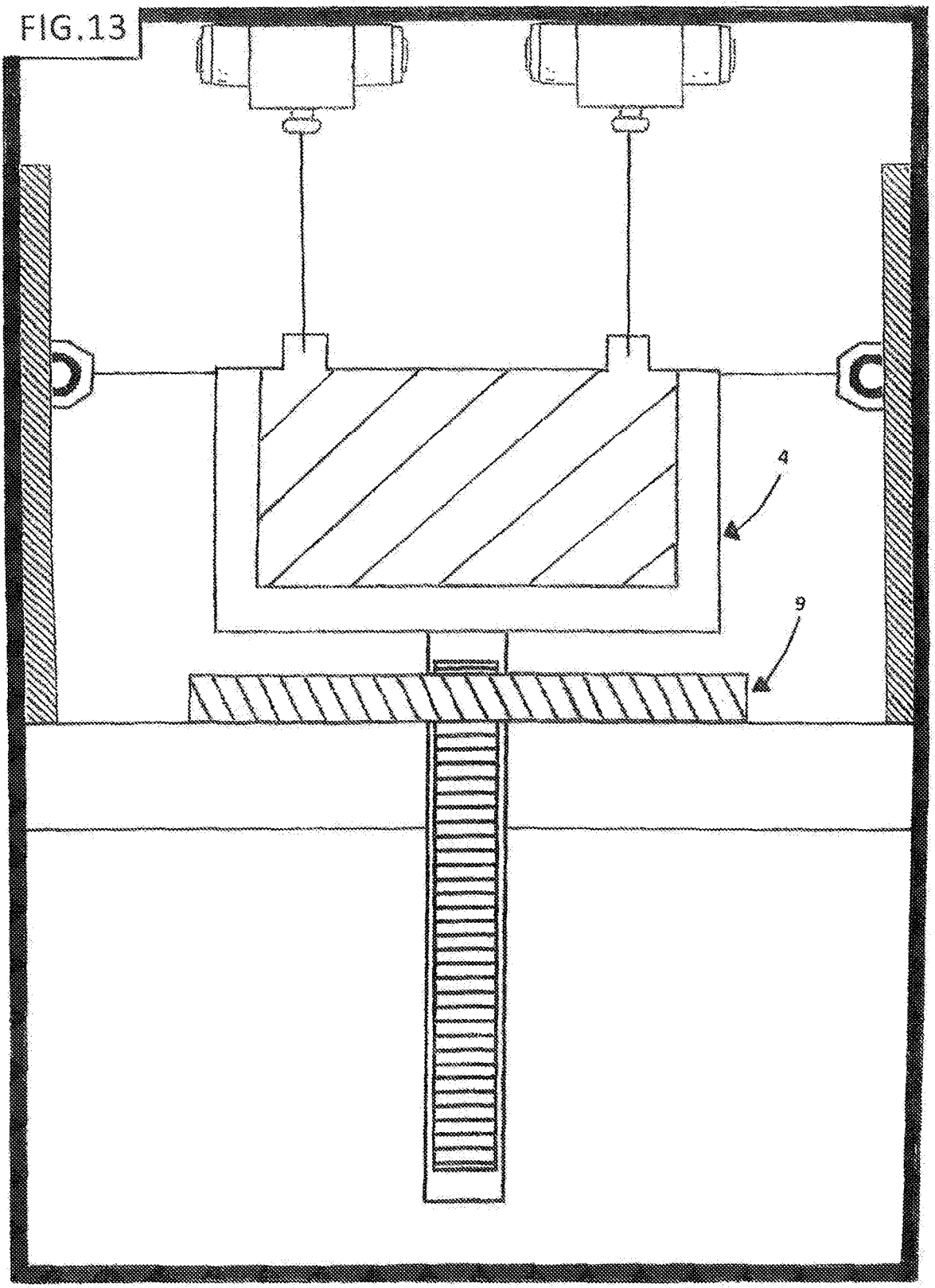
FIG. 13 shows an overhead view of the location of the LMP after BM #1.
Figure 14:
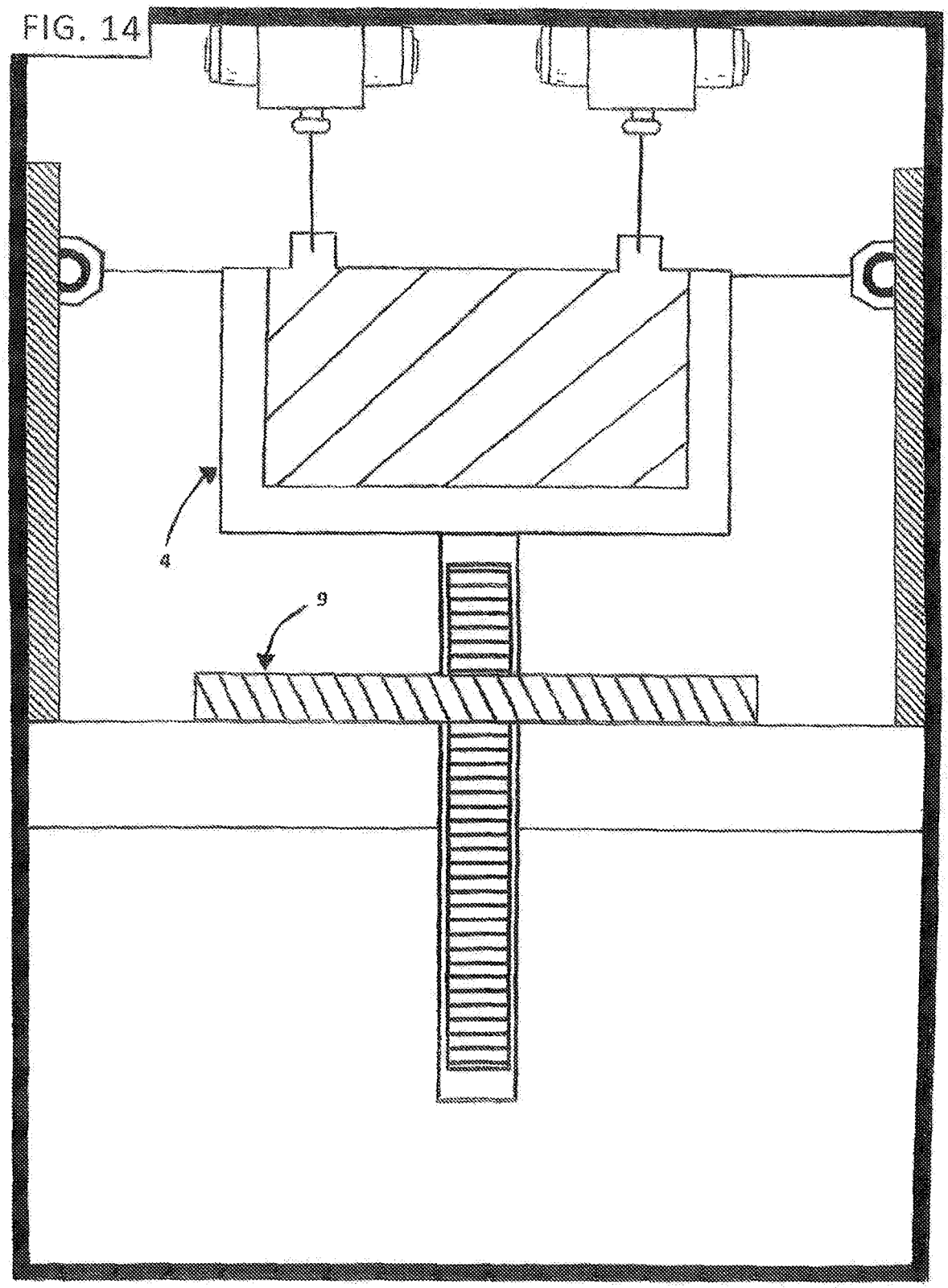
FIG. 14 shows an overhead view of the location of the LMP after BM #2.

BM #2's use of energy-generation-mode (in contrast to BM #1's use of lock-mode) permits the already turning contact gears 10 to continue turning. However, in addition to the three contact gears 10 rotating the round metal shaft connecting them to their respective control mechanisms 11, they will also be used to simultaneously rotate the relevant mechanical parts of the electric generators or flywheels built into or otherwise connected to the three control mechanisms 11. The torque (or Rotating Force) produced by the internal gears of the gear chain (or gearbox) leading to the electric generators or flywheels will be augmented in such a way so that the kinetic energy of the rebounding LMP can be harvested as quickly and efficiently as possible. It will take several dozen more milliseconds of time using BM #2, as well as a little more distance traveled away from Bulkhead #1 (see FIG. 13 compared to FIG. 14), but the high torque of the gears combined with the over-sized generators or flywheels and their over-sized rotors—which will make use of a planetary gear system that will be placed within the open end of the over-sized rotor and make it possible to spin the rotor rapidly—will undoubtedly stop the progress of the shaft 7 in very short order.

Finally, since momentum is conserved in an inelastic collision during which the two colliding objects "stick to each other," no momentum is lost in aggregate (or total) during BM #2 (as in BM #1) because the total momentum of the two objects before the collision is equal to the total momentum of the two objects after the collision. As a result, the linear momentum of the rebounding LMP will be seamlessly transferred/combined and recalibrated with the linear momentum of the host vehicle and not violate the Law of Conservation of Momentum. And, of course, the same more than two miles-per-hour of increased or decreased velocity achieved during BM #1 will also be achieved during BM #2.

At this point, now at the completion of Phase 2 for either BM #1 or BM #2, the three control mechanisms 11 get the instructions from the control system 1 to either keep the three contact gears 10 in lock-mode if BM #1 was used, or, if BM #2 was used, the three contact gears 10 are put into lock-mode so the shaft 5 and the rest of the LMP doesn't move until given further instructions. From here, now at the very beginning of the Recovery Time Period, all that is left for the invention to do is to get prepared to start back at the very beginning of Phase 1, then do it all over again.

The Recovery Time Period is pretty straight forward. The Recovery Time Period in the first embodiment of the invention entails first having the control system 1 instruct the two opposing chain or belt-driven side-wall actuators 17 to begin moving the two mounting blocks/brackets 16 holding the two looped ends 15 of the strap 5 back in the direction of Bulkhead #1. At the same time, the control system 1 also instructs the winch 2 to begin reeling in the cable 3 in order to take the slack out of it. Approximately two seconds later the two opposing mounting blocks/brackets 16 are back locked in place near Bulkhead #1 with the proper amount of tension reapplied to the back side of the block 4 depending on where the LMP's progress was stopped at the end of Phase 2, and the winch 2 has the cable 3 taut and ready to be used to begin pulling the connector 6 back toward Bulkhead #2.

As alluded to earlier, and before moving on to the second embodiment of the invention, there are still some additional potential embodiments of the first embodiment of the invention (or Unit 1s) that need to be described. They include one in particular that will be available to be used in all the different embodiments of the invention included herein, and may also be employed by various Electric-Powered Propellantless Velocity Control Systems of the invention as well.

Because everything done by the invention is done with the intention of not using any propellants of any kind, all the different embodiments of the Electric-Powered Velocity Control Systems employed by the different embodiments of the invention are propellantless as well (although, as previously described, backup or emergency systems that include those using propellants will be a potential option). Also, as previously described, each and every Unit of the invention will be able to operate at a slower pace by simply increasing the number of seconds needed to complete each full Cycle or by reducing the amount of force generated during Phase 1. Obviously, since the control system 1 can control the rate at which the winch 2 performs its tasks, or control when the actuator 14 is activated to release the angular piece 12, or control whether Breakthrough Method #1 (without harvesting and storing energy) or Breakthrough Method #2 (with the harvesting and storing of energy) is used, or control how long after a full Cycle is completed that Phase 1 is once again commenced, slowing the rate of velocity increases or slowing the rate the host vehicle is decelerated using full Cycle of thrust increments will be rather easy for the invention to do. Accelerating or decelerating in increments smaller or less than what a Regular Cycle of a Regular Unit or Direction Control Unit of the invention can produce is when things get interesting.

Regardless of the type of host vehicle, there will almost certainly be instances—such as during docking or when minor direction or attitude (orientation) changes are needed—when smaller increments of thrust will be preferable to the approximately 36 inches of thrust produced in less than one second during Phase 2 of a full or Regular Cycle, which normally takes about 12 seconds to complete from start to finish. There are several different options for doing this. The first, and preferred option, entails making use of the angular piece of steel 12 that is locked under the shaft 7. While the vast amount of time the angular piece 12 will be locked in place with the aid of additional electromechanical bolts (not shown) in its normal location near the end of the shaft, the angular piece 12 and how it is constructed is actually very similar to the bracket 16 and how it is permanently attached to the mounting block of the side-wall actuator 17 so it can be moved back-and-forth within the side-wall actuator 17 and stopped wherever needed. Because of the use of similar mechanical devices (namely an actuator), the angular piece 12 can also be easily moved back-and-forth when it is instructed to do so by the control system 1.

The end view of the shaft 7 shown in FIG. 4 shows a T-shaped configuration (or groove) cut into the bottom of the shaft 7. The T-shaped groove is there for the sole purpose of being used for velocity control. And because the velocities that may be needed will vary, the T-shaped groove runs the full length of the shaft 7 up until where it finally ends just a short distance before the second wall of Bulkhead #1 when the block 4 is in contact with the impactor 9 on the other side. The angular piece 12 fits perfectly into the T-shaped groove so that it can be slid back-and-forth very easily and with very little friction. On reason why there is very little friction is because the angular piece 12 is connected to and extends down from yet another embodiment of a linear actuator (not shown) that, this time, is firmly embedded in a long, thin, rectangular-shaped space made for it above the T-shaped groove in the bottom of the shaft 7.

However, this linear actuator—which will be described as the shaft actuator—is different from the other two linear actuators that are used by the invention in the first embodiment of the invention in one very distinct way. Due to the shaft 7 not being connected to anything other than the contact gears 10 and the block 4, the preferred method to bring electric power to the shaft 7 will be to use wireless technologies. This means the controller for the shaft actuator will communicate via radio frequency with the control system 1. It also means the low-energy-mode capable electric smart motors employed by the shaft actuator will use an energy storage device or product that can be wirelessly charged, most likely batteries. Otherwise, the embodiment of the shaft actuator that is used by the invention will use standardized mechanical components.

The powering of the electromechanical bolts—which, like the shaft actuator, is a common mechanical device that can come in many different embodiments and will be used to lock the angular piece 12 in place at locations of equal distance along the length of the shaft 7—will preferably be done by hard-wiring the electromechanical bolts to the energy storage devices or products used by the shaft actuator. The tasks of communicating with and controlling the electromechanical bolts will either be done through wired or wireless means. The batteries, or other energy storage devices or products, will most likely be charged wirelessly as the shaft 7 continually passes back-and-forth-through Bulkhead #1 so they will be fully charged when needed. Also, for safety reasons, except for when the angular piece 12 is in its normal location near the end of the shaft 7 (where its own separate power source will be used), the electromechanical bolts will automatically deactivate and the angular piece 12 will be returned to its normal location near the end of the shaft 7 when minimal power requirements are not being met.

The preferred embodiments to power mostly everything using power on the shaft 7 will make extensive use of wireless technologies. They include: (1) RF power—which is a means of transmitting energy to an electronic device (or the receiver) via radio waves; (2) Infrared light wireless charging—which includes using focused (laser) beams of invisible infrared light (the transmitter) and photovoltaic cells (the receiver) to convert light into electricity; (3) Power rotor—which is based on resonant electromagnetic fields; (4) Photovoltaics—there is a lot of available space for photovoltaics on the top, bottom, and two sides of the block 4. And while these and any other wireless means to provide electric power to the electronics in or on the shaft will be preferred, any number of electric current collectors could also be utilized. They include: (1) Overhead pantographs used with electric trains, trams, trolleys or buses; (2) A trolley pole; (3) Dynamic charging—which is used for electric cars and other vehicles to charge them by placing two rails in the road that recharge batteries via a movable arm attached to the bottom of the vehicle; (4) Running a power line that winds and unwinds on a spool within Bulkhead #1 as the shaft 7 moves back-and-forth through the bulkhead 8; (5) Any other means to provide electric power to the electronics in or on the shaft 7.

Figure 15:
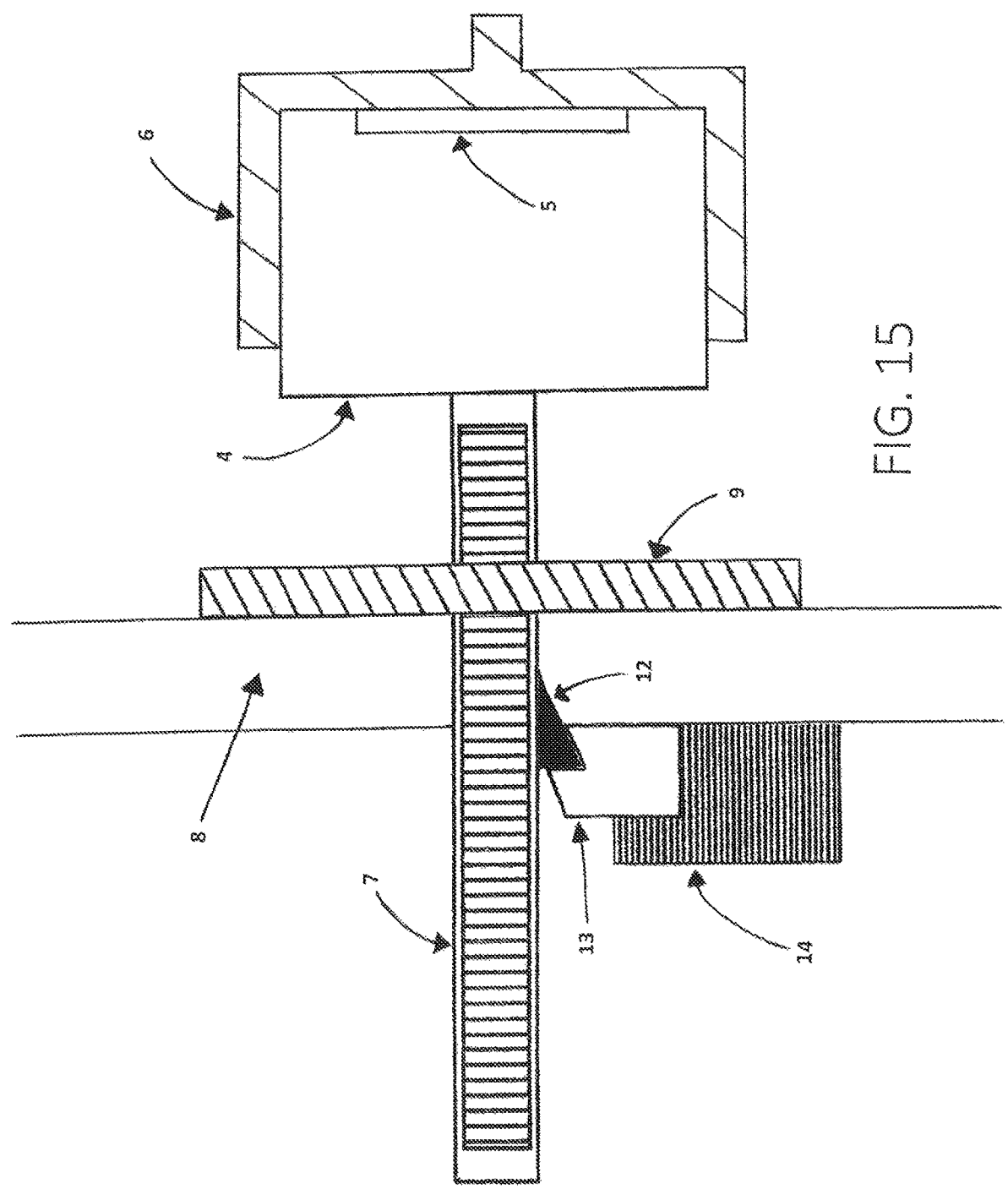
FIG. 15 is a side view of the angular piece located near the center of square-shaped steel shaft when it is being used by the velocity control system to produce less thrust per full cycle.

Regardless of how they are powered, the electromagnetic bolts will be able to lock the angular piece 12 in place in numerous locations that are at equal distance between each other along the length of the shaft 7. When locked in place in any of these locations (see FIG. 15), the invention will be able to function just as it had when the angular piece 12 was in its normal location near the end of the shaft 7. Naturally, the longer the distance the location is away from the end of the shaft 7, the less force that will be able to be generated by the invention during Phase 1, and also the less thrust that will be able to be produced during Phase 2.

Just as with how the three contact gears 10 assist in holding the shaft 7 locked in place when the angular piece 12 is in its normal location during a Regular Cycle of the invention, once the instructions from the control system 1 are carried out by the control mechanisms 11, the three contact gears 10 will likewise assist in holding the shaft 7 locked in place any time the angular piece 12 is locked in place in any of the locations along the length of the shaft 7 used for velocity control purposes. In fact, if for any reason the angular piece 12 is unable to be used, or the control system 1 prefers an even more incremental location for the shaft 7 to be held in place than the numerous locations available to the angular piece 12, the three contact gears 10 can always be utilized by themselves for velocity control purposes. And considering what the three contact gears 10 and their corresponding control mechanisms 11 are capable of doing whenever BM #1 or BM #2 are used by the invention, there is no doubt that the three contact gears 10 and their corresponding control mechanisms 11 can handle the velocity control duties by themselves—especially with the smart winch 2 being able to stop the progression of the shaft 7 at any incremental location along the length of the shaft 7. It will just be more preferable to use the angular piece 12 so as to reduce the wear-and-tear on the three contact gears 10 and the gear grooves they traverse back-and forth in along the full length of the shaft 7, not to mention provide another option—the preferred embodiment—for safety reasons.

With safety in mind, and not only because the winch 2 can indeed stop the progression of the shaft 7 as it is being pulled back through Bulkhead #1 and the impactor 9 at any point possible along the length of the shaft 7, but also because the need to stop the three contact gears 10 precisely in the center of the gear grooves on either side and on top of the shaft 7 is essential for the proper and long-lasting use of Breakthrough Method #1 or Breakthrough Method #2 for producing thrust, another potential option to assist in both thrust production and velocity control will be to add a fourth contact gear 19.

Figure 16:
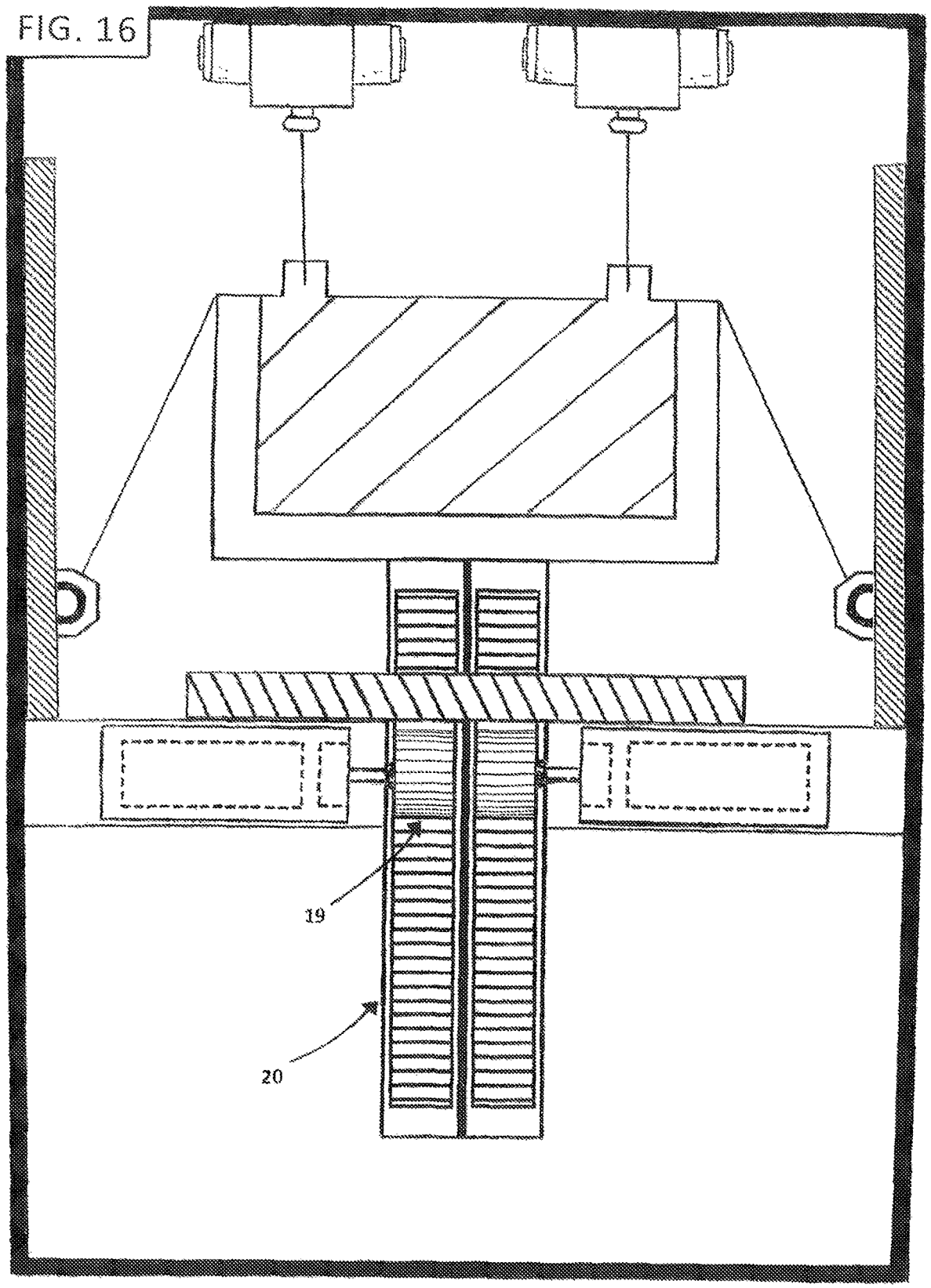
FIG. 16 is an overhead view of the first embodiment of the invention with a fourth contact gear and its control mechanism added and the width of the new, rectangular-shaped, steel shaft doubled.

As shown in FIG. 16, the fourth contact gear 19 and its accompanying control mechanism 11 will be located directly opposite the original top (or third) contact gear 10 that is in constant contact with the top of the shaft 7. The only thing really different with the fourth contact gear 19, compared to the third contact gear 10 shown in FIGS. 1, 2, 8, 13 and 14, is that other than being positioned in the opposite direction, the fourth contact gear 19 will require that the width of the square-shaped steel shaft 7 be doubled as also shown in FIG. 16. But other than the width of the square-shaped steel shaft 7 being doubled, as well as the double-width steel shaft becoming the rectangular-shaped steel shaft 20, everything else will essentially be the same.

As might be expected, this means the fourth contact gear 19 and its accompanying control mechanism 11 will be able to do everything the three other contact gears 10 can do. That includes guiding and then holding the rectangular-shaped steel shaft 20 locked in place during Phase 1 and also in fulfilling all the duties of the rectangular-shaped shaft 20 during Phase 2. It also means assisting the three other contact gears 10 in doing velocity control using the angular piece 12 (or potentially two angular pieces 12 if two are used instead of one because the rectangular shaft 20 will be twice as wide) when it is locked in one of its numerous available locations along the rectangular-shaped shaft 20. However, there will also be instances when rapid changes (sometime back-and-forth) in acceleration and deceleration are needed and when—especially with larger spacecraft and other host vehicles—using the fourth contact gear 19, which will have full access to the electric power from the supercapacitors, will be preferable to using the angular piece 12 and, consequently, be the preferred option (or embodiment).

Also making the use of the fourth contact gear 19 the more preferable option in these rapid acceleration and/or deceleration change situations (including, in many instances, for direction control purposes) is the fact that the control system 1 can use the winch 2 to stop the progress of the rectangular shaft 20 in any desired location that is possible. So, if the rectangular shaft 20 is already stopped and held in place by the winch 2, using the fourth contact gear 19 instead of the angular piece 12 to perform the task of holding the rectangular shaft 20 in place, as well as using the three contact gears 10 to fulfill their customary responsibility of assisting in holding the rectangular shaft 20 in place, the rest of the aspects of velocity control can otherwise be done normally.

If necessary, in an emergency, the three other contact gears 10 could also—by themselves or in unison—be used in the same capacity as the fourth contact gear 19 when it is substituting for the angular piece 12. This would mean the angular piece 12 and the fourth contact gear 19 were unavailable, but if there was no other option to dock safely—or if it were some other potentially life-threatening or potentially catastrophic situation—it would certainly be another option (or embodiment). Similarly, if two or more winches 2—or any other potential embodiments of winch 2 that can adequately perform its tasks (as previously described or otherwise) are used to stop, hold, and then release the square-shaped 7 or rectangular-shaped 20 steel shaft (or shafts), the use of these devices will also be a legitimate option in extreme circumstances. It will likely take a little longer to rewind the cable 3 after Phase 2 is completed, but it would work as long as there were enough contact gears 10 left to still perform BM #1 or BM #2.

While the addition of a fourth contact gear 19 is certainly a nice option to have—and not just for the first embodiment of the invention but for the others as well—there are still other potential options (or embodiments) that are possible with the first embodiment of the invention that need to be covered. In fact, they are not only options, but could be their own standalone embodiments of the invention if there wasn't so many others to choose from.

The main reason the first embodiment of the invention works as just described, is because the Restoring Force of the strap 5 can not only be used to generate the force that is needed to propel the LMP at a high rate of speed, but the equal and opposite amount of Elastic Force on both the host vehicle and the LMP also results in a partially inelastic collision that makes it possible for the rebounding mass of the LMP to be used to perform BM #1 or BM #2.

A property of Elastic Restoring Force—If the elastic strap is stretched beyond its natural length, the restoring forces exerted by the elastic strap (which are pulling the objects on either end with equal force toward the mid-point or center of the elastic strap) will attempt to bring the objects on either end together.

While the act of smashing the block 4 into the impactor 9 at full speed while possessing the full amount of kinetic energy possible at the velocity the LMP was traveling at just before impact will make it possible to simultaneously harvest a significant amount of kinetic energy and also produce a significant amount of thrust using BM #2, successfully performing BM #2 will also require that the smart motors turning the two sprockets or pulleys within each of the two side-wall actuators 17 can easily move the two looped ends 15 of the strap 5 away from Bulkhead #1 at the proper time. Moreover, successfully performing BM #2 will also require that the motors can have the mounting blocks/brackets 16 also keep pace with the block 4 as it is also keeping enough slack in the strap 5 so that BM #2 can be completed without being adversely affected by the strap 5. At the same time, the additional distance the two looped ends 15 of the strap 5 are being moved away from Bulkhead #1 by the two side-wall actuators 17, will also provide the regenerative braking system employed by the two side-wall actuators 17 with an opportunity to harvest a little energy and, along with the more conventional braking systems that will be utilized as needed, simultaneously also produce a very small amount of additional thrust. And all this will need to be done in the short amount of time and space allocated to successfully complete BM #2.

An option to assist the two side-wall actuators 17 in successfully completing their responsibilities—and one that will be made available to the control mechanisms 11 for each of the contact gears 10 that can be used to harvest kinetic energy and simultaneously produce thrust at the same time the side-wall actuators are in operation—will be to add a slow-down-mode. As with how regenerative braking systems also need a more conventional braking system to actually stop the vehicle or object they are being used with at times, slow-down-mode could be added to the control mechanisms 11 for the contact gears 10 as a bridge between energy-generation-mode and lock-mode. Of course, lock-mode would always be available to be used as a backup for energy-generation-mode to ensure that the LMP stops in the allotted available space, but having slow-down-mode as an added option could also certainly be done.

This final point also provides another opportunity to point out how the different embodiments of Breakthrough Method #2 and the regenerative braking system of the side-wall actuators 17—which can both be used by the invention to simultaneously harvest kinetic energy and produce thrust—are strikingly similar to a regenerative braking system of an electric vehicle (EV) or a train or trolley car on Earth. A person who is skilled in the art of regenerative braking systems should have little difficulty determining that the science behind why they all work and perform as they do is practically identical.

This also continues to be true even with all the obvious differences between the invention and commonly used transportation braking systems on Earth. The most obvious difference, of course, has to do with gravity and how gravity is necessary for the wheels of vehicles on Earth to interact as they do with whatever surface (or reaction mass) they are riding on. Conversely, the effects of microgravity in space, which, instead of causing floating as is typically thought, in reality causes the host vehicle and everything within it to essentially "fall" together at the same time. Thus, gravity is totally useless as a means to have the LMP (object 1 or the projectile) and the host vehicle (object 2 or the larger mass object) interact with each other to produce thrust in space.

Other than the obvious need for gravity for them to work, the biggest difference between the regenerative braking systems of transportation vehicles on Earth and the various systems employed by the invention to perform BM #2 or the responsibilities of the regenerative braking system—and only because the mass of the Earth (object 2 or the larger mass object) is so massive when compared to the mass of the EV or train or trolley car (object 1 or the projectile) that it can't be detected by any known means, the acceleration or deceleration of the larger mass object caused by the different elements of the EdDrive Propellantless Propulsion System is actually great enough to be observed and measured using available technology.

Needless to say, having a well-established technology that makes use of the same laws of physics to do something very similar is very helpful. This is especially true when it comes to alleviating any concerns anyone may have about whether the different embodiments of Breakthrough Method #2 or the regenerative braking systems that are described herein and may be employed by the invention in a wide variety of different embodiments will be able to be used to simultaneously harvest energy and produce thrust. Besides the fact that the science tells us that there is absolutely no doubt that they will, having an unquestionable source of empirical proof or evidence is nonetheless well heeded to include.

Also, in respect to whether the different embodiments of Breakthrough Method #1, or the more conventional or traditional braking systems employed by the invention that will accompany and assist the regenerative braking systems, will be able to be used to only produce thrust, there should also be no doubt that they will. Therefore, a person skilled in the art of more traditional braking systems used by transportation vehicles here on Earth, including those used by cars, trucks, buses, trains, trolleys, planes, bicycles, motorcycles, scooters—as well as many other forms of transportation—should have no difficulty determining that they will as well.

There is another potential option (or embodiment) for the first embodiment of the invention that also has to do with making sure that the tension from the strap 5 doesn't return and interfere with BM #1 or BM #2. Since we know the two chain or belt-driven side-wall actuators 17 can be used to move the two looped ends 15 of the strap 5 without causing any movement by the host vehicle before the regenerative braking systems are activated—and which ultimately results in additional positive movement of the host vehicle during Phase 2—if a means were provided to disconnect the strap 5 from the back side of the block 4 when the strap 5 reaches its natural length and equilibrium position, the two looped ends 15 of the strap 5 could be moved away and the side-wall actuators 17 wouldn't need to keep pace with the rebounding LMP because the strap 5 would already be well out of the way. Of, course, the two side-wall actuators 17 might have to be made a little longer, and smart linkage would need to be added where the block 4 and strap 5 would connect and disconnect, but it could certainly be done.

Somewhat similarly, if the sealed containment vessel and the rectangular-shaped shaft 20 were made longer, and the brackets 16 were also moved far enough away from Bulkhead #1 so that the back side of the rebounding block 4 never came close to the detached strap during BM #2, no side-wall actuators 17 would be needed. The LMP would just have to travel much further after it was detached from the strap 5 before impact with the impactor 9.

As with all the other previously described potential embodiments of components, parts, methods and/or systems used by the EdDrive Propellantless Propulsion System, any of the embodiments of the components, part, methods and/or systems that are described in the detailed description of the first embodiment of the invention, if possible, may also be used in other embodiments of the invention.

Second Embodiment of the Invention

The second embodiment of the invention is very similar to the first embodiment of the invention in many respects. The two main differences have to do with the changes that were made in order to make the second embodiment of the invention able to operate normally under much colder conditions or circumstances than the first embodiment of the invention, and also to make it possible for the invention to produce more thrust each full Cycle by using springs instead of an elastic strap as the primary elastic member and driver of the mechanical device that is used by the invention to generate force during Phase 1.

Inside the sealed containment vessel of the second embodiment of the invention everything looks very much the same as in the first embodiment of the invention in the section or side of the invention where most of the activity takes place. This includes the continued and repeated use of a large steel block 4 (preferably consisting of a steel outer shell and a tungsten inner core), a large metal connector 6, one or more smart winch-like devices 2, one or more low-mass, stronger-than-steel, wound, metal alloy cables or synthetic ropes 3, two side-wall chain or belt-driven linear actuators 17, an impactor 9, the visible part of a rectangular-shaped steel shaft 20, as well as a double-walled, steel reinforced bulkhead 8 (or Bulkhead #1) still located near the center of the sealed containment vessel the Unit (or Unit #2) of the invention is operating in. But instead of having a thick elastic strap 5 made of vulcanized natural rubber or synthetic rubber, a synthetic material that is much more tolerant of extreme temperatures and temperature differences is used for a new cold temperature strap 21. Dacron, Kevlar, or a combination of composite fibers Vectran and Dyneema, which are now used in commercial bow string construction, as well as metals used in some compound bows, are just some of the potential embodiments of materials that could be used to make the new cold temperature strap 21.

Figure 17:
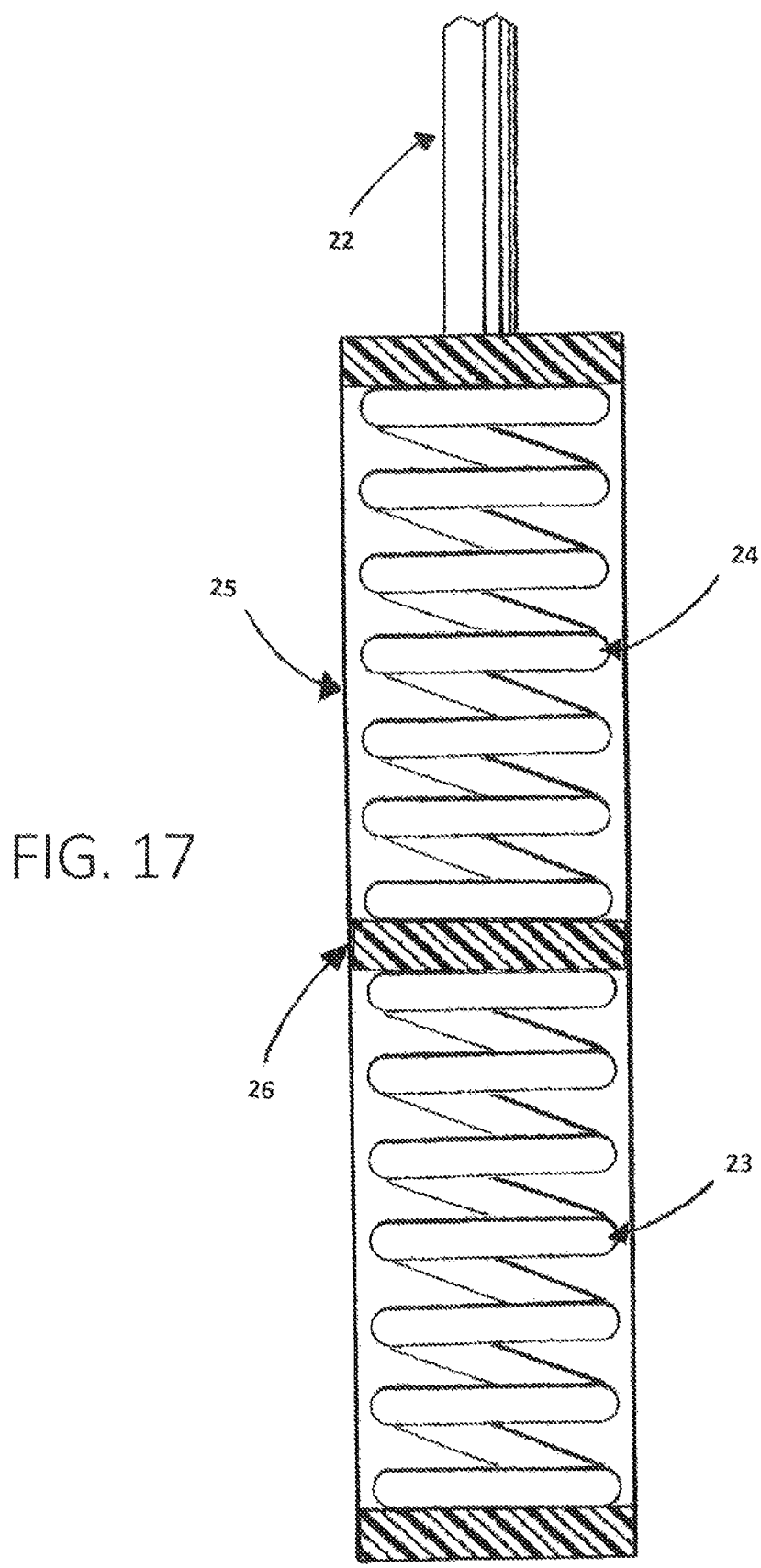
FIG. 17 shows the piston rod, the first equal length and strength compression spring, the second equal length and strength compression spring, and the three, low-friction, compression spring bumpers or buffers, with one at each end and one in between the two compression springs within the piston rod and compression spring's tubular housing.
Figure 18:
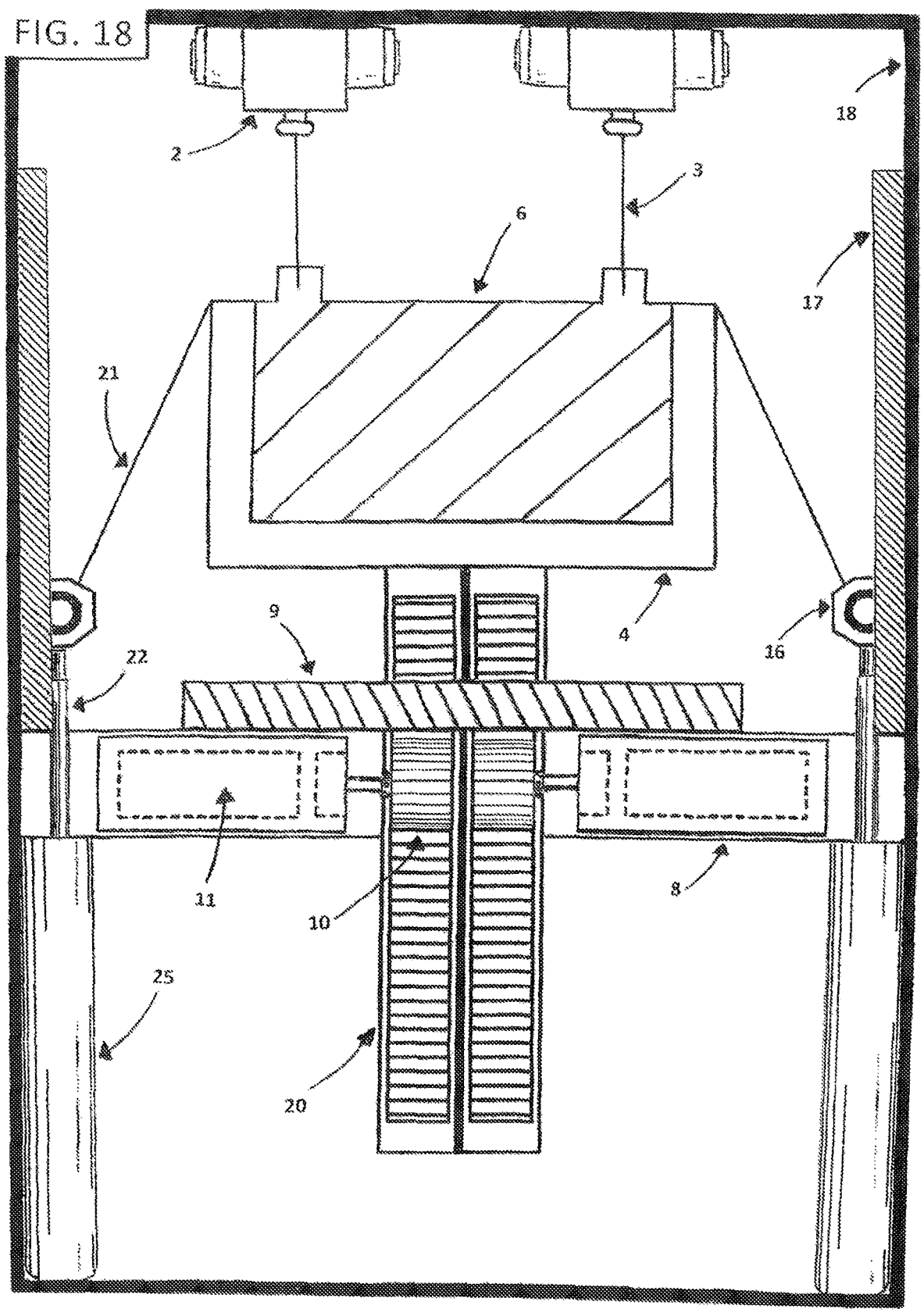
FIG. 18 is an overhead view of the second embodiment of the invention with a piston rod and compression spring's tubular housing added along both side walls of the sealed containment vessel on the far side of Bulkhead #1.

However, since these potential materials will not be anywhere near as elastic—meaning their ability to stretch is limited (usually less than 5% of natural rubber)—additional means to generate force during Phase 1 will be needed. This is accomplished by adding two separate units of an innovative new mechanical device to the system. Each new mechanical device will consist of a longitudinally movable piston rod 22 and two (or more) equal length and strength compression coil springs. The first equal length and strength compression coil spring 23 and the second equal length and strength compression coil spring 24 will be housed in a long, tubular, low-mass container, or the low-mass, piston rod and compression spring's tubular housing 25. This pair of self-contained units (see FIG. 17) within their long, tubular piston rod housings 25 will be located on the far side of Bulkhead #1, where they will join the spring-loaded piston 13, the vertical linear actuator 14 attached below it, as well as the long tail section of the rectangular-shaped steel shaft 20 containing the angular piece of steel 12, and will each be located and positioned horizontally along either side wall 18 of the usually pipe-shaped, sealed containment vessel (see FIG. 18).

While the first "action and reaction" combination in the first embodiment of the invention was sort of like a sling shot, the first "action and reaction" combination in the second embodiment of the invention is more like a bow-and-arrow, with the two piston rod housings 25 being the two ends of the flexible bow and the large mass object (object 1 or the projectile) being the arrow.

The smart connector end (not shown) of the piston rod 22 extending out from the end of the tubular piston rod housing 25 abutting Bulkhead #1 along either side wall 18 will pass through the two walls of Bulkhead #1 and connect to the metal side piece of the bracket 16 attached to the mounting block (or carriage) of the chain or belt-driven side-wall actuator 17 on either side of the Unit. Similar to what was done in the first embodiment of the invention, the bracket 16 that is securely attached to the mounting block of the side-wall actuator 17 and is basically an extension of it, is now holding a looped end 15 of the cold temperature strap 21 with its centrally located bolt and rotatable metal sleeve. The smart connector end of the piston rod 22 will connect to the side of the mounting block/bracket 16 using linkage that can be electronically locked or released by the control system 1 when needed. However, since the piston rod 22 will need to be pulled into the area occupied by the side-wall actuator 17 in order to generate the force needed to complete Phase 1, the two (or more) electric motor driven sprockets or pulleys within each side-wall actuator 17 will need to be able to turn freely in either direction. This will be accomplished by having their smart motors capable of being put into freely-turning-mode, which will continue up until the instant the block 4 makes contact with the impactor 9 during Phase 1.

Also, by having the smart connector end of the piston rod 22 capable of being extended out automatically from inside the piston rod 22 by basically placing another piston rod within the piston rod 22, doing so will eliminate the need to disconnect the smart connector end from the mounting block/bracket 16 upon the impact of the block 4 with the impactor 9 and would be another potential option (or embodiment).

Despite the fact that the invention will usually be operating in the microgravity environment of space, a spring (like a rubber strap) can still work just as it would on Earth. Similarly, as a spring does not use gravity but the application of force, it can certainly be used to perform useful functions in space. A spring (like a rubber strap) also possess the property of Restoring Force. As a result, the Spring Force (like the Elastic Force of a rubber strap) that is exerted by a compressed or stretched spring upon any object it is attached to, is also always acted upon by a Restoring Force that attempts to restore the spring and the attached object to its rest or equilibrium position.

However, for our intents and purposes, and also because it is an object of the invention to embrace Newton's Third Law of Motion (for every action, there is an equal and opposite reaction) and take advantage of it through innovative new types of "action and reaction" combinations (or pairs) to quickly and efficiently generate the force that is needed to subsequently produce a significant amount of thrust during each full cycle of the invention—and also do so without causing any movement whatsoever by the host vehicle during the first "action and reaction" combination and no net negative movement by the host vehicle during the second "action and reaction" combination during Phase 1—instead of using one thick elastic strap 5 as the elastic member and primary driver as is done in the first embodiment of the invention, two compression coil springs will be used together within each of the long, tubular housings 25 containing a longitudinally movable piston rod 22. By using the two compression coil springs as the elastic member and primary driver in the second embodiment of the invention, they will be able to combine with and help the cold temperature strap 21 at least be able to complete the second "action and reaction" combination during Phase 1 without causing a net amount of negative movement by the host vehicle as was done with the first embodiment of the invention.

This will be made possible by having the two compression coil springs within each piston rod housing 25 be of equal length and strength. It will also be done by having the two equal length and strength compression coil springs—which will have a low-friction, round-shaped, bumper or buffer 26 located between them that will also be used to securely connect them to each other—work together in concert to rapidly launch or propel the LMP forward at a high rate of speed during the second "action and reaction" procedure or maneuver of Phase 1.

But first, and also as part of another innovative new "action and reaction" procedure or maneuver, the second equal length and strength compression spring 24 will need to be fully compressed and the first equal length and strength compression spring 23 will need to be fully stretched by the middle bumper or buffer 26 connected to the end of the piston rod 22 within the piston rod housing 25—and without causing any movement by the host vehicle as ideally sought-after the piston rod 22 is pulled back by the cold temperature strap 21 and the winch 2 (or winches or similar devices) during the first "action and reaction" procedure or maneuver in Phase 1. By having the fully compressed second equal length and strength compression spring 24 pushing with equal and opposite force against the second wall of Bulkhead #1 while, at the same time, the first equal length and strength compression spring 23 is pulling the front, inside of the piston rod housing 25 with the same equal and opposite amount of force the instant the angular piece 12 is released by the piston 13 and vertical actuator 14, the large mass object (object 1 or the projectile) will be able to be propelled at a very high rate of speed toward the impactor 9 and also simultaneously push and pull the host vehicle (object 2 or the larger mass object) rapidly toward the front side of the block 4 while possessing an equal amount of kinetic energy and momentum as the LMP.

The reason why the host vehicle and the LMP will collide and compress the (potentially and preferably spring-using) impactor 9 from either side with the same amount of force (f=ma)—whether the second embodiment of the invention is being used in a Direction Control Unit or a Regular Unit of the invention—is due to how the same, but also the same but exact opposite, is done at the same time with the first equal length and strength compression spring 23 as is done with the second equal length and strength compression spring 24. For instance: instead of how the second equal length and strength compression spring 24 is compressed and its length is reduced as the LMP is pulled back by the smart winch 2 and pushed up against Bulkhead #1 during the first "action and reaction" combination during Phase 1, the first equal length and strength compression spring 23—which is directly connected to the second equal length and strength compression spring 24 by the round-shaped, low-mass, middle bumper or buffer 26 between them and also to the far end of the piston rod housing 25 by another bumper or buffer 26 that is connected to the third bulkhead of the sealed containment vessel (or Bulkhead #3)—is simultaneously being stretched and its length is increasing. Conversely, as the second equal length and strength compression spring 24 rapidly decompresses and grows in length after the LMP is released during the second "action and reaction" combination during Phase 1 because of Restoring Force, the first equal length and strength compression spring 23 is simultaneously contracting and reducing in length by the same exact amount, at the same exact rate of speed, as what is occurring with the second equal length and strength compression spring 24 as it is rapidly expanding.

With both Spring Force and Restoring Force, it doesn't matter whether the spring is compressed or stretched within the limits needed for it to maintain its structural integrity. As long as the spring is trying to return to its normal length or rest position, Restoring Force toward the spring's center will be maintained and an equal and opposite amount of Spring Force will be exerted at either end of the spring, whether the force being exerted is pushing or pulling the object it is connected to. This is also the case once an expanding or a contracting spring exceeds its equilibrium position, only immediately in the opposite direction and also with the opposite Restoring Force.

The most important factors to ensure that the expanding and contracting equal length and strength compression springs can both be used together to achieve the objectives of the invention during Phase 1 in the end will be to: (1) make sure that both compression springs are of equal length and strength; (2) make sure that both compression springs are connected to the piston rod housing 25 at either end and to each other in the middle; and, as a result, (3) that both compression springs are each the same length when in the rest position. If so, the first equal length and strength compression spring 23 and the second equal length and strength compression spring 24—because they are each trying to return to their natural length or rest position while they are either stretched or compressed—can be used together to generate the force needed to propel the LMP during Phase 1 without causing any unintended movement by the host vehicle. And better yet—because the second equal length and strength compression spring 24 will be decompressing and becoming longer in length due to Restoring Force after the LMP is released while, at the same time, the first equal length and strength compression spring 23 is simultaneously contracting and reducing in length due to Restoring Force pulling the objects at either end with equal force toward its center—together, they will each be simultaneously providing an equal amount of Spring Force that will be able to be used by the invention to accelerate the host vehicle and the LMP to the fullest extent possible the entire time that the two equal length and strength compression springs are exerting Spring Force upon them.

In addition to being able to use the two equal length and strength compression springs within the two piston rod housings 25 to generate a significant amount of force during Phase 1—and do it with the initial positive movement by the host vehicle almost immediately cancelled out by the negative movement caused later during the second "action and reaction" combination during Phase 1—a major benefit of being able to use the two equal length and strength compression springs to provide the conditions that will make it possible for the partially elastic collision to occur and ultimately result in the rebounding mass of the LMP being made available to produce thrust using either BM #1 or BM #2, will be the fact that this can all be done and still accelerate the large mass object (object 1 or the projectile) at, or very close, to its maximum possible acceleration rate and velocity before impact. This is because an object being pushed or pulled by a fully compressed or extended compression spring won't reach its top velocity or rate of speed as the spring expands or contracts due to Restoring Force until the compression spring reaches its equilibrium position—which is the exact midpoint of where the spring will be when it is at its natural length. So (even though the equal length compression and extension springs in the sixth embodiment of the invention will essentially do the same thing), if the two equal length and strength compression springs are configured to reach their natural length or equilibrium position just before the host vehicle and the LMP collide in a partially inelastic collision—and do so while possessing an equal amount of force and momentum—the objects being propelled by the two equal length and strength compression springs will either be at, or come very close to reaching, their highest potential (or optimum) acceleration rate and velocity.

And while there will be a little bit of continued motion by the two equal length and strength compression springs within the piston rod housing because of the equal and opposite amount of Spring Force being exerted at either inside end of the piston rod housing 25 as the two springs attempt to return to their rest position at the end of Phase 1, the continued movement (or oscillations), as just described, will be minimal. Moreover, because it doesn't matter (within reason) whether the two equal length compression springs are expanding or contracting—or what the spring constant is for the springs, which determines how stiff and strong a spring is—as they attempt to return to their rest position, their decreasing oscillations in either direction will quickly balance each other out and result in no net negative movement by the host vehicle. The fact that this will also be occurring while the initial positive movement of the host vehicle caused during the second "action and reaction" combination in Phase 1 is also coming into balance with the negative movement of the host vehicle caused during the partially inelastic collision in accordance with Newton's Third Law of Motion, the brief oscillations of the equal length and strength compression springs within the two piston rod housings 25 after they reach their equilibrium position and are simultaneously disconnected by their smart linkage from the mounting blocks/brackets, will almost be irrelevant.

And then there is the fact that the cold temperature strap 21 will continue to exert tension on the piston rod 22 and the back side of the block 4 up until just before the point of impact (just as what happens with the strap 5 in the first embodiment of the invention), and whose quick cancelling out of any potential adverse effects of the ending of this tension will also coincide with the two equal length and strength compression springs constantly pushing and pulling the host vehicle in the desired direction and causing positive movement the entire time they are decompressing and contracting by pushing against the second wall of Bulkhead #1 and pulling on Bulkhead #3. Fortunately, all these changes will occur very rapidly and result in no net negative movement of the host vehicle as a result of the second "action and reaction" combination during Phase 1. Even better, all these rapid changes will also occur before or have negligible adverse effect on the amount and strength of the kinetic energy and momentum of the rebounding mass of the LMP, which will then be free to be used to perform Breakthrough Method #1 or Breakthrough Method #2 to produce thrust.

Another advantage of using a mechanical device using a spring or springs instead of a strap 5 made of vulcanized natural rubber or synthetic rubber (or other similar devices or materials) during Phase 1, will be the ability of a spring to help generate more force than a rubber strap 5 in the same amount of available space. Naturally, the amount of space that is available or desired will determine the spring's load-displacement, which will include the spring's stiffness rate, load-range, and displacement range.

Similarly, using springs in some capacity in the construction of the impactor 9 might not only work better in colder temperatures than using winter tire rubber or even new rubber or synthetic rubber products being developed for extreme temperatures, but using springs could also help provide more force to propel the rebounding mass as a result of there being much less energy lost due to deformation. Wave springs and nonlinear springs (as well as other types of springs) are certainly potential options (or embodiments) that could be used to achieve improved results.

Figure 19:
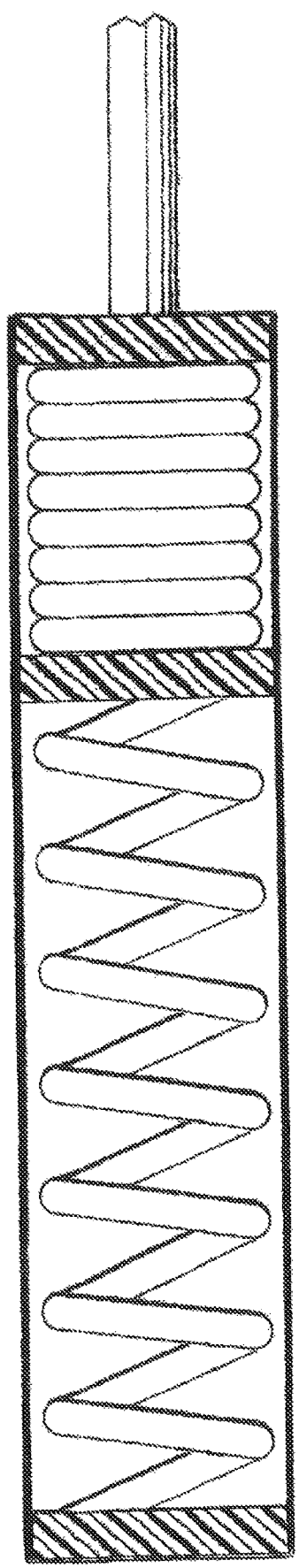
FIG. 19 shows an equal length and strength expansion spring and an equal length and strength compression spring within the piston rod housing
Figure 20:
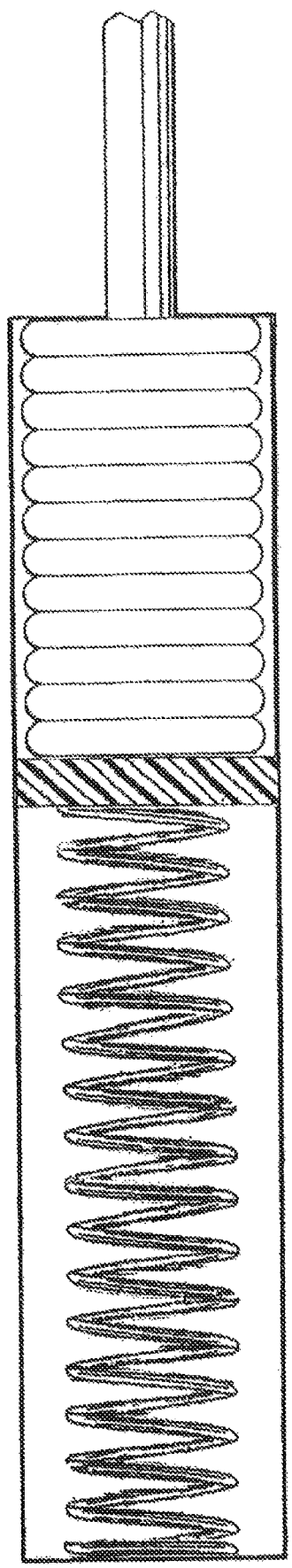
FIG. 20 shows a stronger compression spring and a longer but weaker compression spring within the piston rod housing.

And, of course, in an effort to increase the efficiency and Spring Force potential of the springs used within the piston rod housing 25, any of the spring or spring combinations that are described in other embodiments of the invention, or any others that could possibly be used to improve the performance of the second embodiment of the invention, may also be used. For instance, FIG. 19 shows an equal length and strength expansion spring and an equal length and strength compression spring within the piston rod housing. Then taking a step backwards, but also to show that less efficient and powerful combinations of springs are possible and could be used, FIG. 20 shows a stronger compression spring combined with a longer but weaker compression spring within the piston rod housing.

As with all the other previously described potential embodiments of components, parts, methods and/or systems used by the EdDrive Propellantless Propulsion System, any of the embodiments of components, parts, methods and/or systems that are described in the detailed description of the second embodiment of the invention, if possible, may be used in other embodiments of the invention.

Third Embodiment of the Invention

Figure 21:
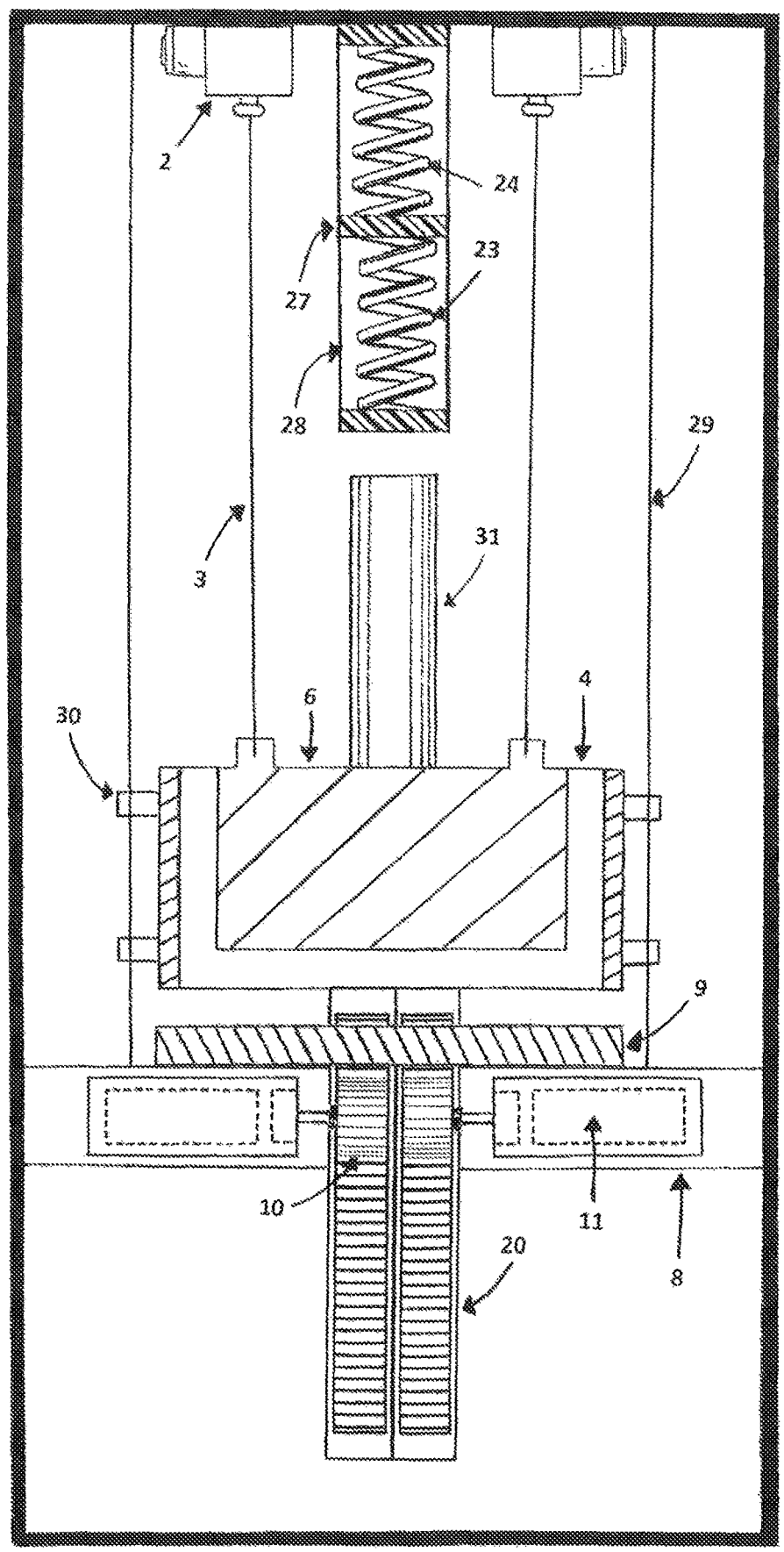
FIG. 21 shows an overhead view of the third embodiment of the invention with two equal length and strength compression coil springs within a propulsion spring's housing and a round-shaped rear shaft added to the back side of the main body (or block) of the LMP.

The third embodiment of the invention is similar to the first two embodiments of the invention in that it also uses a large mass object (object 1 or the projectile) as a rebounding mass after a partially inelastic collision to produce thrust during Phase 2. The third embodiment of the invention (or a Unit #3) likewise also uses a rubber or spring-using impactor 9 that is attached to the face of the first wall of Bulkhead #1 to minimize the potential negative effects of the repeated impacts between the host vehicle and the LMP. But how the LMP gets to the point of impact is done a little differently (see FIG. 21).

For starters, the third embodiment of the invention will not be using a thick elastic strap 5 or a cold temperature strap 21, and there will also be no need for the two side-wall linear actuators 17. However, the third embodiment of the invention will be borrowing from the second embodiment of the invention in its use of two, equal length and strength, compression coil springs to provide the equal and opposite amount of Spring Force needed to propel the host vehicle in the desired direction while, at the same time, also propelling the newly designed large mass projectile in the opposite direction (in this case still toward Bulkhead #1) in order for the partially inelastic collision to occur.

The third embodiment of the invention will also be using a new, self-contained, totally spring-powered unit or new embodiment of a mechanical device that can be used to generate force. This totally spring-powered new mechanical device that will be used by the third embodiment of the invention to propel the LMP during Phase 1, will primarily consist of two, large-diameter, equal length and strength, compression coil springs, and three, square-shaped, bumper or buffers 27, which will all be housed in a new, long, rectangular-shaped, low-mass container or propulsion spring's housing 28. Totally spring-powered, in this instance, also means that in addition to there being no strap 5 or cold temperature strap 21, there will also be no piston rod 22 being used in any way. However, the third embodiment of the invention will, at first, still be using the rectangular-shaped steel shaft 20, the four contact gears 10, as well as their four control mechanisms 11 in order to perform BM #1 (without harvesting and storing energy). And if BM #2 (with the harvesting and storing of energy) is used instead, either the oversized generators or the flywheels (or both), which will still be associated or combined with the control mechanisms 11 and be embedded in the double-walled, steel reinforced bulkhead 8 of Bulkhead #1, will also still be able to be used to harvest the kinetic energy of the rebounding mass of the LMP and simultaneously assist in producing thrust.

The third embodiment of the invention will also be making Bulkhead #2—from which it will be securely attached to the face of and prominently protruding out from—the location of the new, self-contained, totally spring-powered unit and sole origin of all the force and kinetic energy generated by the invention in the third embodiment of the EdDrive Electric-Powered Propellantless Propulsion System. The central location of the new, self-contained, totally spring-powered unit on the face of Bulkhead #2 will also mean it will need to be flanked on either side by a winch 2 or new winch-like device.

Because it will be using Bulkhead #2 as the sole origin of all the force and kinetic energy generated by the invention before the partially inelastic collision between the host vehicle and the front side of the main body (or block 4) of the LMP, the third embodiment of the invention is also able to get a little more creative by potentially using more new or somewhat new mechanical devices in order to perform the first two "action and reaction" procedures or maneuvers during Phase 1 and then successfully complete either Breakthrough Method #1 or Breakthrough Method #2.

The third embodiment of the invention is also the first of two embodiments of the invention (the sixth being the other) that are very similar in their structural composition and how they will each be able to complete the second "action and reaction" combination during Phase 1 using much fewer components than were used previously and also be able to increase the efficiency and thrust producing potential of the invention by combining two (or more) much larger diameter (or large-diameter) coil springs together within a single, low-mass, container or housing unit.

A spring piston gun uses a large diameter piston powered by a spring to force a smaller diameter barrel containing a projectile to be accelerated. The third embodiment of the invention will be using guide cables 29—preferably four and preferably made of a low-mass, stronger than steel, wound metal alloy—that will extend in one continuous piece from Bulkhead #2 to Bulkhead #1. Since the guide cables 29 will guide the large main body (or block 4) of the LMP—preferably consisting of a steel outer shell and a tungsten majority inner core—as it is rapidly being accelerated and then launched by the new, self-contained, totally spring-powered unit used as the primary driver and/or mechanical device to generate force during Phase 1, there will be no need for a smaller diameter barrel to guide the LMP. Instead, the new, self-contained, totally spring-powered unit—which will consist of a relatively long, rectangular-shaped, low-mass, propulsion spring's housing 28, two (although more of each could be added), large-diameter, equal length and strength, compression coil springs (the first equal length and strength compression spring 23 and the second equal length and strength compression spring 24), and three, square-shaped, bumpers or buffers 27 (one each at either end and one in between the two equal length and strength compression springs)—will be all that is needed to propel the LMP away from Bulkhead #2 at an extremely high rate of speed while, at the same time, also propelling the host vehicle in the desired direction with an equal and opposite amount of Spring Force so they can collide in a partially inelastic collision.

In addition to four new simple guide loops 30 that will preferably be built-in along the corner edges on the two sides of the steel outer shell of the block 4 (or main body of the LMP) for the guide cables 29 to pass through, there will also be at least two connector loops built into the back side (one on either side) of the metal connector for the metal cables or synthetic ropes 3 that will be used by the winches 2 (or other similar devices) to pull back the LMP so it can interact and ultimately be launched by the equal length and strength compression springs within the propulsion spring's housing 28. Still another possibility (or potential embodiment) to add additional mass to the LMP, and also provide more options in regard to more potential loops and their potential placement, will be to bolt a large metal plate (or plates) with the loops (guide or connector) already built into them onto the main body of the block. And even if the block 4 is tube or more bullet-shaped, either will be able to be done.

There will also be a new, relatively long, round-shaped, rear metal shaft 31 protruding out the back side of the main body of the LMP. The rear shaft 31 of the LMP will be long and round-shaped so that it will fit nicely through the round-shaped opening cut into the first square-shaped bumper or buffer 27 located inside, at the front end (the end farther away from Bulkhead #2), of the long, rectangular-shaped, propulsion spring's housing 28. From there, as the rear shaft 31 of the LMP passes through the first bumper or buffer 27 and continues to be pulled back into the propulsion spring's unit by the two winches 2 on either side of the propulsion spring's housing 28, the round-shaped end of the rear shaft 31 will also be passing through the center of the first (or outer), large-diameter, equal length and strength compression spring 23 until it eventually comes into contact with the solid, middle, square-shaped, bumper or buffer 27 located between and connecting the first equal length and strength compression spring 23 and the second equal length and strength compression spring 24.

But the two winches 2 won't stop pulling back the LMP once the end of the round-shaped rear shaft 31 comes into contact with the solid, middle bumper or buffer 27. Instead, the two winches 2 will continue to pull back the LMP, compressing the second equal length and strength compression spring 24 and also stretching the first equal length and strength compression spring 23 in the process. Only when the second equal length and strength compression spring 24 is fully compressed and the first equal length and strength compression spring 23 is fully expanded—and without doing any damage to either—do the winches 2 finally stop pulling the LMP back.

As already mentioned, the third embodiment of the invention will be using the rectangular-shaped steel shaft 20 (although other shapes or embodiments of a metal shaft could also be used) and related components when using either Breakthrough Method #1 or Breakthrough Method #2 to produce thrust during Phase 2. The reason for this is quite simple. Because the third embodiment of the invention will have the two, large-diameter, equal length and strength compression coil springs working together in concert to rapidly launch or propel the LMP forward, the second "action and reaction" procedure or maneuver, performed in large part by the fully compressed second equal length and strength compression spring 24 pushing with an equal and opposite amount of force against Bulkhead #2 while, at the same time, the first equal length and strength compression spring 23 is pulling the front, inside of the propulsion spring's housing 28 with the same equal and opposite amount of force the instant the angular piece 12 is released by the piston 13 and vertical actuator 14, the second "action and reaction" combination can be used in the same way that the second "action and reaction" combinations were used in the two previous embodiments of the invention to complete Phase 1. This means that—in keeping with the well-established principles of Newton's Third Law of Motion—the initial positive movement of the host vehicle, which had been caused by it simultaneously being pushed and pulled in the desired direction by the two equal length and strength compression springs within the propulsion spring's housing 28 as they also administered an equal and opposite amount of Spring Force to the end of the rear shaft 31 of the LMP to propel it in the opposite direction, can, as previously, also be used in combination with the negative movement caused by the LMP during the partially inelastic collision to ultimately result in no net negative movement by the host vehicle. And, just as importantly, as well as providing them each with an equal and opposite amount of force and momentum, the partially inelastic collision between the host vehicle and the LMP will also result in the rebounding mass of the LMP fully capable of being used to produce thrust using BM #1 or BM #2.

Whether it is done in a Direction Control Unit or a Regular Unit of the invention, the main reason this can be done as previously with basically no difference in the outcome of the partially inelastic collision (except for possibly the differences brought about by potentially having greater levels of kinetic energy and momentum to work with), is due to how the same, but also the same but exact opposite, is done at the same time with the first equal length and strength compression spring 23 as is done with the second equal length and strength compression spring 24. Just as before, instead of how the second equal length and strength compression spring 24 is compressed and its length is reduced as the LMP is pulled back by the smart winches 2 (or similar devices) and pushed up against Bulkhead #2 during the first "action and reaction" combination during Phase 1, the first equal length and strength compression spring 23—which is also directly connected to the second equal length and strength compression spring 24 by the middle bumper or buffer 27 between them—is simultaneously being stretched and its length is increasing. Or, as the second equal length and strength compression spring 24 rapidly decompresses and grows in length after the LMP is released during the second "action and reaction" combination during Phase 1 because of Restoring Force, the first equal length and strength compression spring 23 is also still simultaneously contracting and reducing in length by the same exact amount, at the same exact rate of speed, as what is occurring with the second equal length and strength compression spring 24 as it is rapidly expanding in the third embodiment of the invention.

With both Spring Force and Restoring Force, it doesn't matter whether the spring is compressed or stretched within the limits needed for it to maintain its structural integrity. As long as the spring is trying to return to its normal length or rest position, Restoring Force toward the spring's center will be maintained and an equal and opposite amount of Spring Force will be exerted at either end of the spring, whether the force being exerted is pushing or pulling the object it is connected to. This is also the case once an expanding or a contracting spring exceeds its equilibrium position, only immediately in the opposite direction and also with the opposite Restoring Force.

And also as before, the most important factors to ensure that the expanding and contracting equal length and strength compression springs can both be used together to achieve the objectives of the invention during Phase 1 in the end will be to: (1) make sure that both compression springs are of equal length and strength; (2) make sure that both compression springs are connected to the propulsion spring's housing 28 at either end and to each other in the middle; and, as a result, (3) that both compression springs are each the same length when in the rest position. If so, the first equal length and strength compression spring 23 and the second equal length and strength compression spring 24—because they are each trying to return to their natural length or rest position while they are either stretched or compressed—can be used together to generate the force needed to propel the LMP during Phase 1 without causing any net negative movement by the host vehicle as sought. And better yet—because as the second equal length and strength compression spring 24 is decompressing and becoming longer in length due to Restoring Force after the LMP is released and, at the same time, the first equal length and strength compression spring 23 is simultaneously contracting and reducing in length due to Restoring Force pulling with equal force toward its center—together, they will each be simultaneously providing an equal amount of Spring Force that will be able to be used by the invention to the fullest extent possible to accelerate the large mass object (object 1 or the projectile) the entire time that the round-shaped rear shaft 31 of the LMP is still in contact with the middle bumper of buffer 27 between the first equal length and strength compression spring 23 and the second equal length and strength compression spring 24. In fact, due to both springs actually being able to reach their equilibrium position—which is also when the LPM will reach its top potential acceleration rate and velocity—and there being a little more time between when the elastic members reach their equilibrium position and propel the LMP forward before the partially inelastic collision occurs compared to previously, not to mention all the extra canceling of movement that needs to happen in the first two embodiments of the invention and everything entailed in using the two side wall actuators, the control system 1 will have less to do and a little less electric power will need to be expended.

Still, everything will still happen incredibly quickly. Whether Breakthrough Method #1 (without harvesting and storing energy) or Breakthrough Method #2 (with the harvesting and storing of energy) is implemented by the control system 1, most of the round-shaped rear shaft 31 of the LMP will still be inside the propulsion spring's housing 28 when it breaks contact with the middle bumper or buffer 27. That means the LMP will be at its top acceleration rate and velocity without the LMP even exiting the propulsion spring's housing 28 and the front side of the block 4 will only need enough distance between it and the impactor 9, once the end of the rear shaft 31 breaks contact with the middle bumper or buffer 27, to complete BM #2. Moreover, if BM #2 is commenced within one or two milliseconds of the block 4 breaking contact with the impactor 9, and everything else is done properly, the total distance needed between Bulkhead #1 and Bulkhead #2 will be able to be reduced considerably compared to the first two embodiments of the invention. Needless to say, doing so will also dramatically reduce the distance needed to pull the LMP back in order to get ready for another round of thrust by the invention during the Recovery Time Period. Likewise, the amount of energy used to power the winches 2 will be reduced considerably. This is especially true considering how the LMP will be pulled back using very little energy because it will be done encountering very little resistance up until the point when the end of the rear shaft 31 comes into contact with the solid middle bumper or buffer 27 between the two equal length and strength compression springs—which, whether BM #1 or BM #2 is done just before, will be the same from that point on.

The short distance away from its point of origin, along with the means of generating force in the third embodiment of the invention, will also provide more options for the invention. This is especially true when it comes to backup or emergency purposes. One of the potential options (or new potential embodiment), will be to replace the smart winches 2 or similar devices with large, electric and electric motor-powered, smart cable reels. It will be relatively easy to do. They could even be located behind or within Bulkhead #2, from where they could provide a decent alternative, or even compliment, to the winches for any number of reasons.

Many other potential options (or new embodiments) will also be able to be utilized for locking and holding the LMP in place—or to assist in doing so. They would primarily be used once the second equal length and strength compression spring 24 is pulled back and fully compressed and, at the same time, the first equal length and strength compression spring 23 is fully extended during Phase 1. For instance, by placing a steel plate within the second (or middle) bumper or buffer 27 between the first 23 and second 24 equal length and strength compression springs within the propulsion spring's housing 28, any number of steel arms and/or attachments (see FIGS. 22a-22d) will be able to be attached to the steel plate that would extend out from it and pass into Bulkhead #2 when the second equal length and strength compression spring 24 is being compressed by the LMP. By making the proper sized openings in the third (or last) bumper or buffer 27 and the first wall of Bulkhead #2, the various steel arms and/or attachments that could possibly be used will be able to pass into (or even through) Bulkhead #2, where they could easily be secured by electronically controlled means. Moreover, they will also be able to be used to ensure that there is an equal and opposite amount of Spring Force applied to Bulkhead #1 and Bulkhead #2 when the attachment and the other possible means of locking and holding both ends of the LMP are released.

Figure 22D:
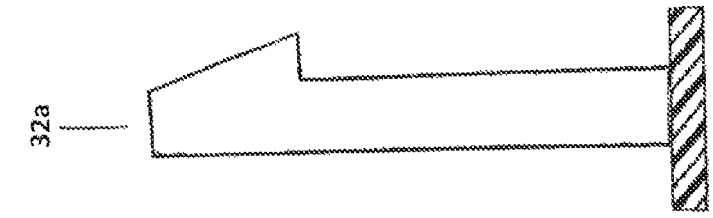
FIGS. 22a thru 22d show potential attachments to lock and hold the LMP in place or assist in doing so.
Figure 22C:
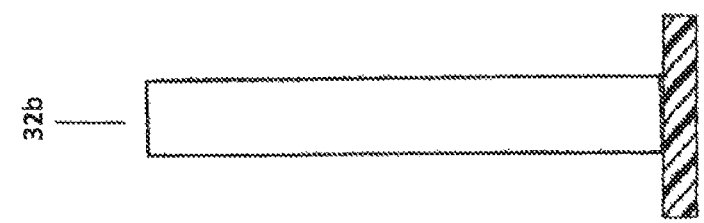
Figure 22B:
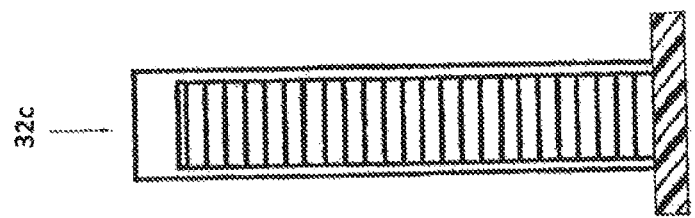
Figure 22A:
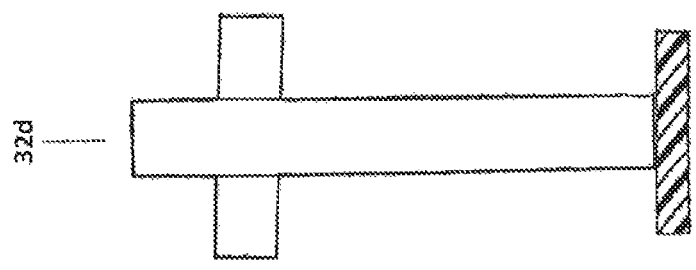

One such option (or potential embodiment) will be to use a simple steel arm or bar with a latch or hook or even an angular piece of steel at its end 32a (see FIG. 22a). The latter will be very similar to what was done previously with the square-shaped steel shaft 7—except this time it will be attached to a steel arm or bar that is extending out from a steel plate that was placed within the middle bumper or buffer 27 between the two equal length and strength compression springs.

Another option will be to add just a standard steel shaft 32b (see FIG. 22b) to the steel plate within the bumper or buffer 27 and use a system using magnets for lock mode. Permanent Magnets can be used by physically bringing the permanent magnet in contact and out of contact with the steel object being used for lock mode. Electromagnets can be turned on and off by simply providing or removing electric power. A Magswitch is a device that allows a magnetic field to be turned on and off like an electromagnet, but has no need for ongoing power to sustain a strong magnetic field. A Magswitch is also super strong, exhibiting up to 5 times the power of other magnet systems.

Then, of course, adding a second square-shaped (or any other shaped) steel shaft 32c (see FIG. 22c) and the respective or desired number of contact gears and control mechanisms instead of using a bar with a latch, hook or angular piece 32a, or a standard shaft with magnets 32b, is yet another possibility that could be done.

Still another possibility will be simple "Stoppers" 32d (see FIG. 22d) that can be deployed electronically by the second square-shaped steel shaft 32c (or any of the other attachments it could be used with) on the far side of Bulkhead #2 (by any means) in order to stop the second shaft 32c from being able to pass through. Likewise, if used with the square-shaped 7 or rectangular-shaped 20 (or any other shaped) steel shaft used to produce thrust in any of the embodiments of the invention, "Stoppers" 32d can be deployed as an emergency option (or for any other reason) to spring open or pop out, or be deployed by some other means, to stop the progress of the shaft through Bulkhead #1 (which, as with any of the other bulkheads, can be reinforced by any means using any material) in order to assist in producing thrust.

As already touched on, the third embodiment of the invention will also have three, square-shaped, low-friction, bumpers of buffers 27 within the propulsion spring's housing 28. The first (or front) and third (or last) will each be located at either inside end of the propulsion spring's housing 28, with each attached to the far end of each equal length and strength compression spring and also their respective inside end of the propulsion spring's housing 28. The second (or middle) bumper or buffer 27 will occupy the location between the two, large-diameter, compression coil springs of equal length and strength and be securely attached to each.

In addition, should a square-shaped steel shaft 7 be attached to the round-shaped rear shaft when the third embodiment of the invention is used (or any of those still to come), a square-shaped opening will be made in the middle and also the last bumper or buffer 27 for it to pass through. The first bumper or buffer 27 will, of course, have a larger round-shaped opening for the round-shaped rear shaft 31 of the LMP to pass through. The same will also hold true for any of the other potential embodiments of a steel shaft that may be used to pass through the bumpers or buffers 27 and be used to lock or hold the LPM in place or be used to perform some other task.

As with all the other previously described potential embodiments of components, parts, methods and/or systems used by the EdDrive Propellantless Propulsion System, any of the embodiments of the components, parts, methods and/or systems that are described in the detailed description of the third embodiment of the invention, if possible, may also be used in other embodiments of the invention.

Fourth Embodiment of the Invention

Figure 23:
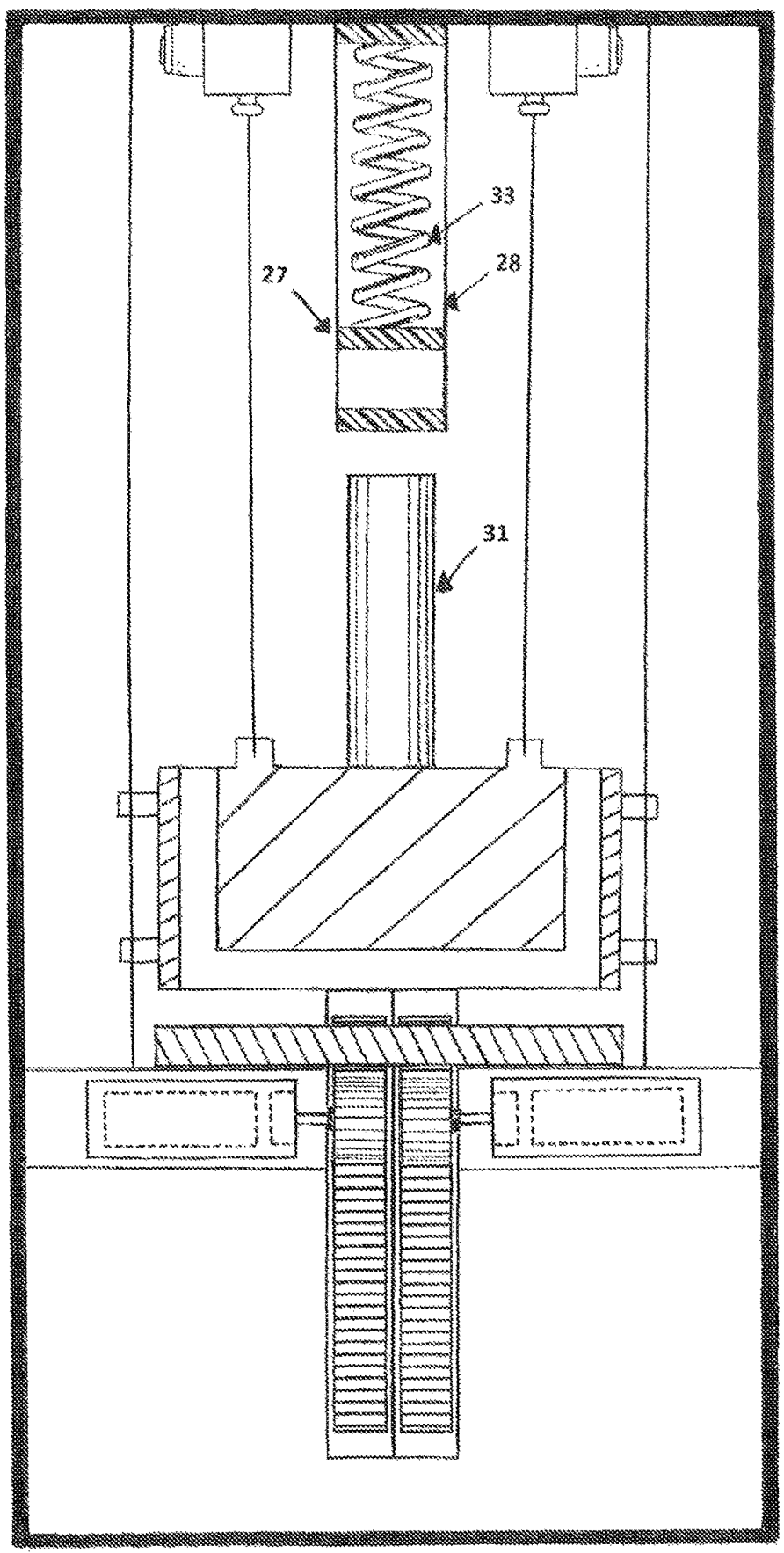
FIG. 23 shows an overhead view of the fourth embodiment of the invention with a single compression coil spring within the propulsion spring's housing.

The fourth embodiment of the invention (as shown in FIG. 23) looks basically the same as the third embodiment of the invention, except only a single, large-diameter, compression coil spring 33 is used in the construction of the propulsion spring unit within the propulsion spring's housing 28 instead of two, large-diameter, equal length and strength, compression coil springs. Because it only uses a single, large-diameter, compression coil spring 33, the fourth embodiment of the invention (or a Unit #4) isn't as efficient or as powerful as the third embodiment of the invention when using a propulsion spring's housing 28 of the same size. However, other than that, the first "action and reaction" combination used during Phase 1 by the fourth embodiment of the invention still causes no movement whatsoever by the host vehicle as ideally sought, the second "action and reaction" combination used during Phase 1 is the same in how the initial positive movement by the host vehicle is canceled out by a partially inelastic collision, and the rebounding mass of the LMP is subsequently also used to produce thrust during Phase 2 using either BM #1 or BM #2.

On the bright side, the fourth embodiment of the invention, even though it will just be using a single, large-diameter, compression coil spring 33 to launch or propel the large mass object (object 1 or the projectile) forward out from the propulsion spring's housing 28 in the direction of Bulkhead #1, it will still be able to be used to produce a significant amount of thrust. That is because after the fully compressed single compression spring 33 is released and simultaneously starts to decompress due to Restoring Force and propel the LMP at an accelerating velocity away from Bulkhead #2, it is still pushing with an equal and opposite amount of force against Bulkhead #2 on one side and the end of the round-shaped rear shaft 31 of the LMP on the other. And while it is certainly not the optimal or most efficient way to provide the LMP with kinetic energy, at least the force supplied by the compressed single compression spring 33 as it decompresses will be equal and opposite against Bulkhead #2 and also against the end of the rear shaft 31 of the LMP until the rear shaft 31 breaks contact with the low-friction, square-shaped, second bumper or buffer 27 attached to the moving end of the single compression spring 33. That then leaves the impact of the LMP with the impactor 9 and the partially inelastic collision between the host vehicle and the LMP to cancel out the positive movement caused while setting the LMP in motion, which will happen just milliseconds before BM #1 (without harvesting and storing energy) or BM #2 (with the harvesting and storing of energy) is implemented by the control system 1, and the kinetic energy of the rebounding LMP is then used to produce a significant amount of thrust.

Because the natural length of the single compression spring 33 will be shorter than the overall distance inside the propulsion spring housing 28, in addition to the LMP reaching its top possible acceleration and velocity just as the end of the rear shaft 31 is breaking contact with the second bumper or buffer 27, the moving end of the single compression spring 33 will simultaneously also be reaching its equilibrium position and top possible acceleration and velocity. This also means that the metal plate embedded within the second bumper or buffer 27 and the attached arm or bar or shaft if they are used to help lock and hold the LMP in place at the completion of the first "action and reaction" procedure or maneuver during Phase 1, will also be reaching their top acceleration and velocity when the second bumper or buffer 27 breaks contact with the end of the rear shaft 31 still within the propulsion spring's housing 28. But since the metal plate and arm or bar or shaft will all contain mass (as well as the spring itself), their kinetic energy will then produce a small amount of thrust in the undesired direction as the single compression spring 33 becomes fully extended after stretching beyond its natural length. The small amount of thrust in the undesired direction will, of course, be quickly counteracted and negated as the single compression spring 33 continues to oscillate back-and-forth within the propulsion spring's housing 28 until it finally reaches its natural length and rest position. However, since the metal plate embedded within the second bumper or buffer 27 and the attached arm or bar or shaft, if they are indeed used, will also have the potential to be used as the last thing locking and/or holding the single compression spring 33 in place before it is released. By using them to release the LMP, they will produce a significant recoil and positive movement by the host vehicle in the same direction of the momentum of the rebounding LMP, which will also be significantly greater than any negative movement caused directly by the spring during Phase 1.

Due to the reduced amount of thrust for the same available amount of space within the propulsion spring's housing 28, the fourth embodiment of the invention might not be the preferred embodiment when compared to the third or sixth embodiments of the invention (and certainly not when compared to the ninth embodiment of the invention), but it will work. For this reason alone, it must be included in the still growing list of potential embodiments of the invention.

As with all the other previously described potential embodiments of components, parts, methods and/or systems used by the EdDrive Propellantless Propulsion System, any of the embodiments of components, parts, methods and/or systems that are described in the detailed description of the fourth embodiment of the invention, if possible, may also be used in other embodiments of the invention.

Fifth Embodiment of the Invention

Because they will also work and should therefore also be included, the fifth embodiment of the invention will be comprised of several different potential embodiments of the invention that also don't complete both "action and reaction" combinations used during Phase 1 in a way or ways that perfectly or immediately cancel each other out and, therefore, also cause some back-and-forth movement by the host vehicle during Phase 1. They do, however, also cause positive movement by the host vehicle initially and can also make use of an impact and a partially inelastic collision between the host vehicle and whatever large mass object (object 1 or the projectile) that they may be using to ultimately produce thrust using BM #1 or BM #2.

Using a system based on the hyperloop is once such potential embodiment of the invention that could be used. A hyperloop is a sealed, reduced-pressure tube through which a pressurized capsule (or large mass object in our case) may travel free of friction on air bearings or by magnetic levitation and be driven by linear induction motors. If it is done inside a sealed tube with near vacuum conditions and also using a magnetic field to completely surround the large mass object (object 1 or the projectile) as it travels through the tube, according to Newton's Third Law of Motion, the force used to propel the LMP will be the same as the force of the impact of the LMP with the impactor 9 and Bulkhead #1 behind it. Unfortunately, they will each cause an equal amount of movement by the host vehicle in opposite directions during Phase 1 (or somewhat equal—the initial recoil will be somewhat greater than the opposite movement—due to friction, heat energy, noise energy and deformation losses before and after impact), but they will ultimately come very close to canceling each other out. Otherwise, the collision will still be a partially inelastic collision and the rebounding mass of the LMP will be free to be used to produce thrust by any of the embodiments of either BM #1 or BM #2 during Phase 2 that have been previously described or are otherwise possible.

One way to potentially lessen any potential damage to the LMP and/or the rubber or spring-using impactor 9 during impact, and also potentially enhance the velocity and kinetic energy of the rebounding mass, will be to add a rubber or synthetic rubber or spring-using bumper (or some other similar material or device) to the front side of the LMP that will go around where the square-shaped 7 or rectangular-shape 20 (or any other shaped) steel shaft is attached.

Perhaps not as effective, but a rubber or synthetic rubber layer or coating could also be placed around the entire LMP. These, of course, would be in addition to any potential embodiment of rubber or spring-using impactor 9 that could be used by the invention, including those made of or using: (1) vulcanized natural rubber; (2) synthetic rubber; (3) butyl rubber; (4) neoprene; (5) Latex; (6) Polyurethane; (7) adding graphene to any of the above for superior strength and durability; (8) new rubber products or other synthetic products for extreme temperatures being developed; (9) high performance fibers—Kevlar, Spectra, Dyneema, Zylon and many others; (10) spider's silk with or without carbon nanotubes (11) coil springs (12) wave springs; (13) nonlinear springs; (14) or any other type of spring or anything using a spring or springs of any type.

Another potential embodiment of the invention that could be used is one that uses compressed air to propel the large mass object (object 1 or the projectile) toward the impactor 9 in a sealed tube or by using guide cables 29 during Phase 1. Since, ideally, air will be used as a medium to heat the interior of the sealed containment vessel the Direction Control Unit or Regular Unit of the invention will be operating in, air will be readily available and could be reused to propel the LMP. With temperatures as low as minus 270 degrees Celsius or minus 450 degrees Fahrenheit normal in space, maintaining a temperature within the sealed containment vessel that the invention can safely operate in for extended periods of time will be an imperative. Having another potential embodiment of the invention that could use compressed air to propel the LMP—even if only for backup or emergency purposes—certainly couldn't hurt either.

Another potential embodiment of the invention that could be used is one that uses electromagnetic force to launch or propel a large mass object (object 1 or the projectile) by means of a sliding armature or some type of track during Phase 1. Potential embodiments of devices that currently use electromagnetic force to launch or propel objects or projectiles at high velocities include: electric cannons, electromagnetic railguns, electromagnetic railgun launchers, electromagnetic coil guns, and other electromagnetic force generating devices. And while an extensive amount of engineering would be needed to be done in order to make any of these potential electromagnetic devices a viable option to be used by the invention to generate the force that would be used to propel the LMP into the impactor 9 and Bulkhead #1 behind it during Phase 1, it is certainly possible and, therefore, they must be included.

Another potential embodiment of the invention that could be used to propel an object (object 1 or the projectile) toward the impactor 9 is any number of potential embodiments that are based on already mentioned and well-known technologies that are used to help describe other embodiments of the invention. They include: sling shots, bows, crossbows, spring piston guns, and others.

Another potential embodiment of the invention that could be used during Phase 1 to help propel an object (object 1 or the projectile) is related to the various other embodiments of devices that could be used that are either a winch, similar to a winch, or can perform the responsibilities of a winch. They include: (1) electric winch; (2) hydraulic winch; (3) pneumatic or air-powered winch; (4) manual winch; (5) smart winch; (6) any total number of winches or types of winches being used at one time or as backups; (7) any total number of winch-like devices; (8) cable reel; (9) electric-powered overhead or alternative pulley system; (10) electric-powered overhead garage door opener and closer type device; (11) belt-drive and/or ball screw driven side-wall linear actuators that could extend the full length of the side wall on either side; (12) hydraulic and other types of actuators; (13) manual-powered hand-cranks or pull chains or other manual-powered devices for any of the above; (14) robotic arm or arms; (15) linear electric motor; (16) conveyor belt or roller; (17) the generators of the control mechanisms run in reverse and used as motors to turn the contact gears and move the shaft back through the bulkhead until it is locked and/or held in place; (18) any other device that can perform the tasks or responsibilities normally associated with a winch.

Another potential embodiment of the invention that could be used to produce net positive thrust (although under most circumstances most likely not that much), would be to use a device with an electric-powered propeller that would be directly attached to the back side of the LMP. Since there will be air (or other combinations of gases) within the sealed containment vessel under ordinary conditions in order to provide a medium to provide warmth, the electric-powered propeller could certainly propel an object (object 1 or the projectile) along a rail or track, or be guided by guide cables 29 or by other means during Phase 1. As a result, it must also be included.

Additionally, the same will also go for any other means of propelling a large mass object (object 1 or the projectile) using innovative new "action and reaction" procedures or maneuvers toward or away from a steel reinforced bulkhead 8, or other strong structure of any kind, during Phase 1, and then use the mass of the LMP, or the rebounding mass of the LMP, during Phase 2—using any potential or possible embodiment of either BM #1 (without harvesting and story energy) or BM #2 (with the harvesting and storing of energy)—to produce net positive thrust and either push or pull the host vehicle in the direction of the LMP's (or LMPs') momentum.

As with all the other previously described potential embodiments of components, part, methods and/or systems used by the EdDrive Propellantless Propulsion System, any of the embodiments of components, parts, methods and/or systems that are described in the detailed description of the fifth embodiment of the invention, if possible, may be used in other embodiments of the invention.

Sixth Embodiment of the Invention

Figure 24:
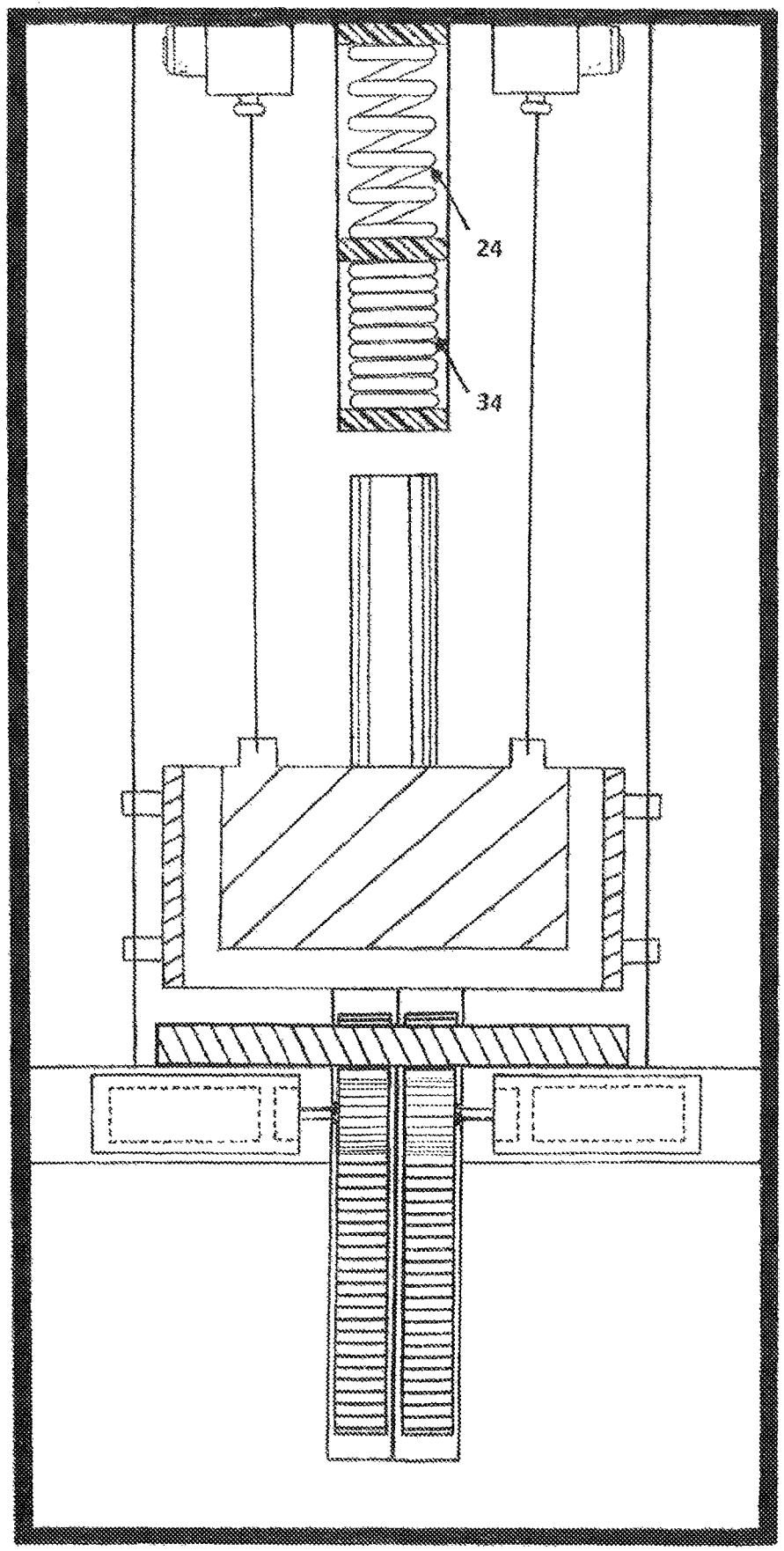
FIG. 24 shows an overhead view of the sixth embodiment of the invention with an equal length and strength compression coil spring and an equal length and strength extension spring within the propulsion spring's housing.

The sixth embodiment of the invention (as shown in FIG. 24) is very similar to the third embodiment of the invention in that it also uses two, large-diameter, equal length and strength springs within a propulsion spring's housing 28 as the main driver to achieve the objectives of the invention during Phase 1. These objectives are, of course, first, to not cause any movement whatsoever by the host vehicle during the innovative new first "action and reaction" procedure or maneuver (or embodiment), second, to also cause no net negative movement of the host vehicle by making use of a partially inelastic collision between the host vehicle and the LMP during the second "action and reaction" procedure or maneuver (or embodiment), and third, to also make it possible for the rapidly rebounding LMP to possess the most amount of kinetic energy possible to produce thrust during Phase 2 using BM #1 or BM #2. That then leaves the main difference between the third and sixth embodiments of the invention being that the sixth embodiment of the invention (or a Unit #6) also requires the use of a new and different type of spring to further improve the overall performance and thrust producing capabilities of the EdDrive Propellantless Propulsion System beyond what is able to be achieved with the third embodiment of the invention.

Compression springs are a type of open coiled, helical spring that are designed to oppose the compression set along the wind axis. Compression springs are usually either fitted inside a hole or placed on a rod. When a load is applied on a compression coil spring, it tries to push back the load in order to attain its natural length or rest position. Compression springs offer excellent resistance against linear compressing forces, which makes them very energy efficient devices.

Every spring is a flexible mechanical element and should undergo a large amount of elastic deflection. This deflection may be either elongation or reduction in length of the spring. Both compression and extension springs are basically helical springs (coil springs), although they are made to serve two different purposes. In the case of a helical compression spring, the external force tends to compress the spring. Thus the length of such a spring reduces when subjected to external loading. On the other hand, an extension spring undergoes incremental elongation in length when subjected to external loading. One of the crucial purposes of every spring is to store mechanical energy when it is elastically deformed (elongated or compressed) by external loading and then release that energy by regaining its original shape upon removal of the external load. Under the action of external load, a compression spring will shorten in length, storing energy within it. Such a loaded spring will continuously push the connecting members with an equal and opposite amount of force in order to try to expand its own length and revert back to its original position by releasing stored energy. Conversely, an extension spring will store energy when it is elongated by the action of external load. As a result, it will continuously pull the connecting members with an equal and opposite amount of force in order to return to its natural length or rest position by releasing the stored energy.

The actual length of any helical spring in unloaded condition is called its free or natural length. The length of any helical spring when it is fully compressed is called its solid length, and this indicates the minimum possible length of any helical (extension or compression) spring. In order to facilitate compression in axial length under the action of external load, a sufficient gap must be provided between adjacent coils of a compression spring. If so, such a spring can be compressed until adjacent coils touch each other (or until solid length is achieved). On the contrary, extension springs are not meant for compression and thus the gap between adjacent coils are not necessary when it is at its natural length or in the rest position. Naturally, this gap will increase when such coils are subjected to tensile loading. Thus extension springs can be wound tightly to minimize longitudinal space requirements without sacrificing spring stiffness.

The third embodiment of the invention uses two, large-diameter, compression coil springs of equal length and strength (or possessing the same spring constant, which measures how stiff and strong the spring is). In the third embodiment of the invention, the first equal length and strength compression spring 23 and the second equal length and strength compression spring 24 are, when in use, also either always compressing or expanding until they reach their rest position. As a result, the first and second equal length and strength compression springs—because they are always trying to return to their natural length and rest position—can be used together to help generate the force needed to propel the LMP during Phase 1 at a high rate of speed without causing any unintended movement by the host vehicle. Using two equal length and strength compression springs together will also split the responsibilities and lessen the physical and structural requirements of each compression spring. Still, the elastic limit of two equal length and strength compression springs is somewhat limited. This is especially true when it comes to stretching the more powerful and thicker bar diameter hot wound compression springs (some with bar diameters of at least two inches and overall diameters of over 18 inches) that may be needed to propel large spacecraft and other host vehicles. And while combining two or more compression springs together instead of using just one spring for each to do the stretching on one side and the compressing on the other is also always a possibility, if two, large-diameter, equal length and strength, helical coil springs are going to be used together to provide a high amount of potential Spring Force—which means at some point one spring will need to be fully compressed while the other is fully elongated—replacing the first equal length and strength compression spring 23 within the propulsion spring's housing with a large-diameter, equal length and strength, helical expansion spring 34 is certainly another and potentially superior option.

The sixth embodiment of the invention does exactly that. By doing so—because an equal length and strength expansion spring 34 is much more suited for the stretching responsibilities of the two springs (one compression and the other expansion) which will simultaneously be used together to generate force during Phase 1 within a Direction Control Unit or Regular Unit of the invention using the sixth embodiment of the invention—the amount of force that can be generated and subsequently used to produce thrust during Phase 2 will be able to be increased. Likewise, the amount of acceleration or deceleration that can be achieved each full cycle or round of thrust by increasing the amount of force that can be used to propel the large mass object (object 1 or the projectile) at a greater velocity will also be able to be increased.

Additionally, the accumulated wear and tear on the equal length and strength expansion spring 34—which will be performing its responsibilities as intended—in most instances, will be less over time than if a compression spring of equal strength is used instead. Also, if the equal length and strength expansion spring 34 used instead of the first equal length and strength compression spring 23 for stretching or elongating purposes is to any degree more efficient from an overall energy usage perspective, the sixth embodiment of the invention will be more energy efficient as well. Lastly, since extension springs are not meant for compression and thus the gap between adjacent coils are not necessary, the available length within the long, rectangular-shaped, propulsion spring's housing 28 that can be used to generate force during Phase 1—and ultimately propel the LMP at the greatest potential velocity possible so its kinetic energy can be used to perform BM #1 (without harvesting and storing energy) or BM #2 (without the harvesting and storing of energy) during Phase 2 to create thrust—will also be increased if an equal length and strength extension spring 34 (or even a torsion or other tension spring) is used instead of the first equal length and strength compression spring 23 and the propulsion spring's housing 28 is the same length.

Thanks once again to Newton's Third Law of Motion (for every action, there is an equal and opposite reaction), the sixth embodiment of the invention will be able to perform the two "action and reaction" procedures or maneuvers during Phase 1 in a way that will make it possible for the first "action and reaction" pair to perfectly cancel each other out without causing any movement whatsoever by the host vehicle as ideally sought and the second "action a reaction pair to cause no net negative movement by the host vehicle as was done in the third embodiment of the invention. By being able to permanently attach the front inside end of the equal length and strength extension spring 34 to the front inside of the propulsion spring's housing 28 by the first (or front) bumper or buffer 27 (or the open end farthest away from Bulkhead #2), and by also being able to attach the back end of the accompanying second equal length and strength compression spring 24 and its attached third (or last) bumper or buffer 27 directly to the face of the first wall of Bulkhead #2, when the LMP is released by the control system 1, there with be an equal and opposite amount of Spring Force exerted in either direction on the host vehicle and the LMP by the Restoring Force of the rapidly contracting equal length and strength extension spring 34 and the simultaneously rapidly decompressing second equal length and strength compression spring 24.

Once the LMP is released by whatever means are used to lock and hold it in place by the control system 1, the middle bumper or buffer 27 between the rapidly contracting equal length and strength extension spring 34 and the rapidly decompressing second equal length and strength second compression spring 24 that the round-shaped rear shaft 31 of the LMP is simultaneously being pulled and pushed (or propelled) by will continue to rapidly accelerate until the equal length and strength extension spring 34 fully contracts and returns to its natural length and equilibrium position and the accompanying second equal length and strength compression spring 24 fully decompresses and returns to its natural length and equilibrium position. At this point, the LMP—with the end of its rear shaft 31 still within the propulsion spring's housing 28 by a distance equal to the natural length (or solid length) of the equal length and strength extension spring 34—will be traveling at its top possible velocity or rate of speed and it will possess the same amount of momentum as the positively moving in the opposite direction host vehicle.

According to industry literature, if it is done without causing any permanent damage to the extension spring or the compression spring (or any other type of spring for that matter), there is only a relatively small amount of difference between the amount of energy that is used to either stretch an extension spring or compress a compression spring until either is fully extended or compressed and the difference in the amount of potential energy that is contained within the extension spring when it is fully extended and a compression spring when it is fully compressed. Furthermore, there will also only be a relatively small amount of difference between the amount of potential energy contained within a fully extended extension spring and a fully compressed compression spring and the difference in the amount of kinetic energy possessed by the LMP once the rear shaft 31 breaks contact with the middle bumper or buffer 27 between the two springs just after they reach their equilibrium position. In fact, due to the relative simplicity and reduction in the number of moving parts in the sixth embodiment of the invention—not to mention the high level of efficiency of the springs and how they are being used, as well as how many of the remaining parts or components that are electric powered are made as efficient as possible—the greatest percentage of the total amount of energy thus far used by the invention during Phase 1 will be able to be harvested and stored using Breakthrough Method #2 than was previously able to be harvested and stored in any of the other embodiments of the invention.

Breakdown of approximate energy use by the sixth embodiment of the invention:
(1) AI-enhanced control system: 30 watts per hour for AI-chip now used in many robots (or the same amount of electricity used by a 60-watt light bulb), or 50 watts per hour for AI-chip or board now used in some self-driving cars, or 100 watts for AI-chip or board with two AI-chips combined together on one board for redundancy and security purposes. 100 watts divided by 300 cycles per hour=0.3 watts per cycle.
(2) Electric smart winch: Current Brushless DC (BLDC) electric motors that can be used with the new, custom-made winch-like devices that will be an option to be used by the invention can typically achieve efficiencies in excess of 90%. AC Induction motors that can also be used by the invention instead of the BLDC motors can typically achieve efficiencies in the neighborhood of 90%. And that's using commonly and readily available technologies that can certainly be improved. Also, current winch technologies weren't exactly designed with energy efficiency as a top priority. Line speeds in excess of 100 feet per minute and pulling capacities of up to 130,000 lbs. were more of a priority. Fortunately, the custom made winch-like devices that can be used with the invention will do more to address heat and noise energy losses, as well as other factors related to design and structural concerns (more on that later). As a result, these new, winch-like devices can be expected to achieve efficiencies of 75% or better.
(3) Actuators and control mechanisms used to release the various mechanical devices locking and holding the LMP in place: (>10 watts per cycle)
(4) Generating the kinetic energy of the LMP: As previously described, other than the major loss of energy used to cancel out the initial positive movement of the host vehicle with the partially inelastic collision, there will be a slight difference between the amount of energy used to compress and stretch the springs within the propulsion spring's housing and the amount of kinetic energy possessed by the LMP when contact is broken with the middle bumper or buffer. Total losses: (<50%)
(5) Loses incurred during impact: A spring-using impactor will be more efficient than one using rubber or a similar material. Total losses: (>5%)
(5) Losses incurred by gears and generators: (typically 80% to 85% efficiency—although incremental improvements are certainly possible).
(6) Losses incurred by flywheels: (typically flywheels with magnetic bearings and high vacuum can maintain 97% mechanical efficiency and 85% round trip efficiency—although incremental improvements are certainly possible).
(7) Supercapacitors: (generating efficiencies up to 97.94%). Total efficiency of the sixth embodiment of the invention: approximately 20% to 25% and potentially greater.

This ability of the invention to harvest and store and, in effect, easily reuse a significant amount of the electric power that is used in the normal operation of the invention will certainly be put to good use. And while new space stations, gateways, and even large docking hubs, as well as large cargo carriers and other large spacecraft, would likely choose to use (if no other options were available) the third or sixth embodiments of the invention in part due to their potential to incorporate two or more, large-diameter, hot wound, springs together in one unit that will be able to equally share and fulfill all the force generating responsibilities of the unit, the third or sixth embodiments of the invention, using just two springs, will also be more than adequate to be used with small and mid-sized spacecraft or other similar sized host vehicles. And then, of course, if two or more extension springs or compression springs were combined together instead of using just one to perform the stretching and compressing duties, each combination of springs would be able to equally share and fulfil the force generating responsibilities of the multi-expansion and compression spring units within the (most likely) longer propulsion spring's housing.

Being able to harvest and store and also reuse a significant amount of the energy ultimately used to produce thrust will also decrease the size of the primary energy source (or sources) needed to power the individual units of invention and also the remainder of the host vehicle. Due to their length and amount of open areas, there will certainly be plenty of room within the sealed containment vessels the different potential embodiments of the invention will be operating in to accommodate whatever energy sources and storage devices may be used. However, using fewer and smaller energy sources will also cost less. A small satellite powered by one or more solar panels and a bunch of supercapacitors (and/or even batteries) using the sixth (or even the third) embodiment of the invention would certainly be a low-cost option. It might take a little longer between rounds of thrust at times due to energy constraints, but it will no doubt be able to eventually get to wherever it wants to go.

As with all the other previously described potential embodiments of components, parts, methods and/or systems used by the EdDrive Propellantless Propulsion system, any of the embodiments of components, parts, methods and/or systems that are described in the detailed description of the sixth embodiment of the invention, if possible, may also be used in other embodiments of the invention.

Seventh Embodiment of the Invention

Figure 25:
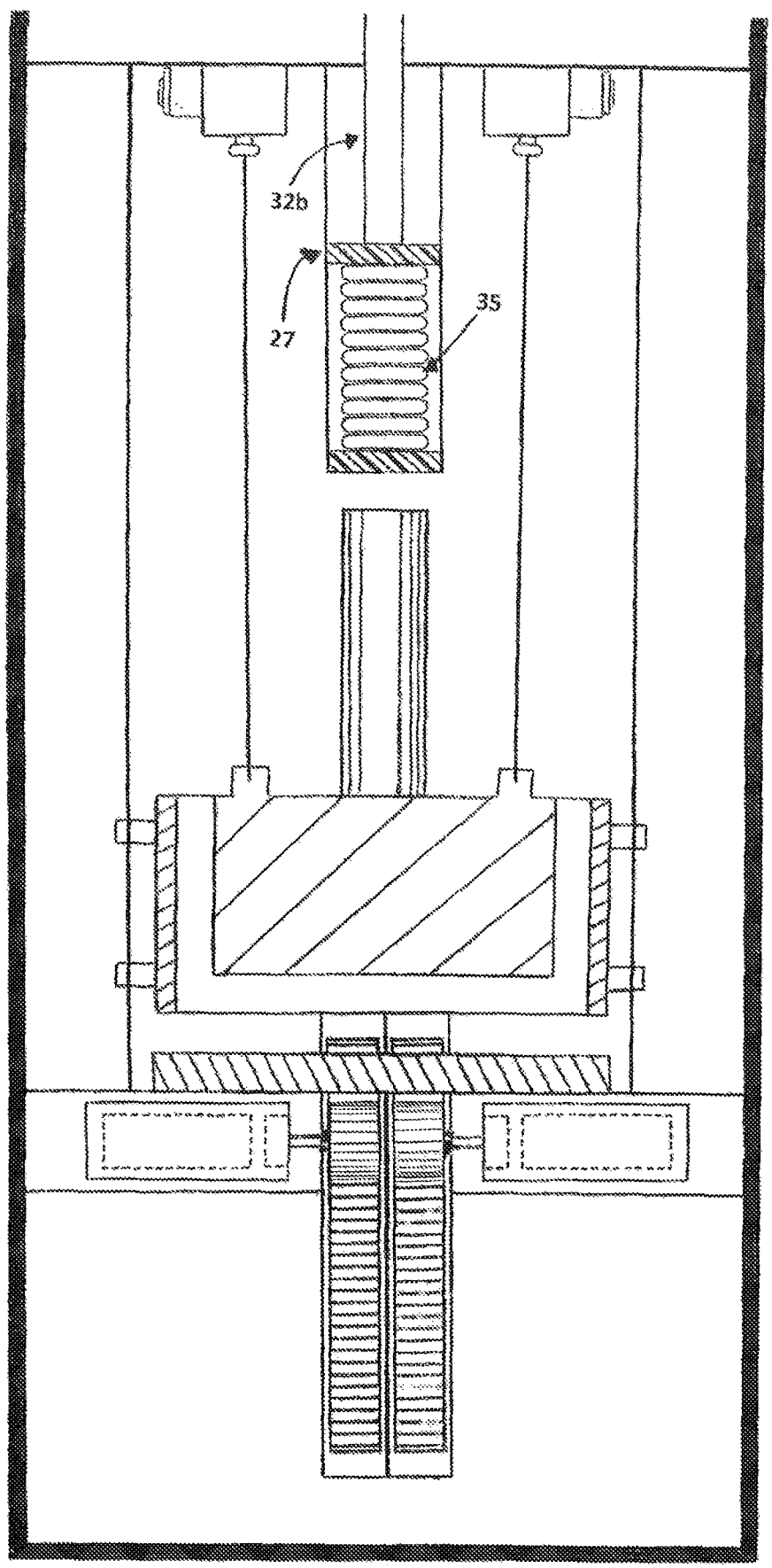
FIG. 25 shows an overhead view of the seventh embodiment of the invention with a single extension spring within the propulsion spring's housing and a shaft attachment being used with the back bumper or buffer.

The seventh embodiment of the invention (as shown in FIG. 25) goes one step farther beyond what was done in the sixth embodiment of the invention. The seventh embodiment of the invention (or a Unit #7) does this by replacing the two, large-diameter, equal length and strength extension and compression springs within the long, rectangular-shaped, propulsion spring's housing 28 with just a single, large-diameter, extension spring 35. But, unfortunately, the seventh embodiment of the invention is very similar to the fourth embodiment of the invention and suffers from many of the same difficulties.

In the fourth embodiment of the invention, only a single, large-diameter, compression spring 33 is used to propel the large mass object (object 1 or the projectile) and simultaneously cause positive movement by the host vehicle when the LMP is released during Phase 1. The main problem with using only the single compression spring 33 in the fourth embodiment of the invention is the reduced amount of force that can be generated to carry out the objectives of the invention during Phase 1, which also results in less thrust being produced during Phase 2 using BM #1 or BM #2.

The same problems also exist in the seventh embodiment of the invention. Moreover, because, while the single compression spring 33 in the fourth embodiment of the invention is pushed back and fully compressed by the LMP in order to generate the equal and opposite amount of Spring Force pushing against Bulkhead #2 and the LMP as the LMP is rapidly accelerated away from Bulkhead #2, the single extension spring 35 used in the seventh embodiment of the invention—even though it will essentially be attached to both the front and back of the long, rectangular-shaped, propulsion spring's housing 28 when the LMP is released—instead of pushing against Bulkhead #2, the single extension spring 35 will be simultaneously pulling the host vehicle in the same direction as Bulkhead #2 (or at least in respect to Bulkhead #1) with an equal and opposite amount of Spring Force as it is rapidly accelerating the LMP in the opposite direction and also providing the host vehicle and the LMP with an equal amount of force and momentum. So, in essence, the same exact thing will occur when using the single compression spring 33 as when using the single extension spring 35.

As with all the other previously described potential embodiments of components, parts, methods and/or systems used by the EdDrive Propellantless Propulsion System, any of the embodiments of components, parts, methods and/or systems that are described in the detailed description of the seventh embodiment of the invention, if possible, may be used in other embodiments of the invention.

Eighth Embodiment of the Invention

Figure 26:
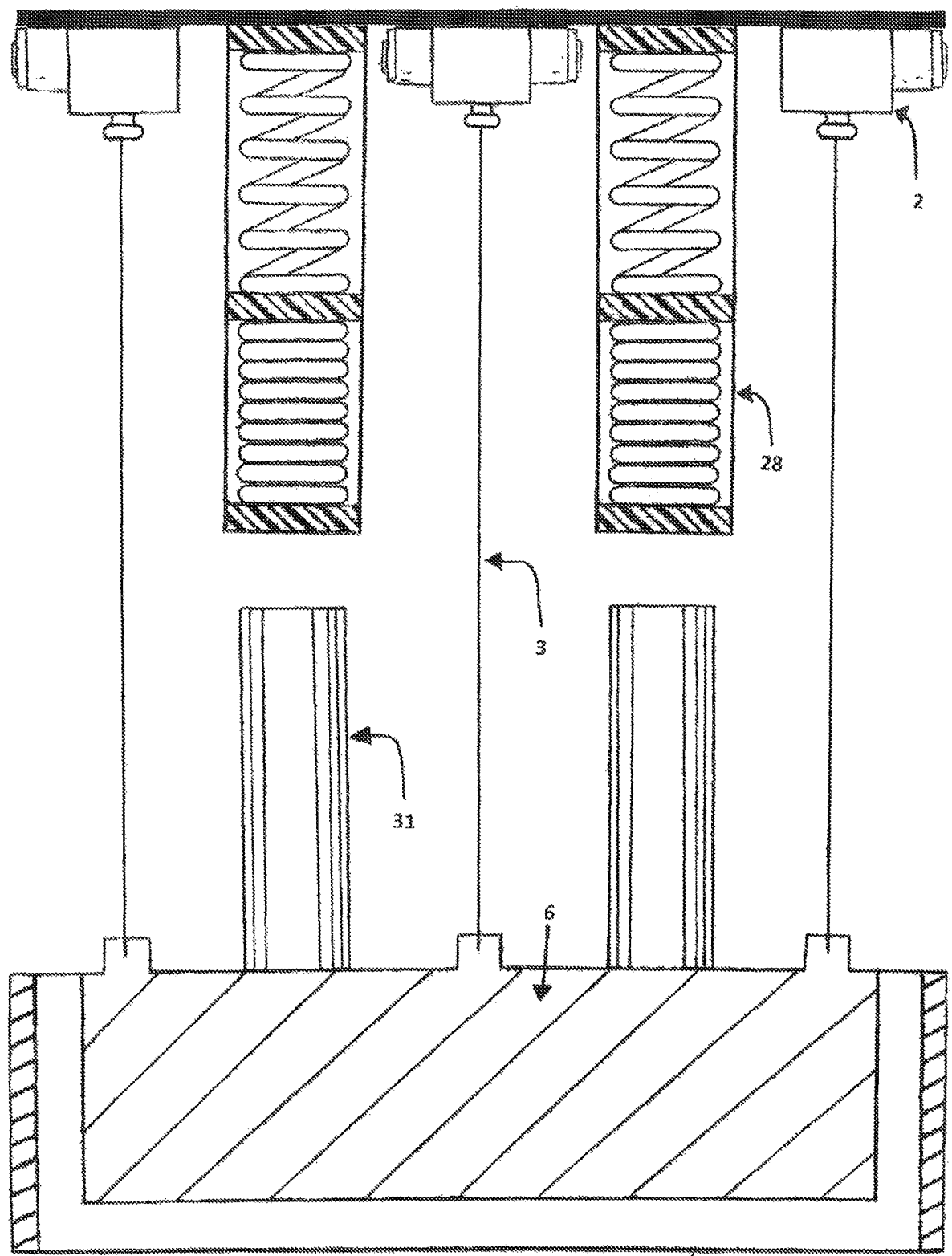
FIG. 26 shows an overhead view of the eighth embodiment of the invention with two propulsion spring's housings, two round-shaped rear shafts, a much larger main body of the LMP, and three winch-like devices.

The eighth embodiment of the invention (as shown in FIG. 26) is primarily concerned with the use of very large springs (although it can also pertain to the use of very large elastic straps or similar devices) to generate the force during Phase 1 that is needed—using any of the previously described embodiments of the invention or others that may be possible—to propel the large mass object (object 1 or the projectile) and subsequently use its kinetic energy to produce thrust during Phase 2 by successfully completing either BM #1 (without harvesting and storing energy) or BM #2 (with the harvesting and storing of energy). In some instances, the use of multiple smaller springs instead of using one or more very large springs may be necessary or be a much more practical option—especially when it comes to propelling very large mass host vehicles. In order to deal with this eventuality, the eighth embodiment of the invention provides yet another option.

Since the LMP (especially really large ones) will be able to be constructed with multiple, round-shaped, rear shafts 31 connected to and protruding out from the main body (or block 4) of the LMP, there is also no reason why multiple, long, rectangular-shaped, propulsion spring's housings 28 and their various units—including those that may be housing compression, or compression and extension, or just extension springs—can't be used at the same time. By using multiple propulsion spring's housings 28 and their various units, the springs within them will be able to be made much smaller than those that would be needed to achieve the same ratios as the 1 kilogram test prototype, yet, when combined, will still be able to generate the same amount of force needed to propel the LMP during Phase 1. And due to how using multiple smart winches 2 (or similar devices) at the same time in order to complete the first "action and reaction" procedure or maneuver during Phase 1 is certainly possible (although using more than two or three may not be the most energy efficient potential option or embodiment), in this instance, it also makes a lot of sense if there is no other alternative.

Fortunately, when it comes to very large spacecraft and other very large mass host vehicles, there are other alternatives. Very powerful hydraulic winches are a common product that are commercially available and their components could be cannibalized or otherwise used in other new types of winch-like devices that may be constructed for the invention. Also, even more powerful hydraulic actuators with extendable and retractable piston rods could be used. Their reach will almost certainly be shorter than devices using cables, but they could be combined with devices using cables (which should have little difficulty pulling the LMP back regardless of how big or how much mass it contains until it makes contact with a bumper or buffer) and connects to the LMP once the round-shaped rear shaft 31, or shafts 31, makes contact with the solid surface of the bumper or buffer 27 it will be pushing against. From there, the much more powerful hydraulic actuators can take over the responsibilities of pulling the LMP back until it is locked and held in place by whatever means of doing so are used. Thus, if powerful hydraulic actuators are indeed used in this or similar ways, there really is no spring (or even elastic strap) made today that they couldn't compress or stretch.

Very large mass spacecraft and other very large mass host vehicles will also be using powerful fission reactors. That includes fission reactors that will be able to continuously produce in excess of two megawatts (<2 MW) of electric power per hour, and do so for several years. So meeting the power needs of multiple units, including those housing any number of different combinations of springs, won't be a problem. This is especially true when you consider how the total amount of energy needed to compress or stretch a spring is just a little more—or very close to—the amount of potential energy contained (or stored) within a compressed or stretched spring afterward. Then there is all the harvested energy that will be harvested and reused if an embodiment of BM #2 is used to produce thrust. Also, due to how each Direction Control Unit or Regular Unit of the invention will almost certainly have plenty of space to accommodate all its energy needs within the sealed containment vessel or other location where the embodiment (or embodiments) of the invention are operating in, each DCU or Regular Unit of the invention will be able to be made energy self-sufficient if so desired.

Very large mass spacecraft and other very large mass host vehicles will also, in most instances, be very large in size as well. So providing the surface area on a steel reinforced bulkhead 8, or on another large and strongly constructed surface that will assuredly be needed to accommodate multiple propulsion spring's housings 28 and any number of different combinations of propulsion springs, also shouldn't be a problem. Bottom line: if it is capable of being built or assembled in space any time in the not too distant future, the many different potential embodiments of the EdDrive Propellantless Propulsion System that can be constructed will very likely be able to be configured in such a way that it (or they) will be able to be used to provide propellantless propulsion for it.

Along these lines, another option that will certainly be made available and will almost certainly be a standard feature of any spacecraft carrying humans, will be to provide a means to replace the entire propulsion spring's housing 28 if necessary. The already mentioned robotic arm or arms within the Direction Control Unit or Regular Unit of the invention would certainly provide one way that could be employed (autonomously or manually) to remove and replace the entire propulsion spring's housing 28. Another possibility would be for the propulsion spring's housing 28 to have its own automated replacement system already built in, or have something similar where the propulsion springs that are being used could easily be removed and replaced (something similar would also hold true for the components of the longitudinally movable piston rod unit or the entire housing if the second embodiment of the invention was used, as well as for the components of the longer piston rod unit if the tenth embodiment of the invention was used). The added mass of carrying the replacements would be reasonable and the benefits of having them available would far outweigh the cost of not having them available should they ever be needed during a mission or journey. As for satellites and other small or mid-sized host vehicles, having the means to autonomously remove and replace components or the entire propulsion spring's housing 28 might also make a lot of sense.

Another option that will certainly be made available, will be to eliminate the winches 2 and just go with two or more electric-powered smart cable reels on either side of the propulsion spring's housing 28 instead. The smart cable reels would be able to perform all the responsibilities of the smart winches 2 in order to successfully complete Phase 1. Plus, the need to put plenty of slack in the winch's cable 3 before the LMP is released could be replaced by using freely-turning-mode, which could even be added to the winches 2. The smart cable reels would also be able to handle all the responsibilities related to velocity control, as well as perform all the potential responsibilities related to BM #1 or BM #2, and certainly those related to the Recovery Time Period.

Then again, for safety reasons, having both the winches 2 and the cable reels, and all their additional safety measures (or embodiments) available, could potentially be the best course of action—especially for large cargo carriers or other large spacecraft used for long-distance space travel. The electric-powered smart winches 2 could still be securely mounted to Bulkhead #2 on either side of the propulsion spring's housing 28, while the smart cable reels could be embedded within Bulkhead #2, right behind the smart winches 2. If so, the robotic arm or arms could be used to autonomously or manually disconnect the hook (lockable or not), or any number of other types of devises at the end of the low-mass, stronger-than-steel, wound metal alloy cable or synthetic rope 3 of either a smart winch 2 or a smart cable reel, and exchange it with the hook or clevis of the replacement device, where it will preferably be connected by the connector loops of a heavy duty steel metal connector 6 to the large steel block 4.

As an added safety measure, additional backup motors will also be able to be incorporated into the smart winches 2 and smart cable reels, as well as having entire additional units of each able to be placed right next to or even above or below the primary devices for each. Due to its overall size and all the potential shapes the large mass object (object 1 or the projectile) can ultimately be constructed, there will certainly be enough room. And any slightly different length or angle of the cables from the backup smart winches 2 and the backup smart cable reels to where they are connected to the LMP, can either be addressed by adding additional connector loops to the block 4 or the connector 6, or by adjusting the angle of how either the smart winch 2 or the smart cable reel is mounted to or embedded within its Bulkhead to maximize performance and limit wear and tear. Then, of course, if only used to pull the LMP back into the propulsion spring's housing 28 during Phase 1 and lock it in place once the compression spring within the propulsion spring's housing 28 is fully compressed, any combination of any of the smart winches 2 or smart cable reels could be used in any way possible or desired. In fact, thanks to the control system 1 and its ability to simultaneously control the speed of each device being used, they could all theoretically be used at the same time—although, from an energy use standpoint, it would not be efficient or practical to do so.

As for using all the devices that could potentially be made available to simultaneously perform BM #1 (without the harvesting and storing of energy) or BM #2 (with the harvesting and storing of energy) during Phase 2, while it would take a considerable amount of training to accomplish as efficiently and effectively as possible—due to only one large mass object (object 1 or the projectile) being used as is shown in FIG. 26—it is certainly possible. Embodiments of the invention using the square-shaped 5 or rectangular-shaped 20 (or any other shaped) steel shaft use multiple contact gears 10 and their related components to simultaneously produce thrust whether BM #1 or BM #2 is used. Likewise, embodiments of the invention using multiple, large, electric-powered, winch-like devices with built-in power generating capabilities by running their electric motors in reverse, will also be able to be used to perform BM #1 or BM #2. Because of this and how BM #1 in either is done by abruptly stopping the progress of the LMP by immediately putting their thrust producing components into lock-mode within a millisecond or two of the block 4 breaking contact with the impactor 9, potentially using all the devices available to simultaneously perform BM #1 will be able to be done by the control system 1 with little difficulty. And because BM #2 will be initiated at the exact same instant as in BM #1 by the control system 1, and also because instead of being put into lock-mode all the devices used to perform BM #2 will simultaneously be put into energy-generation-mode at that same exact instant instead, they will all be able to be used simultaneously as well.

However, as with how it would not be efficient or practical to simultaneously use all the devices potentially available to complete the first "action and reaction" combination of Phase 1, using all the devices potentially available to simultaneously perform BM #1 or BM #2 would likewise not be efficient or practical to do. Still, this incredible versatility made possible by the basic concepts behind what makes the successful operation of any or all of the embodiments of the invention possible, is nonetheless noteworthy and clearly best exemplified (at least so far) in this embodiment of the invention.

As with all the other previously described potential embodiments of components, parts, methods and/or systems used by the EdDrive Propellantless Propulsion System, any of the embodiments of components, parts, methods and/or systems that are described in the detailed description of the eighth embodiment of the invention, if possible, may also be used in other embodiments of the invention.

Ninth Embodiment of the Invention

The biggest difference between the ninth embodiment of the invention and the $1^{st}$, $2^{nd}$, $3^{rd}$, $4^{th}$, $6^{th}$, $7^{th}$ and 8th embodiments of the invention, is that the thrust produced during Phase 2 is definitely produced without using a rebounding mass. That means there is no impact of a large mass object (object 1 or the projectile) with a rubber or spring-using impactor 9 and the bulkhead 8 behind it before the round of thrust is completed by the ninth embodiment of the invention (or a Unit #9) using new or somewhat similar embodiments of either Breakthrough Method #1 (without harvesting and storing energy) or Breakthrough Method #2 (with the harvesting and storing of energy).

The second biggest difference between the ninth embodiment of the invention (as shown in FIGS. 27-31) and the previous ones, is that the large mass object (object 1 or the projectile) has been eliminated and replaced with two, separate, large mass objects (objects 1a and 1b or the projectiles) which are approximately half the mass of the large mass projectile (or LMP) used in the previous embodiments of the invention. Therefore, if the same ratios for mass are used as in the 1 kilogram test prototype (50% for the mass of the test large mass object compared to the mass of everything else including the mass of the test host vehicle), the mass of the two separate large mass objects (or smaller LMPs 36) used in the ninth embodiment of the invention will each be 25% of the mass of everything else other than the large mass projectiles used in the Direction Control Units or Regular Units of the invention—although the ratios could certainly also be higher or lower.

The third biggest difference between the ninth embodiment of the invention and the previous ones, is that, because there is no longer an impact of a large mass object with an impactor 9 or bulkhead 8 of any type, there is also no longer a second "action and reaction" procedure or maneuver that needs a partially inelastic collision to make the two smaller LMPs 36 used in the ninth embodiment of the invention available for their kinetic energy to be harvested. It also means that there is no initial positive movement by the host vehicle caused while setting the two smaller LMPs 36 in motion and that all the "action and reaction" combinations used with the ninth embodiment of the invention can be completed without causing any movement whatsoever by the host vehicle as ideally sought.

The fourth biggest difference between the ninth embodiment of the invention and the previous ones, is how a new pair of longer and larger, electric and electric motor-powered, chain or belt driven, side-wall linear actuators 37 are being used and the two mounting blocks/brackets 16 are now also being used to hold and move the two smaller LMPs 36 along both side walls 18 of the sealed containment vessel. In fact, all the major components of the invention have been moved out of the center of the sealed containment vessel and now occupy both side walls 18, essentially creating two new versions (or embodiments) of Phase 1 (force generation) and Phase 2 (thrust production).

The fifth biggest difference between the ninth embodiment of the invention and the previous ones, is that no elastic members and their property of Restoring Force are being used at all during the second "action and reaction" procedure or maneuver during Phase 1 to generate force. Instead, large electric motors, taking full advantage of the Law of Conservation of Angular Momentum and Newton's Third Law of Motion, are used in the longer and larger side-wall actuators 37 as the main drivers to set the two smaller LMPs 36 in motion without causing any movement whatsoever by the host vehicle as ideally sought. And by being able to complete the second "action and reaction" combination without causing any movement whatsoever by the host vehicle, the kinetic energy and linear momentum of the two smaller LMPs 36—which are rapidly set in motion by the torque (or Rotational Force) provided by the drive trains of the two longer and larger side-wall linear actuators while the equal and opposite torque from the large electric motors on the host vehicle is being perfectly canceled out by running one set of motors clockwise and the other set of motors counterclockwise—can subsequently be used to produce a much greater amount of thrust than is able to be produced in the previous embodiments of the invention for the amount of energy expended, using the new or somewhat new versions (or embodiments) of BM #1 or BM #2.

The sixth biggest difference between the ninth embodiment of the invention and the previous ones, is that the smart winch or winches 2 have been eliminated. As a result, there is a new pair of new winch-like devices that will have the ability to use their electric smart motor, during what was previously the Recovery Time Period, to return, usually in a coordinated effort with the two larger side-wall actuators 37, the two smaller LMPs 36 back to the starting point at the completion of Phase 2 as part of what will now be the first "action and reaction" procedure or maneuver during Phase 1. This pair of smart devices will also have the ability to run the electric smart motor in reverse and generate electric power during Phase 2. But Instead of being located on the face of Bulkhead #2, as the winch or winches 2 had, the new pair of smart winch-like devices and their built-in electric power generating capabilities, will now become a separate pair of smart devices that will be embedded in Bulkhead #1 and also be located at either end, close to the side wall 18 of the sealed containment vessel. From either location, each new winch-like device will then ultimately connect to and become part of a new, longer, and more substantive, mechanical device that will occupy the two locations previously occupied by the two side-wall linear actuators 17 in the first two embodiments of the invention, and from where they will repeatedly be used to help the invention generate force in Phase 1 and also produce thrust in Phase 2. A second pair of these new winch-like devices, with their own built-in capabilities, will also be used from their location embedded within Bulkhead #2 to assist the first pair of winch-like devices in completing the first "action and reaction" combination needed during Phase 1 to return the two smaller LMPs 36 to their starting point without causing any movement whatsoever by the host vehicle as ideally sought.

The seventh biggest difference between the ninth embodiment of the invention and the previous ones, is in how the amount of energy that is used by the invention in the completion of a Full Cycle (or round) of thrust that can be harvested and stored using Breakthrough Method #2 will be dramatically increased. In fact, the overall amount of energy that is used to power the invention that could be harvested and stored in supercapacitors or flywheels (or both) could easily be close to tripled when compared to what had been able to be achieved in the previous embodiments of the invention.

In the first two embodiments of the invention, the two, opposing, chain or belt-driven, side-wall linear actuators 17 are used to instantly move their low-friction mounting blocks (or carriages) and the securely attached brackets 16 holding the two looped ends 15 of the strap (thick elastic strap 5 or cold temperature strap 21) away from Bulkhead #1 in order to ensure tension from the strap 5 or cold temperature strap 21 on the back side of the block 4 isn't allowed to interfere with the rebounding LMP so the rebounding LMP can move freely and its kinetic energy can be converted into thrust during Phase 2. One of the actual benefits of needing to use the two side-wall actuators 17 in the first two embodiments of the invention, is in how a very small amount of kinetic energy is able to be harvested by the regenerative braking system built into the smart motors and the remainder of the two side-wall actuators 17 in order to help more traditional or conventional braking systems stop the progress of the mounting blocks/brackets 16 the intended distance away from Bulkhead #1.

Another benefit of using the two side-wall actuators 17 in the first two embodiments of the invention, is in how, during the process of the regenerative braking system harvesting a very small amount of kinetic energy, the production of a very small amount of additional thrust in the same direction of the thrust made possible by the kinetic energy of the main source of mass of the invention also occurs during Phase 2. The conservation of linear momentum in this instance is very simple: the slowing of the chain or belt holding the mounting block/bracket 17 by a motor running in reverse (and now serving as an electric generator) causes the momentum of the mounting block/bracket 16 and its contents to pull the chain or belt in the direction of its momentum. The belt or chain then pulls on the pulley or sprocket, which is attached to the motor, which is securely attached to the side wall 18 of the host vehicle, which then pulls the host vehicle in the direction of the mounting block/bracket's 16 linear momentum and ultimately transfers the linear momentum of the mounting block/bracket 16 to the host vehicle. And since we know from the two Laws of Conservation of Momentum—linear and angular—that they are absolutely separate and that neither can be converted to the other, the linear momentum of the mounting block/bracket 16, as it is being slowed down by the regenerative braking system, has to be—because it is undoubtedly conserved—transferred/combined and recalibrated with the linear momentum of the host vehicle.

In fact, although on a much smaller scale, what is done by the regenerative braking system when it is harvesting kinetic energy and simultaneously producing a very small amount of thrust is very similar to what normally happens when the invention is using Breakthrough Method #2. And perhaps even more noteworthy, when what is done by all the different embodiments of Breakthrough Method #2 that can be successfully deployed by the invention, as well as what is done by the regenerative braking system used by the two side-wall linear actuators 17, when they are compared to how a regenerative braking system works in an electric vehicle (EV), or in an electric train or trolley car on Earth, the similarities are striking.

This continues to be true even with the obvious differences between the invention and commonly used transportation braking systems on Earth. The most obvious difference has to do with gravity and how it is necessary for the wheels of vehicles on Earth to interact as they do with whatever surface (or reaction mass) they are riding on. The invention, on the other hand, because of the effects of microgravity in space—which, instead of causing floating as is typically thought, in reality causes the host vehicle and everything within it to essentially "fall" together at the same rate—means that gravity is totally useless as a means to have the LMP and the host vehicle interact with each other to produce thrust.

But, perhaps, the most important difference between the invention and Earth-based braking systems is one that isn't so obvious. On Earth, the mass of the Earth (object 2 or the larger mass object) is so massive when compared to the mass of an EV or a train or trolley car (object 1 or the projectile), that the effect of the transfer of the vehicle's linear momentum to the Earth as it is braking using a regenerative braking system (or any other for that matter) is so miniscule that it can't be observed or measured using available technology. This definitely isn't the case with the results that will be obtained by the invention in space, where the acceleration or deceleration of the larger mass object (object 2 or the larger mass object) caused by the invention will actually be great enough to be observed with the naked eye. Therefore, a person skilled in the art of regenerative braking systems should have little difficulty determining that the science behind why a regenerative braking system works and performs as it does on Earth is practically identical to the science behind why the EdDrive Propellantless Propulsion System—of course, with the assistance of the mechanical means that will keep the large mass object (object 1 or the projectile) and the host vehicle (object 2 or the larger mass object) stuck together during the various versions (or embodiments) of an inelastic collision—will work and perform as well as it undoubtedly will in space.

In the preferred embodiment of the two chain or belt-driven side-wall actuators 17 used by the invention in the first two embodiments of the invention, electric-powered traction or induction motors are used to rapidly spin the sprockets or pulleys that are used to instantly move the two low-friction mounting blocks the two low-mass metal brackets 16 are attached to away from Bulkhead #1. In order to ensure that the equal and opposite amount of torque (or Rotational Force) that the smart motors are imparting on the host vehicle and also using to rapidly rotate their rotors (as well as the other spinning parts that may be driven by the spinning rotors) doesn't ultimately result in spinning motion by the host vehicle (and also the creation of angular momentum), the two pairs (or sets) of smart motors—which are directly opposite each other on either side wall 18 of the sealed containment vessel—will be constructed and set up so as to perfectly cancel out the equal and opposite amount of Rotational Force imparted by the motors on the host vehicle. This can easily be done by having one pair of motors turn clockwise while the other pair of motors turn counterclockwise.

For example, if the mounting block/bracket 16 is attached to the lower section of the chain or belt that can be rotated in either direction by the two main sprockets or pulleys within the side-wall actuator 17, and the mounting block/bracket 16 is being moved by the side-wall linear actuator 17 toward Bulkhead #2, the rotor of the smart motor turning the sprocket or pulley closer to Bulkhead #1 (or the first sprocket or pulley) will turn counterclockwise and also turn the belt counterclockwise. The same will also hold true for the motor and rotor of the second sprocket or pulley, whether one sprocket or pulley or both are used at the same time. But regardless of how many sprockets or pulleys are used, as the rotor within the motors that are used start to rotate counterclockwise, an equal and opposite amount of Rotational Force—or torque—will be applied to the host vehicle, which, if it isn't counteracted, will eventually cause the host vehicle to spin clockwise. An actual example of this being done on purpose in space can be found in the use of reaction or momentum wheels that are now used in practically all satellites in operation today for the purpose of pointing in the proper direction.

Reaction/momentum wheels are flywheels used to provide attitude control and stability on spacecraft. By adding or removing energy from the flywheel, torque is applied to a single axis of the spacecraft, causing it to react by rotating. By maintaining flywheel rotation, a steady amount of rotational momentum is maintained and a single axis of the spacecraft is stabilized. Reaction/momentum wheels control the attitude of a spacecraft (or the direction it is pointing) by using an electric motor to rotate a flywheel which, when its rotation speed is changed, causes the spacecraft to begin to counter-rotate proportionally through Conservation of Angular Momentum. However, reaction/momentum wheels can only rotate a spacecraft around its center of mass, and for three axis control, must be mounted along at least three directions. Reaction/momentum wheels are also not very powerful or energy efficient.

A more powerful and energy efficient way to provide attitude control and stability on a spacecraft (or a space station such as the International Space Station that uses them), is to use a control moment gyroscope. A control moment gyroscope generally consists of a momentum wheel mounted in a one-axis gimbal. When mounted to a spacecraft, applying a constant torque to the wheel using one of the gimbal motors causes the spacecraft to develop a constant angular velocity about a perpendicular axis, thus allowing control of the spacecraft's pointing direction. A control moment gyroscope can use one or more gimbals to tilt the rotor's angular momentum. As the rotor tilts, the changing angular momentum causes a gyroscopic torque that rotates the spacecraft.

Neither reaction/momentum wheels or control moment gyroscopes are capable of moving a spacecraft from one place to another. They can, however, use torque from their rotating parts to rotate a spacecraft and control the direction in which it is pointing. And since Newton's Third Law of Motion tells us that no torque can be exerted without an equal and opposite amount of torque being exerted, a person skilled in the art of reaction/momentum wheels and control moment gyroscopes should have little difficulty determining that the equal and opposite torque simultaneously exerted by the motors of the invention's side-wall actuators on the host vehicle and the motor's rotors used to rotate the sprockets or pulleys, is indeed equal and opposite.

But, fortunately, the clockwise spin of the host vehicle in the example—which, if it isn't counteracted, would undoubtedly occur because of the equal and opposite amount of Rotational Force being used to rapidly rotate the motor's rotors counterclockwise—can be counteracted and stopped before it even starts. This, as we know from the use of the two side-wall actuators 17 in the first two embodiments of the invention, can easily be done by having the motors in the opposing side-wall actuator 17 rotate their rotors clockwise, which will also spin their sprockets or pulleys clockwise, which will also turn the chain or belt clockwise and move the mounting block/bracket 16 toward Bulkhead #2. By doing so, the motor's torque (Rotation Force) exerted on the outer wall of the host vehicle in the opposite direction of the torque exerted by the opposing side-wall actuator will perfectly cancel each other out.

Helicopters do something very similar by adding a tail rotor or by adding another rotor called a coax rotor. Coaxial rotors are a pair of helicopter rotors mounted one above the other on concentric shafts, with the same axis of rotation, but turning in opposite directions (or contra-rotating). Without a tail rotor or using coaxial rotors, a helicopter would just spin around in the opposite direction of the main rotor blades. To prevent this from happening, the main purpose of a tail rotor or an added coax rotor is to pull against the torque of the main rotor and hold the helicopter straight. Moreover, tandem rotor helicopters, such as the large transport Chinook helicopters used by the military, use two separate counter-rotating rotors, with one turning clockwise and the other turning counterclockwise, and with each cancelling out the other's torque. This use of a tail rotor or an additional coax rotor or two separate counter-rotating rotors by a helicopter to ensure that the torque produced by the main rotor or rotors is properly compensated for so the helicopter can fly straight is also another example of how the science behind why a well-known and established technology works so well can be applied to the invention. Therefore, a person skilled in the arts of helicopter tail rotors, coaxial rotors, and tandem counter-rotation rotors, should have little difficulty determining that the equal and opposite torque exerted by the motors of the invention's side-wall actuators, which will be pushing the host vehicle along the same axis from opposite directions with an equal amount of Rotational Force, will perfectly cancel each other out.

Obviously being able to have the motors of one of the invention's side-wall actuators rotate their rotors clockwise while the other is having its motors rotate their rotors counterclockwise in order to keep the host vehicle from spinning will be very important.

However, just as important, is the fact that while this incredibly fortuitous canceling out of any potential spinning by the host vehicle is happening—and thanks once again to Conservation of Momentum and Conservation of Energy—we also know from the first two embodiments of the invention that the small amount of additional thrust in the same direction as the direction of the momentum of the LMP, which was caused by using the regenerative braking system to help stop the progress of mounting block/bracket 16 where needed and also harvest a very small amount of kinetic energy in the process, will still occur.

These two concepts, first, the smart motors being constructed and set up so as to perform their tasks and simultaneously also perfectly cancel out any potential movement by the host vehicle that may be caused by any of them, and second, the kinetic energy of the moving masses—primarily provided by the mounting blocks, the low-mass metal brackets, and the looped ends of the thick elastic strap or the cold temperature strap—being capable of being harvested by the regenerative braking system while a very small amount of thrust is simultaneously being produced due to Conservation of Linear Momentum, are the two concepts that provided the basis behind what happens in the ninth embodiment of the invention.

The preferred method to achieve the ambitious objectives of the ninth embodiment of the invention will make extensive use of large, electric and electric motor-powered, smart cable generators 38. One pair of these new winch-like devices with built-in electric power generating capabilities through their use of generators or flywheels will be firmly embedded between the two walls of Bulkhead #1, where they will be placed close to the side wall 18 on either side of the sealed containment vessel, and a second pair will be firmly embedded between the two walls of Bulkhead #2, where they will also be placed close to the side wall 18 on either side of the sealed containment vessel.

Since the ninth embodiment of the invention seeks to cause no movement whatsoever by the host vehicle during Phase 1, as with the previous embodiments of the invention using winches 2 and elastic members (straps or springs or both) to complete the first "action and reaction" procedure or maneuver without doing so, the ninth embodiment of the invention also makes use of Restoring Force and Tension Force during the first "action and reaction" combination. The Tension Force of the low-mass, stronger-than-steel, wound, metal alloy cables 39 of the smart cable generators 38 can, of course, be used in the same way the cables 3 of the winches 2 had previously, but Restoring Force is done in a new way (or embodiment) in order to complete the first "action and reaction" combination during Phase 1 without causing any movement whatsoever by the host vehicle.

This will be accomplished by first having the pair of smart cable generators 38 embedded in Bulkhead #1 on either side of the sealed containment vessel (see FIG. 27), start Phase 1 by reeling in the cable generator cables 39 that pass through the first wall of Bulkhead #1 and are attached to the side bracket 40 that is on the nearest side of the mounting block/bracket 16 that is also the holder of one of the smaller LMPs 36. Each smaller LMP 36 is securely attached to the face of the mounting block/bracket 16 that is also securely attached to either the upper or lower section of the chain or belt that extends in one continuous piece and rotates around the two sprockets or pulleys at either end of what is now a much longer and larger side-wall linear actuator 37 than was used previously in the first two embodiments of the invention. Because the smart motors of the two larger side-wall actuators 37 will be able to put their rotors into freely-turning-mode if they aren't needed—perhaps for backup purposes—to return or help return the two smaller LMPs 36 back to the starting point near Bulkhead #1, the mounting blocks/brackets 16 will be able to be pulled back by the cable generators 38 fairly easily, and they will also consume less electric power. Still, because the two smaller LMPs 36 will contain a considerable amount of mass, some force will be needed to pull them back near Bulkhead #1.

Figure 27:
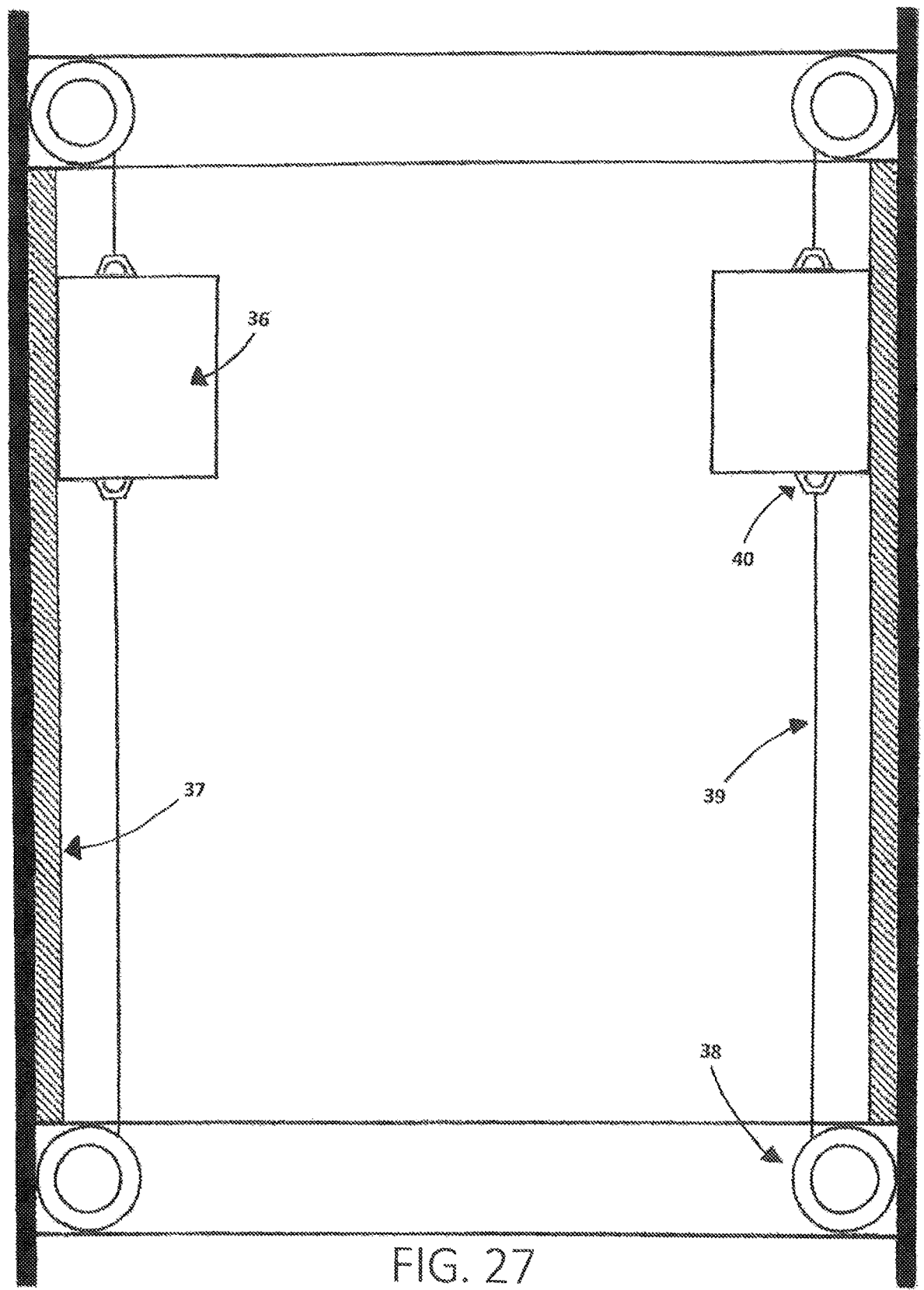
FIG. 27 shows an overhead view of the ninth embodiment of the invention with two smaller LMPs and two smart cable generators embedded in Bulkhead #1 and two smart cable reels with the added capabilities of a spring-loaded cable reel at the end of a Full Cycle using BM #1.

If the two smaller LMPs 36 end the previous Cycle near Bulkhead #2 as shown in FIG. 27, when the cable generators 38 start to pull the two smaller LMPs 36 back toward Bulkhead #1, they will be pulling the host vehicle in the desired direction with an equal and opposite amount of force. If it wasn't for the fact that quickly reeling in the smaller LMPs 36 will cause them to gain kinetic energy and momentum in the undesired direction, the positive movement of the host vehicle caused by pulling the smaller LMPs 36 toward Bulkhead #1 by the cable generators 38 embedded in Bulkhead #1 would be acceptable. But that isn't the case. That then leaves the question of what to do about the possibility of momentum being gained by the smaller LMPs 36 as they are being returned to the starting point?

One option to balance the positive movement of the host vehicle with the potential negative movement caused by moving the smaller LMPs 36 back the starting point, would be to reel in the smaller LMPs 36 very slowly and let the small amount of friction within the drive trains of the larger side-wall actuators 37 cancel out the force of pulling the LMPs 36, which would also make it possible to stop the smaller LMPs 36 when they reach the starting point without causing any significant movement by the host vehicle. But this will take a long time and certainly not be the preferred method (or embodiment) to complete the first "action and reaction" combination during Phase 1.

The second option to balance the positive movement of the host vehicle with the potential negative movement caused by moving the smaller LMPs 36 back to the starting point near Bulkhead #1, would be to let the energy generating components of the smart cable generators 38 embedded in Bulkhead #2, which will have the ability to perform either Breakthrough Method #1 or Breakthrough Method #2 (more on this later), perform BM #1 or BM #2 with the two returning smaller LMPs 36 as they approach Bulkhead #1 and also stop them back at the starting point. This would work, but it would also cause the negative movement needed to cancel out the previous positive movement of the host vehicle.

The third, and preferred option (or embodiment), will also be to use the second pair of smart cable generators 38 embedded in Bulkhead #2 to provide the remainder of the equal and opposite amount of force needed to return the two smaller LMPs 36 back to the starting point, but in this case it will be done without causing any movement whatsoever by the host vehicle. This will be accomplished by adding the capabilities of a spring-loaded or spring-driven cable reel to the capabilities of the two smart cable generators 38 embedded in Bulkhead #2. By doing so, the force provided by the motor-driven cable generators 38 embedded in Bulkhead #1 will be counter-balanced by the mass (or load) of the smaller LMPs 36 and the force needed to wind the spring within the smart cable generators 38 with the added capabilities of a spring-driven cable reel. In the end, the force from the cable generators 38 embedded in Bulkhead #1 will perfectly cancel out the equal and opposite force from the cable generators 38 embedded in Bulkhead #2, and the smaller LMPs 36 (caught in a purely one-sided tug-of-war between the cable generators 38 embedded in opposing steel reinforced bulkheads 8 because the spiral springs used in the smart cable generators 38 embedded in Bulkhead #2 will have more than enough length and strength to provide a constant equal and opposite force as their cable generator cables 39 are being pulled out) will be able to be returned to their starting point without causing any movement whatsoever by the host vehicle as ideally sought.

After the two smaller LMPs 36—which will preferably have a steel outer shell and a tungsten inner core to reduce their size and/or increase their mass—are reeled in as close to Bulkhead #1 as possible, the cable generator cables 39 of the smart cable generators 38 are then locked in place (internally or otherwise) by the control system 1, thus completing the first "action and reaction" combination of Phase 1. It is then at this point, with the control system 1 simultaneously preparing to activate the smart motors that will be used by the two longer and larger side-wall actuators 37, that the two, large, electric-powered, smart cable generators 38 embedded in Bulkhead #1 are being converted into new embodiments of thrust producing devices that will be expected to perform similarly to the devices used in the previous embodiments of the invention to carry out Breakthrough Method #1 or Breakthrough Method #2 during Phase 2.

However, before BM #1 or BM #2 can be commenced, the two larger side-wall actuators 37 must first begin the second "action and reaction" procedure or maneuver of Phase 1 and rapidly set the two smaller LMPs 36 in motion so their kinetic energy can be harvested and simultaneously turned into thrust once the two smaller LMPs 36 have reached their top acceleration rate and velocity possible. Fortunately, the ninth embodiment of the invention has the ability to borrow from the first two embodiments of the invention. And by using the torque of the smart motors to simultaneously power the drive trains of the two, longer and larger, opposing, side-wall linear actuators 37 and, at the same time, also counter-balance the equal and opposite amount of force the torque of the motors of the two larger side-wall actuators 37 are imparting on the host vehicle, the two smaller LMPs 36 are rapidly set in motion without causing any movement whatsoever by the host vehicle as ideally sought. With the hard part solved, that then leaves what happens after the two smaller LMPs 36 are rapidly set in motion by the Rotational Force (or torque) of the drive trains of the two larger side-wall actuators 37 and when their newfound linear momentum and translational kinetic energy will be put to good use by the invention?

To begin with, in order for the two smaller LMPs 36 to be able to reach their top potential acceleration rate and velocity, they must first have enough available space to do so. In the first two embodiments of the invention, a pair of regenerative braking systems, along with the more conventional braking systems that accompany them, are used to stop the progress of the mounting blocks/brackets precisely where needed. The use of these braking systems also results in a very small amount of kinetic energy being harvested and a very small amount of positive thrust in the desired direction being produced. But that is done in a short amount of time using a relatively small amount of mass. Because of these factors, it can also be done in a relatively short amount of distance. The ninth embodiment of the invention will be using the two larger side-wall actuators 37 to rapidly move much more mass and, consequently, will need much more time and a much longer distance in which to stop in. The question then becomes, how much?

Today's electric and hybrid vehicles have the ability to engage the regenerative braking system the instant a driver's foot lifts up on the accelerator pedal. So the motors of the different potential embodiments of larger side-wall actuators 37 that could be used in the ninth embodiment of the invention will undoubtedly be able to be used as generators as part of a regenerative braking system that could be used to help convert some of the kinetic energy of the smaller LMPs into stored electric energy when they reach the top potential velocity that is possible within the limits of the system. Moreover, if the regenerative braking system of the large side-wall actuators 37 is included in the mix of potential options to harvest the kinetic energy of the smaller LMPs 36 and simultaneously produce thrust, the more conventional mechanical brakes that ordinarily accompany a regenerative braking system would also be able to be used to stop the two smaller LMPs 36 in a reasonable amount of distance relatively quickly. On the plus side, using the more conventional braking systems to stop the forward progress of the smaller LMPs 36 would make it possible for the translational kinetic energy of the two smaller LMPs 36 to be converted into thrust, but most of the kinetic energy wouldn't be harvested, it would most likely be wasted in the brakes as heat—not to mention result in a lot of wear and tear on the braking system. Adding a lock-mode function to the smart motors could also be an option, and would most likely be made available, but it, as well as the other potential options that could be performed by the various components of the side-wall actuators 37, are really more suited to be performed by the large, electric-powered, smart cable generators 38 embedded in Bulkhead #1 instead.

Figure 28:
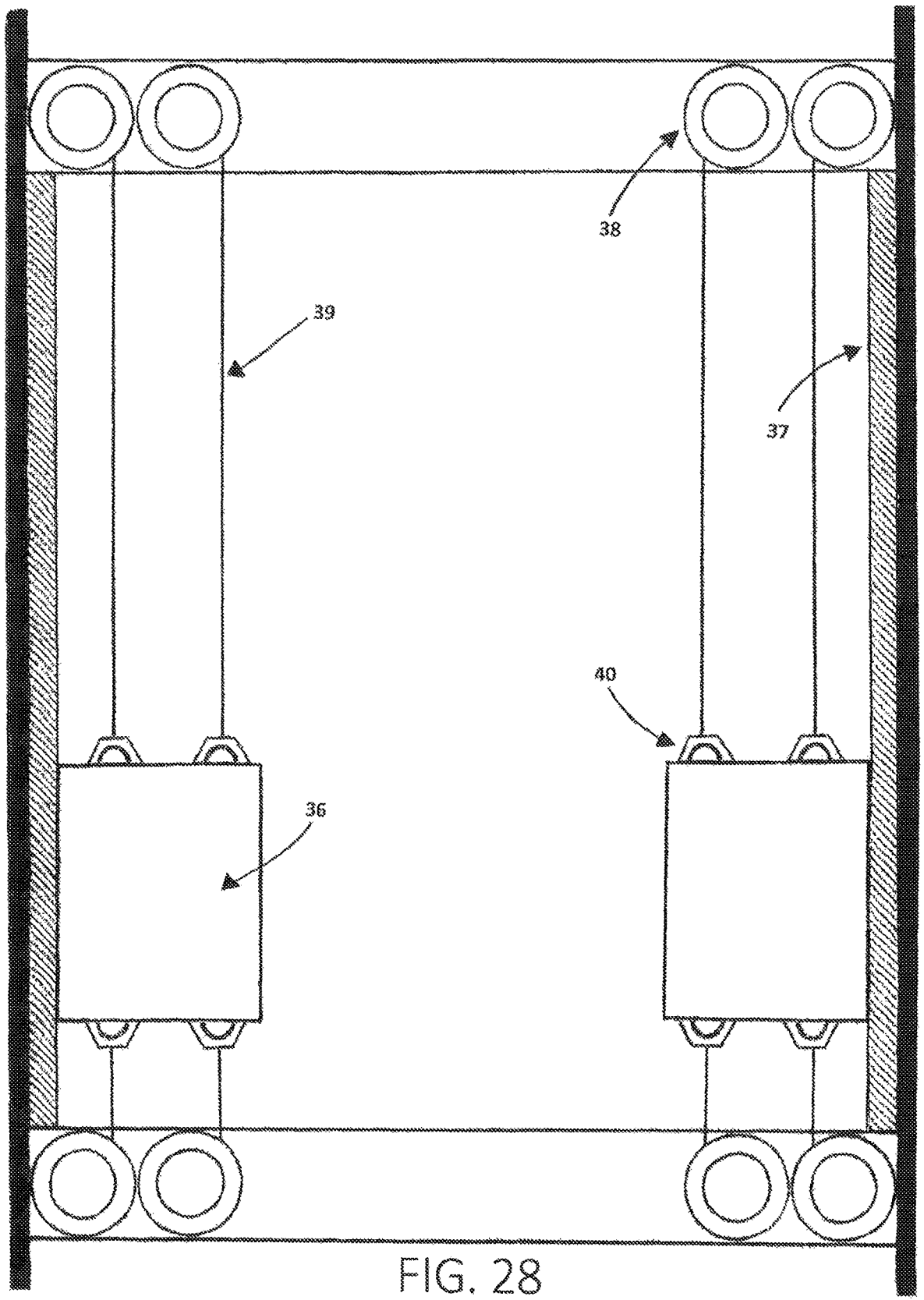
FIG. 28 shows an overhead view of the ninth embodiment of the invention with two (somewhat larger) smaller LMPs and two pairs of smart cable generators embedded in Bulkhead #1 and two pairs of cable reels embedded in Bulkhead #2 at the completion of the first "action and reaction" procedure or maneuver with the two smaller LMPS moved back and locked in place close to Bulkhead #1.
Figure 29:
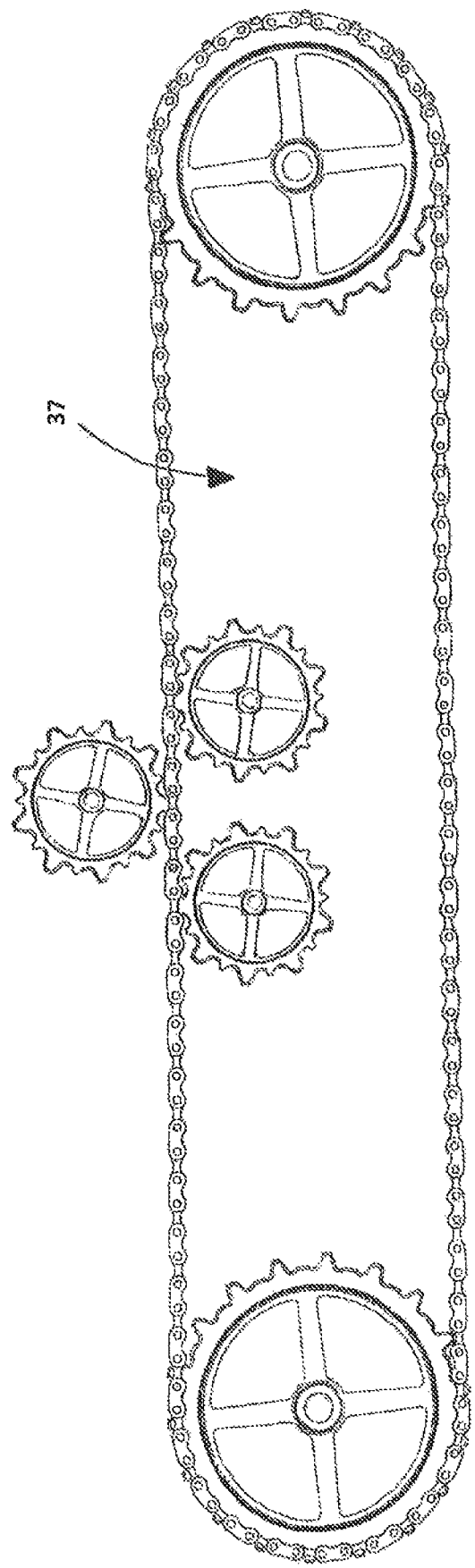
FIG. 29 shows a chain-driven side-wall actuator with the two main sprockets at either end and three smaller additional sprockets added in the middle.

Because the two smaller LMPs 36 will be securely attached to the flat face of the mounting blocks/brackets 16 of the two larger side-wall actuators 37, they will extend in toward the center of the sealed containment vessel housing either a Direction Control Unit or a Regular Unit of the invention. That means the side brackets 40 will need to be turned sideways and be located on either side of the combined mounting block/bracket 16, so the cable generator cables 39 from the opposing cable generators 38 can be connected to the side bracket 40 on either side. It also means that if the smaller LMPs 36 are large enough to require additional cable generators 38, the additional cable generators 38 could be connected by the cable generator cables 39 directly to the nearest side of the smaller LMP 36 (see FIG. 28) by additional side brackets 40. Either way, this will leave just the amount of space equal to the diameter of the sprocket or pulley, with a little extra space added on each side, between Bulkhead #1 and the smaller LMP 36 when the smaller LMP 36 is pulled back and held in place (as shown in FIG. 28) until the smart motors are engaged. In addition, since the cable generators 38 embedded in Bulkhead #1, from where they will not only be able to fill the responsibilities of a winch 2 but also the responsibilities of a long, square-shaped, steel shaft 5 and its three accompanying contact gears 10 and control mechanisms 11 in order to perform BM #1 or BM #2, a lot of space will be saved by just using the cable generators 38. That saved space can easily be used to push back Bulkhead #1 and increase the size and length of the two larger side-wall actuators 37.

Being able to make the two larger side-wall actuators 37 much longer—even if it requires adding additional sprockets or pulleys (see FIG. 29)—will be extremely beneficial. One of the major ways it will be beneficial is in how it will make it possible for the two smaller LMPs 36 to reach much higher velocities before BM #1 or BM #2 is implemented. The velocity that the smaller LMPs 36 can reach is very important because the amount of kinetic energy that they possess is increased significantly by going faster. For example, because the kinetic energy ($\frac{1}{2} mv^2$) of a large mass object (object 1 or the projectile) as its speed changes is proportional to the square of the factor by which the speed changes, if the velocity of the smaller LMP 36 is doubled, its kinetic energy changes to four times the initial kinetic energy. Likewise, if the velocity is tripled, its kinetic energy will be nine times greater. Obviously the faster the smaller LMP 36 can go before BM #1 or BM #2 has to be implemented the better.

One way to help increase the velocity of the smaller LMPs 36 will be to increase the initial torque that is used to turn the sprockets or pulleys when they are first engaged. This can be done by using a clutch and flywheel to effectively disengage the motor from the sprocket or pulley in order to get the rpms (rotations-per-minute) of the flywheel up to a safe speed—instead of starting from a standstill—before the sprocket or pulley is engaged by the drive train of the larger side-wall actuator 37. Another possibility will be to use an automatic transmission-like device to do something similar. Either way, the LMP will be moving faster sooner and will be able to reach greater velocities in a shorter distance.

Another possibility that could be used to increase the velocity of the two smaller LMPs 36 once they are safely in motion, would be to add any number of additional motors and their respective sprockets or pulleys that would act like a gear chain in a gearbox to help rapidly increase the rotational speed of the final sprockets or pulleys turning the chain or belt. As long as they all turn in the opposite direction (clockwise versus counterclockwise) as the same number and configuration of additional motors in the opposing larger side-wall actuator 37, it could be done without causing any movement whatsoever by the host vehicle as ideally sought.

With the two smaller LMPs pulled back and locked and/or held in place near bulkhead #1 by whatever means are locking and/or holding them in place (more on this later), and the drive trains of the two side-wall actuators 37 ready to spin the sprockets or pulleys with a safe but still sizable amount of torque, once the sprockets or pulleys that are being used are engaged at the behest of the control system 1, there will be an equal and opposite amount of torque (Rotation Force) produced by the motors to spin their rotors and also attempt to spin the host vehicle in the opposite direction the entire time the rotors are rotating. As a result, and as previously described, with the motors of one larger side-wall actuator 37 rotating their rotors clockwise and the motors of the opposing larger side-wall actuator 37 rotating their rotors counterclockwise, an equal amount of torque will be pulling the host vehicle in either direction and they will perfectly cancel each other out without causing any movement whatsoever by the host vehicle. And, of course, this will all be happening while the two smaller LMPs 36 are rapidly being set in motion (not unlike how the drive train of a car is used to set the main body of the car in motion).

Figure 30:
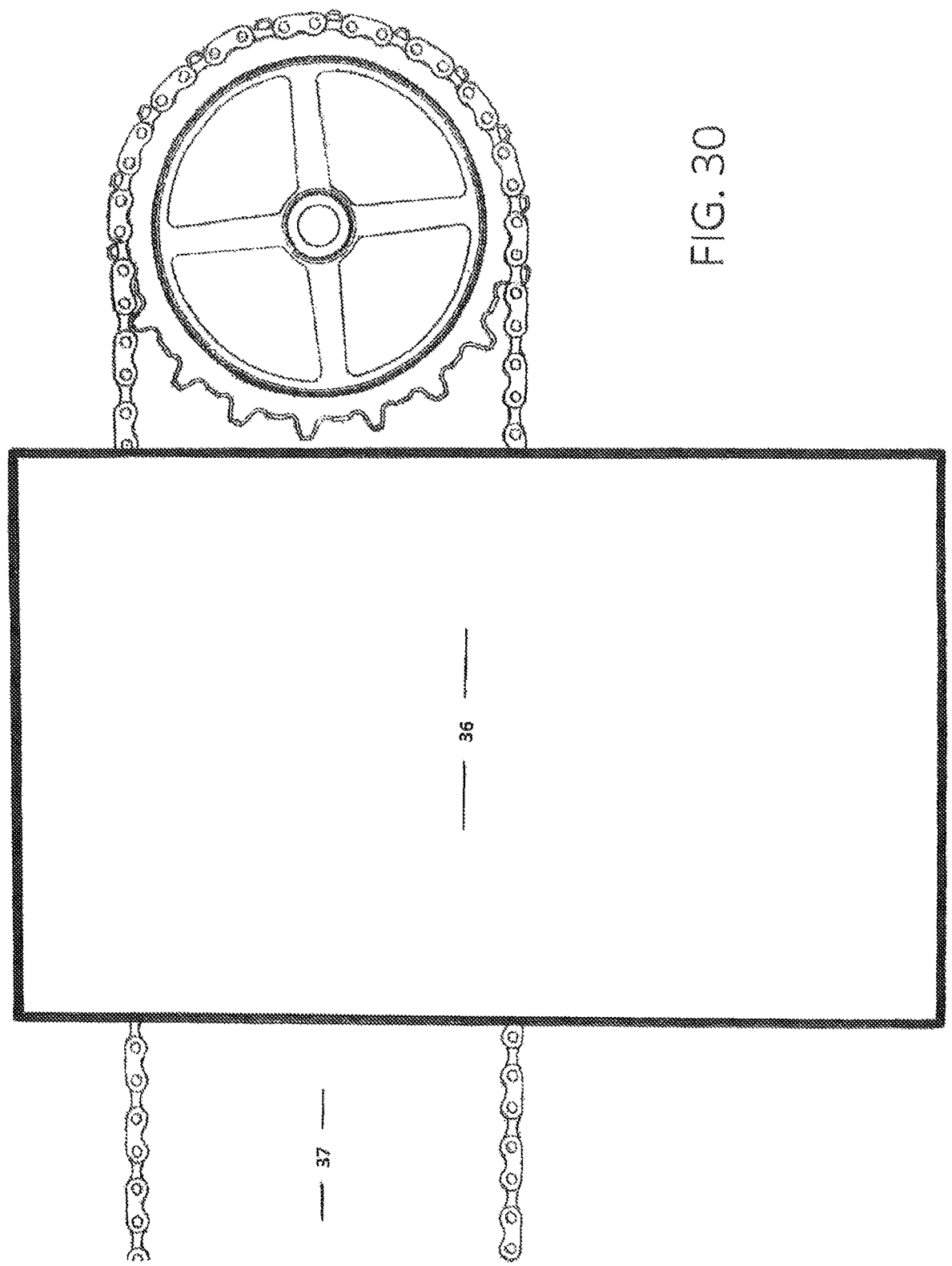
FIG. 30 shows a side view of the larger side-wall actuator with the smaller LMP stopped very close to the second sprocket at the completion of BM #1, which can also be done using BM #2.

Naturally, if BM #1 (without harvesting and storing energy) is chosen by the control system 1 to be used at the beginning of Phase 2, once the (potentially even spring-loaded cables) are released by the cable generators 38 embedded in Bulkhead #1 and put into freely-turning-mode just before all the sprockets or pulleys are simultaneously being engaged, the two cable generator cables 39 can then be abruptly locked and stopped in place at any distance the smaller LMPs 36 have reached along their path as long as they are stopped before they reach the second sprocket or pulley located next to Bulkhead #2. One reason why the two smaller LMPs 36 won't usually be stopped until they come very close to the second sprocket (as shown in FIG. 30) or pulley, is because it will give more time for the two smaller LMPs 36 to rapidly accelerate to the top potential velocity or rate of speed they can achieve in the amount of space they have to operate in BM #1 will stop the two smaller LMPs 36 abruptly, the smaller LMPs 36 will be able to travel farther and faster before the sprockets or pulleys are disengaged and the cable generators 38 embedded in Bulkhead #1 are activated.

Waiting until the two smaller LMPs 36—which will be rapidly accelerating toward Bulkhead #2 up until the instant the sprockets or pulleys are disengaged by the control system 1—to reach their top velocity before abruptly locking and stopping the cable generator cables 39, is important because the greatest amount of thrust will be able to be produced when the greatest amount of kinetic energy is available. And because using BM #1 will allow the two LMPs 36 to reach a higher velocity, thus possess more kinetic energy, the additional velocity will make it possible for considerably more thrust to be produced than if BM #2 was used instead.

On the other hand, if BM #2 (with the harvesting and storing of energy) is chosen at the beginning of Phase 2, once the two smaller LMPs 36 (objects 1a and 1b or the large mass projectiles) have reached their top acceleration rate and velocity in the space available to harvest their kinetic energy to greatest extent possible while, at the same time, simultaneously produce a significant amount of thrust, the control system 1 can switch the smart cable generators 38 embedded in Bulkhead #1 from freely-turning-mode over to energy-generation-mode at the same time it is disengaging the sprockets or pulleys. Once in energy-generation-mode, the smart cable generators 38 embedded in Bulkhead #1 can then be used to harvest the kinetic energy of the two smaller LMPs 36 using their built in or connected generators and flywheels (or both) and simultaneously take advantage of both Conservation of Energy and Conservation of Momentum (just as was done previously with the other embodiments of BM #2) and also turn it into thrust. And because approximately half of all the energy that is used to power the invention won't be lost in setting the two smaller LMPs 36 in motion—as is lost in the previous embodiments of the invention that use an elastic member or members because of their property of Restoring Force and the need for an impact and a partially inelastic collision in order to perform either BM #1 or BM #2—approximately three times more (or somewhere around 65%-70%) of all the energy used to operate the invention can be harvested and reused. Needless to say, that is quite an improvement over even the best results that can be achieved using the sixth embodiment of the invention.

One reason why the ninth embodiment of the invention should have little difficulty being able to harvest and reuse so much of the energy that it needs to power itself, is because of the high efficiency of the smart motors that will be used in the larger side-wall actuators 37 and the cable generators 38. New motors that are currently being developed to be used just in space now achieve efficiencies of at least 92 percent. And with the vast majority of the work (f×d) done during Phase 1 accomplished by very efficient smart motors without causing any movement whatsoever by the host vehicle, other than the efficiency losses of the power generating components of the cable generators 38, friction within the drive trains of the larger side-wall actuators 37 is what will cause the greatest energy loss. And it really won't be that much.

Breakdown of approximate energy use by the ninth embodiment of the invention:

(1) AI-enhanced control system: 30 watts per hour for AI-chip now used in many robots (or the same amount of electricity used by a 60-watt light bulb), or 50 watts per hour for AI-chip or board now used in some self-driving cars, or 100 watts for AI-chip or board with two AI-chips combined together on one board for redundancy and security purposes. 100 watts divided by 300 cycles per hour=0.3 watts per Cycle.

(2) Electric cable generator 38 used like a winch 2 during Phase 1: Current Brushless DC (BLDC) electric motors that can be used with the new, custom-made, smart cable generators 38 that will be an option to be used by the invention can typically achieve efficiencies in excess of 90%. AC Induction motors that can also be used by the invention instead of the BLDC motors can typically achieve efficiencies in the neighborhood of 90%. And that's using commonly and readily available technologies that can certainly be improved. Also, current winches 2 or winch-like devices weren't exactly designed with energy efficiency as a top priority. Fortunately, the custom-made cable generators 38 that can be used to perform the responsibilities of a winch 2 by the invention will do more to increase energy efficiency. As a result, these new cable generators 38 can be expected to achieve efficiencies of 75% or better. Therefore, the amount of electric power used to return the two smaller LMPs 36 back to their starting point during the first "action and reaction" procedure or maneuver of Phase 1 will be less than 10 percent (>10%) of the total amount of energy used by the invention per Cycle. In essence, the amount of electric power expended will basically be a little bit more than what will be required to wind the spring in the opposing cable generators 38 so the cable generator cables 39 can be retracted as the two smaller LMPs 36 are propelled at a high rate of speed toward Bulkhead #2 by the larger side-wall actuators 37.

(3) Actuators and control mechanisms used to lock and release the various mechanical devices locking and holding the two smaller LMPs 36 in place: (>10 watts per cycle)

(4) Motors for larger side-wall actuators: As previously described, new electric motors for use in space will have efficiencies of greater than 90%

(5) Losses incurred by drive train of larger side-wall actuators: Total losses: (>5%)

(6) Losses incurred by gears and generators: (typically 80% to 85% efficiency—although incremental improvements are certainly possible). As with the gears and generators used to perform Breakthrough Method #2 in the previous embodiments of the invention, efficiencies of 80% to 85% should be able to be achieved using cable reel-like devices with the ninth embodiment of the invention.

(7) Losses incurred by flywheels: (typically flywheels with magnetic bearings and high vacuum can maintain 97% mechanical efficiency and 85% round trip efficiency—although incremental improvements are certainly possible).

As with how flywheels can also be used in conjunction with the control mechanisms 11 in the previous embodiments of the invention, flywheels will also be able to be incorporated into the energy harvesting and generating capabilities of the cable reel-like devices.

(7) Supercapacitors: (generating efficiencies up to 97.94%). Total efficiency of the ninth embodiment of the invention: approximately 65% to 70% and potentially greater.

Figure 31:
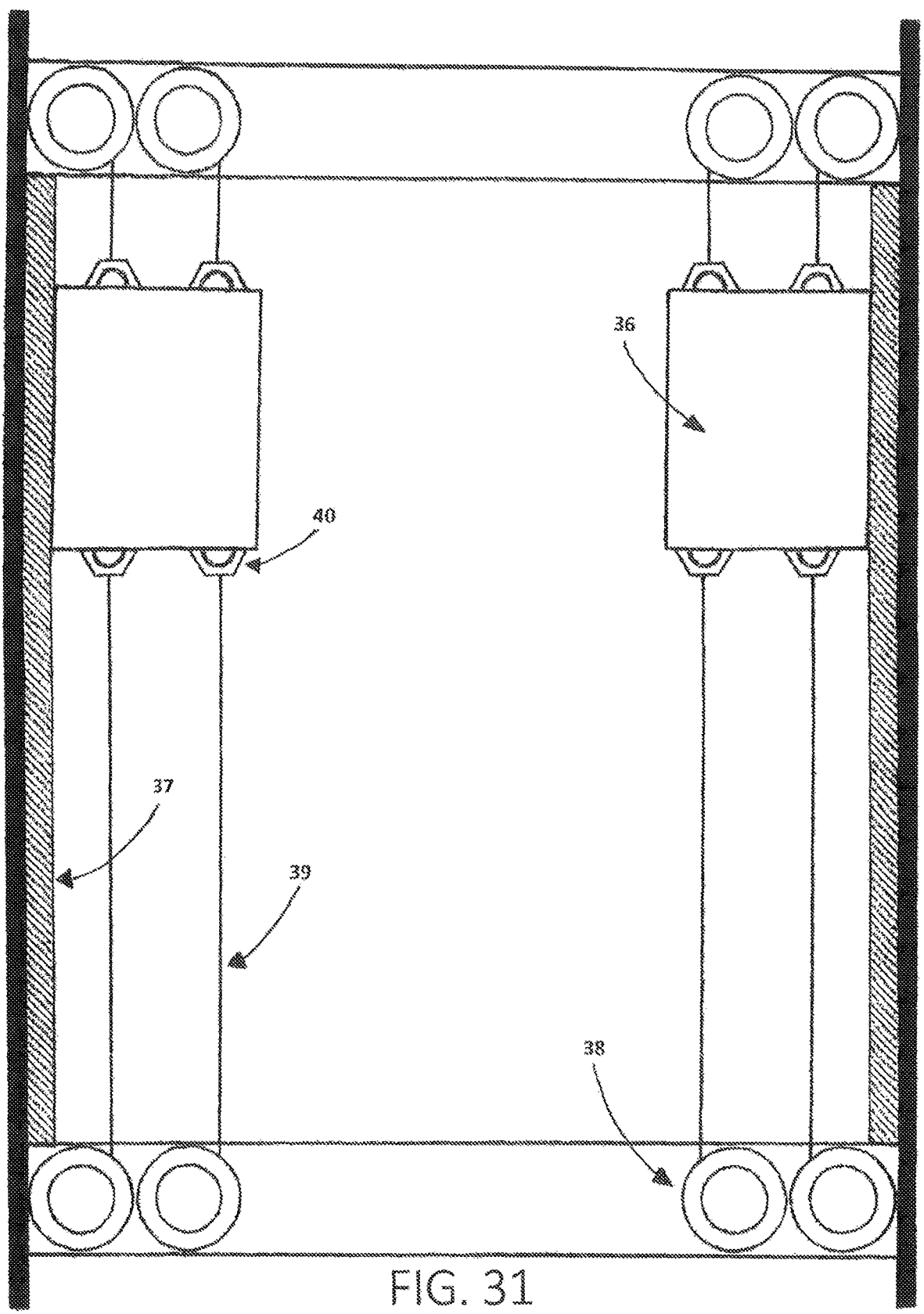
FIG. 31 is an overhead view of the ninth embodiment of the invention with two (somewhat larger) smaller LMPs and two pairs of smart cable generators embedded in Bulkhead #1 and two pairs of cable generators embedded in Bulkhead #2 at the end of a Full Cycle using BM #2.

In addition to the increased amount of kinetic energy that can be harvested and/or also converted into thrust by using the ninth embodiment of the invention over its predecessors, the ninth embodiment of the invention also has other major advantages. These advantage primarily have to do with where the smaller LMPs 36 and the smart cable generators 38—in whatever numbers are possible and/or may be desired—will be positioned or located. It also has to do with how, because the two larger side-wall actuators 37 can do the same exact things in either direction (see FIG. 31), the ninth embodiment of the invention can easily be used to produce thrust in either direction by giving the cable generators 38 embedded in Bulkhead #1 the capabilities of a spring-loaded cable reel and the cable generators 38 in Bulkhead #1 the capabilities needed to harvest kinetic energy and generate electric power. Also, because the cable generators 38 (as shown in FIGS. 27, 28 and 31) used with each smaller LMP 36 will turn in the opposite direction (clockwise versus counterclockwise) as those used with the opposing smaller LMP 36, it won't matter which direction the thrust is being produced because the movement of the host vehicle won't be adversely affected by the rotation of the cable generators 38. Then there is the fact that, in some instances, the ninth embodiment of the invention can even be combined with other embodiments of the invention.

Starting with the advantages related to where the smaller LMPs 36 and cable generators 38 are located, due to how the two smaller LMPs 36 are located and operated along the two side walls 18 of the sealed containment vessel, that potentially leaves a lot of open space in between them. Also, due to the brief summary of the eleventh embodiment of the invention, we also know that multiple Units of the invention can be operated at the same time with the masses of their LMPs capable of being used simultaneously to produce thrust as if they were all one mass. That means many more potential versions (or embodiments) of the ninth embodiment of the invention are possible depending on the overall width and length of the sealed containment vessel.

One such possibility to occupy the open middle area of the Unit would be to add another pair of larger side-wall actuators 37 and another pair of smaller LMPs 36 along the top and bottom of the sealed containment vessel if the first pair of each are located along what is considered the two side walls 18. Since the invention will be operating in the microgravity environment of space, it really doesn't matter where each pair of larger side-wall actuators 37 is located along the outer walls of the sealed containment vessel. As long as each pair is directly opposite each other and operating along the same axis so the equal and opposite torque (or Rotational Force) that the motors of the larger side-wall actuators 37 are imparting on the host vehicle can be perfectly cancelled out along the axis of their potential spin, and the second pair of smaller LMPs 36 are also directly opposite each other and are operated in unison with the first pair, it can easily be done. Obviously having four smaller LMPs to produce thrust instead of two will make it possible to double the amount of thrust that can be produced per Cycle and also double the increase or decrease in velocity that can be achieved.

Figure 32:
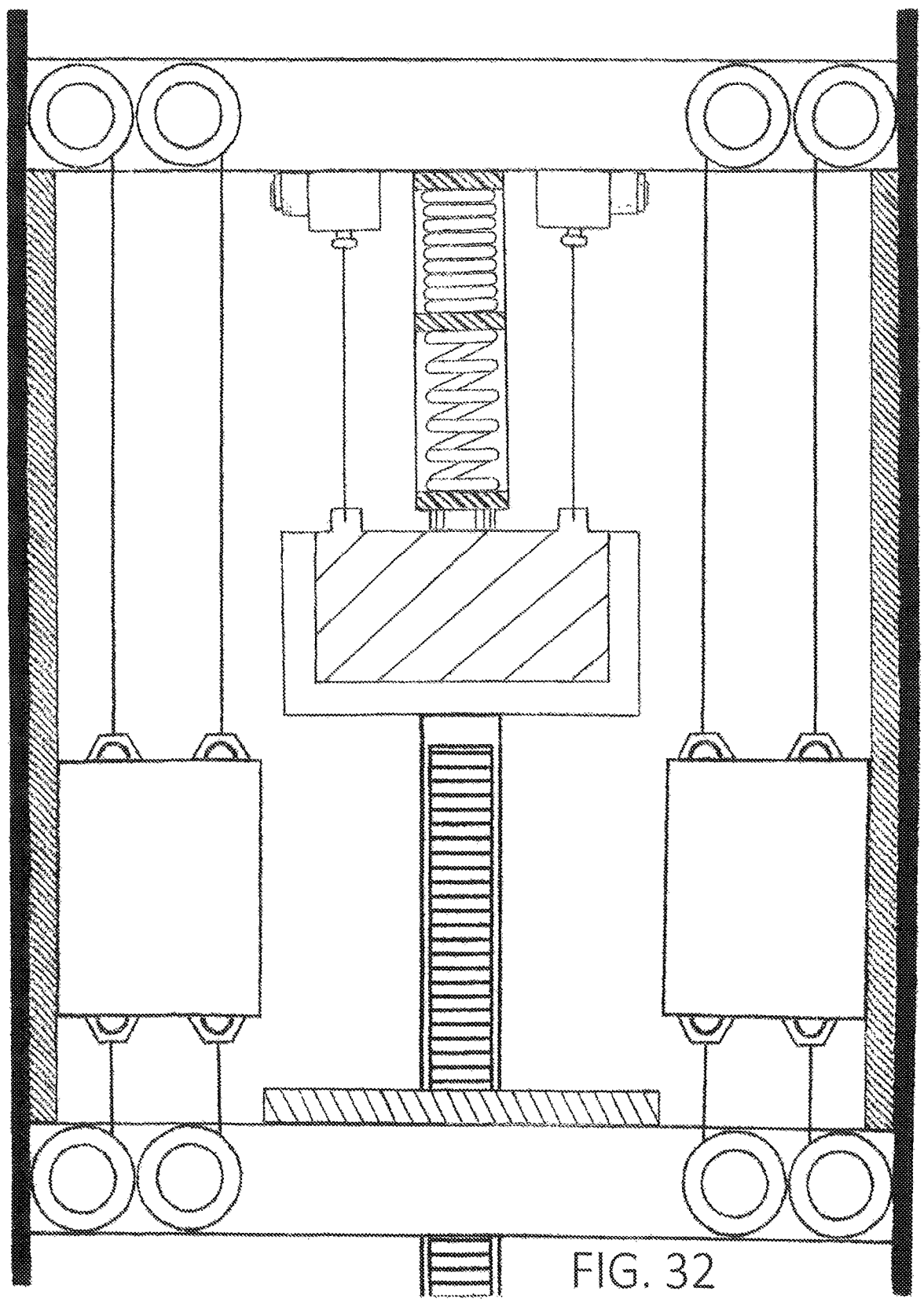
FIG. 32 shows an overhead view of the ninth embodiment of the invention combined with the sixth embodiment of the invention.

Another possibility to occupy the open middle area of the Unit would be to add any of the other possible embodiments of the invention that use a single large-mass LMP and a propulsion spring's housing 28. By using the same ratios for mass (25% for each of the two smaller LMPs 31 and 50% for the single large-mass LMP) as were used in the 1 kilogram prototype, the amount of thrust that could be produced each full Cycle by combining the ninth embodiment of the invention with, say, the sixth embodiment of the invention, could be increased significantly (see FIG. 32). Using a steel outer shell and a denser metal inner core for any or all of the LMPs would also save space and could even be used to increase (or decrease) the ratios for mass. And just because a single LMP (object 1 or the projectile) would be used with two smaller LMPs 36 (object 1a and 1b or the projectiles) in the same sealed containment vessel to primarily produce thrust in the same direction with all the LMPs that are used, since the two smaller LMPs 36 will be able to be used to produce thrust in either direction by simply having the additional capabilities of a spring-driven cable reel built into the cable generators 38 embedded in Bulkhead #1 and electric-power generating capabilities built into the cable generators 38 embedded in Bulkhead #2, although much more mass will have to be moved in order to propel the host vehicle in the opposite direction of the embodiment of the invention (or Unit) using the large-mass LMP, the combined Units would be able to be used to go in either direction.

Figure 33:
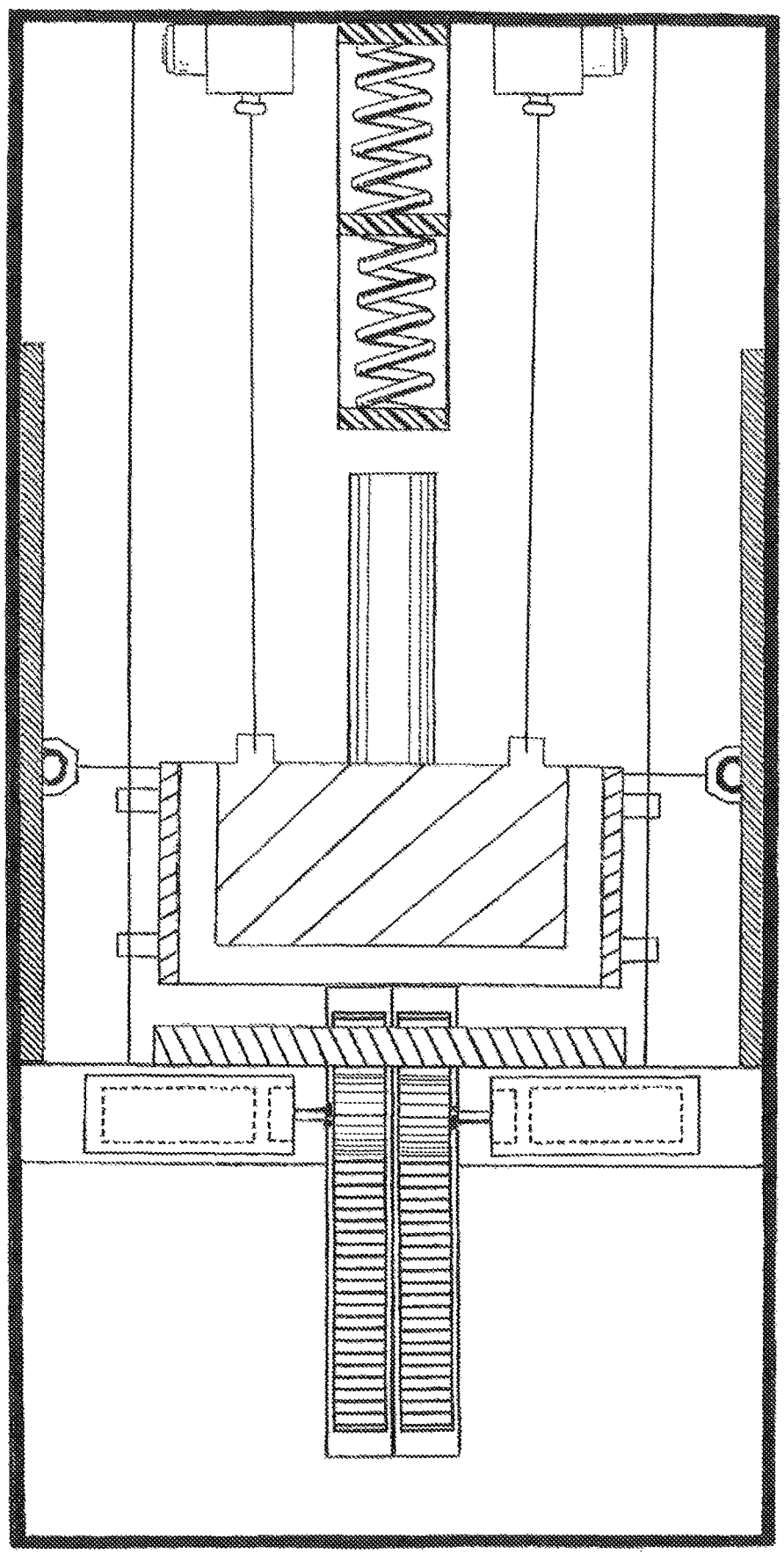
FIG. 33 shows an overhead view of the first embodiment of the invention combined with the third embodiment of the invention.

Other potential versions (or embodiments) of the invention that combine multiple Units of the invention, but would only be able to be used to propel the host vehicle in one direction, are also possible. And despite only being able to be used by one Unit per Cycle, a single large-mass LMP would also be able to be shared by combining multiple Units of the invention. They include combining the first embodiment of the invention with the third embodiment of the invention (see FIG. 33).

If the first embodiment of the invention is combined with the third embodiment of the invention, the LMP will be able to be used by either to produce thrust without either system interfering with the other. The only difference, other than the strap 5 being a little longer and having a little more slack available to work with, will be that when the LMP is in position to begin being pulled back at the beginning of Phase 1, the control system 1 will have to decide which embodiment of the invention it wants to use. If is elects to use the first embodiment of the invention (or Unit #1), it will not pull the LMP back any further than possibly just letting the end of the round-shaped rear shaft 31 make inconsequential contact with the second (or middle) bumper or buffer 27 within the propulsion spring's housing 28 so the remainder of the first embodiment of the invention can be completed without any obstructions or interference. If it elects to use the third embodiment of the invention (or Unit #3), the control system 1 will need to start by putting the smart motors controlling and powering the sprockets or pulleys within each of the two opposing side-wall linear actuators 17 into freely-turning-mode. Once this is done, the two low-mass mounting blocks/brackets 16 holding the two looped ends 15 of the strap 5 can easily be pulled farther away from Bulkhead #1 as the rear shaft 31 of the LMP is pulled back into the propulsion spring's housing 28 and locked and/or held in place by multiple means once the second equal length and strength compression spring 24 is fully compressed. If these simple tasks are done, the side-wall actuators will just need to keep enough slack in the strap 5 when the LMP is released for the third embodiment of the invention to perform any of the different embodiments of BM #1 or BM #2 it is capable of without interference.

Figure 34:
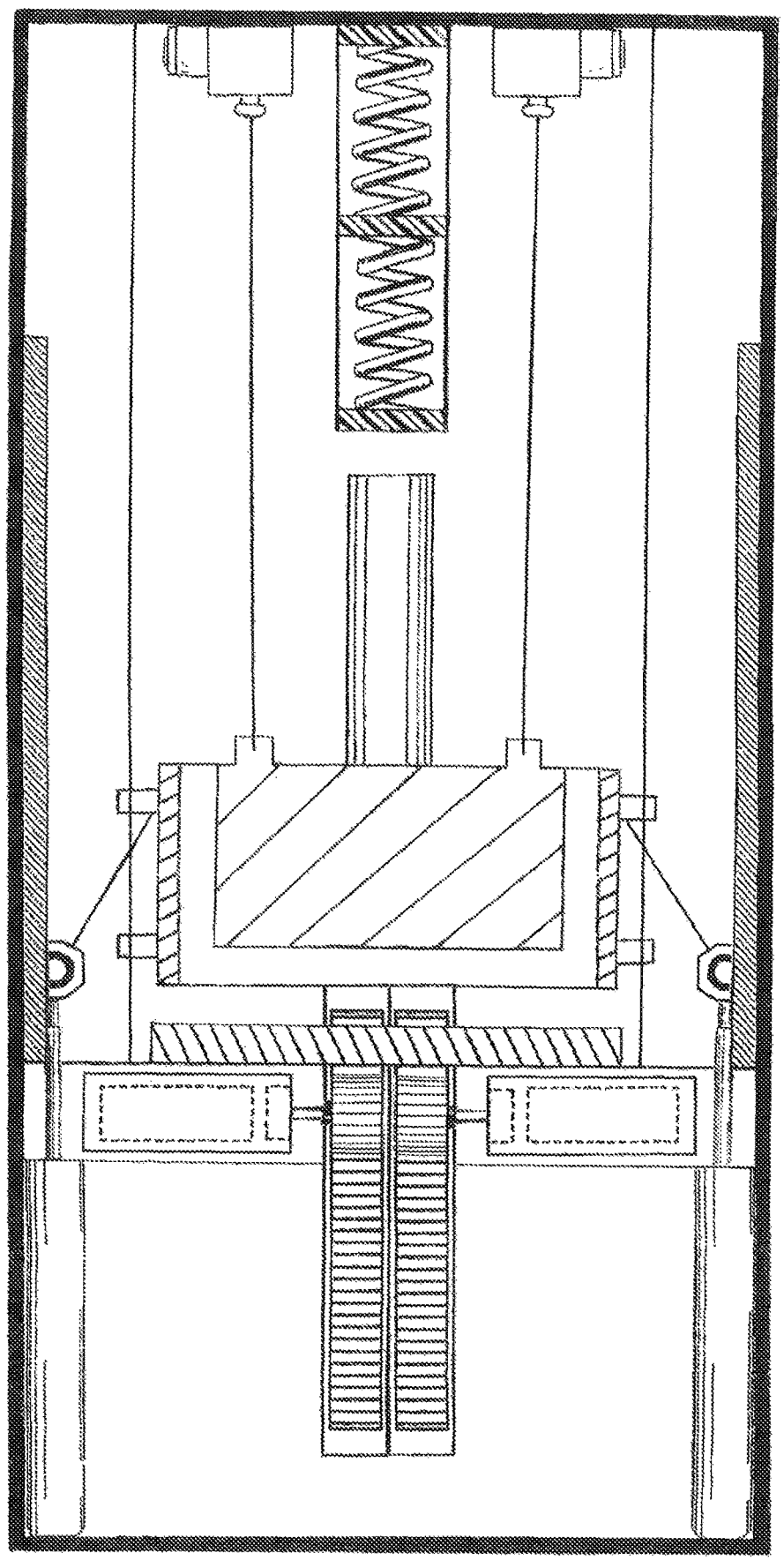
FIG. 34 shows an overhead view of the second embodiment of the invention combined with the third embodiment of the invention.

Another potential combination would be to combine the second embodiment of the invention (or Unit #2) with the third embodiment of the invention (see FIG. 34). If a Unit #2 is combined with a Unit #3, thrust can also be produced by either without either system interfering with the other. The only difference this time, since the two piston rod housings 25 and the cold temperature strap 21 will be used instead of the thick elastic strap 5, is that if a Unit #3 is to be used in this coupling, the smart end of the two piston rods 22 will also need to be disconnected electronically from the two mounting blocks/brackets 16 within the two opposing side-wall linear actuators 17 in order for the two looped ends 15 of the cold temperature strap 21 to be easily pulled farther away from Bulkhead #1 as the LMP is pulled back into the propulsion spring's housing 28.

As per the two previous examples, if a Unit #1 or a Unit #2 can be combined with a Unit #3, a Unit #1 or a Unit #2 can also be combined with a Unit #4, a Unit #6 or a Unit #7. By essentially having two, separate, Regular Units of the invention sharing the same LMP—which is the most expensive component due to the cost of transporting its mass into space and also the least likely component to experience any structural or mechanical failures or difficulties—having one of these combinations of Units together in one sealed containment vessel, will also be extremely useful and cost-effective should something happen to make any of the remaining components of the two Units inoperable. Also, if ever needed, a simple, electronically controlled means to disconnect the round-shaped rear shaft 31 from the main body of the LMP will certainly be an included option.

Additionally, if a Unit #9 is combined with a Unit #3, Unit #4, Unit #6 or a Unit #7, and large, spring-loaded, electric-powered, smart cable generators 38 are used with or instead of a square-shaped 7 or rectangular-shaped 20 (or any other shaped) metal shaft and its related components, they will be able to complete any of the different embodiments of BM #1 (without harvesting and storing energy) or BM #2 (with the harvesting and storing of energy) it is capable of performing.

Still, because of its increased ability to harvest kinetic energy and produce thrust, not to mention not require an impact and a partially inelastic collision in order to do so, the ninth embodiment of the invention will, in most instances, be preferable to combining multiple other embodiments of the invention. Then, when the added ability to produce thrust in either direction is factored in, the ninth embodiment of the invention is clearly superior to the others.

Think about it. This means the added ability to produce thrust in either direction will make it possible to accelerate or decelerate a host vehicle without needing to flip it around a full 180 degrees. That includes whether the sealed containment vessel containing a Unit #9 is being employed by its Direction Control Unit or is operating in a Regular Unit of the invention. In other words, a host vehicle making use of the ninth embodiment of the invention in all its deployed Units will be able to accelerate or decelerate a full cycle of thrust about as easy as it is for a driverless car to be put in forward or reverse. And by being able to use the ninth embodiment of the invention to produce thrust in either direction whenever desired, it will also mean that it can be done without any of the efficiency losses or potential long-term damage done due to repeated impacts of the main body of the LMP with any of the different embodiments of impactor and bulkhead behind it. Moreover, in addition to the increased amount of kinetic energy that can be harvested and the increased amount of thrust that can be produced due to increased efficiency each full cycle, using the ninth embodiment of the invention will no doubt also mean a longer lifespan for the EdDrive Propellantless Propulsion System.

In a similar note: Because the sealed containment vessels used by the various embodiments of the invention will likely have ample length and width—there should be more than enough room next to a cable generator 38 for any number of versions (or embodiments) of a square-shaped shaft 7 or a rectangular-shaped shaft 20 and their accompanying contact gears 10 and control mechanisms 11 to be used along with or instead of a smart cable generator 38 if so desired. That includes to lock and hold the smaller LMPs 36 in place during Phase 1 or to produce thrust using BM #1 or BM #2 during Phase 2. The same goes for any other aspects of the previous embodiments of the invention that may be used in the ninth embodiment of the invention.

Finally, the ability to use one or more pairs of larger side-wall actuators 37 that are directly opposite each other to complete the second "action and reaction" combination during Phase 1 without causing any movement whatsoever by the host vehicle as ideally sought will foster the development of a whole new range of new possibilities and embodiments of the invention that can be done. Just as with how having the motors in one larger side-wall actuator 37 turn clockwise while the motors in the opposing larger side-wall actuator 37 turn counterclockwise will cause their potential negative effect on the movement of the host vehicle to be cancelled out and make it possible to successfully complete the ninth embodiment of the invention as just described, having the motors in one larger side-wall actuator 37 turn clockwise while the motors in the opposing larger side-wall actuator 37 turn counterclockwise also means the motors can be used in many other ways to set other pairs of large mass objects (objects 1a or 1b or the projectiles) in motion without causing any movement whatsoever by the host vehicle as ideally sought. And if other pairs of LMPs can be set in motion by the motors of the two larger side-wall actuators 37 without causing any movement whatsoever by the host vehicle, it is certainly possible to devise other ways to use motors and actuators to do so.

Figure 35:
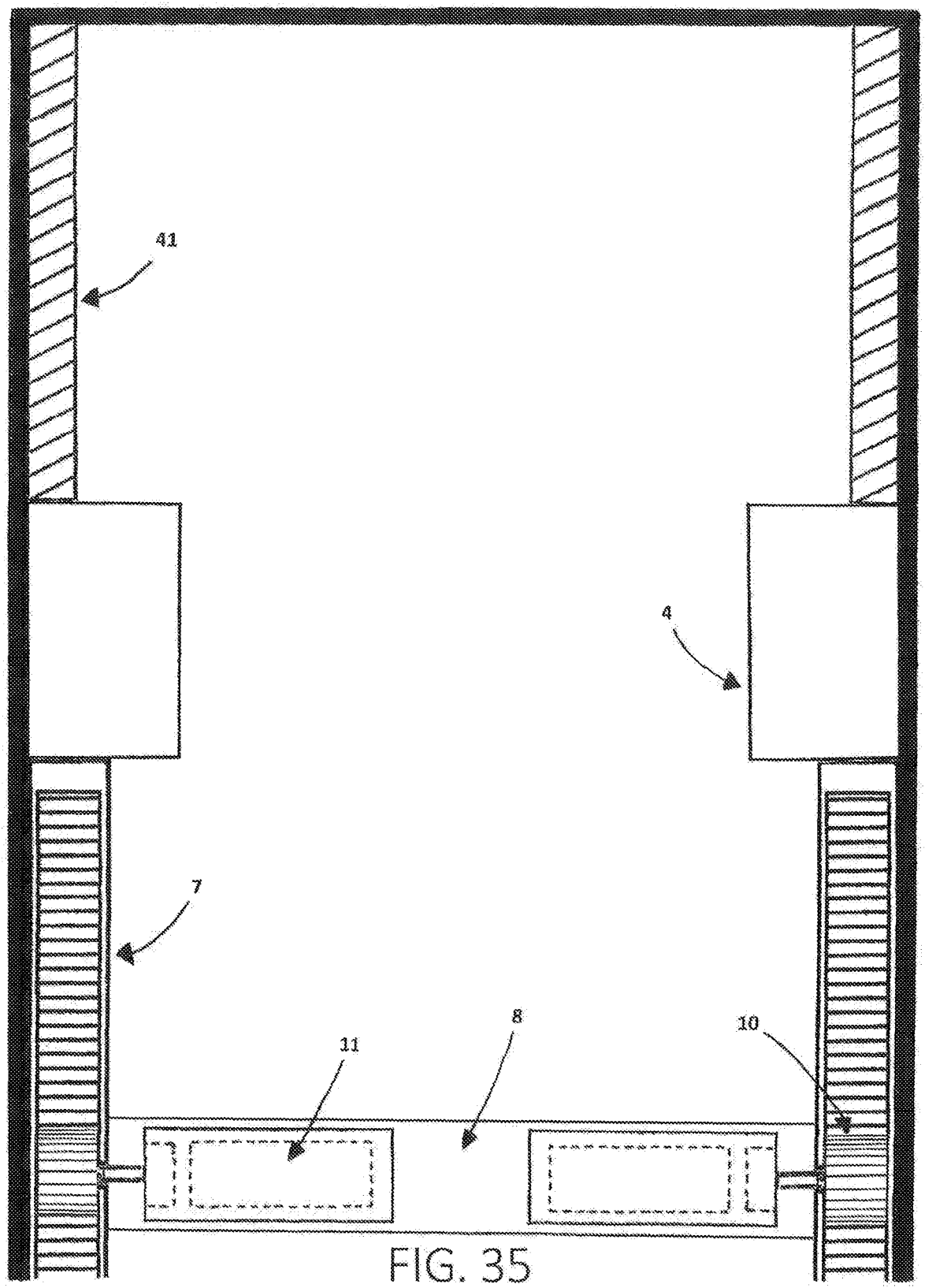
FIG. 35 shows an overhead view of a pair of opposing single rotor-driven actuators that are each used to directly set a projectile in motion at very high speed so it can interact with a block, shaft, gears and control mechanisms through an inelastic collision using mechanical means in order to use the kinetic energy of the combined projectile to produce thrust using Breakthrough Method #1 or Breakthrough Method #2.

Using a motor to directly set an object (object 1 or the projectile) in motion is still another possibility that would be a variation on the ninth embodiment of the invention that could easily be done. For example, one possible way to take advantage of the net force provided by a pair of opposing motors that would be securely attached to opposite walls of the sealed containment vessel and used to set a pair of objects in motion during Phase 1 without causing any movement whatsoever by the host vehicle, would be to use the motors to directly spin a round-shaped object possessing a considerable amount of mass at very high speed. Once the spinning object had achieved the desired velocity, the mechanical device (or carriage) holding the object could then use the centrifugal force being directly applied to the object to launch it so its kinetic energy could then be used to produce thrust during Phase 2 using BM #1 or BM #2. And by using the opposing motors, with one turning clockwise while the other is simultaneously turning counterclockwise, in the new, specially designed, single rotor-driven actuators 41 that will be able to utilize centrifugal force to first spin and then launch suitable projectiles a short distance through a cylindrical conduit at very high rates of speed, it would be possible to dramatically reduce the masses of such projectiles and still produce significant amounts of thrust during Phase 2 without causing any movement whatsoever by the host vehicle as ideally sought during Phase 1. By using the block 4, shaft 7, gears 10, and control mechanisms 11 (see FIG. 35) to complete Phase 2 after an inelastic collision during which the projectile and the block 4 immediately become stuck together through the use of mechanical means and then move together afterward away from the block's 4 starting point as shown in FIG. 35, their combined linear momentum and kinetic energy could then be easily converted into thrust using Breakthrough Method #1 or Breakthrough Method #2.

The repurposed LMP and the ball-shaped projectile—preferably made with a steel outer shell and a tungsten inner core—could then be returned at the beginning of Phase 1 to their starting points by any number of "action and reaction" procedures or maneuvers that could successfully be performed without causing any movement whatsoever by the host vehicle as ideally sought. These "action and reaction" combinations could include any method or system used in previous embodiments of the invention or use other mechanical devices—including robots and robotic arms—that could take advantage of having their motorized parts attached to opposing walls of the sealed containment vessel in order to successfully complete the first "action and reaction" combination of Phase 1 without causing any movement by the host vehicle. As long as the opposing mechanisms mirrored each other with one mechanism (or combination of mechanisms) and its motors turning clockwise while the other mechanism and its motors turned counterclockwise, if the same basic concepts and principles that made it possible to complete all the other first "action and reaction" combinations without causing any movement whatsoever by the host vehicle are emulated, they should be able to be used successfully as well.

As with all the other previously described potential embodiments of components, parts, methods and/or systems used by the EdDrive Propellantless Propulsion System, any of the embodiments of the components, parts, methods and/or systems that are described in the detailed description of the ninth embodiment of the invention, if possible, may be used in other embodiments of the invention.

Tenth Embodiment of the Invention

Figure 36:
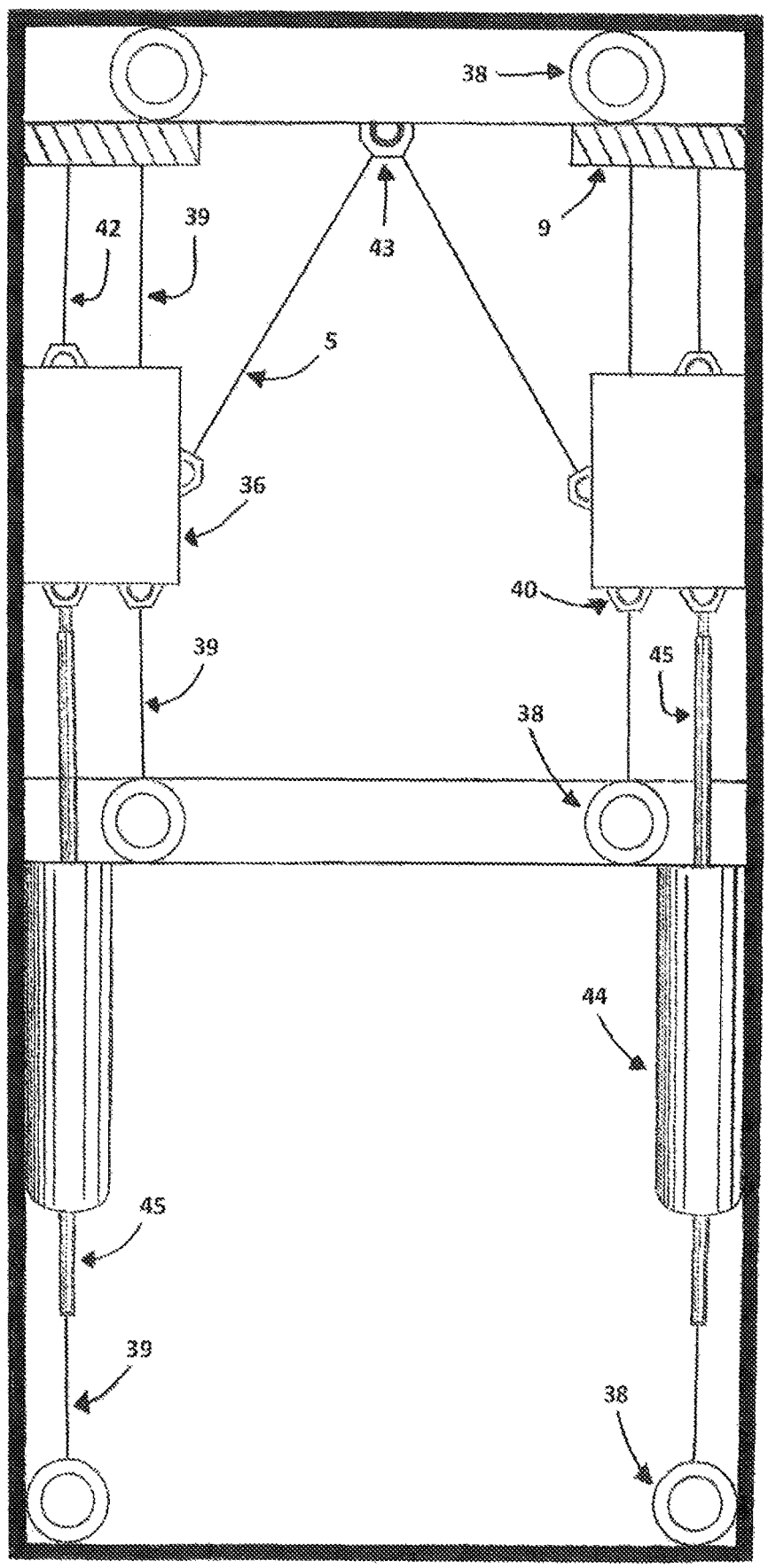
FIG. 36 shows an overhead view of the tenth embodiment of the invention in the middle of the second "action and reaction" procedure or maneuver of Phase 1 and just milliseconds before the smart linkage of the longer piston rod is disconnected from the two smaller LMPs.

The tenth embodiment of the invention is similar to the ninth embodiment of the invention in many ways (see FIG. 36). This includes its use of two, separate, large mass objects (objects 1a and 1b or the projectiles), that are likewise approximately half the mass of the single large mass projectile (or LMP) used in previous embodiments of the invention. But unlike the ninth embodiment of the invention, which completes the "action and reaction" procedures and maneuvers used during Phase 1 without causing any movement whatsoever by the host vehicle, the tenth embodiment of the invention returns to using a rubber or spring-using impactor 9 and a bulkhead 8 (Bulkhead #2 in this instance) to complete Phase 1. The need for an impactor also means a partially inelastic collision and a rebounding mass are needed before a round of thrust can be completed by the tenth embodiment of the invention (or a Unit #10) using the new or somewhat similar embodiments of either Breakthrough Method #1 (without harvesting and storing energy) or Breakthrough Method #2 (with the harvesting and storing of energy) that are used in the ninth embodiment of the invention.

Another difference between the tenth embodiment of the invention and the ninth, is in how the two longer and larger chain or belt-driven side-wall linear actuators 37 have been replaced by an all new combination of mechanical devices that will also be located and run along the side wall 18 of the sealed containment vessel. This new combination (or embodiment) of mechanical devices will make use of multiple elastic members (elastic straps and springs) in order to complete Phase 1 and also meet the objective of causing no net negative movement of the host vehicle in the process of making the rebounding masses of the two smaller LMPs 36 available to be used to complete Phase 2.

Another difference between the tenth and ninth embodiments of the invention, is that there is now a thick elastic strap (the additional elastic strap 42) connected to the second side bracket 40 that is attached to the mounting block/bracket 16 on the far side of each of the smaller LMPs 36 and extends all the way back to Bulkhead #2. The additional elastic strap 42 is in addition (and borrowing from the first embodiment of the invention) to a thick elastic strap 5 that is attached at either end to the side of the two smaller LMPs 36 and is also held in place at its center on the face of Bulkhead #2 by a single stationary metal bracket 43 in a location similar to where a single smart winch 2 would have previously been located in the first two embodiments of the invention. This single stationary metal bracket 43 is very similar to the low-mass metal brackets 16 that had previously been used in conjunction with the two side-wall linear actuators 17 to hold the two looped ends 15 of a thick elastic strap 5 or a cold temperature strap 21—and which are still used to hold the looped ends of whatever elastic strap or straps (and potentially even springs) that are being utilized in the new set up.

Another difference between the ninth and tenth embodiments of the invention, is in how a second pair of large, electric-powered, smart cable generators 38 will be added to assist in the generation of force in the first "action and reaction" combination during Phase 1. The first pair of smart cable generators 38 used to generate force in Phase 1 will still be firmly embedded within the steel reinforced double-walls of Bulkhead #1. The second pair, however, will be located on the far side of Bulkhead #1, where they will be attached to the third bulkhead of the sealed containment vessel (or Bulkhead #3). From either location, each new cable generator 38 will then ultimately connect to and become part of a new, larger, and more substantive, mechanical device that will primarily run along either side wall 18 of the of the sealed containment vessel and extend all the way from Bulkhead #3 to the second wall of Bulkhead #2. As for how the kinetic energy of the two smaller LMPs 36 will be harvested and/or converted into thrust after the impact with an impactor 9 now located on the face of the first wall of Bulkhead #2, a third pair of large, electric-powered, smart cable generators 38 will be embedded in Bulkhead #2 and be used to perform BM #1 or BM #2 and complete phase 2.

The addition of an additional elastic strap 42, which, in the preferred version (or embodiment) of the tenth embodiment of the invention, will connect to the side bracket 40 on the far side of the sliding mounting block/bracket 16 and extend and connect to Bulkhead #2 using another low-mass stationary bracket 43, will have two primary purposes. The first, will be to help the thick elastic strap 5, which is attached to the side of the two smaller LMPs 36 and also held in place at its center on the face of Bulkhead #2 by a single stationary metal bracket 43, pull and slide the released mounting blocks/brackets 16 holding the two smaller LMPs 36 back toward Bulkhead #2 much faster and with much more Elastic Force than just using the thick elastic strap 5 alone. The second, will be to better balance out the equal and opposite amount of Elastic Force and Spring Force pulling and pushing the host vehicle and the two smaller LMPs 36 toward each other at an accelerating pace during the second "action and reaction" procedure or maneuver during Phase 1.

Fortunately, the innovative new technologies and methods of the invention that are successfully implemented and exhibited in the different "action and reaction" combinations used during Phase 1 in many of the previous embodiments of the invention, are also able to be used to generate force without causing any unintended movement by the host vehicle in the tenth embodiment of the invention. The influence of these innovative new techniques and methods of the invention, in addition to how they are put to good use with the addition of the additional elastic straps 42, can also be seen clearly in many of the new mechanical devices (or embodiments) that are used by the tenth embodiment of the invention to help generate more force during Phase 1 and also contribute to the significant amount of thrust that is produced by the cable generators 38 during Phase 2.

As in the ninth embodiment of the invention, the preferred method to perform the tenth embodiment of the invention will make extensive use of large, electric and electric motor-powered, smart cable generators 38. The first pair of these new winch-like devices will be firmly embedded between the two walls of Bulkhead #1 and also be placed as close as possible to the side wall 18 on either side of the sealed containment vessel. The second pair of large, electric-powered, smart cable generators 38 will be located in the area on the far side of Bulkhead #1, where they will each be combined with a new mechanical device that is very similar to the self-contained unit used in the second embodiment of the invention—which included the longitudinally movable piston rod 22, the two equal length and strength compression coil springs, and their low-mass tubular housing 25. But because the second pair of smart cable generators 38 will also need to perform the responsibilities of a winch 2, they will be placed at the far end, away from Bulkhead #1, behind the new, low-mass, tubular containers 44 housing a new, longer, piston rod 43 and a pair of equal length and strength compression springs (a combination of an equal length and strength extension spring and an equal length and strength compression spring could also be used), and be attached to the third steel reinforced bulkhead (or Bulkhead #3) in the considerably longer sealed containment vessel the tenth embodiment of the invention is operating in.

Furthermore, the new, low-mass, tubular containers 44 housing the new, longer piston rod 44 and two equal length and strength compression springs, will be flipped around 180 degrees so the back end of the longer piston rod 45 can be pulled back instead of being pulled toward the side of the invention where the two smaller LMPs 36 (object 1a and 1b or the projectiles) are located. As a result, the longer piston rod 45 will indeed need to be longer because it will also need to extend out the other end of the new longer piston rod housing 44 so the longer piston rod 45—and its smart end and linkage—can be automatically connected to the side bracket 40 securely attached on the side of the mounting block/bracket 16 holding the smaller LMP 36 it will be responsible for helping to propel and also automatically disconnect from it when needed as well.

If a thick elastic strap 5 made of vulcanized natural rubber or synthetic rubber is the primary elastic member (a cold temperature strap 21 and springs could also be used) to help generate force in Phase 1, the first pair of cable generators 38 embedded in Bulkhead #1 will start Phase 1 by reeling in the cable generator cables 39 that pass through the first wall of Bulkhead #1 and are attached to the nearest side of the two smaller LMPs 36 by a second side bracket 40. Each smaller LMP 36 is attached to the face of the mounting block/bracket 16 that, with the help of a ball system to reduce friction, will easily slide along a track that is firmly attached to the two opposing side walls 18 of the sealed containment vessel. After the two smaller LMPs 36—which will preferably have a steel outer shell and a tungsten inner core to reduce their size and/or increase their mass—are pulled back as close to Bulkhead #1 as possible with their cable generator cables 39 reeled in and locked in place (internally or otherwise), the first pair of cable generators 38 can then be prepared to be put into freely-turning-mode by the control system 1 while, at the same time, the third pair of large, electric-powered, smart cable generators 38 embedded in Bulkhead #2 are being prepared to use their spring-loaded cable reel capabilities to rapidly reel in their cable generator cables 39 without interfering with the progress of the two smaller LMPs 36 once the LMPs are released, and then be converted into thrust producing devices that will perform similarly to the devices used in the ninth embodiment of the invention to perform Breakthrough Method #1 or Breakthrough Method #2 during Phase 2.

However, before all this (and much more) can be done by the control system 1, something first needs to be done to counteract all the initial positive movement of the host vehicle that will be caused by multiple means when the two smaller LMPs 36 are released.

The first major source of positive movement by the host vehicle will be caused by the two elastic straps (meaning one half of the thick elastic strap 5 and also the additional elastic strap 42) on either side of the sealed containment vessel pulling with an equal and opposite amount of Elastic Force on Bulkhead #2 and simultaneously with the same amount of Elastic Force on the mounting block/bracket 16 (by the additional elastic strap 42) and also the smaller LMP 36 (by one end of the thick elastic strap 5) once the two smaller LMPs 36 are released by whatever means are locking and/or holding them in place.

The second major source of positive movement by the host vehicle will be caused by the two equal length and strength compression springs within the two longer piston rod housings 44 pushing with an equal and opposite amount of Spring Force on Bulkhead #3 and simultaneously pushing with the same amount of Spring Force on the mounting blocks/brackets 16 holding the two smaller LMPs 36 once the two smaller LMPs 36 are released by whatever means are locking and/or holding them in place.

During a Regular Cycle of the tenth embodiment of the invention, the smart end of the two, longer, longitudinally movable piston rods 45 passing through the two walls of Bulkhead #1 will be directly connected by their smart linkage to the mounting blocks/brackets 16 the entire time they are still pushing and rapidly sliding the two mounting blocks/brackets 16 holding the two smaller LMPs 36 along the track on either side wall 18. Only when the two sets of equal length and strength compression springs within the two longer piston rod housings 44 reach their natural length and equilibrium position is the smart linkage disconnected by the control system 1.

Because the two smaller LMPs 36 will be securely attached to the mounting blocks/brackets 16 and extend a bit farther in toward the center of the sealed containment vessel being used with either a Direction Control Unit or a Regular Unit of the invention, the two smaller LMPs 36 will be able to be connected directly to the two cable generators 38 embedded in Bulkhead #1. By having the pair of smart cable generators 38 that are attached to Bulkhead #3 pull back and compress the first equal length and strength compression spring 23 within the two longer piston rod housings 44 while, at the same time, they are also stretching or extending the second equal length and strength compression springs 24, the two cable generators 38 embedded in Bulkhead #1 will also be able to be used to simultaneously pull back the two smaller LMPs 36 toward Bulkhead #1. That means, the smart end of the two longer piston rods 45 will be able to be connected to the mounting blocks/brackets 16 by their smart linkage and the side bracket 40 at the same time the two smaller LMPs 36 are being locked and held in place near Bulkhead #1 by whatever means are used.

With the two smaller LMPs 36 pulled back and locked and held in place near bulkhead #1, and the equal length and strength compression springs within the two longer piston rod housings 44 also locked and held in place by whatever means are locking and holding the two smaller LMPs 36 locked and held in place (more on this later), once the two LMPs 36 are released by the control system 1, there will be an equal and opposite amount of Elastic Force from the fully extended elastic straps pulling on Bulkhead #2 in the desired direction as the amount of Spring Force—provided by the two fully compressed first equal length and strength compression springs 23 and the two fully extended second equal length and strength compression springs 24 within the two longer piston rod housings 44—pushing and pulling the host vehicle in the same desired direction the entire time the elastic straps are rapidly contracting and the equal length and strength compression springs are rapidly returning to their natural length. As a result, when the Elastic Force provided by the additional elastic straps 42 and the two halves of the thick elastic strap 5 are combined with the Spring Force from the equal length and strength compression springs, the full force, or the total force of the additional elastic straps 42, the thick elastic strap 5, and the four compression springs, will become quite substantial. Together, as the elastic straps and the four compression springs are propelling the two smaller LMPs 36 at an accelerating pace toward Bulkhead 2—and continuing to increase their kinetic energy the whole time—the exact instant that all the elastic members (straps and springs alike) reach their natural length and equilibrium position is when the smart linkage of the two longer piston rods 44 will be disconnected. And with the two smaller LMPs 36 at their top acceleration rate and velocity, the second "action and reaction" combination in Phase 1 will be able to be completed.

This will, of course, happen after the impact of the two smaller LMPs 36 with a separate pair of rubber or spring-using impactors 9 attached to the face of Bulkhead #2, which, as in the previous embodiments of the invention requiring an impact, will result in a partially inelastic collision between the host vehicle and the two smaller LMPs 36. Afterward, the kinetic energy of the two rebounding smaller LMPs 36 will then be available to be used by the third pair of large cable generators 38 embedded between the walls of Bulkhead #2 to perform either Breakthrough Method #1 or Breakthrough Method #2.

If BM #1 (without harvesting and storing energy) is chosen by the control system 1 to be used, after the spring-loaded cable generator cables 39 of the two cable generators 38 embedded in Bulkhead #2 are put into freely-turning-mode as the two smaller LMPs 36 make contact with the two separate impactors 9, the cable generator cables 39 of the cable generators 38 embedded in Bulkhead #2 can then be abruptly locked and stopped by the control system 1 in the same one or two milliseconds (as was done previously with other embodiments of BM #1) after the two smaller LMPs 36 simultaneously break contact with the two separate impactors 9.

On the other hand, if BM #2 (with the harvesting and storing of energy) is chosen, once the two smaller LMPs 36 (objects 1a and 1b or the large mass projectiles) have impacted with the impactors 9 and completed the partially inelastic collision, the control system 1 can switch the large, spring-loaded, electric-powered, smart cable generators 38 from freely-turning-mode over to energy-generation-mode at the beginning of Phase 2. Once in energy-generation-mode, the smart cable generators 38 can then be used to harvest the kinetic energy of the two smaller LMPs 36 and simultaneously take advantage of both Conservation of Energy and Conservation of Momentum (as was done previously with the other embodiments of BM #2) and also turn it into thrust.

By substituting a combination of springs and a cold temperature strap 21 in place of the thick elastic strap 5 during Phase 1, a more powerful and capable of operating in colder temperatures version of the tenth embodiment of the invention will also be able to be constructed. The biggest differences between the two versions (or embodiments), other than those previously described, will have to do with how much more additional space may need to be added in order to accommodate the additional springs and spring's housings and possibly where the large, potentially spring-loaded, electric-powered, smart cable generators 38—in whatever numbers are possible and/or may be desired—will be positioned or located.

In a similar note: In either version of the tenth embodiment of the invention just described—and also because the longer piston rods 45 pass through Bulkhead #1 in the first version with more than enough room for the first pair of cable generators 38 to be placed right beside them within Bulkhead #1—there will also be more than enough room for any number of versions (or embodiments) of the square-shaped steel shaft 7 or the rectangular-shaped steel shaft 20 (or any other shaped metal shaft) and their accompanying contact gears 10 and control mechanisms 11 to be used instead of the cable generators 38 if so desired to lock and hold the smaller LMPs 36 in place during Phase 1 or to produce thrust using BM #1 or BM #2 during Phase 2.

Also, just as with how the two smaller LMPs 36 in the ninth embodiment of the invention being located and operating along the two side walls 18 of the sealed containment vessel leaves a lot of open space in between them that could be used to add other Units of the invention, the same holds true for the tenth embodiment of the invention. And while it would certainly require a longer sealed containment vessel to accomplish than using any previously described combination or combined pair of Units, the use of a Unit #10 with a Unit #3, Unit #4, Unit #6 or Unit #7 would certainly be possible. The stationary bracket 43 attached to Bulkhead #2 for the strap 5 or the cold temperature 21 would just have to become two separate stationary brackets 43 that would need to be moved away from the center to make room for the other Unit and would each hold an end of half of the original strap.

As with all the other previously described potential embodiments of components, parts, methods and/or systems used by the EdDrive Propellantless Propulsion System, any of the embodiments of components, parts, methods and/or systems that are described in the detailed description of the tenth embodiment of the invention, if possible, may also be used in other embodiments of the invention.

Eleventh Embodiment of the Invention

The eleventh embodiment of the invention has to do with using Artificial Intelligence and multiple AI-enhanced or AI-enabled control systems to simultaneously produce thrust using multiple and/or also different types of Units (or embodiments) of the invention together in unison to propel long-distance spacecraft at truly incredible velocities—and also be able to attain these incredible velocities much faster.

Being able to use multiple propulsion spring's housings 28 and a wide variety of springs as is done in the eighth embodiment of the invention, or combining different embodiments of the invention together to create a new Unit that can produce more thrust per Cycle as can certainly be done with the ninth and tenth embodiments of the invention, is one thing. Being able to simultaneously use multiple, completely separate Units of the invention together at the same time to increase the amount of thrust that can be produced by the EdDrive Propellantless Propulsion System during each Cycle by 20 times or more, is another. One obvious thing that still hasn't been overcome, has to do with why can't any number of Units of the invention—primarily Regular Units or Specialty Units such as a Direction Control Unit—be used during the other eleven seconds, including prior to and after the less than one second it usually takes to complete BM #1 or BM #2 in a full or Regular Cycle of the invention (or whatever time period is possible depending on the size of the host vehicle and the number of Units deployed), in order to provide a constant—or closer to constant—flow of thrust?

Certainly using multiple Units of the Direction Control Unit (DCU), or using one or more Regular Units of the invention with large mass spacecraft in conjunction with a DCU, or using two embodiments of the invention that share the same LMP in the same Unit, or adding additional Units to a Unit #9 or Unit #10, or even placing two or more Units of the invention back-to-back in the main body of a spacecraft and/or in one or more attached, long, sealed, containment vessels that look very much like a rocket booster, have been covered. But why multiple Units of the invention can't be used in rapid succession to produce a steady flow of thrust still hasn't. The reason why, along with saving the best embodiment of the invention for last, has to do with the fact that when a DCU or a Regular Unit of the invention isn't actively engaged in producing thrust during Phase 2, the large amount of mass that is possessed by the Unit's large mass object (object 1 or the projectile), and can but isn't being used to produce thrust, will just be more mass that has to be accelerated or decelerated in order to change the direction and/or velocity of the host vehicle. Basically, if an LMP (or multiple LMPs), just like any other large mass object (or objects), isn't in the process of being used to produce thrust, it is just more "dead weight" (or mass) that has to be moved.

But, fortunately, there is a way to overcome this problem. Once again, it entails the use of an AI-enhanced or AI-enabled control system, a wide variety and number of high-quality smart sensors, and enough charged supercapacitors and/or other electricity sources to simultaneously do a whole lot of things at the same exact time. In fact, as long as there is enough electric power available to first complete Phase 1, (which will mainly consist of powering all the winches 2 or cable generators 38 or other winch-like devices, as well as all the motors of the actuators that are used) and then simultaneously perform Breakthrough Method #1 (without harvesting and storing energy) or Breakthrough Method #2 (with the harvesting and storing of energy) once the LMP or smaller LMPs 36 are just a millisecond or two into Phase 2 with all the Units of the invention that are capable of being deployed by a spacecraft or other large mass host vehicle, all the Direction Control Units and Regular Units can be used at the same exact time as if they were one Unit of the invention that contained all of their masses.

Yes, that means a spacecraft or other host vehicle can be made to travel much faster than the at least 2.045 miles-per-hour increase or decrease in velocity that can be achieved during a Regular Cycle of a single DCU or Regular Unit of the invention using one of the previously described embodiments of the invention if the ratios for mass are the same as exist in the 1 kilogram test prototype. For instance: if a space-based spacecraft was designed to look similar to a rocket with four Regular Units of the invention encircling the back portion of the spacecraft like traditional rocket boosters, and if there was also a single Direction Control Unit sticking out the back (or aft) of the main rocket body by itself with the same thrust potential as the four Regular Units, if all five Units engaged BM #1 or BM #2 at the same exact time, the spacecraft could be expected to travel five times faster than if it was just using a single Direction Control Unit. Put another way, if a spacecraft could increase or decrease its velocity by more than 2.045 mph every twelve seconds by just using a single DCU with the same ratios for mass as in the 1 kilogram test prototype (or the mass of the LMP being 50% of the mass of the entire spacecraft without including the mass of the LMP), the same spacecraft using four Regular Units and a single DCU (which, as previously described, will be needed for propellantless direction control purposes by every host vehicle), could be expected to accelerate or decelerate by more than 10 mph every twelve seconds, or more than 50 mph every minute.

And it won't even be hard to do. All it would take is for a more capable (or even advanced) Artificial Intelligence-Enhanced or Enabled Control System to connect the AI-chip or board—which, in most instances, will be serving as the primary computing device used by the control system 1—for each of the five individual Units of the EdDrive Electric-Powered Propellantless Propulsion System being deployed by the spacecraft in this example, and coordinate the operation of each Unit so that they would all release the angular piece 12 and/or whatever else was being locked and held in place so they would simultaneously complete Phase 1 at the same time. If this, or something similar is done (including how newer and better computer technologies are inevitable and will be used as they become available), all five Units of the invention could perform either Breakthrough Method #1 or Breakthrough Method #2 within a millisecond or two of completing Phase 1 and produce thrust with all of them at the same exact time. And even if each individual Unit was set up or behaved a little differently, the Artificial Intelligence System (including those currently being developed that will be able to perform many more and/or also different tasks at the same time using a single AI), will eventually become familiar with all the idiosyncrasies of all the different Units deployed and get them to produce the most amount of thrust possible per cycle.

Naturally, if size or electric power limitations make it necessary to increase the amount of time in seconds needed to complete each full or Regular Cycle of the invention (for instance, increasing it from 12 to 15 seconds), the velocities that would still be able to be attained by using multiple Units (DCU or Regular Units) of the invention together in unison would still be incredible—and certainly way beyond anything now capable with propellant-using propulsion systems. As a result, even if the masses of all the LMPs (object 1 or the projectile) being used to complete Phase 1 and Phase 2 were reduced significantly (including by even more than half) because of the limitations of the devices and/or their parts or components, the potential increases in acceleration or deceleration by simultaneously using multiple Units would still make extremely high-speed space travel by spacecraft of even huge masses (potentially hundreds of tons) possible.

Figure 37:
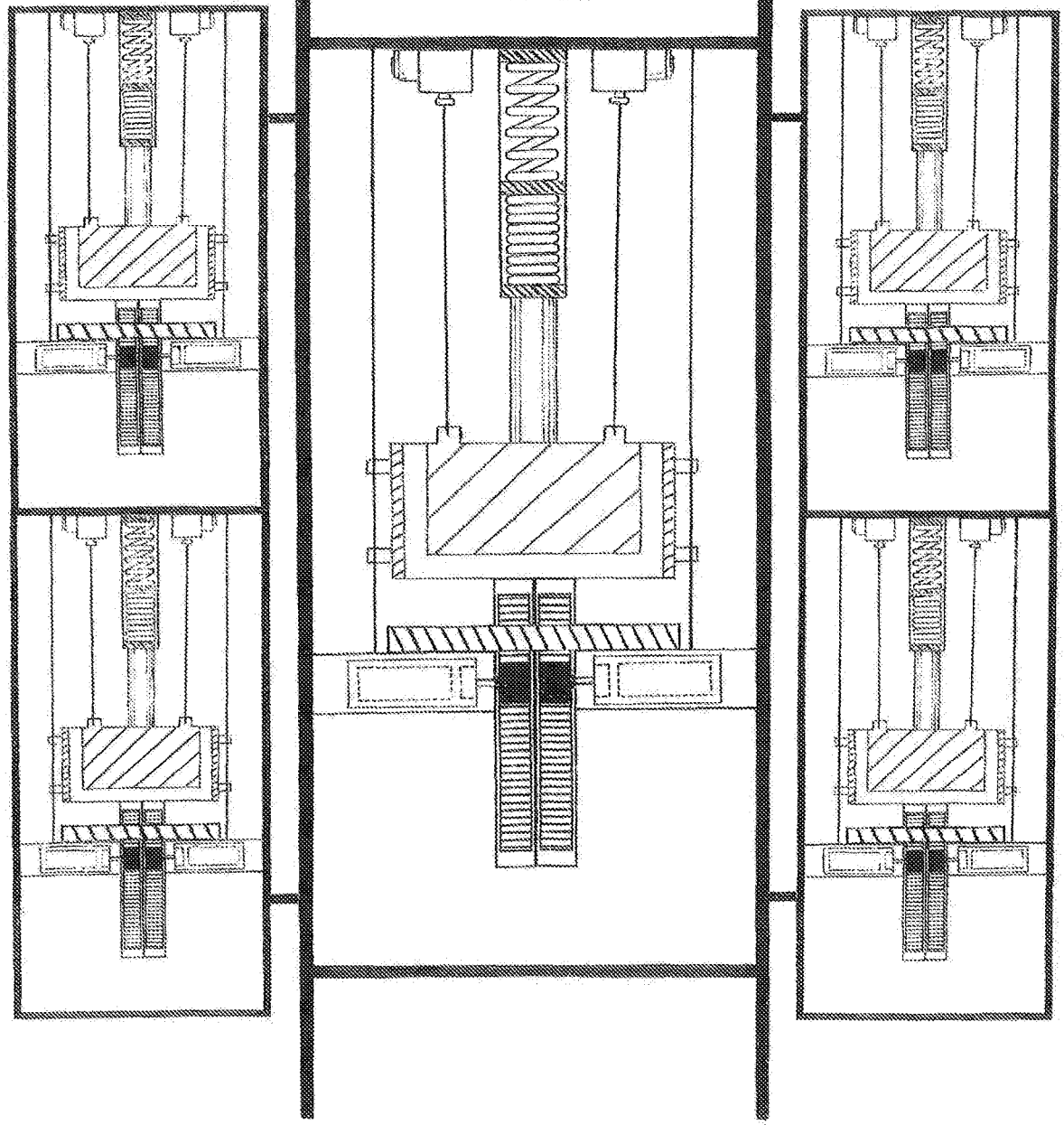
FIG. 37 shows an overhead view of two, back-to-back, sealed containment vessels within long, tube-shaped, booster rocket-like containment vessels containing Unit 6s of the invention on either side of a section of the wider main body of a long, tube-shaped, host vehicle with a Unit 6 within it.
Figure 38:
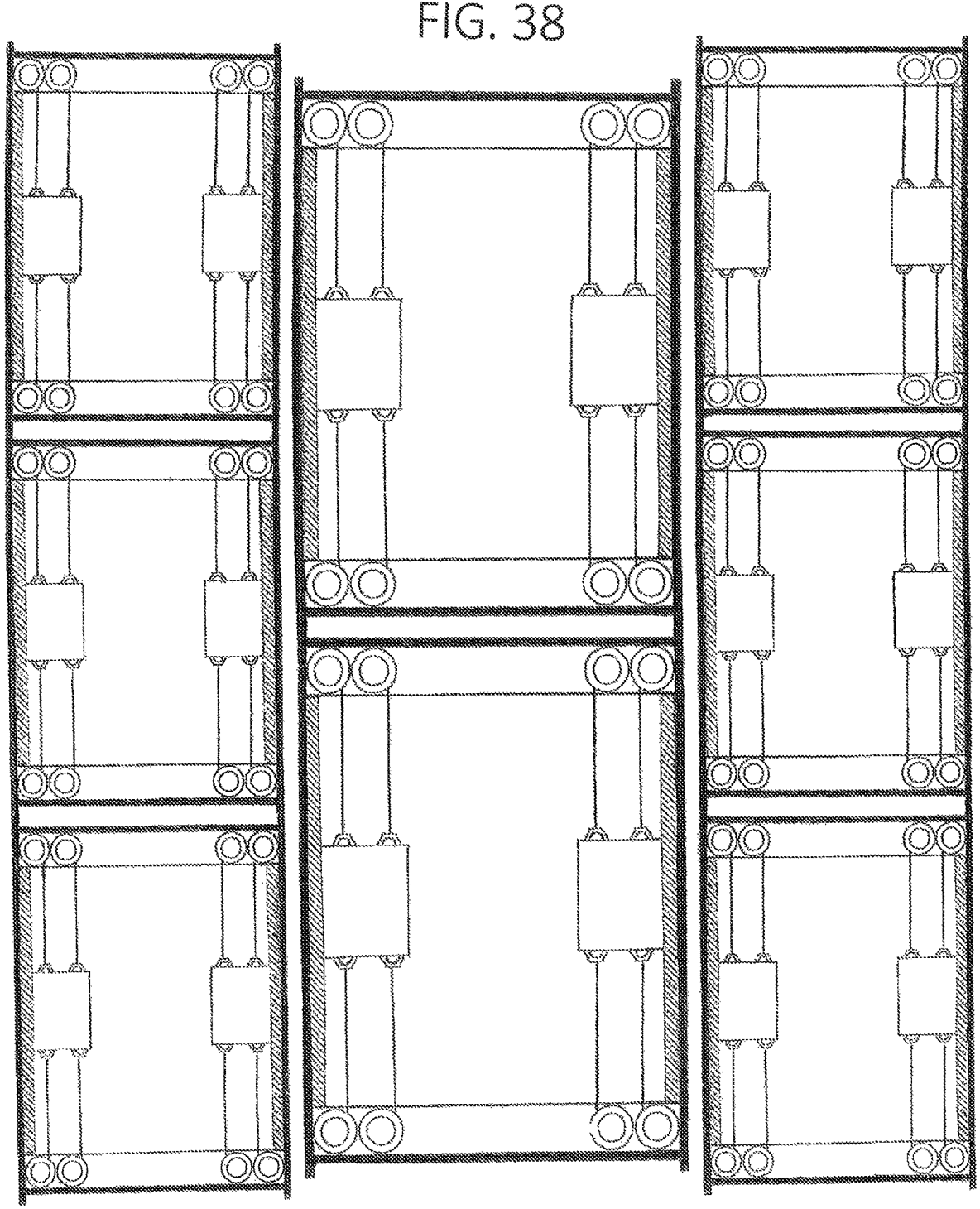
FIG. 38 shows an overhead view of three, back-to-back, sealed containment vessels within long, tube-shaped, booster rocket-like containment vessels containing Unit 9s of the invention on either side of a section of the wider main body of a long, tube-shaped, host vehicle with two Unit 9s within it.

With this incredible ability to use multiple Units of the invention and have the Masses of all of their LMPs act as if they were one single Mass by simply performing Breakthrough Method #1 or Breakthrough Method #2 with all of them simultaneously, the EdDrive Propellantless Propulsion System will be transformed from a relatively easy to construct mechanical device into a high-tech marvel that will finally make long-distance space travel to the farthest reaches of the solar system possible for people from all around the world. And since there really is no limit to the number of individual Units (or embodiments) of the invention that can be used to simultaneously produce thrust as long as they can all perform Phase 2 simultaneously (see FIGS. 37 and 38), instead of just having two rocket booster-like containment vessels as shown in FIG. 37 (deploying multiple Unit 6s) and FIG. 38 (deploying multiple Unit 9s), and as many as six rocket booster-like sealed containment vessels around the aft section of the main body of a spacecraft that could contain two or more Units of the invention within each, another two to six rocket booster-like sealed containment vessels, with each containing another two or more Units of the invention, could be placed around the middle section of the spacecraft if it was long enough and truly amazing velocities would be able to be attained.

Having multiple rocket booster-like sealed containment vessels would also be extremely useful should any of them have a mechanical failure that couldn't be fixed or otherwise posed a threat to the crew or mission. Because it could be connected to the host vehicle in a manner similar to how a typical rocket booster is connected to a rocket, if for some reason it needed to be eliminated, it could simply be jettisoned and use whatever means were available to safely set it on a course that would send it far out into the solar system.

As with all the other previously described potential embodiments of components, parts, methods and/or systems used by the EdDrive Propellantless Propulsion System, any of the embodiments of components, parts, methods and/or systems that are described in the detailed description of the eleventh embodiment of the invention, if possible, may also be used in other embodiments of the invention.

Electric-Powered Propellantless Direction Control System

As previously described. The Electric-Powered Propellantless Direction Control System is in fact a totally separate and self-contained Specialty Unit of the invention that has the ability to direct its thrust in any direction at any time by purely mechanical means. However, as also previously described, the Direction Control Unit (or DCU) will have its overall size limited, and thus the amount of thrust it can produce per Regular Cycle limited, by some basic structural constraints. Even so, for the vast majority of small and medium-sized host vehicles, a single Direction Control Unit will be sufficient to meet all its direction control, velocity control, and also propulsion needs.

This will also hold true for many large host vehicles as well. Telescopes, satellites, communication hardware, and even some spacecraft (autonomous or otherwise) with lower and/or more nuanced propulsion needs,—including those using a combination of both propellantless and propellant-using propulsion systems—will do just fine for many years using just a single Direction Control Unit.

Large, high-mass, long-distance spacecraft, including other host vehicles such as cargo carriers that may be used for a variety of purposes including asteroid mining, will be a different story. Once a host vehicle reaches a certain mass (say 25,000 lbs. or 11,340 kilograms), using a DCU all the time by itself to produce thrust will result in way too much wear and tear on its joints to make much sense of only using a DCU. This continues to be true even with the potential for a DCU to automatically deploy additional supports when not being used to change direction or perform other specialized tasks. And when human safety is entered into the equation, adding a Regular Unit of the invention—or even another DCU or two or more—will likely be the best choice. But one thing is certain: if a spacecraft or other host vehicle—including space stations, gateways and new types of docking infrastructure—wants to have the ability to actually change or alter the direction of its linear momentum through propellantless means on a regular and/or continued basis in a significant way, it will need to make use of at least one Direction Control Unit.

Newton's laws state that an object in motion will stay in motion unless acted upon by an external force. So unless it encounters an interstellar object or a source of gravitational pull, the spaceship will keep traveling linearly in the same direction. The same also applies to rotational motion. A rotating object will continue to rotate unless acted upon by an external torque. These two things (linear motion and rotational motion) are independent—one will not affect the other.

Due to the inherent nature of the invention and the need to not only prioritize its structural integrity but also the structural integrity of where the DCU is ultimately located, the preferred location for the DCU will be at either end of the host vehicle. In most embodiments of spacecraft, or other host vehicles, this will mean at, what would normally be considered, either the front (forward) or the back (aft). By being located in either the front or the back, the DCU will most likely be able to be embedded in or attached to a major structural component of the host vehicle. And since it will also be preferable for the DCU to be positioned, horizontally, or running lengthwise in the same direction as the host vehicle, the width of the DCU should not be made wider than the overall width of the host vehicle.

Figure 39:
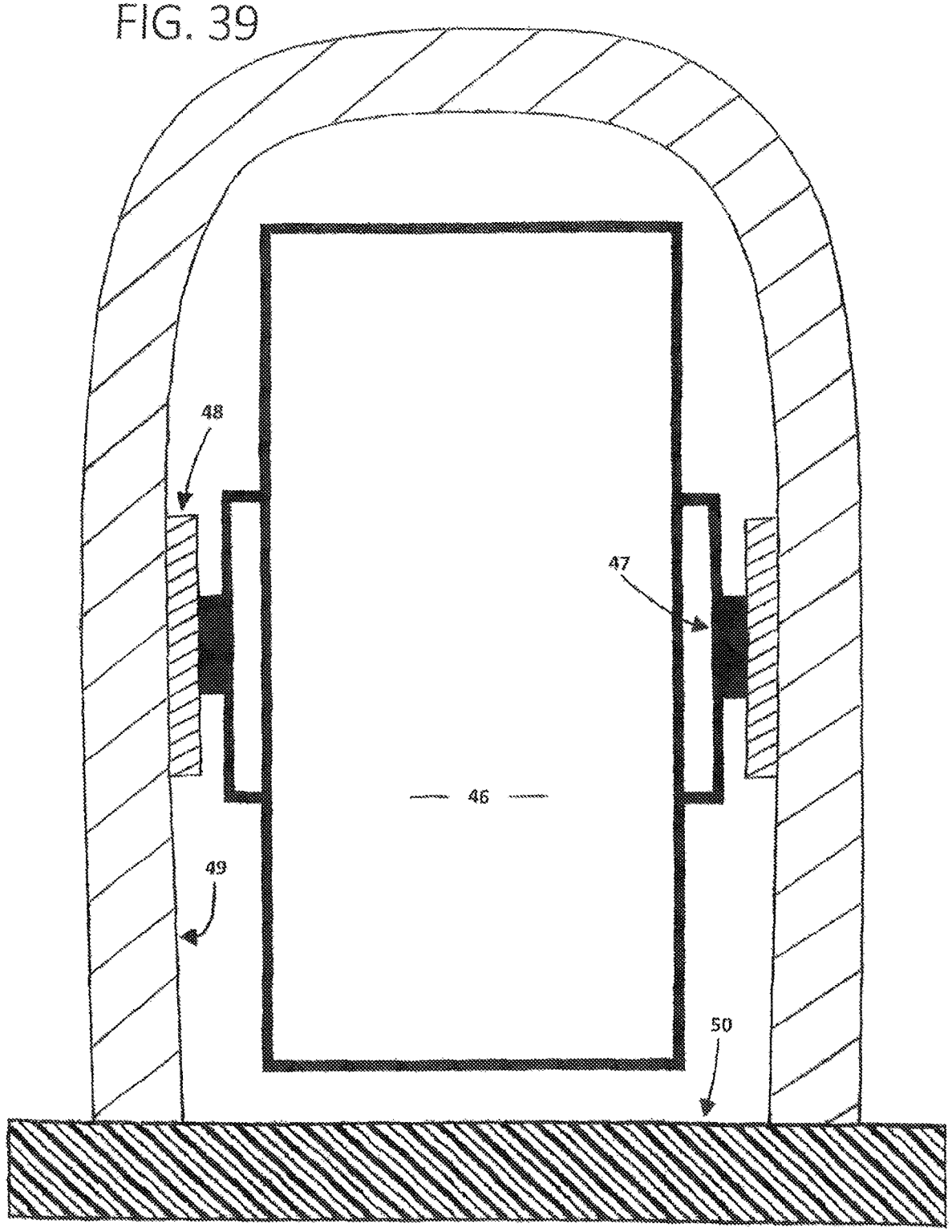
FIG. 39 is an overhead view of the pipe-shaped, sealed, metal tube of a Direction Control Unit with a bearing housing on either side attached to the strong support bean that is connected on either end to the rotatable circular base.
Figure 40:
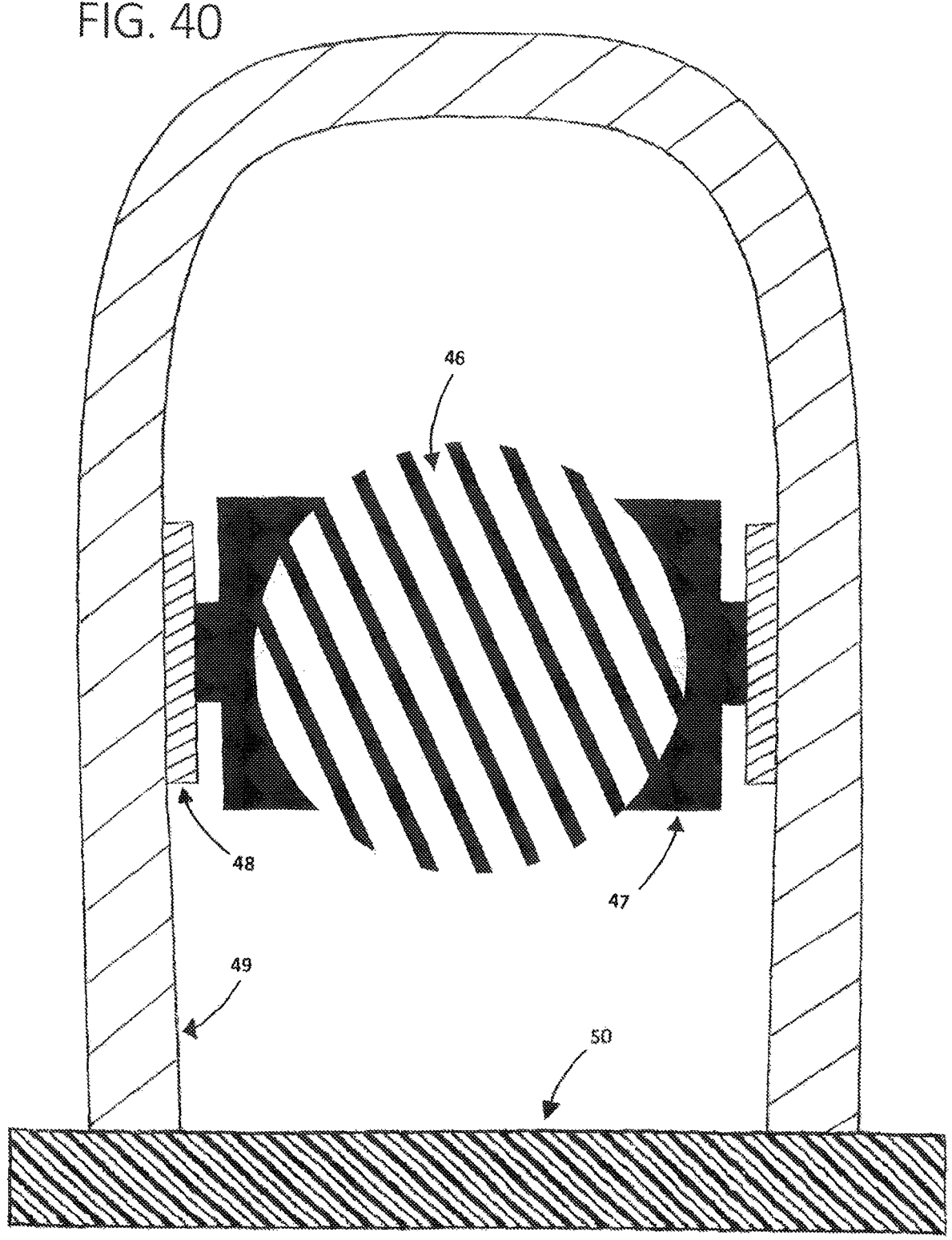
FIG. 40 is an overhead view of the pipe-shaped, sealed, metal tube of a Direction Control Unit at a 90 degree angle with the two rotation shafts and their connectors securely attached to the side of the pipe-shaped metal tube.

The thrust producing component of the Direction Control Unit will be housed in a pipe-shaped, hollow, (preferably) low-mass, metal tube 46, with both ends sealed and with the length being considerably longer than the width (see FIG. 39 and FIG. 40). As shown in in FIGS. 39 and 40, the pipe-shaped tube 46 component of the DCU (which will contain all the elements of a Regular Unit of the invention within its sealed outer shell), will be able to rotate a full 360 degrees on its central axis.

The rotation shaft 47 of the pipe-shaped metal tube 46, will preferably be made of a strong metal or metal alloy and will be permanently attached to the pipe-shaped tube 46. The unattached end of the rotation shaft 47 on either side of the pipe-shaped tube 46, will first pass through a bearing housing 48. The two bearing housings 48 (also shown in FIGS. 39 and 40), which are also centrally located in respect to the pipe-shaped tube 46, are attached to a strong support beam 49 that has a rounded, horseshoe-like bend in the middle and extends in one solid piece (unless the back, curved section is made of a lower mass material or eliminated entirely) from where the strong support beam 49 connects to the rotatable circular base 50 on either end. The rotatable circular base 50, which will preferably have a diameter no wider than the host vehicle, will make it possible for the rotatable (on its central axis) pipe-shaped tube 46 to be pointed in any direction by the control system 1 by being able to rotate a full 360 degrees as well.

The rotatable circular base 50 will also preferably be embedded in the back (aft) or front (forward) of the host vehicle in a steel (or a material stronger and lighter than steel) reinforced bulkhead so the rotatable circular base 50 can be secured with additional supports with little difficulty when thrust is being produced to accelerate or decelerate the host vehicle. By being embedded in the bulkhead, all the mechanical parts for the rotatable circular base 50 will also be able to be located there. And since a simple electric-powered chain or belt-driven pulley system will be the preferred method (or embodiment) to rotate the rotatable circular base 50 a full 360 degrees, placing automatically deployable additional supports (not shown) behind where the two ends of the strong support beam 49 are secured to the rotatable circular base 50 with the aid of a large metal plate at either end will assist in making sure the full impact of the thrust from the invention is transferred from the DCU to the host vehicle. Deploying even more structural supports to assist in securing the rotatable circular base 50 to the back (aft) or front (forward) bulkhead—or perhaps even the side—of a host vehicle will also be done as needed in the most practical and cost-effective means possible.

Figure 41:
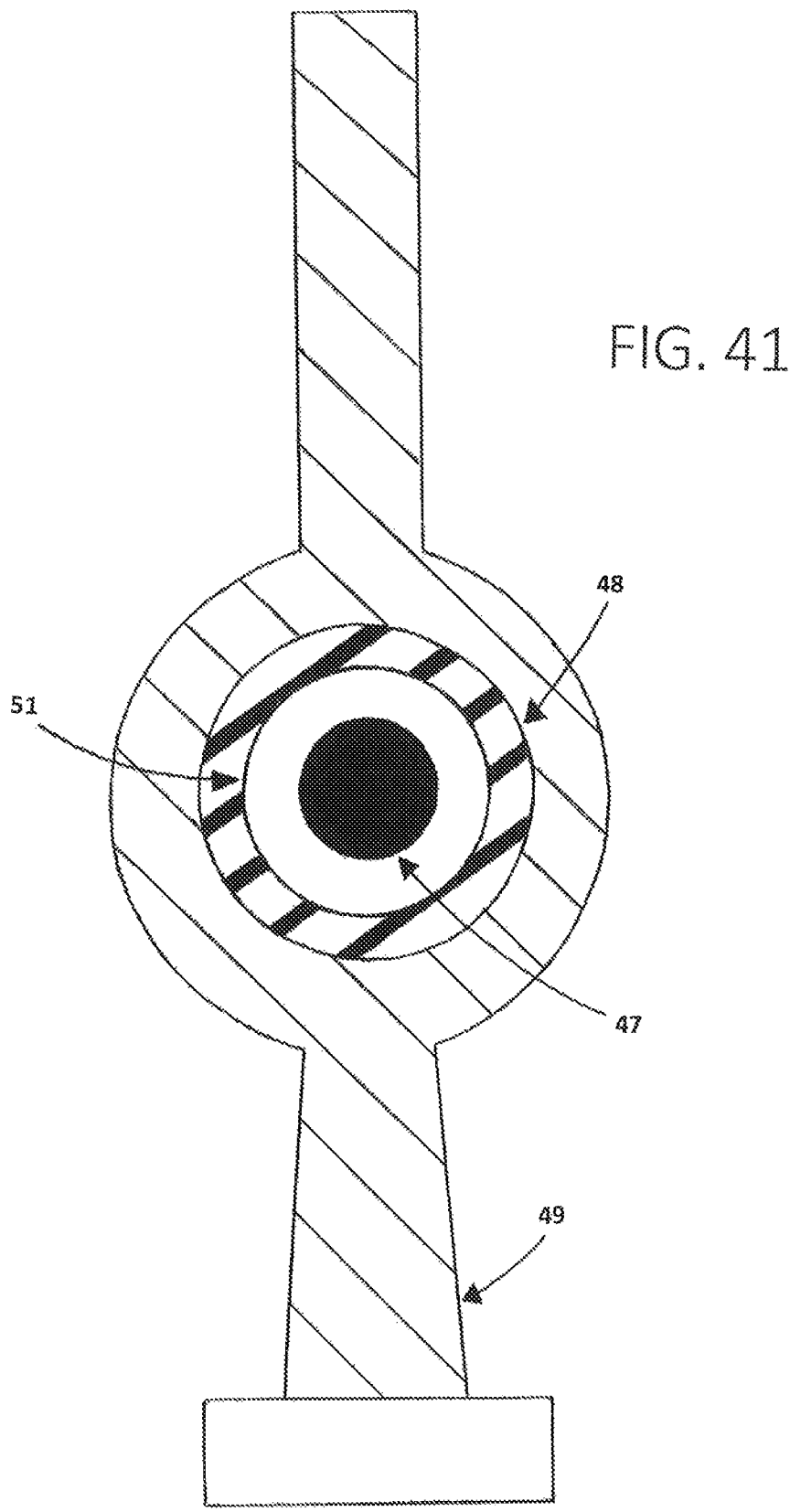
FIG. 41 shows a side view of the strong support beam with the shaft bearing within the bearing housing and the end of the rotation shaft in the center of the shaft bearing.

Within each of the two bearing housings 48 on either side of the pipe-shaped tube 46 will be a rotation shaft bearing 51 for the rotation shaft 47 on either side of the pipe-shaped tube 46 to rotate a full 360 degrees with. There are many different potential embodiments for the rotation shaft bearings 51 that can be used by the DCU. The rotation shaft 47 will fit snuggly within the center of the rotation shaft bearing 51 and be located within the two bearing housings 48 centrally located on either side of the pipe-shaped tube 46 housing the Specialized Unit of the invention (see FIG. 41).

Figure 42:
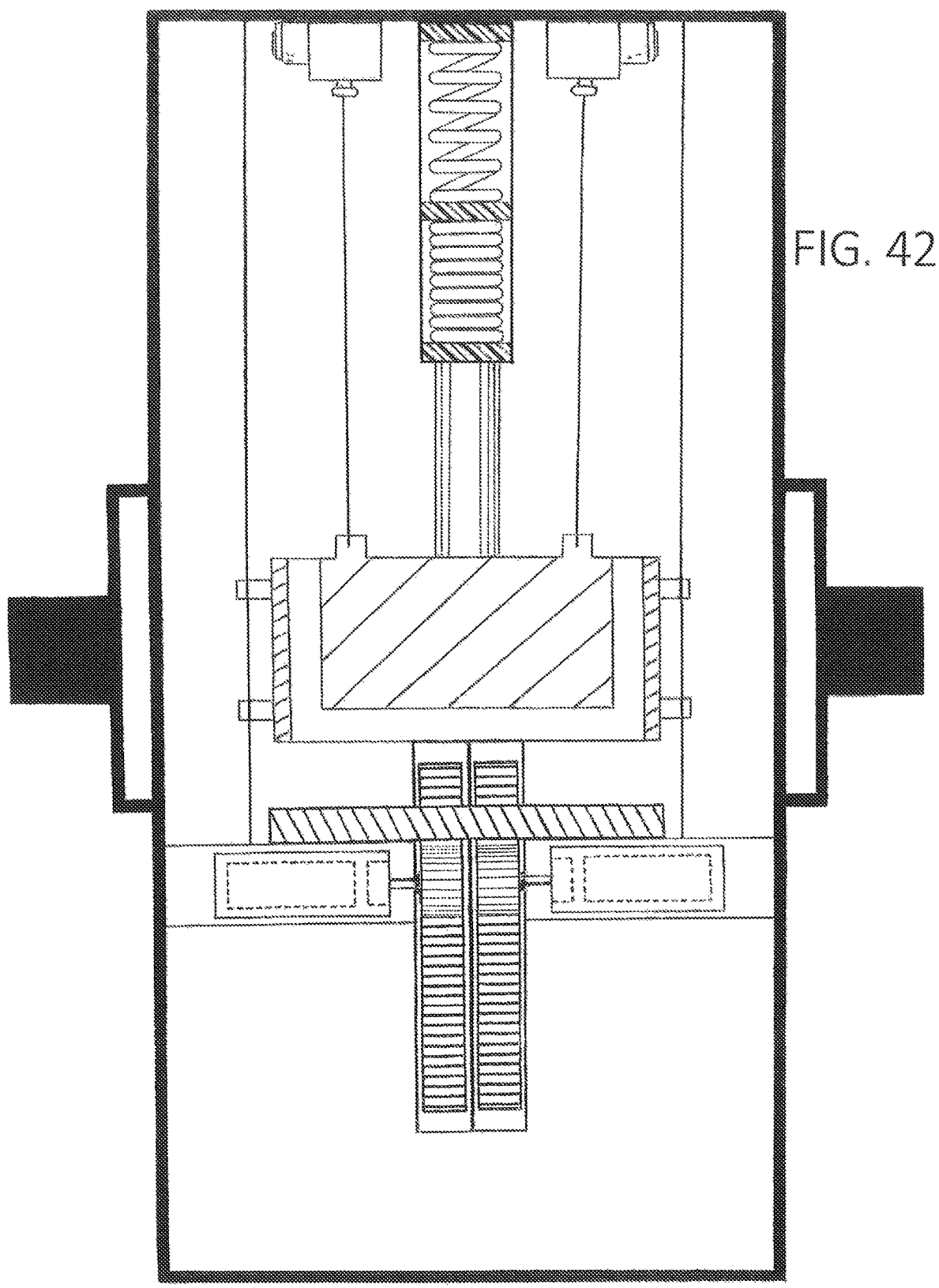
FIG. 42 is an overhead view of the sixth embodiment of the invention within the pipe-shaped, sealed, metal tube (or containment vessel) of a Direction Control Unit and its permanently attached rotation shaft that will be used to rotate the sealed containment vessel a full 360 degrees on its central axis.
Figure 43:
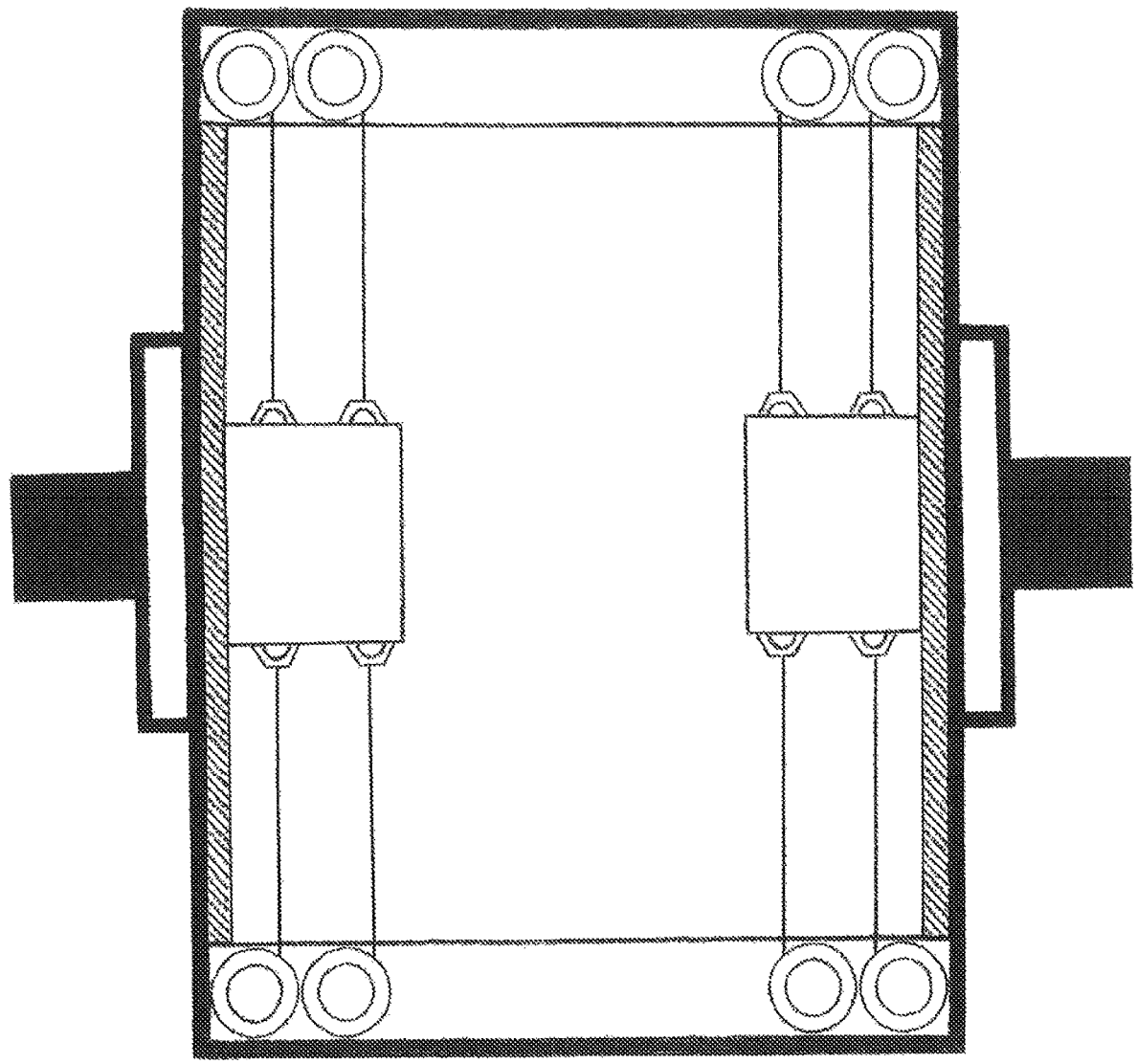
FIG. 43 is an overhead view of the ninth embodiment of the invention within the pipe-shaped, sealed, metal tube of a DCU and its permanently attached rotation shaft that will be used to rotate the sealed containment vessel, and that can contain any one of the thousands of potential embodiments of the invention, a full 360 degrees on its central axis.

A simple electric-powered chain or belt-driven pulley system will also be the preferred method (or embodiment) to rotate the two shaft pulleys (not shown) that will be permanently attached to the two rotation shafts 47 and be used by the control system 1 to rotate the pipe-shaped tube 46 a full 360 degrees so the DCU can indeed be pointed in any direction. Direct-drive motors that are connected directly to the rotation shafts 47 will be another possible option (or embodiment) to rotate the pipe-shaped tube 45 a full 360 degrees. The Regular Units of the sixth and ninth embodiments of the invention shown within the pipe-shaped metal tube 46 of the DCU in FIGS. 42 and 43 respectively, each have the main body of the LMP centrally located to assist in the balanced operation of the entire Direction Control Unit when it is making a direction or course change, and will help ensure the longevity of the DCU so it will continue to be able to be used to propel the host vehicle in any direction it is pointed.

Finally, after using this document to describe multiple different potential embodiments of the invention that are made possible by the innovative new concepts and principles that are the basis for the invention and essential for its successful operation, it is also a purpose of this patent application to legally state that there are thousands of different potential embodiments of the invention that can potentially be constructed using any of the previously described potential embodiments of components, parts, methods and/or systems used in any of the previously described embodiments of the EdDrive Propellantless Propulsion System.

Moreover, while this invention has been described as using two new breakthrough methods or systems to produce propellantless thrust, as well as using new propellantless systems for velocity control and direction control purposes, as well as using many other new or innovative procedures or maneuvers to generate or induce net forces and achieve other objectives, the present embodiments of the invention—which may already be described herein using multiple embodiments—may be further modified within the spirit and scope of this disclosure. This application is therefore intended to cover any variations, uses, or adaptations of the invention using its general concepts and principles. Further, this application is intended to cover such departures from present disclosure as come within known or customary practice in the disparate arts to which this invention pertains.

LIST OF PARTS

1—Artificial Intelligence-Enhanced Control System (control system)
2—Electric-Powered Smart Winch or Winch-Like Device (winch)
3—Low-Mass, Stronger-Than-Steel, Wound, Metal Alloy Cable or Synthetic Rope (cable)
4—Large Steel Block (block)
5—Thick Elastic Strap (strap)
6—Metal Connector (connector)
7—Square-Shaped Steel Shaft (shaft)
8—Double-Walled, Steel Reinforced Bulkhead (bulkhead)
9—Rubber or Synthetic Rubber, or Spring-Using Impactor (impactor)
10—Contact Gear or Guide Gear (contact gear)
11—Control Mechanism (control mechanism)
12—Angular Piece of Steel (angular piece)
13—Spring-Loaded Piston (piston)
14—Vertical Linear Actuator (vertical actuator)
15—Looped Ends of Thick Elastic Strap or Cold Temperature Strap or Additional Strap (looped ends)
16—Low-Mass Metal Bracket (bracket)
17—Chain or Belt-Driven Side-Wall Linear Actuator (side-wall actuator)
18—Side Wall of Sealed Containment Vessel (side wall)
19—Fourth Contact Gear (fourth contact gear)
20—Rectangular-Shaped Steel Shaft (rectangular shaft)
21—Cold Temperature Strap (cold temperature strap)
22—Piston Rod (piston rod)
23—First Equal Length and Strength Compression Coil Spring (first equal length and strength compression spring)
24—Second Equal Length and Strength Compression Coil Spring (second equal length and strength compression spring)
25—Low-Mass Piston Rod and Compression Spring's Tubular Housing (piston rod housing)
26—Low-Friction, Round-Shaped, Bumper or Buffer (round-shaped bumper or buffer)
27—Square-Shaped Bumper or Buffer (bumper or buffer)
28—Long, Rectangular-Shaped, Low-Mass, Propulsion Spring's Housing (propulsion spring's housing)
29—Guide Cable (guide cable)
30—Guide Loops (guide loops)
31—Round-Shaped Rear Metal shaft (rear shaft)

32a—Steel Arm or Bar with Latch, Hook, or Angular Piece of Steel (latch, hook, or angular piece)
32b—Standard Shaft for Use with Magnets (standard shaft with magnets)
32c—Second Square-Shaped Steel Shaft (second steel shaft)
32d—Stoppers (stoppers)
33—Single, Large-Diameter, Compression Coil Spring (single compression spring)
34—Large-Diameter, Equal Length and Strength Helical Expansion Spring (equal length and strength expansion spring)
35—Single, Large-Diameter, Expansion Spring (single expansion spring)
36—Smaller LMP (smaller LMP)
37—Longer and Larger, Chain or Belt Driven, Side-Wall Linear Actuator (large side-wall actuator)
38—Large, Electric and Electric Motor-Powered, Smart Cable Generator (cable generator)
39—Low-Mass, Stronger-than-Steel, Wound, Metal Alloy Cable for Cable Generator (cable generator cable)
40—Side Bracket (side bracket)
41—Single Rotor-Driven Actuator (single rotor-driven actuator)
42—Additional Elastic Strap (additional strap)
43—Stationary Bracket (stationary bracket)
44—Low-Mass, Longer Piston Rod Tubular Housing (longer piston rod housing)
45—Longer Piston Rod (longer piston rod)
46—Low-Mass, Hollow, Pipe-Shaped, Sealed Metal Tube (pipe-shaped tube)
47—Rotation Shaft (rotation shaft)
48—Bearing Housing (bearing housing)
49—Strong Support Beam (strong support beam)
50—Rotatable Circular Base (rotatable circular base)
51—Rotation Shaft Bearing (rotation shaft bearing)

What is claimed is:

1. A propellantless propulsion system comprising:
a first mass; and
a second mass with a greater mass than the first mass, the first and second mass each capable of simultaneously being moved in an opposite direction in a microgravity environment of space by an elastic force provided by a mechanical device;
a means to move the first mass in a positive direction without causing net negative movement by the second mass, the first mass thereafter used as a reaction mass in the form of a projectile used to accelerate or decelerate the second mass through the use of a brake;
wherein the elastic force is simultaneously applied to the first mass and the second mass to move the first mass and the second mass in the opposite direction, and further wherein the first mass is moved linearly in a first direction, which is a negative direction, and the second mass is simultaneously moved linearly in the opposite direction of the first mass, which is a positive direction, to produce a partially inelastic collision between the first mass and an internal surface of the second mass; and
wherein the partially inelastic collision, including kinetic energy losses in the form of heat and sound, results in no net negative acceleration or deceleration by the second mass from when the elastic force was first applied, and the first mass bounces off the internal surface of the second mass and moves in the opposite direction of its previous movement, which is the positive direction and a desired direction of a round of thrust, and wherein during the round of thrust a brake is employed to engage the first and second mass in an inelastic collision that results in the first and second mass moving together such that linear momentum from the first mass is transferred to the second mass to produce movement of the second mass in the positive direction, and further wherein during the round of thrust the brake abruptly stops the first mass to transfer linear momentum from the first mass to the second mass or the brake regeneratively brakes to harvest kinetic energy from the first mass and convert the kinetic energy into stored energy as linear momentum is simultaneously being transferred from the first mass to the second mass.

2. The propellantless propulsion system of claim 1, wherein the second mass comprises a containment vessel having sidewalls coupled to bulkheads, including a forward, middle, and aft bulkhead to form a closed vessel, and further wherein the first mass is propelled linearly in the first direction within the containment vessel toward the middle bulkhead using the elastic force provided by the mechanical device; and at least one electric power source to provide electric power to the mechanical device.

3. The propellantless propulsion system of claim 2, wherein the mechanical device comprises an elastic strap coupled at either end to an opposite sidewall of the containment vessel via a linear actuator which selectively alleviates elastic tension from the elastic strap on the first mass after the partially inelastic collision, a main body of the first mass, which is generally block-shaped, centrally positioned in between the sidewalls with the elastic strap held loosely in place behind the main body of the first mass through the use of a groove made for the strap in a back side of the main body of the first mass and an overlapping metal connector;
a winch-like device including an electric motor and using a cable coupled to the back side of the main body of the first mass to provide the elastic strap with potential energy by pulling the first mass toward the forward bulkhead such that the elastic strap is stretched and the first mass is in a locked position, the potential energy possessed by the stretched elastic strap when the first mass is in the locked position used to move the first mass toward the middle bulkhead and simultaneously move the containment vessel in the opposite direction of the first mass in response to the force provided by the elastic strap as it returns to its unstretched length;
an equal and opposite tension force remaining in the cable between the winch-like device and the first mass when the first mass is locked in place, the first mass secured to the second mass and unable to move independent of the second mass until it is released from the locked position, the winch-like device being disengaged thereby allowing the elastic strap to pull the first mass and the middle bulkhead of the second mass together such that the cable between the winch-like device and the first mass has enough slack so as not to interfere with actions taken to produce a round of thrust;
a vertical linear actuator mounted to an aft side of the middle bulkhead, the vertical linear actuator after being activated releasing an angular piece of metal positioned below and near an end of a metal guide shaft that passes through the middle bulkhead and is coupled to a front side of the main body of the first mass, the restoring force of the elastic strap simultaneously moving the first mass toward the middle bulkhead and the containment vessel in the opposite direction of the first mass.

4. The propellantless propulsion system of claim 3, wherein the second mass further includes an elastic impactor made of highly elastic material mounted on the forward surface of the middle bulkhead positioned between the forward and aft bulkheads, the elastic impactor including a cut-out for the guide shaft to pass through and be used by a plurality of contact gears in contact with the guide shaft from within the middle bulkhead to guide the first mass toward the elastic impactor, the elastic impactor thereafter able to receive the impact of the collision with the front side of the main body of the first mass such that after the partially inelastic collision with the elastic impactor the first mass moves away from the middle bulkhead with its linear momentum in the direction of the forward bulkhead, the linear momentum of the first mass thereby transferred to the second mass by using a brake to abruptly stop the first mass or the brake can brake regeneratively and harvest kinetic energy form the first mass and convert the kinetic energy into stored energy as linear momentum is simultaneously being transferred from the first mass to the second mass and the second mass is being accelerated or decelerated.

5. The propellantless propulsion system of claim 3, wherein the elastic strap has two looped ends, the two looped ends held in place on opposite sidewalls of the containment vessel via a linear actuator having a carriage and an attached bracket adapted for holding a looped end of the elastic strap, the carriage adapted to move linearly within the linear actuator along the sidewall to selectively alleviate the return of tension from the elastic strap to the back side of the first mass as the first mass moves away from the middle bulkhead and the elastic impactor after the partially inelastic collision;

wherein the two linear actuators further include a regenerative brake to harvest kinetic energy, thereby converting the kinetic energy into stored energy and producing thrust in the direction of the forward bulkhead as they slow and stop the two carriages, the two carriages containing the two looped ends of the strap at a proper distance away from the middle bulkhead after the partially inelastic collision, and wherein the two linear actuators include a motor which rotates about the same axis as the motor of the other linear actuator, and further wherein the two linear actuators include a motor which rotates in a direction opposite that of the motor of the other linear actuator to counteract rotational forces caused by torque from the motors on the containment vessel;

wherein, to provide altitude control and stability, a reaction/moment wheel or a control moment gyroscope may be coupled to the containment vessel to use the torque from rotating parts to control the rotation of the containment vessel and the direction of movement;

wherein the carriages of the first and second linear actuators can be locked in place, and wherein the first and second linear actuator's sprockets or pulleys can be placed into lock mode, slow-down mode or freely-turning mode;

wherein the carriages of the first and second linear actuators can be returned to their initial position near the middle bulkhead by rotating the motors of the first and second linear actuators in reverse once the winch-like device and the brake, including the guide shaft and components in communication with the guide shaft, and after the winch-like device has pulled in the slack on the cable and reestablished tension force in the cable between the winch-like device and the back side of the main body of the first mass, have established the beginnings of elastic tension provided by the elastic strap on the back side of the main body of the first mass depending, if needed, on where the first mass and the two opposing carriages are finally stopped and locked in place by an AI-enhanced control system; and wherein, after the carriages of the first and second linear actuators are returned to their original position near the middle bulkhead and locked in place without having a significant impact on the movement of the containment vessel, the winch-like device can proceed with pulling the first mass in the direction of the forward bulkhead before reducing and continuing to reduce speed until the desired amount of potential energy is possessed by the elastic strap and the first mass is in the locked position.

6. The propellantless propulsion system of claim 4, wherein the contact gears in contact with the guide shaft from within the middle bulkhead are adapted to be unlocked in coordination with the vertical linear actuator being activated to release the angular piece of metal, and wherein the contact gears are adapted to be placed into freely-turning mode such that as the guide shaft moves through the middle bulkhead in the direction of the aft bulkhead the kinetic energy lost by the first mass prior to the partially inelastic collision between the first and second mass is minimized and momentum is conserved, and further wherein the contact gears are adapted to rotate in the opposite direction and remain in freely-turning mode during and after the partially inelastic collision between the first and second mass until the brake is deployed to produce thrust in the direction of the forward bulkhead.

7. The propellantless propulsion system of claim 2, further comprising a primary means for producing thrust to accelerate or decelerate the second mass, the primary means for producing thrust comprising a regenerative brake or at least one brake, the process of producing thrust brought about through the transfer of linear momentum from the first mass to the second mass, and the means for braking coupled to the front side of the main body of the first mass and positioned within or in communication with the middle bulkhead of the containment vessel.

8. The propellantless propulsion system of claim 7, wherein the primary means for harvesting kinetic energy and converting the kinetic energy into stored energy comprises at least one of a guide shaft mounted to the front side of the main body of the first mass and having contact gears and a corresponding generator having a mating contact gear in contact with the guide shaft for engaging the generator with the guide shaft, at least one guide shaft mounted to the front side of the main body of the first mass and having contact gears and a corresponding flywheel having a mating contact gear in contact with the guide shaft for engaging the flywheel with the guide shaft, and the at least one guide shaft mounted to the front side of the main body of the first mass and having contact gears and a corresponding generator and flywheel combination having a mating contact gear in contact with the guide shaft for engaging the generator and flywheel combination with the guide shaft.

9. A propellantless propulsion system comprising:
a containment vessel comprising bulkheads, including a forward and aft bulkhead and sidewalls extending from at least the forward bulkhead to at least the aft bulkhead to form a closed vessel;
a first mass and a second mass of substantially equal mass spaced apart and opposite from one another and having a combined mass less than the mass of the object the propulsion system is intended to move in a microgravity environment of space, the first and second mass being coupled via a carriage in a first and second linear actuator, respectively, such that the first and second mass are adapted to move simultaneously in a linear direction along the sidewalls, and wherein the first and second mass move in a positive direction without thrust being produced in a negative direction, the first and second mass thereafter used as a reaction mass in the form of a projectile used to accelerate or decelerate the containment vessel through the use of a brake;

at least one electric motor coupled to each linear actuator and each sidewall of the first and second mass and adapted to drive the carriage of the linear actuator and move the first and second mass coupled thereto, the at least one motor uses torque to spin a rotor to drive a drive train to drive the carriage of the linear actuator as a substantially equal torque from the at least one motor is simultaneously being applied in an opposite direction to the sidewall of the containment vessel;

at least a first and second cable generator connected to the aft and forward bulkheads, respectively, and a cable connecting the at least first cable generator to an aft surface of the first mass and a cable connecting the at least second cable generator to a forward surface of the first mass;

at least a third and fourth cable generator connected to the aft and forward bulkheads, respectively, a cable connecting the at least third cable generator to an aft surface of the second mass and a cable connecting the at least fourth cable generator to a forward surface of the second mass;

an electric power source coupled to the at least one electric motor;

wherein the at least one electric motor coupled to each linear actuator and sidewall uses torque from the at least one motor coupled to each linear actuator and sidewall to simultaneously move the first and second mass towards the forward bulkhead and before reaching an end near the forward bulkhead, the at least first and third cable generators abruptly stops the movement of the first and second mass thereby producing thrust through the transfer of linear momentum to the containment vessel in the same direction as the movement of the first and second mass; and wherein the at least first, second, third and fourth cable generators in conjunction with the first and second linear actuators are adapted to move the first and second mass back to an initial start position near the aft bulkhead without having a significant impact on the movement of the containment vessel.

10. The propellantless propulsion system of claim 9, wherein the first and second mass are moved towards the aft bulkhead to move the containment vessel in the opposite direction by rotating the motors of the first and second actuators in reverse.

11. The propellantless propulsion system of claim 9, wherein the first linear actuator includes at least one motor which rotates about the same axis as the at least one motor of the other linear actuator, and wherein the first linear actuator includes at least one motor, configured and in equal number to the motors in the opposing linear actuator, which rotates in a direction opposite to that of the opposing motor of the other linear actuator to counteract rotational forces caused by torque from the motors on the containment vessel, and wherein the first and second linear actuators produce the linear momentum of the first and second mass as the linear actuators accelerate the first and second mass in the direction of the forward bulkhead.

12. The propellantless propulsion system of claim 10, wherein the first and second linear actuators are mounted to opposing sidewalls of the containment vessel and wherein the at least first and third cable generators are mounted to the forward bulkhead and the at least second and fourth cable generators are mounted to the aft bulkhead.

13. The propellantless propulsion system of claim 9, further comprising:
   a regenerative brake provided in the at least first and third cable generators, thereby producing thrust through the transfer of linear momentum from the first and second mass to the containment vessel and simultaneously converting kinetic energy into stored energy as they simultaneously slow and stop the movement of the first and second mass before they reach an end near the forward bulkhead;
   a regenerative brake provided in the first and second linear actuators, thereby producing thrust through the transfer of linear momentum from the first and second mass to the containment vessel and simultaneously converting kinetic energy into stored energy as the brake slows and stops the carriages coupled to the first and second mass before they reach an end near the forward bulkhead.

14. The propellantless propulsion system of claim 9, wherein the at least first, second, third and fourth cable generators include a spring-loaded cable reel, and wherein a spiral spring within the spring-loaded cable reel of the at least second and fourth cable generators are wound providing the spiral spring with potential energy and keeping tension on the cable of the at least second and fourth cable generators as the first and second mass are pulled by the at least first and third cable generators in the direction of the aft bulkhead, the first and second linear actuator's sprockets or pulleys in freely-turning mode as the first and second mass are moved back to the initial start position, and the at least first and third cable generators reducing and continuing to reduce speed as the first and second mass approach the aft bulkhead until the first and second mass and the two opposing carriages are finally stopped and locked in place by an AI-enhanced control system, and further wherein the spiral spring within the spring-loaded cable reel of the at least second and fourth cable generators are locked in place before the spring-loaded cable reel of the cable generator is disengaged from the remainder of the cable generator and a round of thrust begins;
   wherein a rotatable part of the spring-loaded cable reel of the at least second and fourth cable generators each rotate about the same axis when the spiral springs of each are simultaneously unwound, and wherein a rotatable part of the spring-loaded cable reel of the at least second and fourth cable generators each rotate in a direction which is opposite that of the other when the spiral springs of each are simultaneously unwound in a controlled manner and without significantly interfering with the remainder of the actions taken to produce a round of thrust;
   wherein the at least first, second, third and fourth cable generators are configured to lock the cable in place or stop the cable from moving, and wherein after the spring-loaded cable reel of the at least second and fourth cable generators are disengaged from the remainder of the cable generator, an equal and opposite tension force remains in the cables between the at least first and second cable generators, with the first mass in between, and the at least third and fourth cable generators, with the second mass in between, when the first and second mass are locked in place, the first and second mass are unable to move independent of the containment vessel until they are released from the locked position, and further wherein the at least first and third cable generators can be disengaged from the first and second mass, respectively, by being put in reverse until the cable between the at least first cable generator and the first mass, and the at least third cable generator and the second mass, has enough slack so as not to interfere with the remainder of the actions taken to produce a round of thrust;

wherein, when being utilized during a round of thrust, the at least first and third cable generators rotate about the same axis when the first mass and second mass are moving in the direction of the forward bulkhead, and wherein, when being utilized during a round of thrust, the at least first cable generator rotates in a direction which is opposite that of the at least third cable generator when the first and second mass are moving in the direction of the forward bulkhead;

wherein the carriages of the first and second linear actuators are configured to be locked, and wherein the first and second linear actuator's sprockets or pulleys can be placed into lock-mode, slow-down mode or freely-turning mode; and wherein, to provide altitude control and stability, a reaction/moment wheel or a control moment gyroscope is coupled to the containment vessel to use torque from rotating parts to control the rotation of the containment vessel and the direction of movement.

15. The propellantless propulsion system of claim 9, further comprising:

a third and fourth mass spaced apart and opposite each other on the top and bottom wall of the containment vessel, the third and fourth linear actuators adapted to move the third and fourth mass, respectively, linearly along the top and bottom wall of the containment vessel in the direction of the forward bulkhead.

16. A direction control unit comprising a housing having a length substantially larger than the width, wherein the housing includes a shaft coupled to a support beam provided on either side thereof and being connected to a 360 degrees rotatable base, the rotatable base being adapted to be mounted to a host vehicle, wherein the directional control unit housing can rotate 360 degrees around the shaft relative to the support beam, the directional control unit housing including therein a propellantless propulsion system as defined in claim 9.

17. The propellantless propulsion system of claim 9, wherein a plurality of containment vessels are coupled together and synchronized to increase and/or decrease velocity of the system.

18. A propellantless propulsion system comprising:

a first mass and second mass;

a third mass and fourth mass;

a first actuator and a second actuator;

a fifth mass comprising a containment vessel for housing the first, second, third and fourth mass and the first and second actuator in a microgravity environment of space; and the containment vessel and the first and second actuator including means for propelling the first and third mass toward a forward bulkhead of the containment vessel to make an inelastic collision with the second and fourth mass, respectively, such that after the inelastic collision the first and second mass move together towards the forward bulkhead and the third and fourth mass simultaneously move together towards the forward bulkhead, and both pairs of combined masses engage the fifth mass via a brake and move together with the fifth mass in the direction of the forward bulkhead.

19. The propellantless propulsion system of claim 18, wherein the propelling means comprises the first and third mass spun and then launched at high speed by a motor within a first and second actuator, and wherein the motor of the first actuator rotates about the same axis as the motor of the other actuator, and further wherein the first actuator includes a motor which rotates in a direction opposite that of the motor of the other actuator to counteract rotational forces caused by torque from the motors on the containment vessel; and wherein, to provide altitude control and stability, a reaction/moment wheel or a control moment gyroscope is coupled to the containment vessel to use torque from rotating parts to control the rotation of the containment vessel and the direction of movement.

20. The propellantless propulsion system of claim 18, wherein the first and second mass are returned by mechanical means to an initial start position without causing significant movement by the containment vessel, and wherein the third and fourth mass are returned by mechanical means to an initial start position without causing significant movement to the containment vessel.

\* \* \* \* \*